US011086555B1

(12) United States Patent
Botes et al.

(10) Patent No.: US 11,086,555 B1
(45) Date of Patent: *Aug. 10, 2021

(54) SYNCHRONOUSLY REPLICATING DATASETS

(71) Applicant: Pure Storage, Inc., Mountain View, CA (US)

(72) Inventors: Par Botes, Mountain View, CA (US); John Colgrove, Los Altos, CA (US); Alan Driscoll, Fremont, CA (US); David Grunwald, San Francisco, CA (US); Steven Hodgson, Palo Alto, CA (US); Ronald Karr, Palo Alto, CA (US)

(73) Assignee: Pure Storage, Inc., Mountain View, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/661,724

(22) Filed: Oct. 23, 2019

Related U.S. Application Data

(63) Continuation of application No. 15/842,850, filed on Dec. 14, 2017, now Pat. No. 10,503,427.
(Continued)

(51) Int. Cl.
*G06F 3/06* (2006.01)
*G06F 16/27* (2019.01)

(52) U.S. Cl.
CPC ............ *G06F 3/065* (2013.01); *G06F 3/067* (2013.01); *G06F 3/0617* (2013.01); *G06F 16/275* (2019.01)

(58) Field of Classification Search
CPC .......... G06F 3/065; G06F 3/061; G06F 3/067; G06F 16/275
See application file for complete search history.

(56) References Cited

U.S. PATENT DOCUMENTS 5,706,210 A   1/1998   Kumano et al.
5,799,200 A   8/1998   Brant et al.
(Continued)

FOREIGN PATENT DOCUMENTS

EP   0725324 A2   8/1996
EP   3414653 A1   12/2018
(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.
(Continued)

*Primary Examiner* — Hiep T Nguyen

(57) ABSTRACT

A pod, the pod including the dataset, a set of managed objects and management operations, a set of access operations to modify or read the dataset, and a plurality of storage systems, where: management operations can modify or query managed objects equivalently through any of the storage systems, access operations to read or modify the dataset operate equivalently through any of the storage systems, each storage system stores a separate copy of the dataset as a proper subset of the datasets stored and advertised for use by the storage system, and operations to modify managed objects or the dataset performed and completed through any one storage system are reflected in subsequent management objects to query the pod or subsequent access operations to read the dataset.

20 Claims, 58 Drawing Sheets

Related U.S. Application Data

(60) Provisional application No. 62/598,989, filed on Dec. 14, 2017, provisional application No. 62/518,071, filed on Jun. 12, 2017, provisional application No. 62/502,060, filed on May 5, 2017, provisional application No. 62/470,172, filed on Mar. 10, 2017.

(56) References Cited

U.S. PATENT DOCUMENTS

| | | |
|---|---|---|
| 5,933,598 A | 8/1999 | Scales et al. |
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,444,822 B1 | 9/2016 | Borowiec et al. |
| 9,507,532 B1 | 11/2016 | Colgrove et al. |
| 9,632,870 B2 | 4/2017 | Bennett |
| 10,095,428 B1 * | 10/2018 | Meiri ................ G06F 3/067 |
| 10,503,427 B2 * | 12/2019 | Botes ................ G06F 16/275 |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2005/0273565 A1 | 12/2005 | Hirakawa et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2006/0288178 A1 | 12/2006 | Yagawa et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0143367 A1 | 5/2014 | Dahlin et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |

(56) References Cited

U.S. PATENT DOCUMENTS

| | | | |
|---|---|---|---|
| 2015/0026387 | A1 | 1/2015 | Sheredy et al. |
| 2015/0074463 | A1 | 3/2015 | Jacoby et al. |
| 2015/0089569 | A1 | 3/2015 | Sondhi et al. |
| 2015/0095515 | A1 | 4/2015 | Krithivas et al. |
| 2015/0113203 | A1 | 4/2015 | Dancho et al. |
| 2015/0121137 | A1 | 4/2015 | McKnight et al. |
| 2015/0134920 | A1 | 5/2015 | Anderson et al. |
| 2015/0149822 | A1 | 5/2015 | Coronado et al. |
| 2015/0193169 | A1 | 7/2015 | Sundaram et al. |
| 2015/0378888 | A1 | 12/2015 | Zhang et al. |
| 2016/0098323 | A1 | 4/2016 | Mutha et al. |
| 2016/0173367 | A1 | 6/2016 | Sareen et al. |
| 2016/0205182 | A1* | 7/2016 | Lazar .................. G06F 3/067 709/219 |
| 2016/0350009 | A1 | 12/2016 | Cerreta et al. |
| 2016/0352720 | A1 | 12/2016 | Hu et al. |
| 2016/0352830 | A1 | 12/2016 | Borowiec et al. |
| 2016/0352834 | A1 | 12/2016 | Borowiec et al. |
| 2017/0046234 | A1* | 2/2017 | Yang .................. G06F 16/2365 |
| 2017/0149883 | A1 | 5/2017 | Joshi et al. |
| 2017/0155713 | A1 | 6/2017 | Powell et al. |
| 2018/0260125 | A1 | 9/2018 | Botes et al. |

FOREIGN PATENT DOCUMENTS

| | | | |
|---|---|---|---|
| WO | WO-2012/087648 | A1 | 6/2012 |
| WO | WO-2013071087 | A1 | 5/2013 |
| WO | WO-2013/163650 | A1 | 10/2013 |
| WO | WO-2014/110137 | A1 | 7/2014 |
| WO | WO-2016/004120 | A2 | 1/2016 |
| WO | WO-2016/100790 | A1 | 6/2016 |
| WO | WO-2016/015008 | A1 | 12/2016 |
| WO | WO-2016/190938 | A1 | 12/2016 |
| WO | WO-2016/195759 | A1 | 12/2016 |
| WO | WO-2016/195958 | A1 | 12/2016 |
| WO | WO-2016/195961 | A1 | 12/2016 |
| WO | WO-2018/164782 | A1 | 9/2018 |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Sep. 8, 2015, 2 pages, URL: en.wikipedia.org/wiki/Convergent_encryption.

Storer et al., *Secure Data Deduplication*, Proceedings of the 4th ACM International Workshop on Storage Security and Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 2 pages, URL: download.microsoft.com/download/E/A/E/EAE57CD1-A80B-423C-96BB-142FAAC630139/Hybrid_Identity_Datasheet.pdf.

Bellamy-Mcintyre et al., *OpenID and the Enterprise: A Model-based Analysis of Single Sign-On Authentication*, 15th IEEE International Enterprise Distributed Object Computing Conference (EDOC), Aug. 29, 2011, pp. 129-38, IEEE Computer Society, USA, DOI: 10.1109/EDOC.2011.26, ISBN: 978-1-4577-0362-1.

Kong, *Using PCI Express As the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Jul. 18, 2016, 12 pages.
International Search Report and Written Opinion, PCT/US2016/015008, dated May 4, 2016, 12 pages.
International Search Report and Written Opinion, PCT/US2016/020410, dated Jul. 8, 2016, 12 pages.
International Search Report and Written Opinion, PCT/US2016/032084, dated Jul. 18, 2016, 12 pages.
International Search Report and Written Opinion, PCT/US2016/016333, dated Jun. 8, 2016, 12 pages.
International Search Report and Written Opinion, PCT/US2016/032052, dated Aug. 30, 2016, 17 pages.
International Search Report and Written Opinion, PCT/US2016/035492, dated Aug. 17, 2016, 10 pages.
International Search Report and Written Opinion, PCT/US2016/036693, dated Aug. 29, 2016, 10 pages.
International Search Report and Written Opinion, PCT/US2016/038758, dated Oct. 7, 2016, 10 pages.
International Search Report and Written Opinion, PCT/US2016/040393, dated Sep. 22, 2016, 10 pages.
International Search Report and Written Opinion, PCT/US2016/044020, dated Sep. 30, 2016, 11 pages.
International Search Report and Written Opinion, PCT/US2016/044874, dated Oct. 7, 2016, 11 pages.
International Search Report and Written Opinion, PCT/US2016/044875, dated Oct. 5, 2016, 13 pages.
International Search Report and Written Opinion, PCT/US2016/044876, dated Oct. 21, 2016, 12 pages.
International Search Report and Written Opinion, PCT/US2016/044877, dated Sep. 29, 2016, 13 pages.
International Search Report and Written Opinion, PCT/US2018/016125, dated Apr. 20, 2018, 13 pages.

* cited by examiner

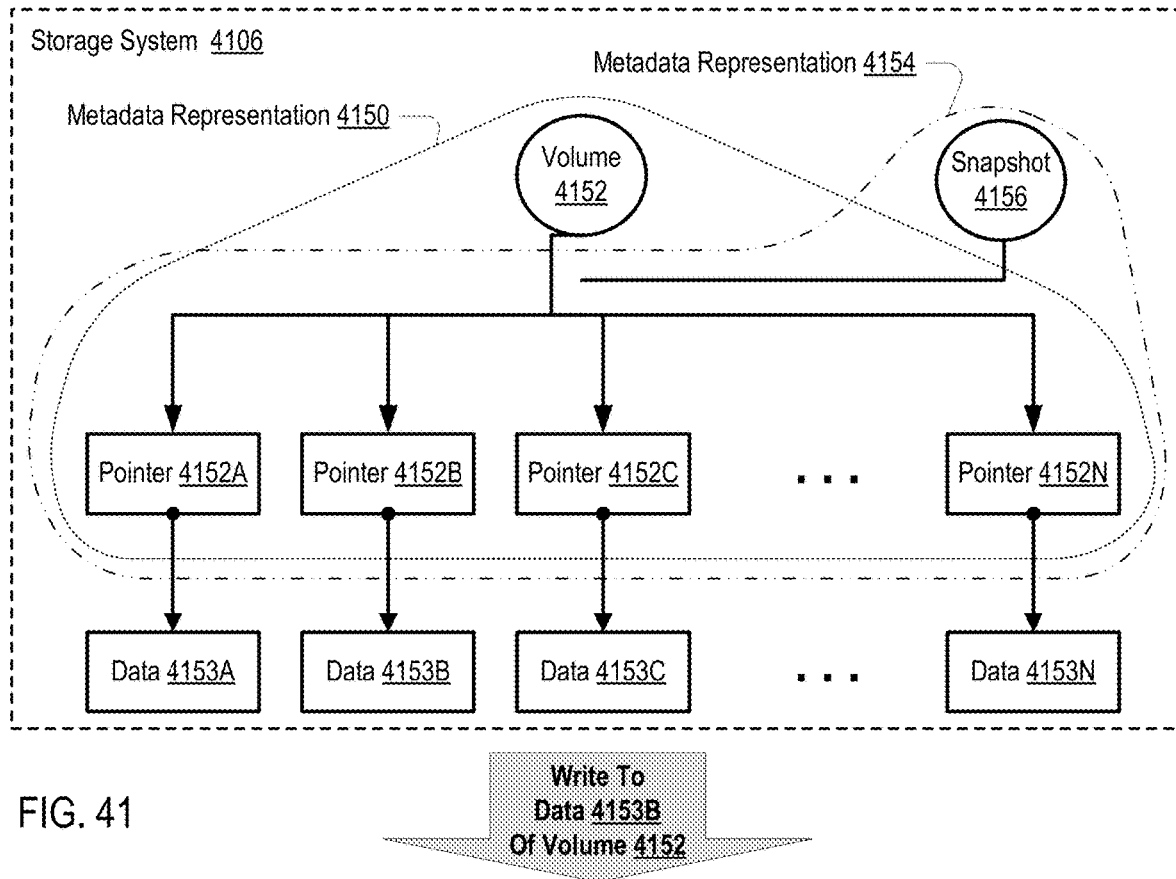
FIG. 41
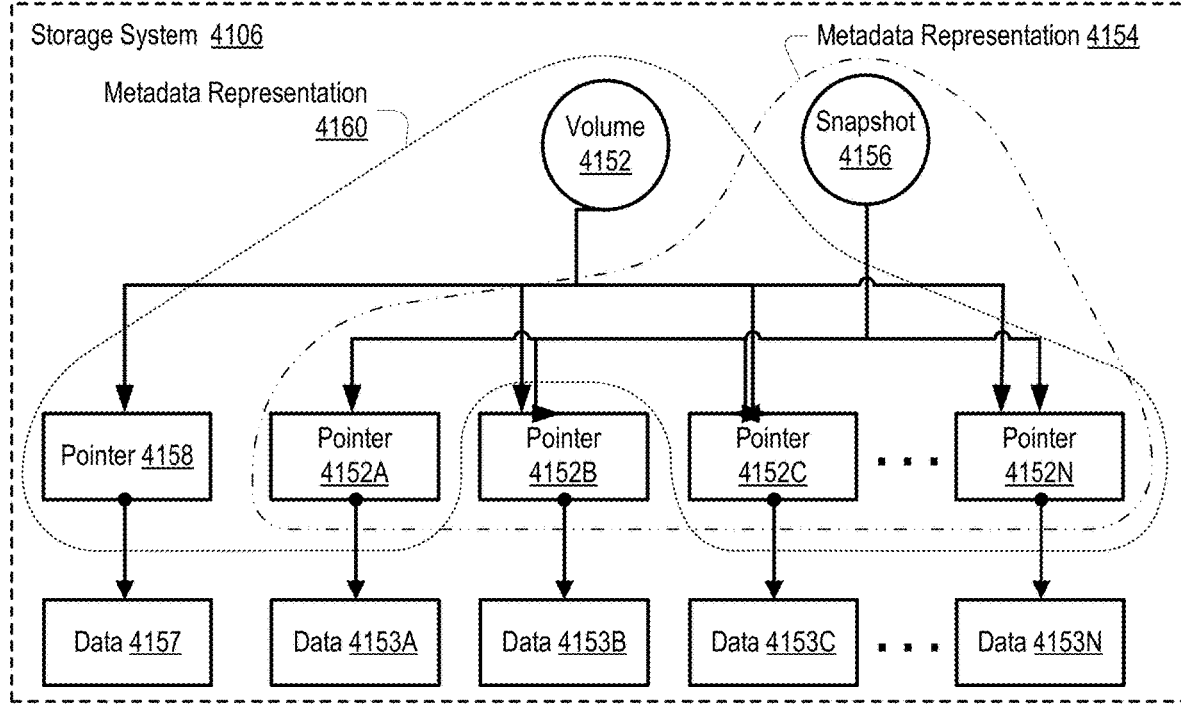

Storage System 4200A

Receive, At A First Storage System Of The Storage Systems, An I/O Operation Directed To The Dataset 4202

↓

Determine, In Dependence Upon The I/O Operation, A Metadata Update Describing A Mapping Of Segments Of Content To A Virtual Address Within A Storage Object, Where The Storage Object Includes The Dataset 4204

↓

Apply The I/O Operation To The Dataset On The First Storage System 4288

↓

Responsive To Successfully Applying The I/O Operation On The First Storage System, Update, On The First Storage System And In Accordance With The Metadata Update, A Version Of Metadata Corresponding To The Dataset Prior To Applying The I/O Operation 4290

↓

Determine Predicate Metadata Describing An Ordering Of The I/O Operations Relative To One Or More Other I/O Operations 4292

↓

Synchronize Metadata On A Second Storage System Of The Storage Systems By Sending The Metadata Update To The Second Storage System To Update A Metadata Representation On The Second Storage System In Accordance With The Metadata Update 4206

Storage Object 4256

Dataset 4258

FIG. 42B

```
Storage System 4300A

┌─────────────────────────────────────────────────────────────────┐
│ Detect, By A Particular Storage System Of The Storage Systems,  │
│ A Communication Fault With One Or More Of The Storage Systems,  │
│ Where The Particular Storage System Is Configured To Request    │
│ Mediation From A Mediation Target  4302                         │
└─────────────────────────────────────────────────────────────────┘
                              │
                              ▼
┌─────────────────────────────────────────────────────────────────┐
│ Determine That At Least One Of The One Or More Storage Systems  │
│ Is Configured To Request Mediation From The Mediation Target    │
│ Responsive To The Communication Fault  4304                     │
└─────────────────────────────────────────────────────────────────┘
                              │
                              ▼
┌─────────────────────────────────────────────────────────────────┐
│ Determine, By A First Set Of One Or More Storage Systems, That  │
│ There Is Consistent Communication Among Storage Systems Of The  │
│ First Set Of One Or More Storage Systems, Where Each Storage    │
│ System Of The Storage Systems Corresponds To Zero Or More Votes │
│ Within A Quorum Protocol That Determines Whether The First Set  │
│ Of One Or More Storage Systems May Detach A Second Set Of One   │
│ Or More Storage Systems  4402                                   │
└─────────────────────────────────────────────────────────────────┘
                              │
                              ▼
┌─────────────────────────────────────────────────────────────────┐
│ Determine, By The First Set Of One Or More Storage Systems,     │
│ Lack Of Communication With Storage Systems Among The Second Set │
│ Of One Or More Storage Systems, Where The First Set Of One Or   │
│ More Storage Systems Is Unable To Form A Quorum  4404           │
└─────────────────────────────────────────────────────────────────┘
                              │
                              ▼
┌─────────────────────────────────────────────────────────────────┐
│ Determine, By The First Set Of One Or More Storage Systems,     │
│ That The Second Set Of One Or More Storage Systems Is Unable To │
│ Form A Quorum  4406                                             │
└─────────────────────────────────────────────────────────────────┘
                              │
                              ▼
┌─────────────────────────────────────────────────────────────────┐
│ Responsive To Determining That One Or More Of The Storage       │
│ Systems Is Configured To Request Mediation From The Mediation   │
│ Target, Determining Whether To Request Mediation From The       │
│ Mediation Target  4306                                          │
└─────────────────────────────────────────────────────────────────┘
```

FIG. 44

Storage System 4300A

Detect, By A Particular Storage System Of The Storage Systems, A Communication Fault With One Or More Of The Storage Systems, Where The Particular Storage System Is Configured To Request Mediation From A Mediation Target 4302

Determine That At Least One Of The One Or More Storage Systems Is Configured To Request Mediation From The Mediation Target Responsive To The Communication Fault 4304

Determine, By The First Set Of One Or More Storage Systems, That There Is Consistent Communication Among Storage Systems Of The First Set Of One Or More Storage Systems 4402

Determine, By The First Set Of One Or More Storage Systems, Lack Of Communication With Storage Systems Among The Second Set Of One Or More Storage Systems, Where The First Set Of One Or More Storage Systems Is Unable To Form A Quorum 4404

Determine, By The First Set Of One Or More Storage Systems, That The Second Set Of One Or More Storage Systems Is Unable To Form A Quorum 4406

Determine That The Second Set Of One Or More Storage Systems Is Unable To Form A Quorum In Dependence Upon The Second Set Of One Or More Storage Systems Including Half Of The Votes For The Storage Systems Synchronously Replicating The Dataset 4602

Responsive To Determining That One Or More Of The Storage Systems Is Configured To Request Mediation From The Mediation Target, Determining Whether To Request Mediation From The Mediation Target 4306

FIG. 46

SYNCHRONOUSLY REPLICATING DATASETS

CROSS-REFERENCE TO RELATED APPLICATIONS

This application is a continuation application of and claims priority from U.S. patent application Ser. No. 15/842,850, filed Dec. 14, 2017, which is a non-provisional Application for patent claiming the benefit of U.S. Provisional Patent Application Ser. No. 62/470,172, filed Mar. 10, 2017, U.S. Provisional Patent Application Ser. No. 62/502,060, filed May 5, 2017, U.S. Provisional Patent Application Ser. No. 62/518,071, filed Jun. 12, 2017, and U.S. Provisional Patent Application Ser. No. 62/598,989, filed Dec. 14, 2017.

BRIEF DESCRIPTION OF DRAWINGS

FIG. 41 sets forth diagrams of metadata representations that may be implemented as a structured collection of metadata objects that, together, may represent a logical volume of storage data, or a portion of a logical volume, in accordance with some embodiments of the present disclosure.

FIG. 42B sets forth a flow chart illustrating an example method of synchronizing metadata among storage systems synchronously replicating a dataset according to some embodiments of the present disclosure.

FIG. 44 sets forth a flow chart illustrating an example method for determining active membership among storage systems synchronously replicating a dataset according to some embodiments of the present disclosure.

FIG. 46 sets forth a flow chart illustrating an example method for determining active membership among storage systems synchronously replicating a dataset according to some embodiments of the present disclosure.

DESCRIPTION OF EMBODIMENTS

Figure 1A:
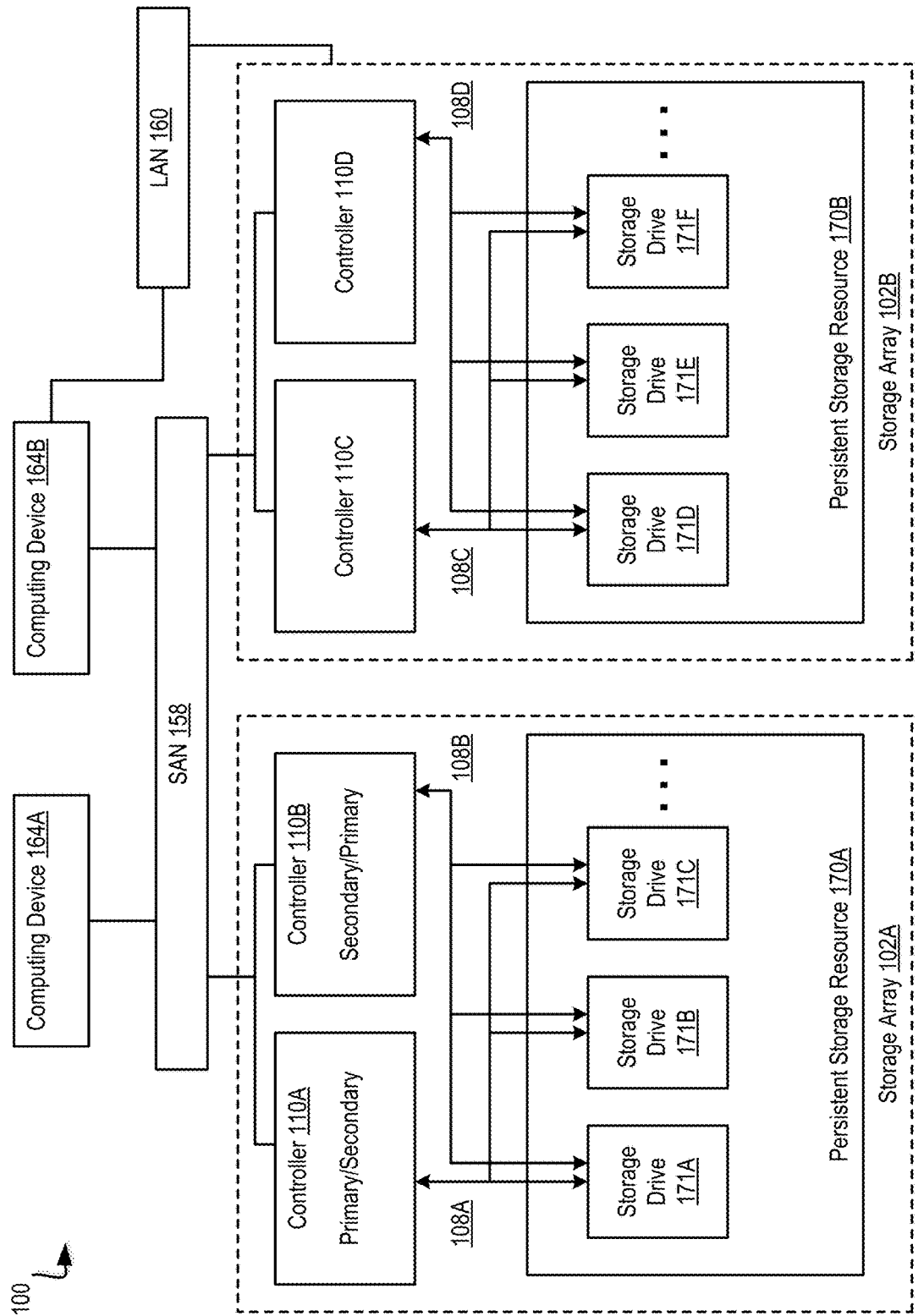
FIG. 1A illustrates a first example system for data storage in accordance with some implementations.

Example methods, apparatus, and products for synchronously replicating datasets and other managed objects to cloud-based storage systems in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol (IF), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller (e.g., storage array controller 110A) of a storage system 100 may be designated with primary status (also referred to as "primary controller" herein), and other storage array controllers (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
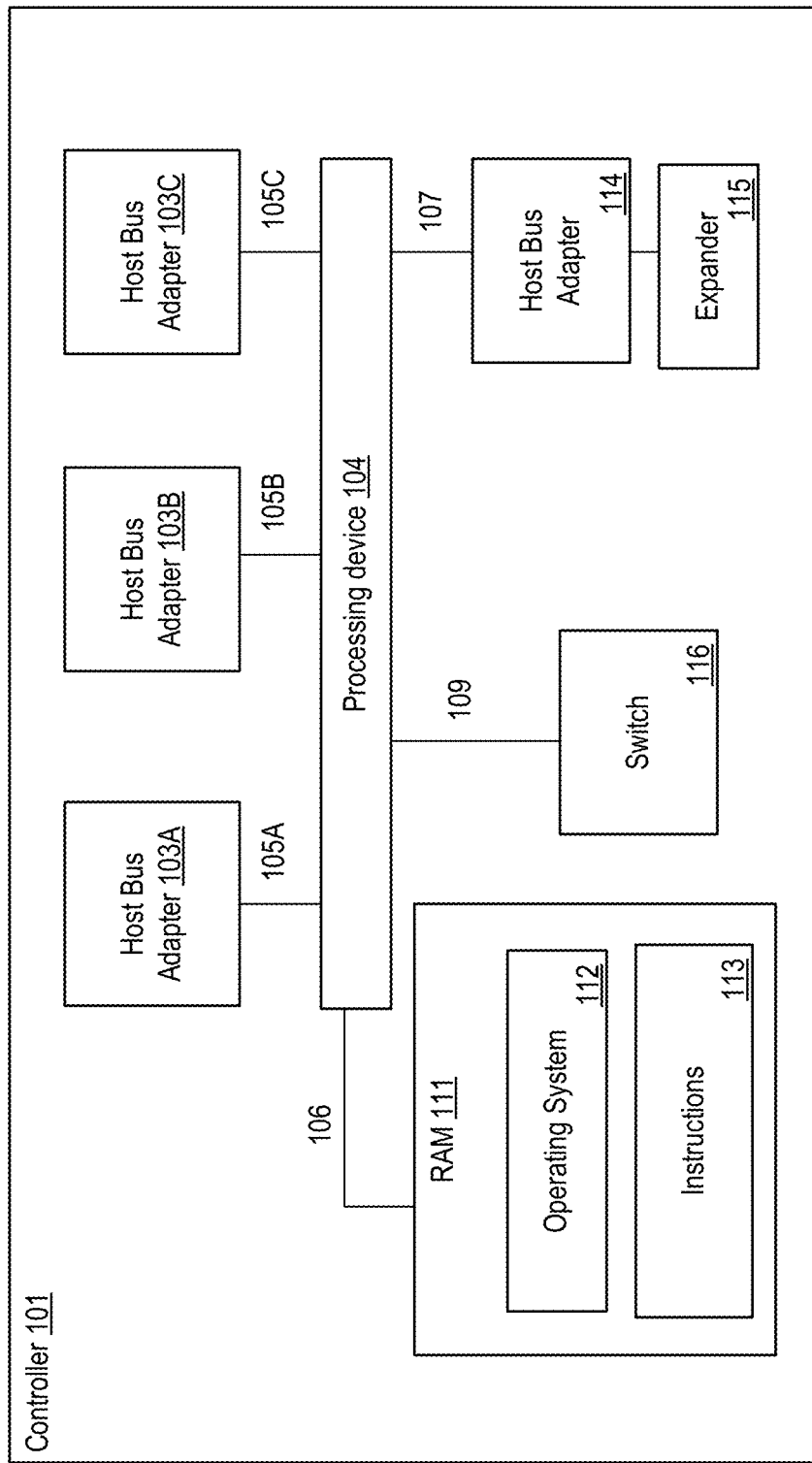
FIG. 1B illustrates a second example system for data storage in accordance with some implementations.

FIG. 1B illustrates an example system for data storage, in accordance with some implementations. Storage array controller 101 illustrated in FIG. 1B may similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an application specific integrated circuit ('ASIC'), a field programmable gate array ('FPGA'), a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
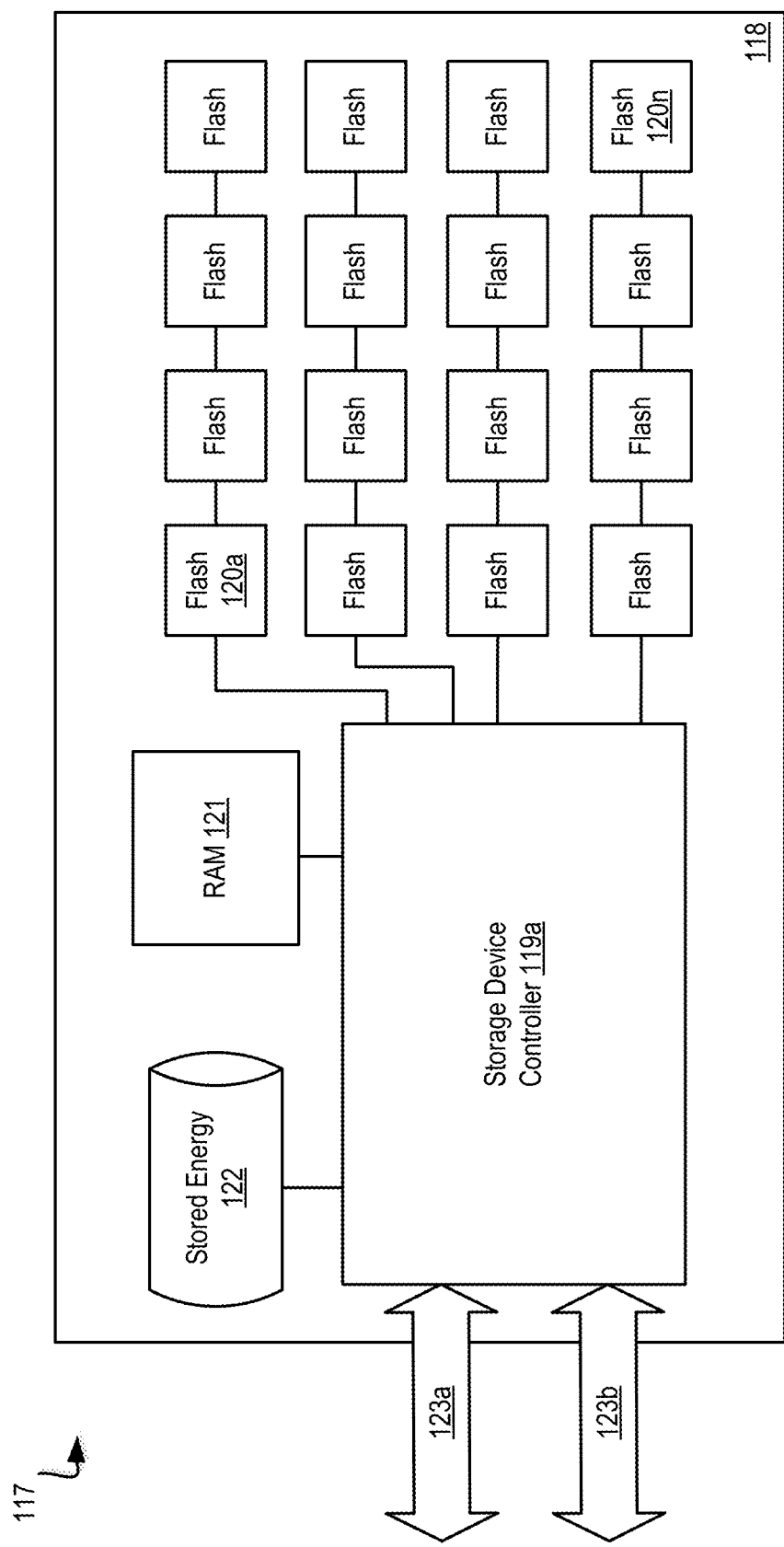
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage device controller 119a-d. In one embodiment, storage device controller 119a-d may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119a-d. Flash memory devices 120a-n, may be presented to the controller 119a-d as an addressable collection of Flash pages, erase blocks, and/or control elements sufficient to allow the storage device controller 119a-d to program and retrieve various aspects of the Flash. In one embodiment, storage device controller 119a-d may perform operations on flash memory devices 120A-N including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119a-d or multiple storage device controllers. The RAM 121 may be utilized for other purposes as well, such as temporary program memory for a processing device (e.g., a CPU) in the storage device controller 119a-d.

In one embodiment, system 117 may include a stored energy device 122, such as a rechargeable battery or a capacitor. Stored energy device 122 may store energy sufficient to power the storage device controller 119a-d, some amount of the RAM (e.g., RAM 121), and some amount of Flash memory (e.g., Flash memory 120a-120n) for sufficient time to write the contents of RAM to Flash memory. In one embodiment, storage device controller 119a-d may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119a-d from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119a-d may present a logical device over a PCI bus which may include an addressable fast-write logical device, or a distinct part of the logical address space of the Dual PCI storage device 118, which may be presented as PCI memory or as persistent storage. In one embodiment, operations to store into the device are directed into the RAM 121. On power failure, the storage device controller 119a-d may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a Dual PCI storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 107a-120n stored energy device 122 may power storage device controller 119a-d and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119a-d. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
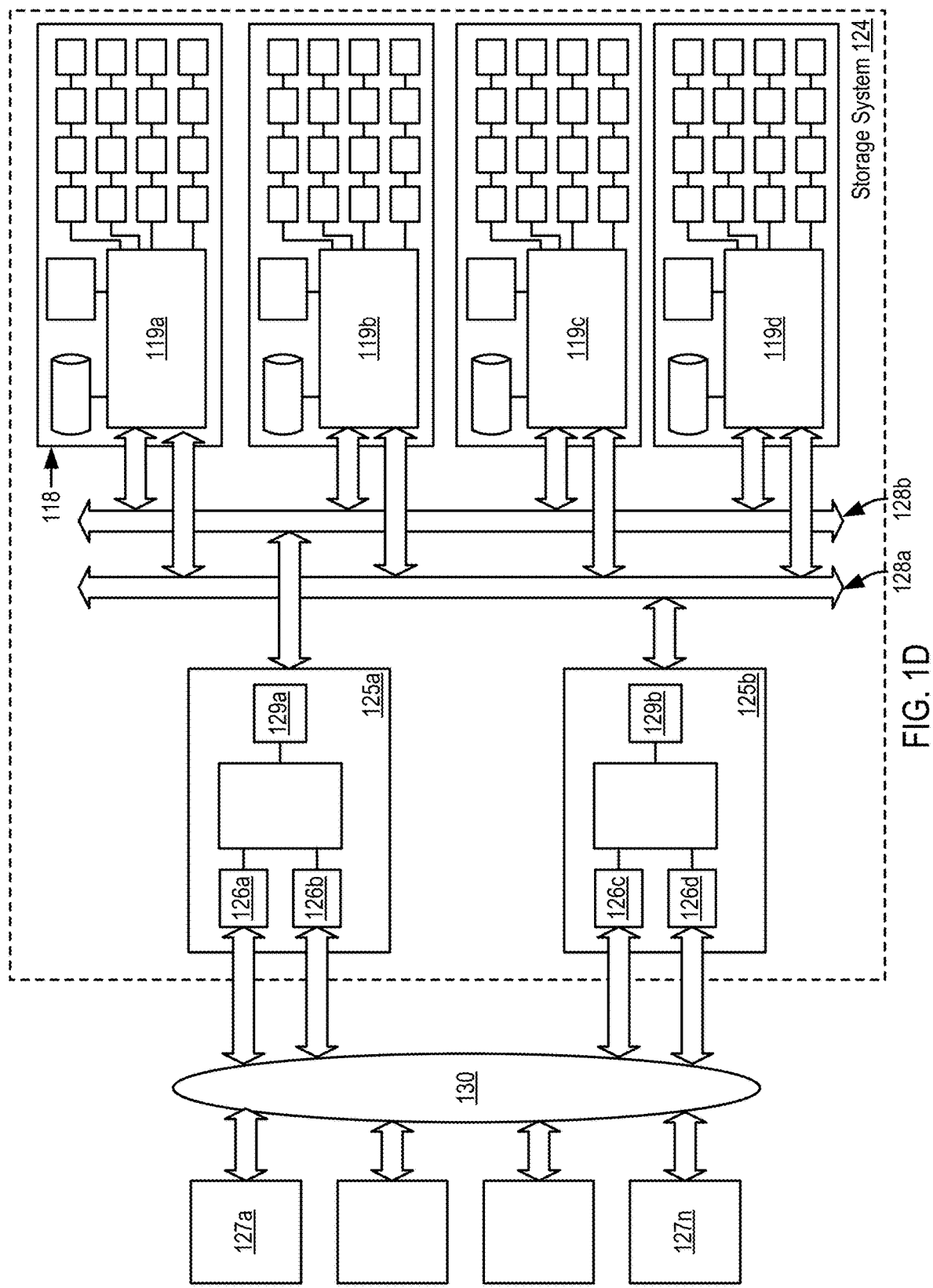
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to storage device controllers 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage device controllers 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128*a*, 128*b*) from the storage controllers 125*a*, 125*b*. In one embodiment, a recalculation may include compressing data, attaching indexing or other metadata, combining multiple data segments together, performing erasure code calculations, etc.

In one embodiment, under direction from a storage controller 125*a*, 125*b*, a storage device controller 119*a*, 119*b* may be operable to calculate and transfer data to other storage devices from data stored in RAM (e.g., RAM 121 of FIG. 1C) without involvement of the storage controllers 125*a*, 125*b*. This operation may be used to mirror data stored in one controller 125*a* to another controller 125*b*, or it could be used to offload compression, data aggregation, and/or erasure coding calculations and transfers to storage devices to reduce load on storage controllers or the storage controller interface 129*a*, 129*b* to the PCI bus 128*a*, 128*b*.

A storage device controller 119*a-d* may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125*a*, 125*b* may initiate the use of erase blocks within and across storage devices (e.g., 118) in accordance with an age and expected remaining lifespan of the storage devices, or based on other statistics. The storage controllers 125*a*, 125*b* may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
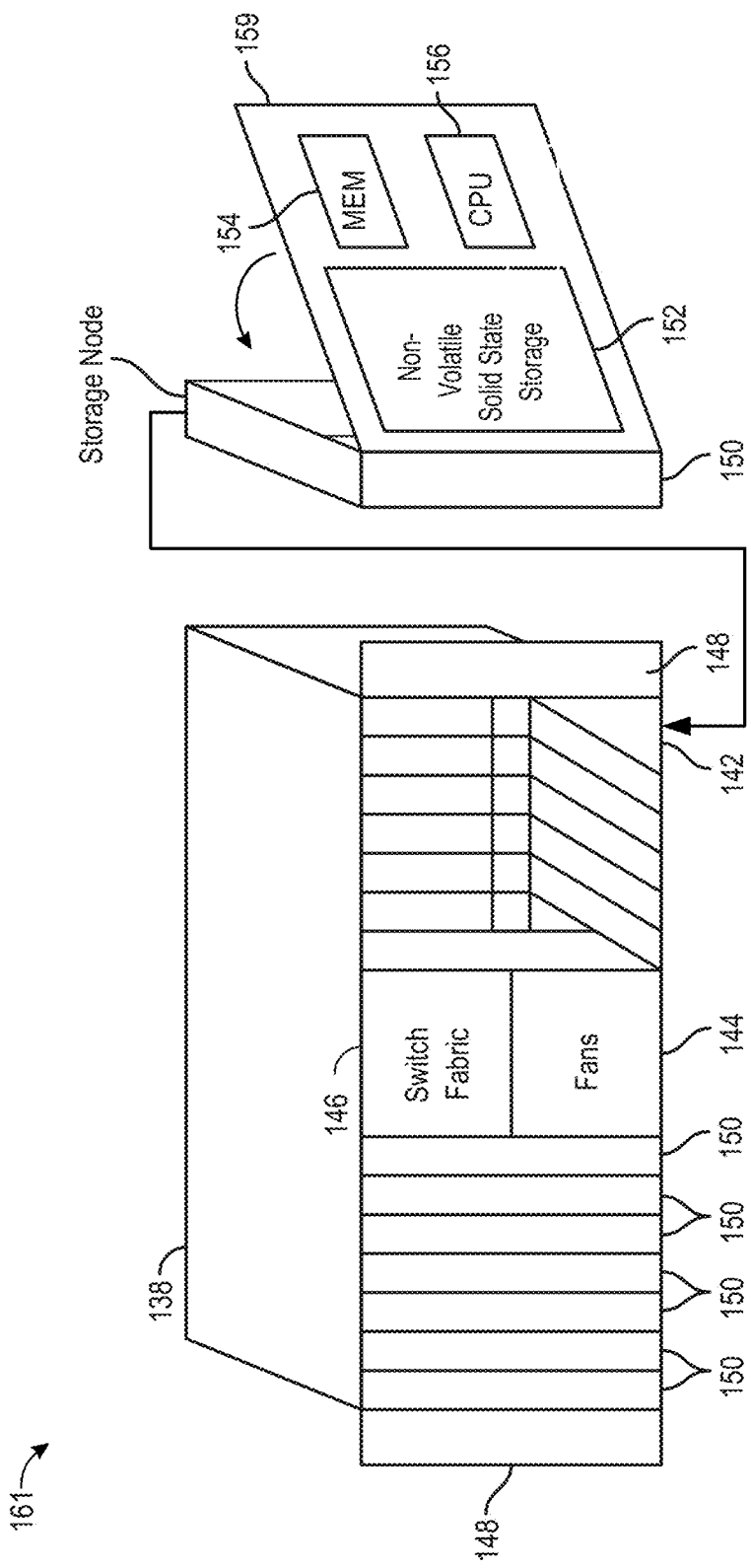
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
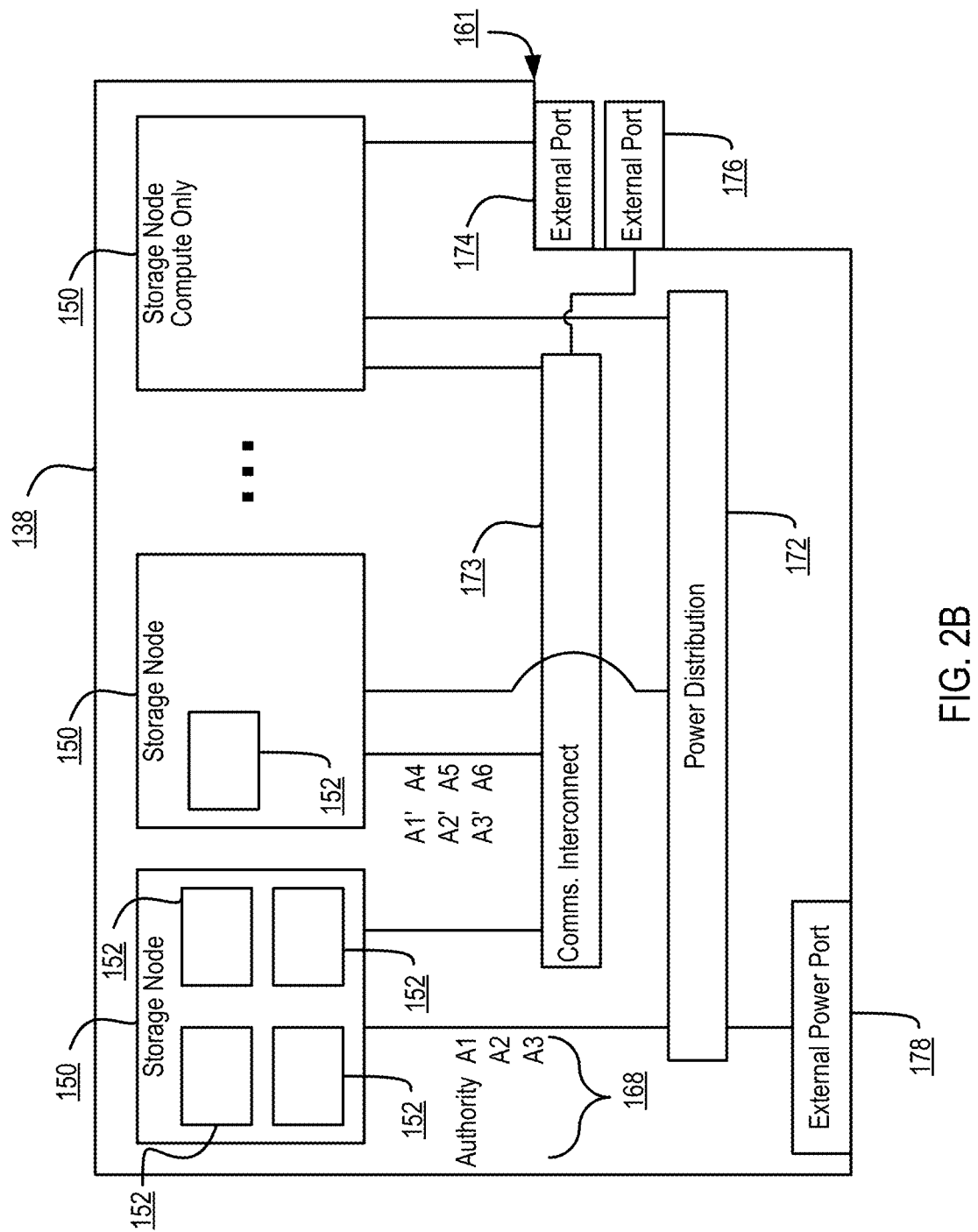
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
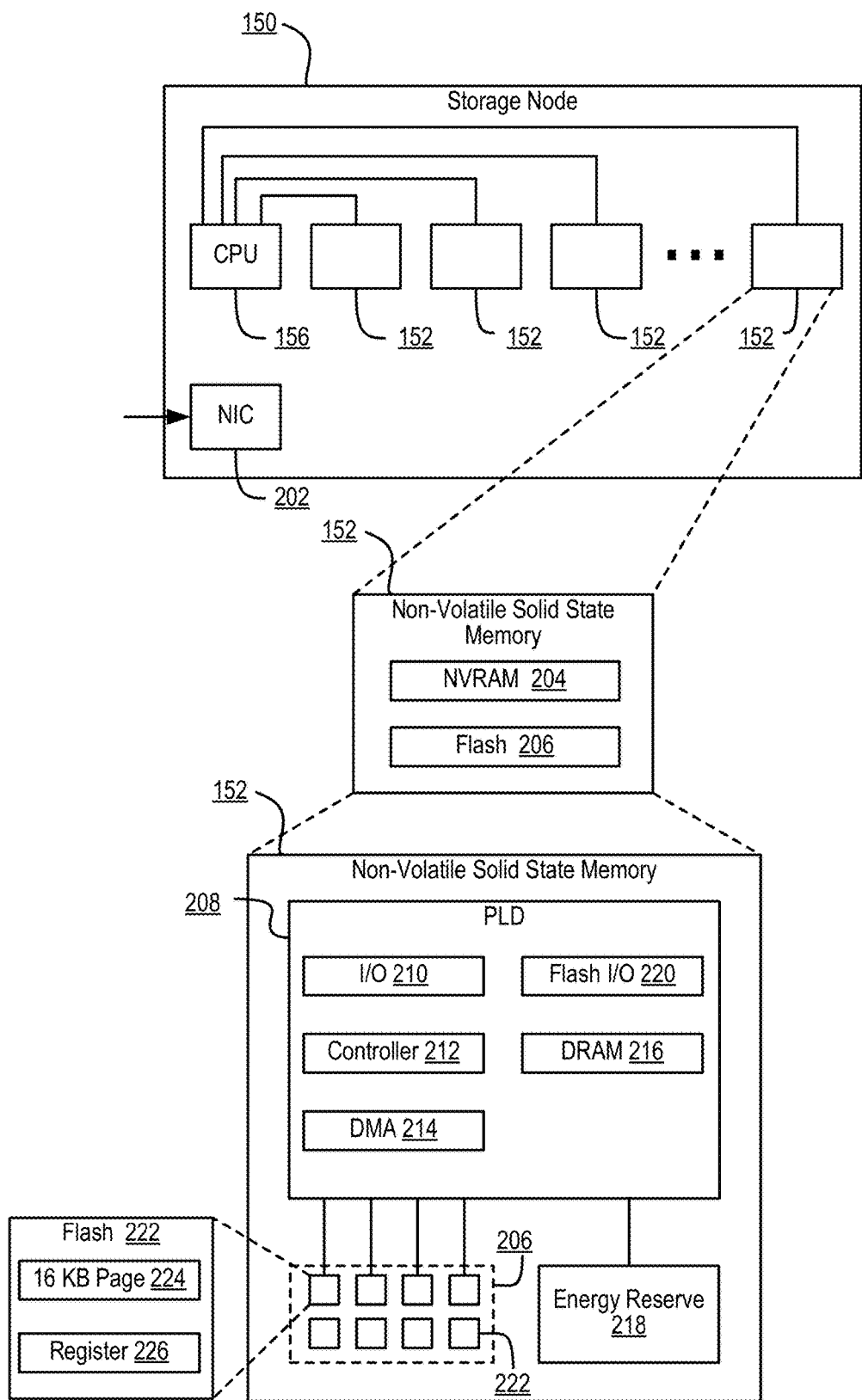
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
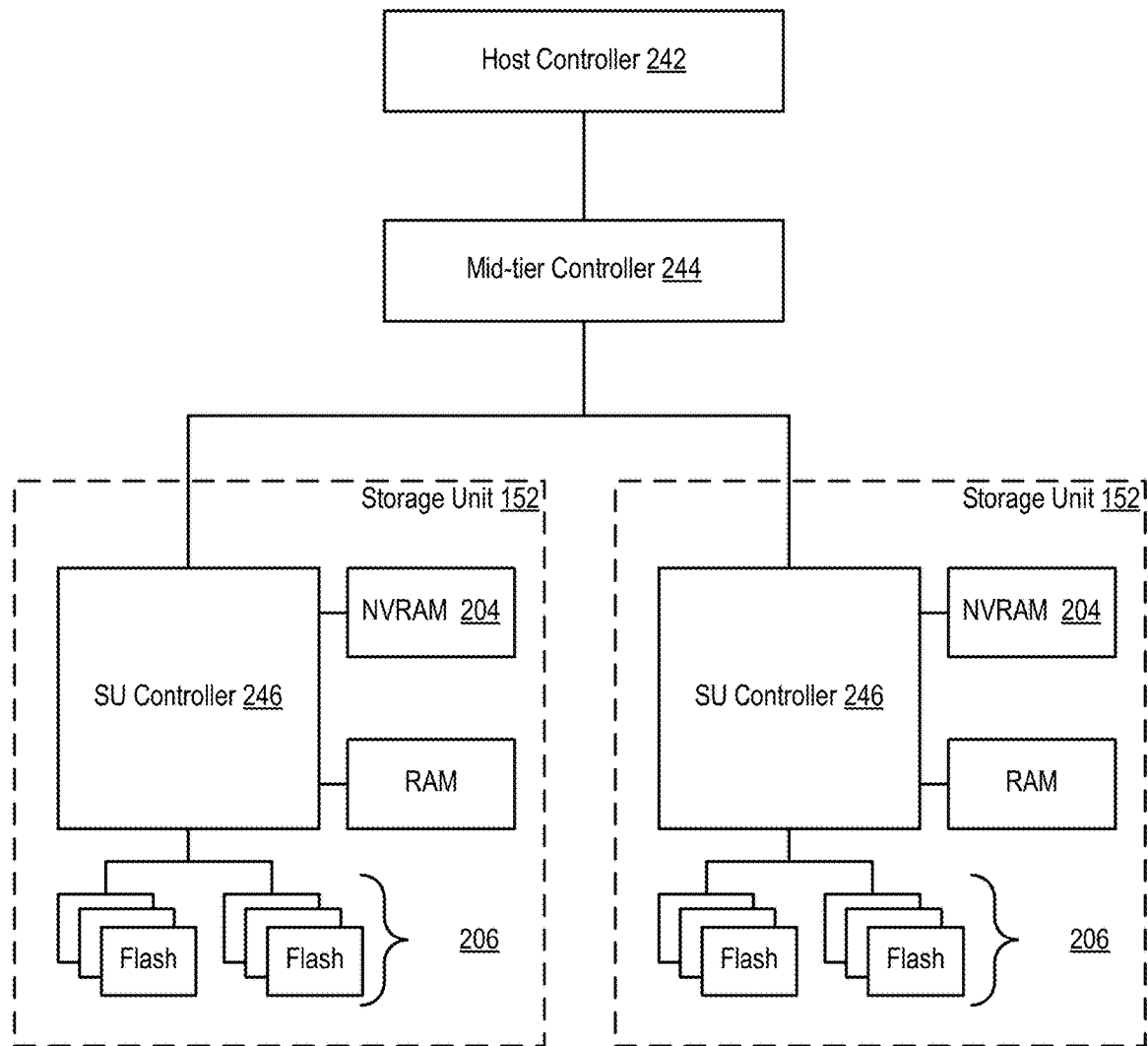
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA (field programmable gate array), flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
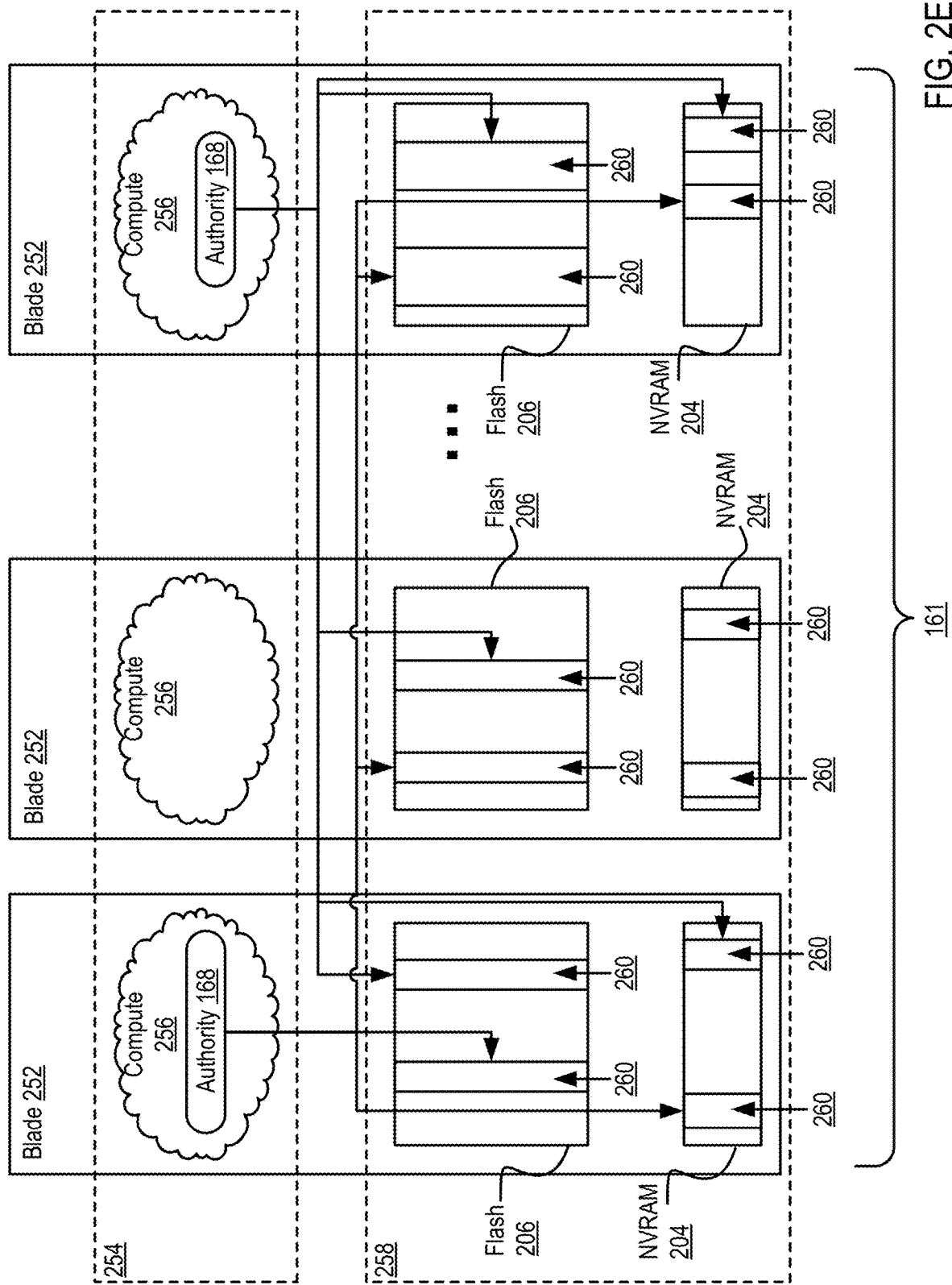
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources.

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
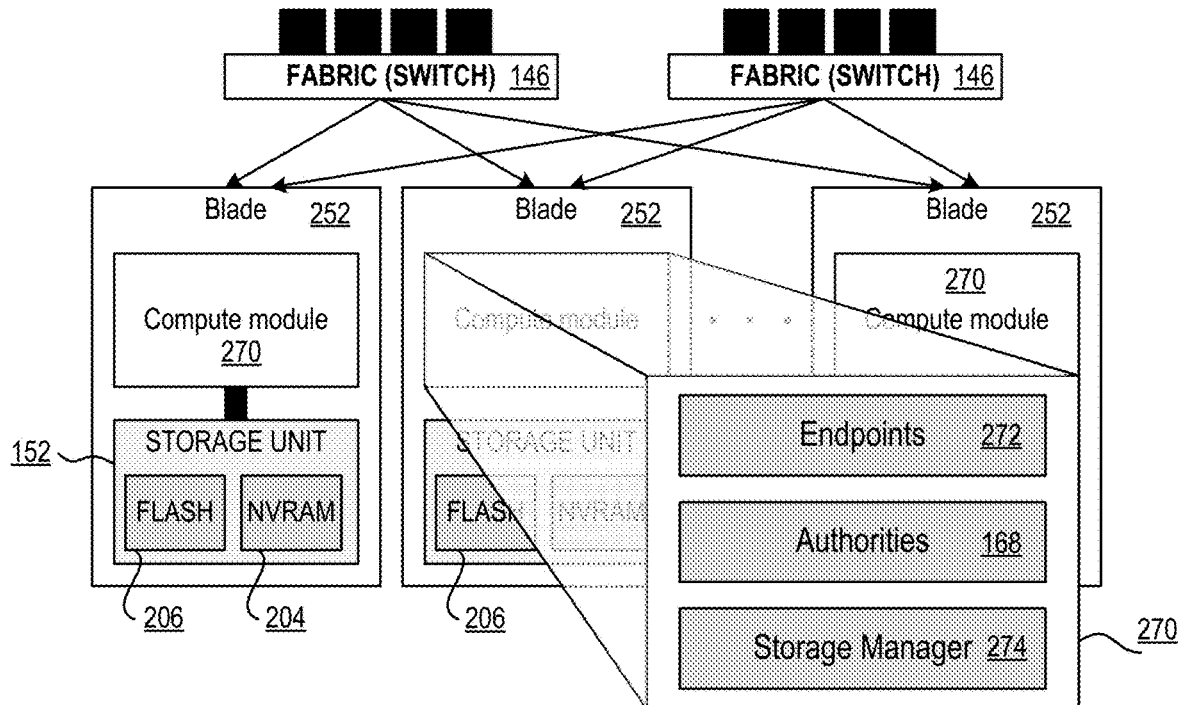
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
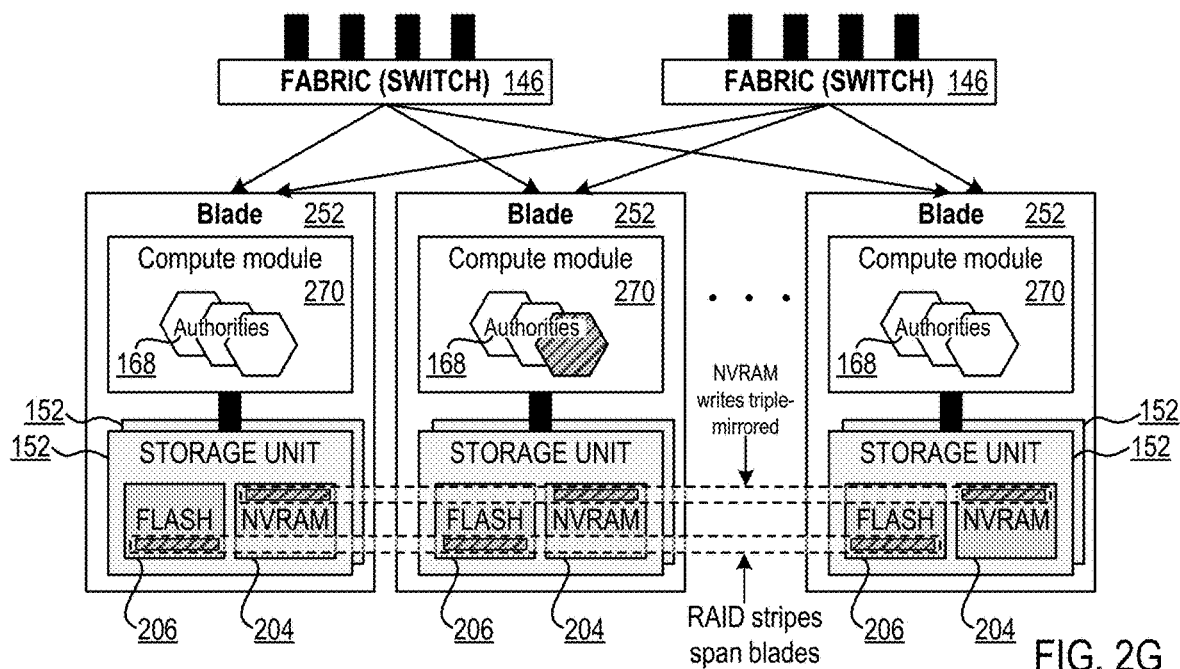
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
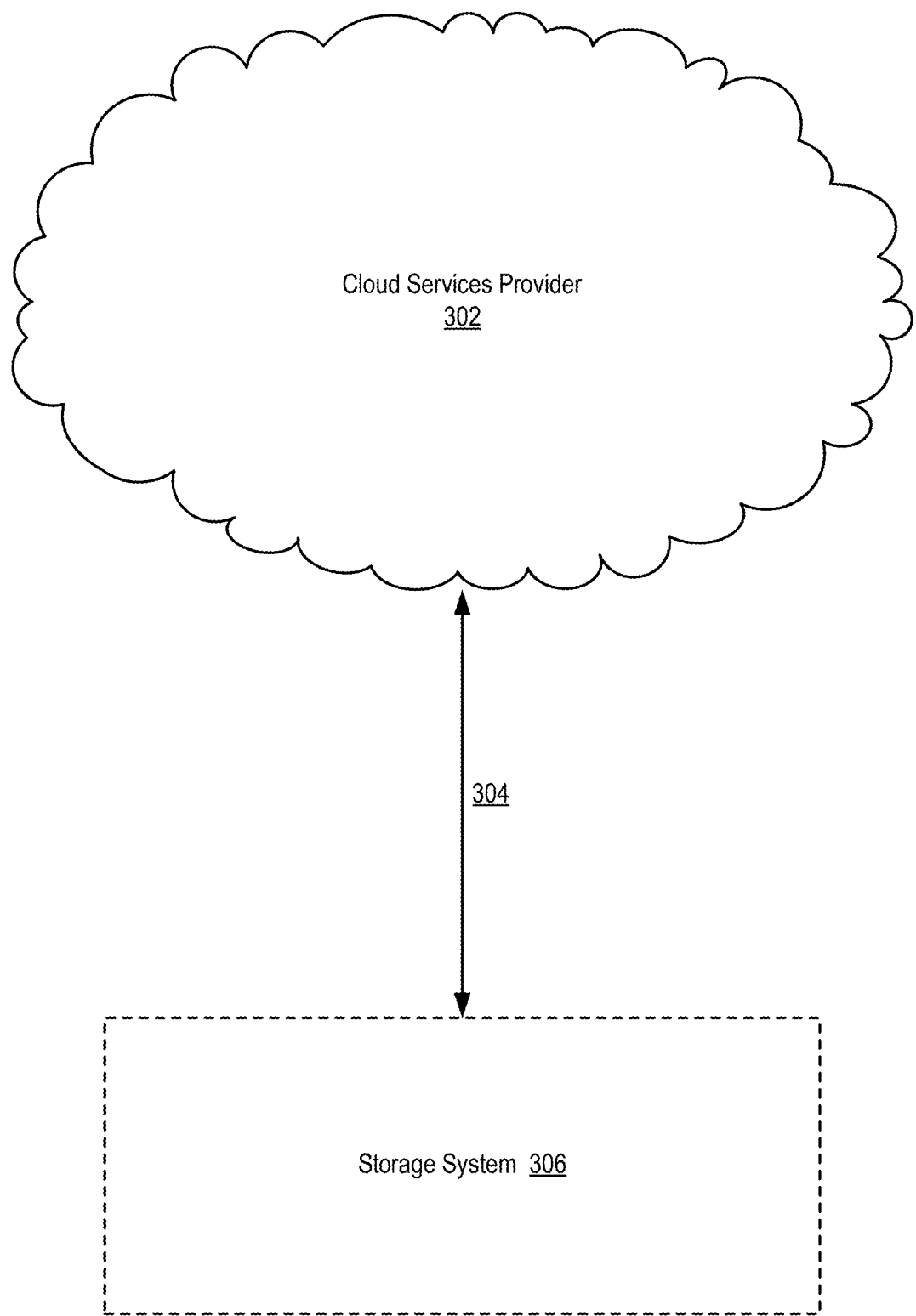
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or local area network ('LAN'), or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services to the storage system 306 and users of the storage system 306 through the implementation of an infrastructure as a service ('IaaS') service model where the cloud services provider 302 offers computing infrastructure such as virtual machines and other resources as a service to subscribers. In addition, the cloud services provider 302 may be configured to provide services to the storage system 306 and users of the storage system 306 through the implementation of a platform as a service ('PaaS') service model where the cloud services provider 302 offers a development environment to application developers. Such a development environment may include, for example, an operating system, programming-language execution environment, database, web server, or other components that may be utilized by application developers to develop and run software solutions on a cloud platform. Furthermore, the cloud services provider 302 may be configured to provide services to the storage system 306 and users of the storage system 306 through the implementation of a software as a service ('SaaS') service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. The cloud services provider 302 may be further configured to provide services to the storage system 306 and users of the storage system 306 through the implementation of an authentication as a service ('AaaS') service model where the cloud services provider 302 offers authentication services that can be used to secure access to applications, data sources, or other resources. The cloud services provider 302 may also be configured to provide services to the storage system 306 and users of the storage system 306 through the implementation of a storage as a service model where the cloud services provider 302 offers access to its storage infrastructure for use by the storage system 306 and users of the storage system 306. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. Public cloud and private cloud deployment models may differ and may come with various advantages and disadvantages. For example, because a public cloud deployment involves the sharing of a computing infrastructure across different organization, such a deployment may not be ideal for organizations with security concerns, mission-critical workloads, uptime requirements demands, and so on. While a private cloud deployment can address some of these issues, a private cloud deployment may require on-premises staff to manage the private cloud. In still alternative embodiments, the cloud services provider 302 may be embodied as a mix of a private and public cloud services with a hybrid cloud deployment.

Although not explicitly depicted in FIG. 3A, readers will appreciate that additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive telemetry data phoned home by the storage system 306. Such telemetry data may describe various operating characteristics of the storage system 306 and may be analyzed, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
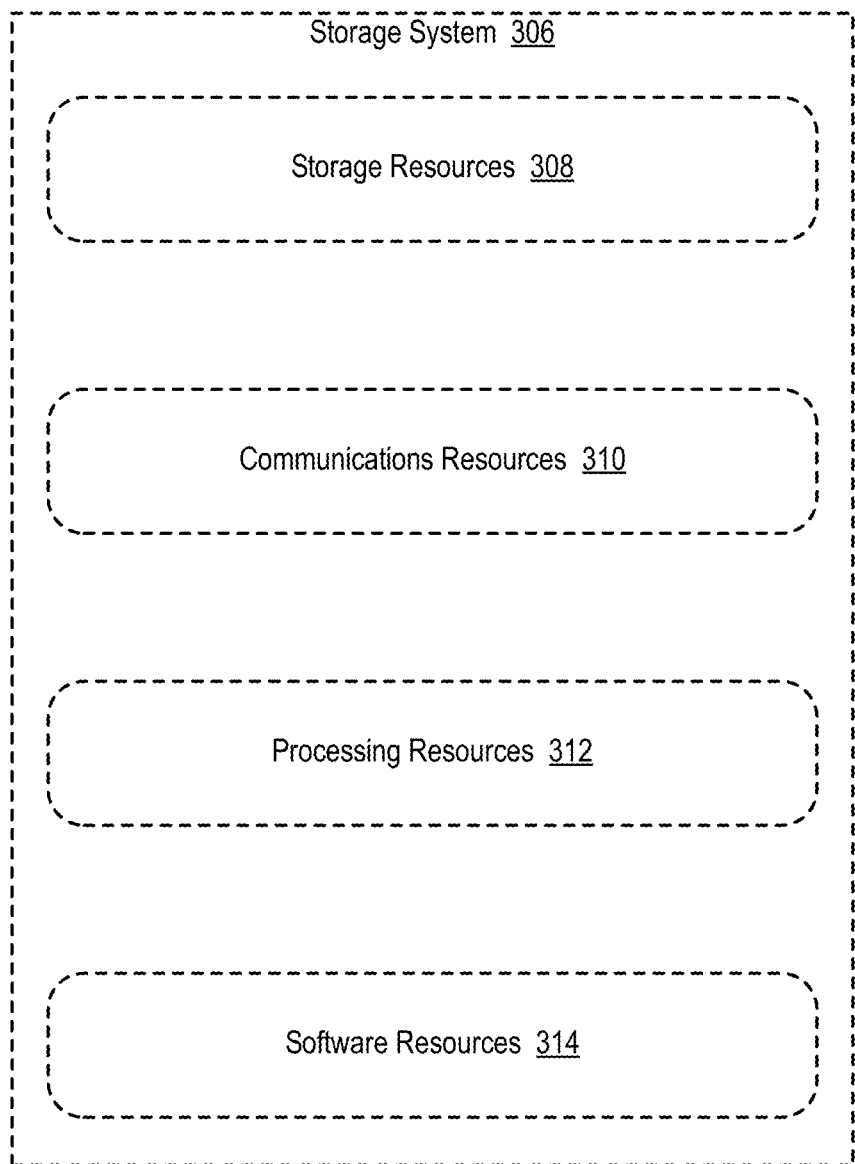
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include storage resources 308, which may be embodied in many forms. For example, in some embodiments the storage resources 308 can include nano-RAM or another form of nonvolatile random access memory that utilizes carbon nanotubes deposited on a substrate. In some embodiments, the storage resources 308 may include 3D crosspoint non-volatile memory in which bit storage is based on a change of bulk resistance, in conjunction with a stackable cross-gridded data access array. In some embodiments, the storage resources 308 may include flash memory, including single-level cell ('SLC') NAND flash, multi-level cell ('MLC') NAND flash, triple-level cell ('TLC') NAND flash, quad-level cell ('QLC') NAND flash, and others. In some embodiments, the storage resources 308 may include non-volatile magnetoresistive random-access memory ('MRAM'), including spin transfer torque ('STT') MRAM, in which data is stored through the use of magnetic storage elements. In some embodiments, the example storage resources 308 may include non-volatile phase-change memory ('PCM') that may have the ability to hold multiple bits in a single cell as cells can achieve a number of distinct intermediary states. In some embodiments, the storage resources 308 may include quantum memory that allows for the storage and retrieval of photonic quantum information. In some embodiments, the example storage resources 308 may include resistive random-access memory ('ReRAM') in which data is stored by changing the resistance across a dielectric solid-state material. In some embodiments, the storage resources 308 may include storage class memory ('SCM') in which solid-state nonvolatile memory may be manufactured at a high density using some combination of sub-lithographic patterning techniques, multiple bits per cell, multiple layers of devices, and so on. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC networks. The communications resources 310 can also include FC over ethernet ('FCoE') technologies through which FC frames are encapsulated and transmitted over Ethernet networks. The communications resources 310 can also include InfiniBand ('IB') technologies in which a switched fabric topology is utilized to facilitate transmissions between channel adapters. The communications resources 310 can also include NVM Express ('NVMe') technologies and NVMe over fabrics ('NVMeoF') technologies through which non-volatile storage media attached via a PCI express ('PCIe') bus may be accessed. The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more application-specific integrated circuits ('ASICs') that are customized for some particular purpose as well as one or more central processing units ('CPUs'). The processing resources 312 may also include one or more digital signal processors ('DSPs'), one or more field-programmable gate arrays ('FPGAs'), one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform various tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques. Through the use of such data protection techniques, business continuity and disaster recovery objectives may be met as a failure of the storage system may not result in the loss of data stored in the storage system.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Readers will appreciate that the various components depicted in FIG. 3B may be grouped into one or more optimized computing packages as converged infrastructures. Such converged infrastructures may include pools of computers, storage and networking resources that can be shared by multiple applications and managed in a collective manner using policy-driven processes. Such converged infrastructures may minimize compatibility issues between various components within the storage system 306 while also reducing various costs associated with the establishment and operation of the storage system 306. Such converged infrastructures may be implemented with a converged infrastructure reference architecture, with standalone appliances, with a software driven hyper-converged approach (e.g., hyper-converged infrastructures), or in other ways.

Readers will appreciate that the storage system 306 depicted in FIG. 3B may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may be also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. A GPU is a modern processor with thousands of cores, well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing, and many others. Training deep neural networks, however, requires both high quality input data and large amounts of computation. GPUs are massively parallel processors capable of operating on large amounts of data simultaneously. When combined into a multi-GPU cluster, a high throughput pipeline may be required to feed input data from storage to the compute engines. Deep learning is more than just constructing and training models. There also exists an entire data pipeline that must be designed for the scale, iteration, and experimentation necessary for a data science team to succeed.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

A data scientist works to improve the usefulness of the trained model through a wide variety of approaches: more data, better data, smarter training, and deeper models. In many cases, there will be teams of data scientists sharing the same datasets and working in parallel to produce new and improved training models. Often, there is a team of data scientists working within these phases concurrently on the same shared datasets. Multiple, concurrent workloads of data processing, experimentation, and full-scale training layer the demands of multiple access patterns on the storage tier. In other words, storage cannot just satisfy large file reads, but must contend with a mix of large and small file reads and writes. Finally, with multiple data scientists exploring datasets and models, it may be critical to store data in its native format to provide flexibility for each user to transform, clean, and use the data in a unique way. The storage systems described above may provide a natural shared storage home for the dataset, with data protection redundancy (e.g., by using RAID6) and the performance necessary to be a common access point for multiple developers and multiple experiments. Using the storage systems described above may avoid the need to carefully copy subsets of the data for local work, saving both engineering and GPU-accelerated servers use time. These copies become a constant and growing tax as the raw data set and desired transformations constantly update and change.

Readers will appreciate that a fundamental reason why deep learning has seen a surge in success is the continued improvement of models with larger data set sizes. In contrast, classical machine learning algorithms, like logistic regression, stop improving in accuracy at smaller data set sizes. As such, the separation of compute resources and storage resources may also allow independent scaling of each tier, avoiding many of the complexities inherent in managing both together. As the data set size grows or new data sets are considered, a scale out storage system must be able to expand easily. Similarly, if more concurrent training is required, additional GPUs or other compute resources can be added without concern for their internal storage. Furthermore, the storage systems described above may make building, operating, and growing an AI system easier due to the random read bandwidth provided by the storage systems, the ability to of the storage systems to randomly read small files (50 KB) high rates (meaning that no extra effort is required to aggregate individual data points to make larger, storage-friendly files), the ability of the storage systems to scale capacity and performance as either the dataset grows or the throughput requirements grow, the ability of the storage systems to support files or objects, the ability of the storage systems to tune performance for large or small files (i.e., no need for the user to provision filesystems), the ability of the storage systems to support non-disruptive upgrades of hardware and software even during production model training, and for many other reasons.

Small file performance of the storage tier may be critical as many types of inputs, including text, audio, or images will be natively stored as small files. If the storage tier does not handle small files well, an extra step will be required to pre-process and group samples into larger files. Storage, built on top of spinning disks, that relies on SSD as a caching tier, may fall short of the performance needed. Because training with random input batches results in more accurate models, the entire data set must be accessible with full performance. SSD caches only provide high performance for a small subset of the data and will be ineffective at hiding the latency of spinning drives.

Readers will appreciate that the storage systems described above may be configured to support the storage of (among of types of data) blockchains. Such blockchains may be embodied as a continuously growing list of records, called blocks, which are linked and secured using cryptography. Each block in a blockchain may contain a hash pointer as a link to a previous block, a timestamp, transaction data, and so on. Blockchains may be designed to be resistant to modification of the data and can serve as an open, distributed ledger that can record transactions between two parties efficiently and in a verifiable and permanent way. This makes blockchains potentially suitable for the recording of events, medical records, and other records management activities, such as identity management, transaction processing, and others.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the systems described above may be better suited for the applications described above relative to other systems that may include, for example, a distributed direct-attached storage (DDAS) solution deployed in server nodes. Such DDAS solutions may be built for handling large, less sequential accesses but may be less able to handle small, random accesses. Readers will further appreciate that the storage systems described above may be utilized to provide a platform for the applications described above that is preferable to the utilization of cloud-based resources as the storage systems may be included in an on-site or in-house infrastructure that is more secure, more locally and internally managed, more robust in feature sets and performance, or otherwise preferable to the utilization of cloud-based resources as part of a platform to support the applications described above. For example, services built on platforms such as IBM's Watson may require a business enterprise to distribute individual user information, such as financial transaction information or identifiable patient records, to other institutions. As such, cloud-based offerings of AI as a service may be less desirable than internally managed and offered AI as a service that is supported by storage systems such as the storage systems described above, for a wide array of technical reasons as well as for various business reasons.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models."

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. Likewise, machines like locomotives and gas turbines that generate large amounts of information through the use of a wide array of data-generating sensors may benefit from the rapid data processing capabilities of an edge solution. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

Consider a specific example of inventory management in a warehouse, distribution center, or similar location. A large inventory, warehousing, shipping, order-fulfillment, manufacturing or other operation has a large amount of inventory on inventory shelves, and high resolution digital cameras that produce a firehose of large data. All of this data may be taken into an image processing system, which may reduce the amount of data to a firehose of small data. All of the small data may be stored on-premises in storage. The on-premises storage, at the edge of the facility, may be coupled to the cloud, for external reports, real-time control and cloud storage. Inventory management may be performed with the results of the image processing, so that inventory can be tracked on the shelves and restocked, moved, shipped, modified with new products, or discontinued/obsolescent products deleted, etc. The above scenario is a prime candidate for an embodiment of the configurable processing and storage systems described above. A combination of compute-only blades and offload blades suited for the image processing, perhaps with deep learning on offload-FPGA or offload-custom blade(s) could take in the firehose of large data from all of the digital cameras, and produce the firehose of small data. All of the small data could then be stored by storage nodes, operating with storage units in whichever combination of types of storage blades best handles the data flow. This is an example of storage and function acceleration and integration. Depending on external communication needs with the cloud, and external processing in the cloud, and depending on reliability of network connections and cloud resources, the system could be sized for storage and compute management with bursty workloads and variable conductivity reliability. Also, depending on other inventory management aspects, the system could be configured for scheduling and resource management in a hybrid edge/cloud environment.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. Big data analytics applications enable data scientists, predictive modelers, statisticians and other analytics professionals to analyze growing volumes of structured transaction data, plus other forms of data that are often left untapped by conventional business intelligence (BI) and analytics programs. As part of that process, semi-structured and unstructured data such as, for example, internet clickstream data, web server logs, social media content, text from customer emails and survey responses, mobile-phone call-detail records, IoT sensor data, and other data may be converted to a structured form. Big data analytics is a form of advanced analytics, which involves complex applications with elements such as predictive models, statistical algorithms and what-if analyses powered by high-performance analytics systems.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

Figure 4:
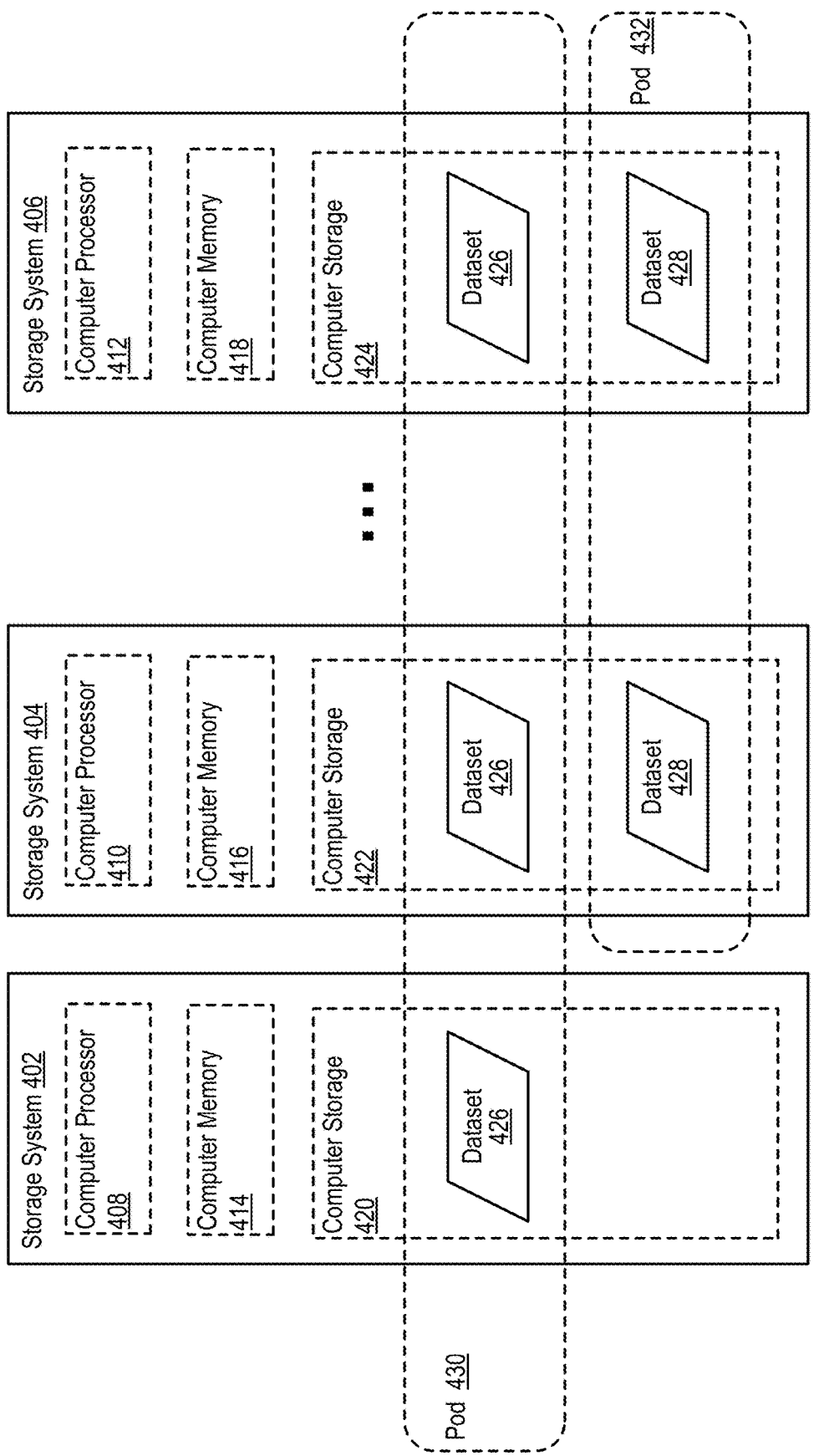
FIG. 4 sets forth a block diagram illustrating a plurality of storage systems that support a pod according to some embodiments of the present disclosure.

For further explanation, FIG. 4 sets forth a block diagram illustrating a plurality of storage systems (402, 404, 406) that support a pod according to some embodiments of the present disclosure. Although depicted in less detail, the storage systems (402, 404, 406) depicted in FIG. 4 may be similar to the storage systems described above with reference to FIGS. 1A-1D, FIGS. 2A-2G, FIGS. 3A-3B, or any combination thereof. In fact, the storage systems (402, 404, 406) depicted in FIG. 4 may include the same, fewer, or additional components as the storage systems described above.

In the example depicted in FIG. 4, each of the storage systems (402, 404, 406) is depicted as having at least one computer processor (408, 410, 412), computer memory (414, 416, 418), and computer storage (420, 422, 424). Although in some embodiments the computer memory (414, 416, 418) and the computer storage (420, 422, 424) may be part of the same hardware devices, in other embodiments the computer memory (414, 416, 418) and the computer storage (420, 422, 424) may be part of different hardware devices. The distinction between the computer memory (414, 416, 418) and the computer storage (420, 422, 424) in this particular example may be that the computer memory (414, 416, 418) is physically proximate to the computer processors (408, 410, 412) and may store computer program instructions that are executed by the computer processors (408, 410, 412), while the computer storage (420, 422, 424) is embodied as non-volatile storage for storing user data, metadata describing the user data, and so on. Referring to the example above in FIG. 1A, for example, the computer processors (408, 410, 412) and computer memory (414, 416, 418) for a particular storage system (402, 404, 406) may reside within one of more of the controllers (110A-110D) while the attached storage devices (171A-171F) may serve as the computer storage (420, 422, 424) within a particular storage system (402, 404, 406).

In the example depicted in FIG. 4, the depicted storage systems (402, 404, 406) may attach to one or more pods (430, 432) according to some embodiments of the present disclosure. Each of the pods (430, 432) depicted in FIG. 4 can include a dataset (426, 428). For example, a first pod (430) that three storage systems (402, 404, 406) have attached to includes a first dataset (426) while a second pod (432) that two storage systems (404, 406) have attached to includes a second dataset (428). In such an example, when a particular storage system attaches to a pod, the pod's dataset is copied to the particular storage system and then kept up to date as the dataset is modified. Storage systems can be removed from a pod, resulting in the dataset being no longer kept up to date on the removed storage system. In the example depicted in FIG. 4, any storage system which is active for a pod (it is an up-to-date, operating, non-faulted member of a non-faulted pod) can receive and process requests to modify or read the pod's dataset.

In the example depicted in FIG. 4, each pod (430, 432) may also include a set of managed objects and management operations, as well as a set of access operations to modify or read the dataset (426, 428) that is associated with the particular pod (430, 432). In such an example, the management operations may modify or query managed objects equivalently through any of the storage systems. Likewise, access operations to read or modify the dataset may operate equivalently through any of the storage systems. In such an example, while each storage system stores a separate copy of the dataset as a proper subset of the datasets stored and advertised for use by the storage system, the operations to modify managed objects or the dataset performed and completed through any one storage system are reflected in subsequent management objects to query the pod or subsequent access operations to read the dataset.

Readers will appreciate that pods may implement more capabilities than just a clustered synchronously replicated dataset. For example, pods can be used to implement tenants, whereby datasets are in some way securely isolated from each other. Pods can also be used to implement virtual arrays or virtual storage systems where each pod is presented as a unique storage entity on a network (e.g., a Storage Area Network, or Internet Protocol network) with separate addresses. In the case of a multi-storage-system pod implementing a virtual storage system, all physical storage systems associated with the pod may present themselves as in some way the same storage system (e.g., as if the multiple physical storage systems were no different than multiple network ports into a single storage system).

Readers will appreciate that pods may also be units of administration, representing a collection of volumes, file systems, object/analytic stores, snapshots, and other administrative entities, where making administrative changes (e.g., name changes, property changes, managing exports or permissions for some part of the pod's dataset), on any one storage system is automatically reflected to all active storage systems associated with the pod. In addition, pods could also be units of data collection and data analysis, where performance and capacity metrics are presented in ways that aggregate across all active storage systems for the pod, or that call out data collection and analysis separately for each pod, or perhaps presenting each attached storage system's contribution to the incoming content and performance for each a pod.

One model for pod membership may be defined as a list of storage systems, and a subset of that list where storage systems are considered to be in-sync for the pod. A storage system may be considered to be in-sync for a pod if it is at least within a recovery of having identical idle content for the last written copy of the dataset associated with the pod. Idle content is the content after any in-progress modifications have completed with no processing of new modifications. Sometimes this is referred to as "crash recoverable" consistency. Recovery of a pod carries out the process of reconciling differences in applying concurrent updates to in-sync storage systems in the pod. Recovery can resolve any inconsistencies between storage systems in the completion of concurrent modifications that had been requested to various members of the pod but that were not signaled to any requestor as having completed successfully. Storage systems that are listed as pod members but that are not listed as in-sync for the pod can be described as "detached" from the pod. Storage systems that are listed as pod members, are in-sync for the pod, and are currently available for actively serving data for the pod are "online" for the pod.

Each storage system member of a pod may have its own copy of the membership, including which storage systems it last knew were in-sync, and which storage systems it last knew comprised the entire set of pod members. To be online for a pod, a storage system must consider itself to be in-sync for the pod and must be communicating with all other storage systems it considers to be in-sync for the pod. If a storage system can't be certain that it is in-sync and communicating with all other storage systems that are in-sync, then it must stop processing new incoming requests for the pod (or must complete them with an error or exception) until it can be certain that it is in-sync and communicating with all other storage systems that are in-sync. A first storage system may conclude that a second paired storage system should be detached, which will allow the first storage system to continue since it is now in-sync with all storage systems now in the list. But, the second storage system must be prevented from concluding, alternatively, that the first storage system should be detached and with the second storage system continuing operation. This would result in a "split brain" condition that can lead to irreconcilable datasets, dataset corruption, or application corruption, among other dangers.

The situation of needing to determine how to proceed when not communicating with paired storage systems can arise while a storage system is running normally and then notices lost communications, while it is currently recovering from some previous fault, while it is rebooting or resuming from a temporary power loss or recovered communication outage, while it is switching operations from one set of storage system controller to another set for whatever reason, or during or after any combination of these or other kinds of events. In fact, any time a storage system that is associated with a pod can't communicate with all known non-detached members, the storage system can either wait briefly until communications can be established, go offline and continue waiting, or it can determine through some means that it is safe to detach the non-communicating storage system without risk of incurring a split brain due to the non-communicating storage system concluding the alternative view, and then continue. If a safe detach can happen quickly enough, the storage system can remain online for the pod with little more than a short delay and with no resulting application outages for applications that can issue requests to the remaining online storage systems.

One example of this situation is when a storage system may know that it is out-of-date. That can happen, for example, when a first storage system is first added to a pod that is already associated with one or more storage systems, or when a first storage system reconnects to another storage system and finds that the other storage system had already marked the first storage system as detached. In this case, this first storage system will simply wait until it connects to some other set of storage systems that are in-sync for the pod.

This model demands some degree of consideration for how storage systems are added to or removed from pods or from the in-sync pod members list. Since each storage system will have its own copy of the list, and since two independent storage systems can't update their local copy at exactly the same time, and since the local copy is all that is available on a reboot or in various fault scenarios, care must be taken to ensure that transient inconsistencies don't cause problems. For example, if one storage systems is in-sync for a pod and a second storage system is added, then if the second storage system is updated to list both storage systems as in-sync first, then if there is a fault and a restart of both storage systems, the second might startup and wait to connect to the first storage system while the first might be unaware that it should or could wait for the second storage system. If the second storage system then responds to an inability to connect with the first storage system by going through a process to detach it, then it might succeed in completing a process that the first storage system is unaware of, resulting in a split brain. As such, it may be necessary to ensure that storage systems won't disagree inappropriately on whether they might opt to go through a detach process if they aren't communicating.

One way to ensure that storage systems won't disagree inappropriately on whether they might opt to go through a detach process if they aren't communicating is to ensure that when adding a new storage system to the in-sync member list for a pod, the new storage system first stores that it is a detached member (and perhaps that it is being added as an in-sync member). Then, the existing in-sync storage systems can locally store that the new storage system is an in-sync pod member before the new storage system locally stores that same fact. If there is a set of reboots or network outages prior to the new storage system storing its in-sync status, then the original storage systems may detach the new storage system due to non-communication, but the new storage system will wait. A reverse version of this change might be needed for removing a communicating storage system from a pod: first the storage system being removed stores that it is no longer in-sync, then the storage systems that will remain store that the storage system being removed is no longer in-sync, then all storage systems delete the storage system being removed from their pod membership lists. Depending on the implementation, an intermediate persisted detached state may not be necessary. Whether or not care is required in local copies of membership lists may depend on the model storage systems use for monitoring each other or for validating their membership. If a consensus model is used for both, or if an external system (or an external distributed or clustered system) is used to store and validate pod membership, then inconsistencies in locally stored membership lists may not matter.

When communications fail or one or several storage systems in a pod fail, or when a storage system starts up (or fails over to a secondary controller) and can't communicate with paired storage systems for a pod, and it is time for one or more storage systems to decide to detach one or more paired storage systems, some algorithm or mechanism must be employed to decide that it is safe to do so and to follow through on the detach. One means of resolving detaches is use a majority (or quorum) model for membership. With three storage systems, as long as two are communicating, they can agree to detach a third storage system that isn't communicating, but that third storage system cannot by itself choose to detach either of the other two. Confusion can arise when storage system communication is inconsistent. For example, storage system A might be communicating with storage system B but not C, while storage system B might be communicating with both A and C. So, A and B could detach C, or B and C could detach A, but more communication between pod members may be needed to figure this out.

Care needs to be taken in a quorum membership model when adding and removing storage systems. For example, if a fourth storage system is added, then a "majority" of storage systems is at that point three. The transition from three storage systems (with two required for majority) to a pod including a fourth storage system (with three required for majority) may require something similar to the model described previously for carefully adding a storage system to the in-sync list. For example, the fourth storage system might start in an attaching state but not yet attached where it would never instigate a vote over quorum. Once in that state, the original three pod members could each be updated to be aware of the fourth member and the new requirement for a three storage system majority to detach a fourth. Removing a storage system from a pod might similarly move that storage system to a locally stored "detaching" state before updating other pod members. A variant scheme for this is to use a distributed consensus mechanism such as PAXOS or RAFT to implement any membership changes or to process detach requests.

Another means of managing membership transitions is to use an external system that is outside of the storage systems themselves to handle pod membership. In order to become online for a pod, a storage system must first contact the external pod membership system to verify that it is in-sync for the pod. Any storage system that is online for a pod should then remain in communication with the pod membership system and should wait or go offline if it loses communication. An external pod membership manager could be implemented as a highly available cluster using various cluster tools, such as Oracle RAC, Linux HA, VERITAS Cluster Server, IBM's HACMP, or others. An external pod membership manager could also use distributed configuration tools such as Etcd or Zookeeper, or a reliable distributed database such as Amazon's DynamoDB.

In the example depicted in FIG. 4, the depicted storage systems (402, 404, 406) may receive a request to read a portion of the dataset (426, 428) and process the request to read the portion of the dataset locally according to some embodiments of the present disclosure. Readers will appreciate that although requests to modify (e.g., a write operation) the dataset (426, 428) require coordination between the storage systems (402, 404, 406) in a pod, as the dataset (426, 428) should be consistent across all storage systems (402, 404, 406) in a pod, responding to a request to read a portion of the dataset (426, 428) does not require similar coordination between the storage systems (402, 404, 406). As such, a particular storage system that receives a read request may service the read request locally by reading a portion of the dataset (426, 428) that is stored within the storage system's storage devices, with no synchronous communication with other storage systems in the pod. Read requests received by one storage system for a replicated dataset in a replicated cluster are expected to avoid any communication in the vast majority of cases, at least when received by a storage system that is running within a cluster that is also running nominally. Such reads should normally be processed simply by reading from the local copy of a clustered dataset with no further interaction required with other storage systems in the cluster Readers will appreciate that the storage systems may take steps to ensure read consistency such that a read request will return the same result regardless of which storage system processes the read request. For example, the resulting clustered dataset content for any set of updates received by any set of storage systems in the cluster should be consistent across the cluster, at least at any time updates are idle (all previous modifying operations have been indicated as complete and no new update requests have been received and processed in any way). More specifically, the instances of a clustered dataset across a set of storage systems can differ only as a result of updates that have not yet completed. This means, for example, that any two write requests which overlap in their volume block range, or any combination of a write request and an overlapping snapshot, compare-and-write, or virtual block range copy, must yield a consistent result on all copies of the dataset. Two operations should not yield a result as if they happened in one order on one storage system and a different order on another storage system in the replicated cluster.

Furthermore, read requests can be made time order consistent. For example, if one read request is received on a replicated cluster and completed and that read is then followed by another read request to an overlapping address range which is received by the replicated cluster and where one or both reads in any way overlap in time and volume address range with a modification request received by the replicated cluster (whether any of the reads or the modification are received by the same storage system or a different storage system in the replicated cluster), then if the first read reflects the result of the update then the second read should also reflect the results of that update, rather than possibly returning data that preceded the update. If the first read does not reflect the update, then the second read can either reflect the update or not. This ensures that between two read requests "time" for a data segment cannot roll backward.

In the example depicted in FIG. 4, the depicted storage systems (402, 404, 406) may also detect a disruption in data communications with one or more of the other storage systems and determine whether to the particular storage system should remain in the pod. A disruption in data communications with one or more of the other storage systems may occur for a variety of reasons. For example, a disruption in data communications with one or more of the other storage systems may occur because one of the storage systems has failed, because a network interconnect has failed, or for some other reason. An important aspect of synchronous replicated clustering is ensuring that any fault handling doesn't result in unrecoverable inconsistencies, or any inconsistency in responses. For example, if a network fails between two storage systems, at most one of the storage systems can continue processing newly incoming I/O requests for a pod. And, if one storage system continues processing, the other storage system can't process any new requests to completion, including read requests.

In the example depicted in FIG. 4, the depicted storage systems (402, 404, 406) may also determine whether the particular storage system should remain in the pod in response to detecting a disruption in data communications with one or more of the other storage systems. As mentioned above, to be 'online' as part of a pod, a storage system must consider itself to be in-sync for the pod and must be communicating with all other storage systems it considers to be in-sync for the pod. If a storage system can't be certain that it is in-sync and communicating with all other storage systems that are in-sync, then it may stop processing new incoming requests to access the dataset (426, 428). As such, the storage system may determine whether to the particular storage system should remain online as part of the pod, for example, by determining whether it can communicate with all other storage systems it considers to be in-sync for the pod (e.g., via one or more test messages), by determining whether the all other storage systems it considers to be in-sync for the pod also consider the storage system to be attached to the pod, through a combination of both steps where the particular storage system must confirm that it can communicate with all other storage systems it considers to be in-sync for the pod and that all other storage systems it considers to be in-sync for the pod also consider the storage system to be attached to the pod, or through some other mechanism.

In the example depicted in FIG. 4, the depicted storage systems (402, 404, 406) may also keep the dataset on the particular storage system accessible for management and dataset operations in response to determining that the particular storage system should remain in the pod. The storage system may keep the dataset (426, 428) on the particular storage system accessible for management and dataset operations, for example, by accepting requests to access the version of the dataset (426, 428) that is stored on the storage system and processing such requests, by accepting and processing management operations associated with the dataset (426, 428) that are issued by a host or authorized administrator, by accepting and processing management operations associated with the dataset (426, 428) that are issued by one of the other storage systems, or in some other way.

In the example depicted in FIG. 4, the depicted storage systems (402, 404, 406) may, however, make the dataset on the particular storage system inaccessible for management and dataset operations in response to determining that the particular storage system should not remain in the pod. The storage system may make the dataset (426, 428) on the particular storage system inaccessible for management and dataset operations, for example, by rejecting requests to access the version of the dataset (426, 428) that is stored on the storage system, by rejecting management operations associated with the dataset (426, 428) that are issued by a host or other authorized administrator, by rejecting management operations associated with the dataset (426, 428) that are issued by one of the other storage systems in the pod, or in some other way.

In the example depicted in FIG. 4, the depicted storage systems (402, 404, 406) may also detect that the disruption in data communications with one or more of the other storage systems has been repaired and make the dataset on the particular storage system accessible for management and dataset operations. The storage system may detect that the disruption in data communications with one or more of the other storage systems has been repaired, for example, by receiving a message from the one or more of the other storage systems. In response to detecting that the disruption in data communications with one or more of the other storage systems has been repaired, the storage system may make the dataset (426, 428) on the particular storage system accessible for management and dataset operations once the previously detached storage system has been resynchronized with the storage systems that remained attached to the pod.

In the example depicted in FIG. 4, the depicted storage systems (402, 404, 406) may also go offline from the pod such that the particular storage system no longer allows management and dataset operations. The depicted storage systems (402, 404, 406) may go offline from the pod such that the particular storage system no longer allows management and dataset operations for a variety of reasons. For example, the depicted storage systems (402, 404, 406) may also go offline from the pod due to some fault with the storage system itself, because an update or some other maintenance is occurring on the storage system, due to communications faults, or for many other reasons. In such an example, the depicted storage systems (402, 404, 406) may subsequently update the dataset on the particular storage system to include all updates to the dataset since the particular storage system went offline and go back online with the pod such that the particular storage system allows management and dataset operations, as will be described in greater detail in the resynchronization sections included below.

In the example depicted in FIG. 4, the depicted storage systems (402, 404, 406) may also identifying a target storage system for asynchronously receiving the dataset, where the target storage system is not one of the plurality of storage systems across which the dataset is synchronously replicated. Such a target storage system may represent, for example, a backup storage system, as some storage system that makes use of the synchronously replicated dataset, and so on. In fact, synchronous replication can be leveraged to distribute copies of a dataset closer to some rack of servers, for better local read performance. One such case is smaller top-of-rack storage systems symmetrically replicated to larger storage systems that are centrally located in the data center or campus and where those larger storage systems are more carefully managed for reliability or are connected to external networks for asynchronous replication or backup services.

In the example depicted in FIG. 4, the depicted storage systems (402, 404, 406) may also identify a portion of the dataset that is not being asynchronously replicated to the target storage system by any of the other storages systems and asynchronously replicate, to the target storage system, the portion of the dataset that is not being asynchronously replicated to the target storage system by any of the other storages systems, wherein the two or more storage systems collectively replicate the entire dataset to the target storage system. In such a way, the work associated with asynchronously replicating a particular dataset may be split amongst the members of a pod, such that each storage system in a pod is only responsible for asynchronously replicating a subset of a dataset to the target storage system.

In the example depicted in FIG. 4, the depicted storage systems (402, 404, 406) may also detach from the pod, such that the particular storage system that detaches from the pod is no longer included in the set of storage systems across which the dataset is synchronously replicated. For example, if storage system (404) in FIG. 4 detached from the pod (430) illustrated in FIG. 4, the pod (430) would only include storage systems (402, 406) as the storage systems across which the dataset (426) that is included in the pod (430) would be synchronously replicated across. In such an example, detaching the storage system from the pod could also include removing the dataset from the particular storage system that detached from the pod. Continuing with the example where the storage system (404) in FIG. 4 detached from the pod (430) illustrated in FIG. 4, the dataset (426) that is included in the pod (430) could be deleted or otherwise removed from the storage system (404).

Readers will appreciate that there are a number of unique administrative capabilities enabled by the pod model that can further be supported. Also, the pod model itself introduces some issues that can be addressed by an implementation. For example, when a storage system is offline for a pod, but is otherwise running, such as because an interconnect failed and another storage system for the pod won out in mediation, there may still be a desire or need to access the offline pod's dataset on the offline storage system. One solution may be simply to enable the pod in some detached mode and allow the dataset to be accessed. However, that solution can be dangerous and that solution can cause the pod's metadata and data to be much more difficult to reconcile when the storage systems do regain communication. Furthermore, there could still be a separate path for hosts to access the offline storage system as well as the still online storage systems. In that case, a host might issue I/O to both storage systems even though they are no longer being kept in sync, because the host sees target ports reporting volumes with the same identifiers and the host I/O drivers presume it sees additional paths to the same volume. This can result in fairly damaging data corruption as reads and writes issued to both storage systems are no longer consistent even though the host presumes they are. As a variant of this case, in a clustered application, such as a shared storage clustered database, the clustered application running on one host might be reading or writing to one storage system and the same clustered application running on another host might be reading or writing to the "detached" storage system, yet the two instances of the clustered application are communicating between each other on the presumption that the dataset they each see is entirely consistent for completed writes. Since they aren't consistent, that presumption is violated and the application's dataset (e.g., the database) can quickly end up being corrupted.

One way to solve both of these problems is to allow for an offline pod, or perhaps a snapshot of an offline pod, to be copied to a new pod with new volumes that have sufficiently new identities that host I/O drivers and clustered applications won't confuse the copied volumes as being the same as the still online volumes on another storage system. Since each pod maintains a complete copy of the dataset, which is crash consistent but perhaps slightly different from the copy of the pod dataset on another storage system, and since each pod has an independent copy of all data and metadata needed to operate on the pod content, it is a straightforward problem to make a virtual copy of some or all volumes or snapshots in the pod to new volumes in a new pod. In a logical extent graph implementation, for example, all that is needed is to define new volumes in a new pod which reference logical extent graphs from the copied pod associated with the pod's volumes or snapshots, and with the logical extent graphs being marked as copy on write. The new volumes should be treated as new volumes, similarly to how volume snapshots copied to a new volume might be implemented. Volumes may have the same administrative name, though within a new pod namespace. But, they should have different underlying identifiers, and differing logical unit identifiers from the original volumes.

In some cases it may be possible to use virtual network isolation techniques (for example, by creating a virtual LAN in the case of IP networks or a virtual SAN in the case of fiber channel networks) in such a way that isolation of volumes presented to some interfaces can be assured to be inaccessible from host network interfaces or host SCSI initiator ports that might also see the original volumes. In such cases, it may be safe to provide the copies of volumes with the same SCSI or other storage identifiers as the original volumes. This could be used, for example, in cases where the applications expect to see a particular set of storage identifiers in order to function without an undue burden in reconfiguration.

Some of the techniques described herein could also be used outside of an active fault context to test readiness for handling faults. Readiness testing (sometimes referred to as "fire drills") is commonly required for disaster recovery configurations, where frequent and repeated testing is considered a necessity to ensure that most or all aspects of a disaster recovery plan are correct and account for any recent changes to applications, datasets, or changes in equipment. Readiness testing should be non-disruptive to current production operations, including replication. In many cases the real operations can't actually be invoked on the active configuration, but a good way to get close is to use storage operations to make copies of production datasets, and then perhaps couple that with the use of virtual networking, to create an isolated environment containing all data that is believed necessary for the important applications that must be brought up successfully in cases of disasters. Making such a copy of a synchronously replicated (or even an asynchronously replicated) dataset available within a site (or collection of sites) that is expected to perform a disaster recovery readiness test procedure and then starting the important applications on that dataset to ensure that it can startup and function is a great tool, since it helps ensure that no important parts of the application datasets were left out in the disaster recovery plan. If necessary, and practical, this could be coupled with virtual isolated networks coupled perhaps with isolated collection of physical or virtual machines, to get as close as possible to a real world disaster recovery takeover scenario. Virtually copying a pod (or set of pods) to another pod as a point-in-time image of the pod datasets immediately creates an isolated dataset that contains all the copied elements and that can then be operated on essentially identically to the originally pods, as well as allowing isolation to a single site (or a few sites) separately from the original pod. Further, these are fast operations and they can be torn down and repeated easily allowing testing to repeated as often as is desired.

Some enhancements could be made to get further toward perfect disaster recovery testing. For example, in conjunction with isolated networks, SCSI logical unit identities or other types of identities could be copied into the target pod so that the test servers, virtual machines, and applications see the same identities. Further, the administrative environment of the servers could be configured to respond to requests from a particular virtual set of virtual networks to respond to requests and operations on the original pod name so scripts don't require use of test-variants with alternate "test" versions of object names. A further enhancement can be used in cases where the host-side server infrastructure that will take over in the case of a disaster takeover can be used during a test. This includes cases where a disaster recovery data center is completely stocked with alternative server infrastructure that won't generally be used until directed to do so by a disaster. It also includes cases where that infrastructure might be used for non-critical operations (for example, running analytics on production data, or simply supporting application development or other functions which may be important but can be halted if needed for more critical functions). Specifically, host definitions and configurations and the server infrastructure that will use them can be set up as they will be for an actual disaster recovery takeover event and tested as part of disaster recovery takeover testing, with the tested volumes being connected to these host definitions from the virtual pod copy used to provide a snapshot of the dataset. From the standpoint of the storage systems involved, then, these host definitions and configurations used for testing, and the volume-to-host connection configurations used during testing, can be reused when an actual disaster takeover event is triggered, greatly minimizing the configuration differences between the test configuration and the real configuration that will be used in case of a disaster recovery takeover.

In some cases it may make sense to move volumes out of a first pod and into a new second pod including just those volumes. The pod membership and high availability and recovery characteristics can then be adjusted separately, and administration of the two resulting pod datasets can then be isolated from each other. An operation that can be done in one direction should also be possible in the other direction. At some point, it may make sense to take two pods and merge them into one so that the volumes in each of the original two pods will now track each other for storage system membership and high availability and recovery characteristics and events. Both operations can be accomplished safely and with reasonably minimal or no disruption to running applications by relying on the characteristics suggested for changing mediation or quorum properties for a pod which were discussed in an earlier section. With mediation, for example, a mediator for a pod can be changed using a sequence consisting of a step where each storage system in a pod is changed to depend on both a first mediator and a second mediator and each is then changed to depend only on the second mediator. If a fault occurs in the middle of the sequence, some storage systems may depend on both the first mediator and the second mediator, but in no case will recovery and fault handling result in some storage systems depending only on the first mediator and other storage systems only depending on the second mediator. Quorum can be handled similarly by temporarily depending on winning against both a first quorum model and a second quorum model in order to proceed to recovery. This may result in a very short time period where availability of the pod in the face of faults depend on additional resources, thus reducing potential availability, but this time period is very short and the reduction in availability is often very little. With mediation, if the change in mediator parameters is nothing more than the change in the key used for mediation and the mediation service used is the same, then the potential reduction in availability is even less, since it now depends only on two calls to the same service versus one call to that service, and rather than separate calls to two separate services.

Readers will note that changing the quorum model may be quite complex. An additional step may be necessary where storage systems will participate in the second quorum model but won't depend on winning in that second quorum model, which is then followed by the step of also depending on the second quorum model. This may be necessary to account for the fact that if only one system has processed the change to depend on the quorum model, then it will never win quorum since there will never be a majority. With this model in place for changing the high availability parameters (mediation relationship, quorum model, takeover preferences), we can create a safe procedure for these operations to split a pod into two or to join two pods into one. This may require adding one other capability: linking a second pod to a first pod for high availability such that if two pods include compatible high availability parameters the second pod linked to the first pod can depend on the first pod for determining and instigating detach-related processing and operations, offline and in-sync states, and recovery and resynchronization actions.

To split a pod into two, which is an operation to move some volumes into a newly created pod, a distributed operation may be formed that can be described as: form a second pod into which we will move a set of volumes which were previously in a first pod, copy the high availability parameters from the first pod into the second pod to ensure they are compatible for linking, and link the second pod to the first pod for high availability. This operation may be encoded as messages and should be implemented by each storage system in the pod in such a way that the storage system ensures that the operation happens completely on that storage system or does not happen at all if processing is interrupted by a fault. Once all in-sync storage systems for the two pods have processed this operation, the storage systems can then process a subsequent operation which changes the second pod so that it is no longer linked to the first pod. As with other changes to high availability characteristics for a pod, this involves first having each in-sync storage system change to rely on both the previous model (that model being that high availability is linked to the first pod) and the new model (that model being its own now independent high availability). In the case of mediation or quorum, this means that storage systems which processed this change will first depend on mediation or quorum being achieved as appropriate for the first pod and will additionally depend on a new separate mediation (for example, a new mediation key) or quorum being achieved for the second pod before the second pod can proceed following a fault that required mediation or testing for quorum. As with the previous description of changing quorum models, an intermediate step may set storage systems to participate in quorum for the second pod before the step where storage systems participate in and depend on quorum for the second pod. Once all in-sync storage systems have processed the change to depend on the new parameters for mediation or quorum for both the first pod and the second pod, the split is complete.

Joining a second pod into a first pod operates essentially in reverse. First, the second pod must be adjusted to be compatible with the first pod, by having an identical list of storage systems and by having a compatible high availability model. This may involve some set of steps such as those described elsewhere in this paper to add or remove storage systems or to change mediator and quorum models. Depending on implementation, it may be necessary only to reach an identical list of storage systems. Joining proceeds by processing an operation on each in-sync storage system to link the second pod to the first pod for high availability. Each storage system which processes that operation will then depend on the first pod for high availability and then the second pod for high availability. Once all in-sync storage systems for the second pod have processed that operation, the storage systems will then each process a subsequent operation to eliminate the link between the second pod and the first pod, migrate the volumes from the second pod into the first pod, and delete the second pod. Host or application dataset access can be preserved throughout these operations, as long as the implementation allows proper direction of host or application dataset modification or read operations to the volume by identity and as long as the identity is preserved as appropriate to the storage protocol or storage model (for example, as long as logical unit identifiers for volumes and use of target ports for accessing volumes are preserved in the case of SCSI).

Migrating a volume between pods may present issues. If the pods have an identical set of in-sync membership storage systems, then it may be straightforward: temporarily suspend operations on the volumes being migrated, switch control over operations on those volumes to controlling software and structures for the new pod, and then resume operations. This allows for a seamless migration with continuous uptime for applications apart from the very brief operation suspension, provided network and ports migrate properly between pods. Depending on the implementation, suspending operations may not even be necessary, or may be so internal to the system that the suspension of operations has no impact. Copying volumes between pods with different in-sync membership sets is more of a problem. If the target pod for the copy has a subset of in-sync members from the source pod, this isn't much of a problem: a member storage system can be dropped safely enough without having to do more work. But, if the target pod adds in-sync member storage systems to the volume over the source pod, then the added storage systems must be synchronized to include the volume's content before they can be used. Until synchronized, this leaves the copied volumes distinctly different from the already synchronized volumes, in that fault handling differs and request handling from the not yet synced member storage systems either won't work or must be forwarded or won't be as fast because reads will have to traverse an interconnect. Also, the internal implementation will have to handle some volumes being in sync and ready for fault handling and others not being in sync.

There are other problems relating to reliability of the operation in the face of faults. Coordinating a migration of volumes between multi-storage-system pods is a distributed operation. If pods are the unit of fault handling and recovery, and if mediation or quorum or whatever means are used to avoid split-brain situations, then a switch in volumes from one pod with a particular set of state and configurations and relationships for fault handling, recovery, mediation and quorum to another then storage systems in a pod have to be careful about coordinating changes related to that handling for any volumes. Operations can't be atomically distributed between storage systems, but must be staged in some way. Mediation and quorum models essentially provide pods with the tools for implementing distributed transactional atomicity, but this may not extend to inter-pod operations without adding to the implementation.

Consider even a simple migration of a volume from a first pod to a second pod even for two pods that share the same first and second storage systems. At some point the storage systems will coordinate to define that the volume is now in the second pod and is no longer in the first pod. If there is no inherent mechanism for transactional atomicity across the storage systems for the two pods, then a naive implementation could leave the volume in the first pod on the first storage system and the second pod on the second storage system at the time of a network fault that results in fault handling to detach storage systems from the two pods. If pods separately determine which storage system succeeds in detaching the other, then the result could be that the same storage system detaches the other storage system for both pods, in which case the result of the volume migration recovery should be consistent, or it could result in a different storage system detaching the other for the two pods. If the first storage system detaches the second storage system for the first pod and the second storage system detaches the first storage system for the second pod, then recovery might result in the volume being recovered to the first pod on the first storage system and into the second pod on the second storage system, with the volume then running and exported to hosts and storage applications on both storage systems. If instead the second storage system detaches the first storage system for the first pod and first storage detaches the second storage system for the second pod, then recovery might result in the volume being discarded from the second pod by the first storage system and the volume being discarded from the first pod by the second storage system, resulting in the volume disappearing entirely. If the pods a volume is being migrated between are on differing sets of storage systems, then things can get even more complicated.

A solution to these problems may be to use an intermediate pod along with the techniques described previously for splitting and joining pods. This intermediate pod may never be presented as visible managed objects associated with the storage systems. In this model, volumes to be moved from a first pod to a second pod are first split from the first pod into a new intermediate pod using the split operation described previously. The storage system members for the intermediate pod can then be adjusted to match the membership of storage systems by adding or removing storage systems from the pod as necessary. Subsequently, the intermediate pod can be joined with the second pod.

Figure 5:
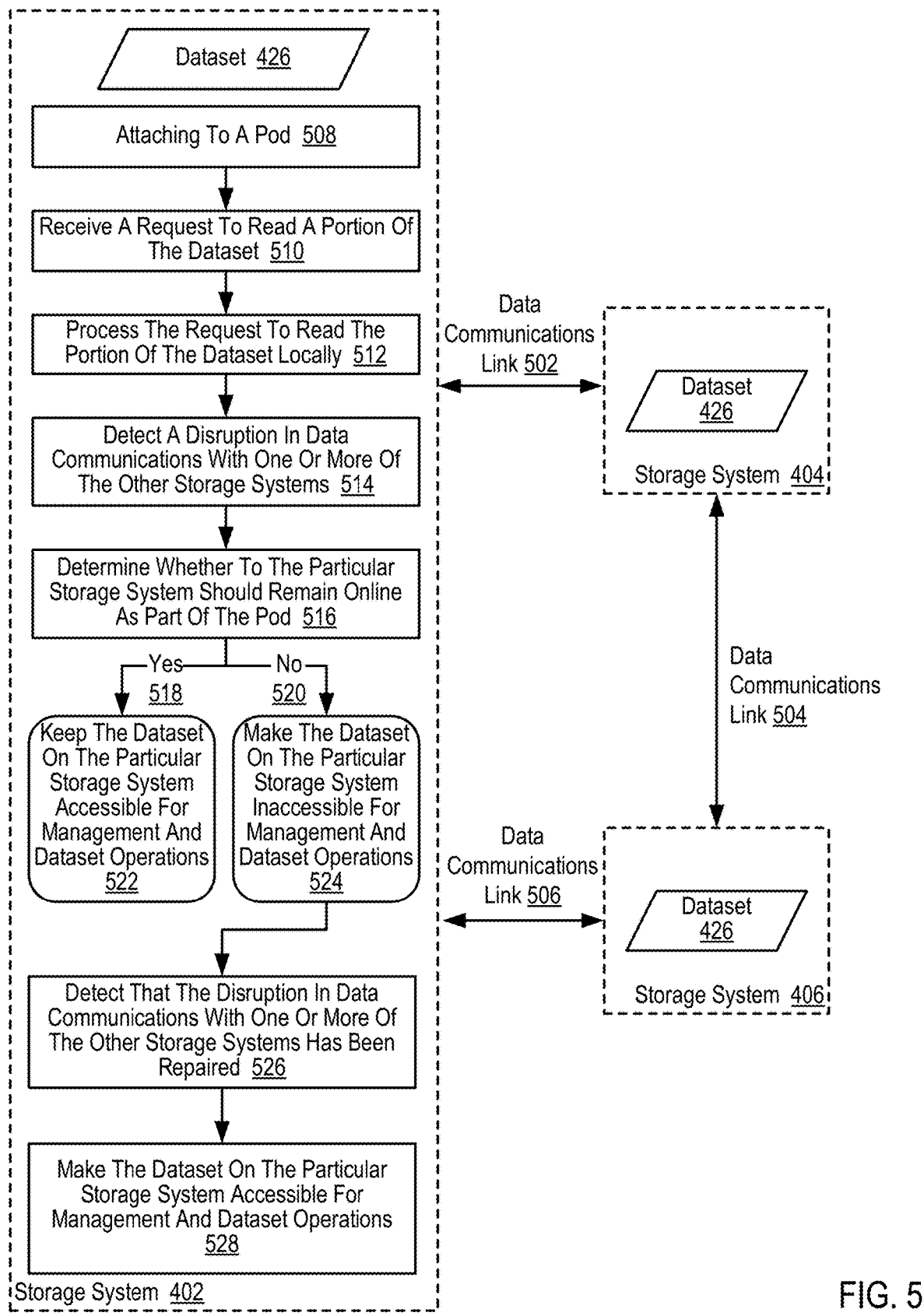
FIG. 5 sets forth a block diagram illustrating a plurality of storage systems that support a pod according to some embodiments of the present disclosure.

For further explanation, FIG. 5 sets forth a flow chart illustrating steps that may be performed by storage systems (402, 404, 406) that support a pod according to some embodiments of the present disclosure. Although depicted in less detail, the storage systems (402. 404, 406) depicted in FIG. 5 may be similar to the storage systems described above with reference to FIGS. 1A-1D, FIGS. 2A-2G, FIGS. 3A-3B, FIG. 4, or any combination thereof. In fact, the storage systems (402, 404, 406) depicted in FIG. 5 may include the same, fewer, additional components as the storage systems described above.

In the example method depicted in FIG. 5, a storage system (402) may attach (508) to a pod. The model for pod membership may include a list of storage systems and a subset of that list where storage systems are presumed to be in-sync for the pod. A storage system is in-sync for a pod if it is at least within a recovery of having identical idle content for the last written copy of the dataset associated with the pod. Idle content is the content after any in-progress modifications have completed with no processing of new modifications. Sometimes this is referred to as "crash recoverable" consistency. Storage systems that are listed as pod members but that are not listed as in-sync for the pod can be described as "detached" from the pod. Storage systems that are listed as pod members, are in-sync for the pod, and are currently available for actively serving data for the pod are "online" for the pod.

In the example method depicted in FIG. 5, the storage system (402) may attach (508) to a pod, for example, by synchronizing its locally stored version of the dataset (426) along with an up-to-date version of the dataset (426) that is stored on other storage systems (404, 406) in the pod that are online, as the term is described above. In such an example, in order for the storage system (402) to attach (508) to the pod, a pod definition stored locally within each of the storage systems (402, 404, 406) in the pod may need to be updated in order for the storage system (402) to attach (508) to the pod. In such an example, each storage system member of a pod may have its own copy of the membership, including which storage systems it last knew were in-sync, and which storage systems it last knew comprised the entire set of pod members.

In the example method depicted in FIG. 5, the storage system (402) may also receive (510) a request to read a portion of the dataset (426) and the storage system (402) may process (512) the request to read the portion of the dataset (426) locally. Readers will appreciate that although requests to modify (e.g., a write operation) the dataset (426) require coordination between the storage systems (402, 404, 406) in a pod, as the dataset (426) should be consistent across all storage systems (402, 404, 406) in a pod, responding to a request to read a portion of the dataset (426) does not require similar coordination between the storage systems (402, 404, 406). As such, a particular storage system (402) that receives a read request may service the read request locally by reading a portion of the dataset (426) that is stored within the storage system's (402) storage devices, with no synchronous communication with other storage systems (404, 406) in the pod. Read requests received by one storage system for a replicated dataset in a replicated cluster are expected to avoid any communication in the vast majority of cases, at least when received by a storage system that is running within a cluster that is also running nominally. Such reads should normally be processed simply by reading from the local copy of a clustered dataset with no further interaction required with other storage systems in the cluster Readers will appreciate that the storage systems may take steps to ensure read consistency such that a read request will return the same result regardless of which storage system processes the read request. For example, the resulting clustered dataset content for any set of updates received by any set of storage systems in the cluster should be consistent across the cluster, at least at any time updates are idle (all previous modifying operations have been indicated as complete and no new update requests have been received and processed in any way). More specifically, the instances of a clustered dataset across a set of storage systems can differ only as a result of updates that have not yet completed. This means, for example, that any two write requests which overlap in their volume block range, or any combination of a write request and an overlapping snapshot, compare-and-write, or virtual block range copy, must yield a consistent result on all copies of the dataset. Two operations cannot yield a result as if they happened in one order on one storage system and a different order on another storage system in the replicated cluster.

Furthermore, read requests may be time order consistent. For example, if one read request is received on a replicated cluster and completed and that read is then followed by another read request to an overlapping address range which is received by the replicated cluster and where one or both reads in any way overlap in time and volume address range with a modification request received by the replicated cluster (whether any of the reads or the modification are received by the same storage system or a different storage system in the replicated cluster), then if the first read reflects the result of the update then the second read should also reflect the results of that update, rather than possibly returning data that preceded the update. If the first read does not reflect the update, then the second read can either reflect the update or not. This ensures that between two read requests "time" for a data segment cannot roll backward.

In the example method depicted in FIG. 5, the storage system (402) may also detect (514) a disruption in data communications with one or more of the other storage systems (404, 406). A disruption in data communications with one or more of the other storage systems (404, 406) may occur for a variety of reasons. For example, a disruption in data communications with one or more of the other storage systems (404, 406) may occur because one of the storage systems (402, 404, 406) has failed, because a network interconnect has failed (e.g., some portion of data communications link (502), data communications link (504), or data communications link (506) has failed), or for some other reason. An important aspect of synchronous replicated clustering is ensuring that any fault handling doesn't result in unrecoverable inconsistencies, or any inconsistency in responses. For example, if a network fails between two storage systems, at most one of the storage systems can continue processing newly incoming I/O requests for a pod. And, if one storage system continues processing, the other storage system can't process any new requests to completion, including read requests.

In the example method depicted in FIG. 5, the storage system (402) may also determine (516) whether to the particular storage system (402) should remain online as part of the pod. As mentioned above, to be 'online' as part of a pod, a storage system must consider itself to be in-sync for the pod and must be communicating with all other storage systems it considers to be in-sync for the pod. If a storage system can't be certain that it is in-sync and communicating with all other storage systems that are in-sync, then it may stop processing new incoming requests to access the dataset (426). As such, the storage system (402) may determine (516) whether to the particular storage system (402) should remain online as part of the pod, for example, by determining whether it can communicate with all other storage systems (404, 406) it considers to be in-sync for the pod (e.g., via one or more test messages), by determining whether the all other storage systems (404, 406) it considers to be in-sync for the pod also consider the storage system (402) to be attached to the pod, through a combination of both steps where the particular storage system (402) must confirm that it can communicate with all other storage systems (404, 406) it considers to be in-sync for the pod and that all other storage systems (404, 406) it considers to be in-sync for the pod also consider the storage system (402) to be attached to the pod, or through some other mechanism.

In the example method depicted in FIG. 5, the storage system (402) may also, responsive to affirmatively (518) determining that the particular storage system (402) should remain online as part of the pod, keep (522) the dataset (426) on the particular storage system (402) accessible for management and dataset operations. The storage system (402) may keep (522) the dataset (426) on the particular storage system (402) accessible for management and dataset operations, for example, by accepting requests to access the version of the dataset (426) that is stored on the storage system (402) and processing such requests, by accepting and processing management operations associated with the dataset (426) that are issued by a host or authorized administrator, by accepting and processing management operations associated with the dataset (426) that are issued by one of the other storage systems (404, 406) in the pod, or in some other way.

In the example method depicted in FIG. 5, the storage system (402) may also, responsive to determining that the particular storage system should not (520) remain online as part of the pod, make (524) the dataset (426) on the particular storage system (402) inaccessible for management and dataset operations. The storage system (402) may make (524) the dataset (426) on the particular storage system (402) inaccessible for management and dataset operations, for example, by rejecting requests to access the version of the dataset (426) that is stored on the storage system (402), by rejecting management operations associated with the dataset (426) that are issued by a host or other authorized administrator, by rejecting management operations associated with the dataset (426) that are issued by one of the other storage systems (404, 406) in the pod, or in some other way.

In the example method depicted in FIG. 5, the storage system (402) may also detect (526) that the disruption in data communications with one or more of the other storage systems (404, 406) has been repaired. The storage system (402) may detect (526) that the disruption in data communications with one or more of the other storage systems (404, 406) has been repaired, for example, by receiving a message from the one or more of the other storage systems (404, 406). In response to detecting (526) that the disruption in data communications with one or more of the other storage systems (404, 406) has been repaired, the storage system (402) may make (528) the dataset (426) on the particular storage system (402) accessible for management and dataset operations.

Readers will appreciate that the example depicted in FIG. 5 describes an embodiment in which various actions are depicted as occurring within some order, although no ordering is required. Furthermore, other embodiments may exist where the storage system (402) only carries out a subset of the described actions. For example, the storage system (402) may perform the steps of detecting (514) a disruption in data communications with one or more of the other storage systems (404, 406), determining (516) whether to the particular storage system (402) should remain in the pod, keeping (522) the dataset (426) on the particular storage system (402) accessible for management and dataset operations or making (524) the dataset (426) on the particular storage system (402) inaccessible for management and dataset operations without first receiving (510) a request to read a portion of the dataset (426) and processing (512) the request to read the portion of the dataset (426) locally. Furthermore, the storage system (402) may detect (526) that the disruption in data communications with one or more of the other storage systems (404, 406) has been repaired and make (528) the dataset (426) on the particular storage system (402) accessible for management and dataset operations without first receiving (510) a request to read a portion of the dataset (426) and processing (512) the request to read the portion of the dataset (426) locally. In fact, none of the steps described herein are explicitly required in all embodiments as prerequisites for performing other steps described herein.

Figure 6:
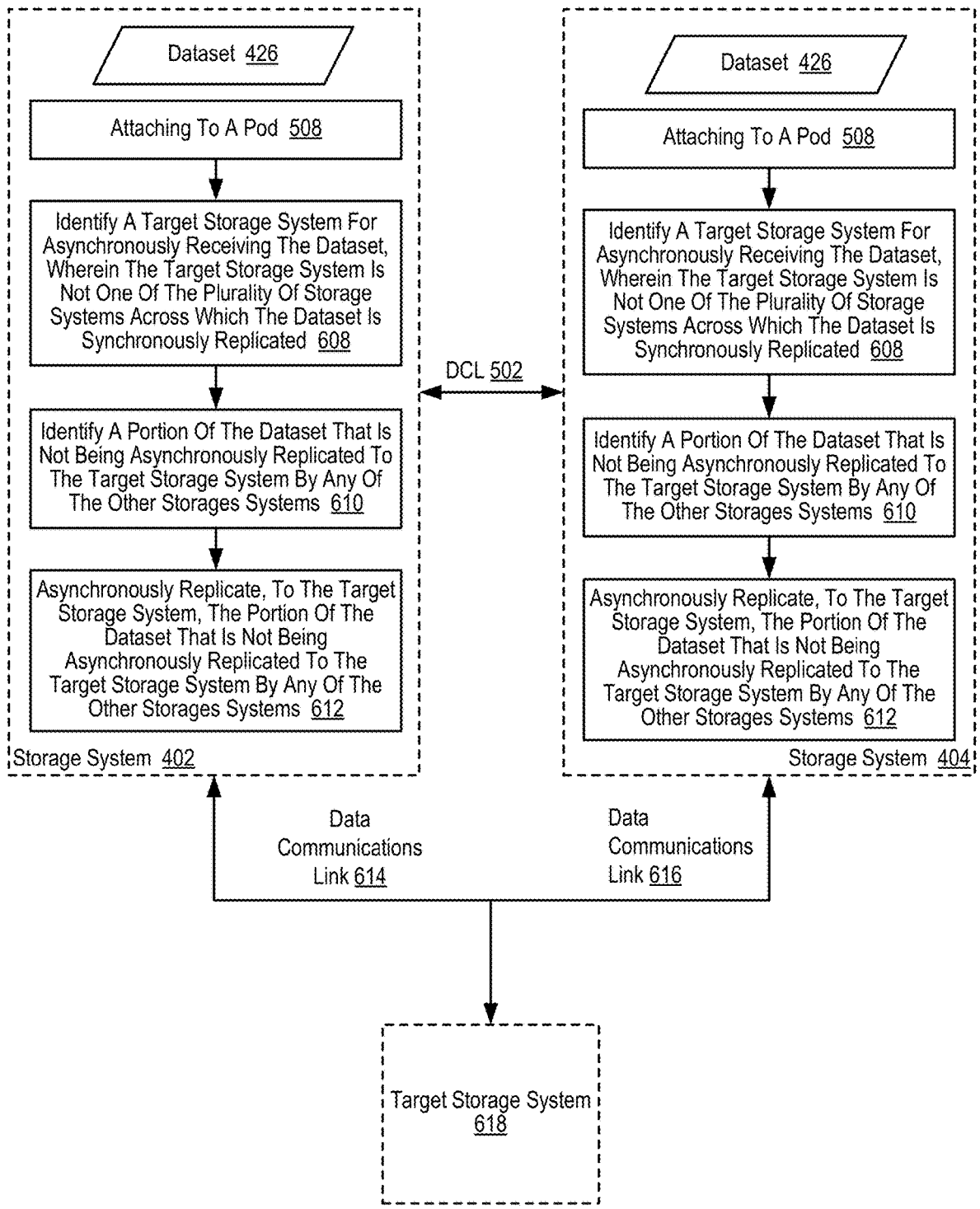
FIG. 6 sets forth a block diagram illustrating a plurality of storage systems that support a pod according to some embodiments of the present disclosure.

For further explanation, FIG. 6 sets forth a flow chart illustrating steps that may be performed by storage systems (402, 404, 406) that support a pod according to some embodiments of the present disclosure. Although depicted in less detail, the storage systems (402. 404, 406) depicted in FIG. 6 may be similar to the storage systems described above with reference to FIGS. 1A-1D, FIGS. 2A-2G, FIGS. 3A-3B, FIG. 4, or any combination thereof. In fact, the storage systems (402, 404, 406) depicted in FIG. 6 may include the same, fewer, additional components as the storage systems described above and each of the storage systems may be configured for data communications via one or more data communications links (502, 614, 616).

In the example method depicted in FIG. 6, two or more of the storage systems (402, 404) may each identify (608) a target storage system (618) for asynchronously receiving the dataset (426). The target storage system (618) for asynchronously receiving the dataset (426) may be embodied, for example, as a backup storage system that is located in a different data center than either of the storage systems (402, 404) that are members of a particular pod, as cloud storage that is provided by a cloud services provider, or in many other ways. Readers will appreciate that the target storage system (618) is not one of the plurality of storage systems (402, 404) across which the dataset (426) is synchronously replicated, and as such, the target storage system (618) initially does not include an up-to-date local copy of the dataset (426).

In the example method depicted in FIG. 6, two or more of the storage systems (402, 404) may each also identify (610) a portion of the dataset (426) that is not being asynchronously replicated to the target storage (618) system by any of the other storages systems that are members of a pod that includes the dataset (426). In such an example, the storage systems (402, 404) may each asynchronously replicate (612), to the target storage system (618), the portion of the dataset (426) that is not being asynchronously replicated to the target storage system by any of the other storages systems. Consider an example in which a first storage system (402) is responsible for asynchronously replicating a first portion (e.g., a first half of an address space) of the dataset (426) to the target storage system (618). In such an example, the second storage system (404) would be responsible for asynchronously replicating a second portion (e.g., a second half of an address space) of the dataset (426) to the target storage system (618), such that the two or more storage systems (402, 404) collectively replicate the entire dataset (426) to the target storage system (618).

Readers will appreciate that through the use of pods, as described above, the replication relationship between two storage systems may be switched from a relationship where data is asynchronously replicated to a relationship where data is synchronously replicated. For example, if storage system A is configured to asynchronously replicate a dataset to storage system B, creating a pod that includes the dataset, storage system A as a member, and storage system B as a member can switch the relationship where data is asynchronously replicated to a relationship where data is synchronously replicated. Likewise, through the use of pods, the replication relationship between two storage systems may be switched from a relationship where data is synchronously replicated to a relationship where data is asynchronously replicated. For example, if a pod is created that includes the dataset, storage system A as a member, and storage system B as a member, by merely unstretching the pod (to remove storage system A as a member or to remove storage system B as a member), a relationship where data is synchronously replicated between the storage systems can immediately be switched to a relationship where data is asynchronously replicated. In such a way, storage systems may switch back-and-forth as needed between asynchronous replication and synchronous replication.

This switching can be facilitated by the implementation relying on similar techniques for both synchronous and asynchronous replication. For example, if resynchronization for a synchronously replicated dataset relies on the same or a compatible mechanism as is used for asynchronous replication, then switching to asynchronous replication is conceptually identical to dropping the in-sync state and leaving a relationship in a state similar to a "perpetual recovery" mode. Likewise, switching from asynchronous replication to synchronous replication can operate conceptually by "catching up" and becoming in-sync just as is done when completing a resynchronization with the switching system becoming an in-sync pod member.

Alternatively, or additionally, if both synchronous and asynchronous replication rely on similar or identical common metadata, or a common model for representing and identifying logical extents or stored block identities, or a common model for representing content-addressable stored blocks, then these aspects of commonality can be leveraged to dramatically reduce the content that may need to be transferred when switching to and from synchronous and asynchronous replication. Further, if a dataset is asynchronously replicated from a storage system A to a storage system B, and system B further asynchronously replicates that data set to a storage system C, then a common metadata model, common logical extent or block identities, or common representation of content-addressable stored blocks, can dramatically reduce the data transfers needed to enable synchronous replication between storage system A and storage system C.

Readers will further appreciate that that through the use of pods, as described above, replication techniques may be used to perform tasks other than replicating data. In fact, because a pod may include a set of managed objects, tasks like migrating a virtual machine may be carried out using pods and the replication techniques described herein. For example, if virtual machine A is executing on storage system A, by creating a pod that includes virtual machine A as a managed object, storage system A as a member, and storage system B as a member, virtual machine A and any associated images and definitions may be migrated to storage system B, at which time the pod could simply be destroyed, membership could be updated, or other actions may be taken as necessary.

Figure 7:
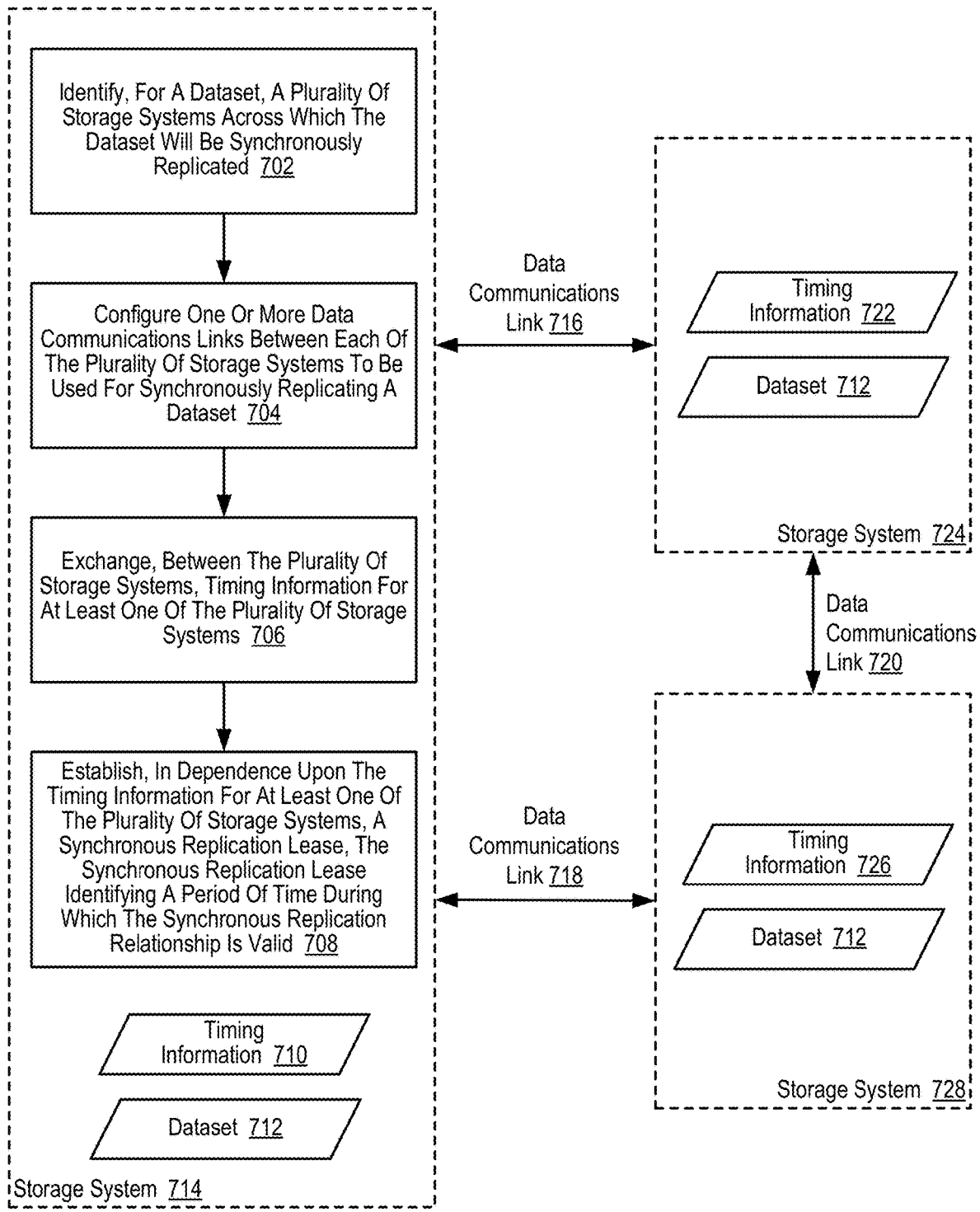
FIG. 7 sets forth a flow chart illustrating an example method of establishing a synchronous replication relationship between two or more storage systems according to some embodiments of the present disclosure.

For further explanation, FIG. 7 sets forth a flow chart illustrating an example method of establishing a synchronous replication relationship between two or more storage systems (714, 724, 728) according to some embodiments of the present disclosure. Although depicted in less detail, the storage systems (714, 724, 728) depicted in FIG. 7 may be similar to the storage systems described above with reference to FIGS. 1A-1D, FIGS. 2A-2G, FIGS. 3A-3B, or any combination thereof. In fact, the storage systems (714, 724, 728) depicted in FIG. 7 may include the same, fewer, additional components as the storage systems described above.

The example method depicted in FIG. 7 includes identifying (702), for a dataset (712), a plurality of storage systems (714, 724, 728) across which the dataset (712) will be synchronously replicated. The dataset (712) depicted in FIG. 7 may be embodied, for example, as the contents of a particular volume, as the contents of a particular shard of a volume, or as any other collection of one or more data elements. The dataset (712) may be synchronized across a plurality of storage systems (714, 724, 728) such that each storage system (714, 724, 728) retains a local copy of the dataset (712). In the examples described herein, such a dataset (712) is synchronously replicated across the storage systems (714, 724, 728) in such a way that the dataset (712) can be accessed through any of the storage systems (714, 724, 728) with performance characteristics such that any one storage system in the cluster doesn't operate substantially more optimally than any other storage system in the cluster, at least as long as the cluster and the particular storage system being accessed are running nominally. In such systems, modifications to the dataset (712) should be made to the copy of the dataset that resides on each storage system (714, 724, 728) in such a way that accessing the dataset (712) on any of the storage systems (714, 724, 728) will yield consistent results. For example, a write request issued to the dataset must be serviced on all storage systems (714, 724, 728) or serviced on none of the storage systems (714, 724, 728). Likewise, some groups of operations (e.g., two write operations that are directed to same location within the dataset) must be executed in the same order on all storage systems (714, 724, 728) such that the copy of the dataset that resides on each storage system (714, 724, 728) is ultimately identical. Modifications to the dataset (712) need not be made at the exact same time, but some actions (e.g., issuing an acknowledgement that a write request directed to the dataset, enabling read access to a location within the dataset that is targeted by a write request that has not yet been completed on all storage systems) may be delayed until the copy of the dataset (712) on each storage system (714, 724, 728) has been modified.

In the example method depicted in FIG. 7, identifying (702), for a dataset (712), a plurality of storage systems (714, 724, 728) across which the dataset (712) will be synchronously replicated may be carried out, for example, by examining a pod definition or similar data structure that associates a dataset (712) with one or more storage systems (714, 724, 728) which nominally store that dataset (712). A 'pod', as the term is used here and throughout the remainder of the present application, may be embodied as a management entity that represents a dataset, a set of managed objects and management operations, a set of access operations to modify or read the dataset, and a plurality of storage systems. Such management operations may modify or query managed objects equivalently through any of the storage systems, where access operations to read or modify the dataset operate equivalently through any of the storage systems. Each storage system may store a separate copy of the dataset as a proper subset of the datasets stored and advertised for use by the storage system, where operations to modify managed objects or the dataset performed and completed through any one storage system are reflected in subsequent management objects to query the pod or subsequent access operations to read the dataset. Additional details regarding a 'pod' may be found in previously filed provisional patent application No. 62/518,071, which is incorporated herein by reference. In such an example, the pod definition may include at least an identification of a dataset (712) and a set of storage systems (714, 724, 728) across which the dataset (712) is synchronously replicated. Such a pod may encapsulate some of number of (perhaps optional) properties including symmetric access, flexible addition/removal of replicas, high availability data consistency, uniform user administration across storage systems in relationship to the dataset, managed host access, application clustering, and so on. Storage systems can be added to a pod, resulting in the pod's dataset (712) being copied to that storage system and then kept up to date as the dataset (712) is modified. Storage systems can also be removed from a pod, resulting in the dataset (712) being no longer kept up to date on the removed storage system. In such examples, a pod definition or similar data structure may be updated as storage systems are added to and removed from a particular pod.

The example method depicted in FIG. 7 also includes configuring (704) one or more data communications links (716, 718, 720) between each of the plurality of storage systems (714, 724, 728) to be used for synchronously replicating the dataset (712). In the example method depicted in FIG. 6, the storage systems (714, 724, 728) in a pod must communicate with each other both for high bandwidth data transfer, and for cluster, status, and administrative communication. These distinct types of communication could be over the same data communications links (716, 718, 720) or, in an alternative embodiment, these distinct types of communication could be over separate data communications links (716, 718, 720). In a cluster of dual controller storage systems, both controllers in each storage system should have the nominal ability to communicate with both controllers for any paired storage systems (i.e., any other storage system in a pod).

In a primary/secondary controller design, all cluster communication for active replication may run between primary controllers until a fault occurs. In such systems, some communication may occur between a primary controller and a secondary controller, or between secondary controllers on distinct storage systems, in order to verify that the data communications links between such entities are operational. In other cases, virtual network addresses might be used to limit the configuration needed for of inter-datacenter network links, or to simplify design of the clustered aspect of the storage system. In an active/active controller design, cluster communications might run from all active controllers of one storage system to some or all active controllers in any paired storage systems, or they might be filtered through a common switch, or they might use a virtual network address to simplify configuration, or they might use some combination. In a scale-out design, two or more common network switches may be used such that all scale-out storage controllers within the storage system connect to the network switches in order to handle data traffic. The switches might or might not use techniques to limit the number of exposed network addresses, so that paired storage systems don't need to be configured with the network addresses of all storage controllers.

In the example method depicted in FIG. 7, configuring (704) one or more data communications links (716, 718, 720) between each of the plurality of storage systems (714, 724, 728) to be used for synchronously replicating the dataset (712) may be carried out, for example, by configuring the storage systems (716, 718, 720) to communicate via defined ports over a data communications network, by configuring the storage systems (716, 718, 720) to communicate over a point-to-point data communications link between two of the storage systems (716, 724, 728), or in a variety of ways. If secure communication is required, some form of key exchange may be needed, or communication could be done or bootstrapped through some service such as SSH (Secure SHell), SSL, or some other service or protocol built around public keys or Diffie-Hellman key exchange or reasonable alternatives. Secure communications could also be mediated through some vendor-provided cloud service tied in some way to customer identities. Alternately, a service configured to run on customer facilities, such as running in a virtual machine or container, could be used to mediate key exchanges necessary for secure communications between replicating storage systems (716, 718, 720). Readers will appreciate that a pod including more than two storage systems may need communication links between most or all of the individual storage systems. In the example depicted in FIG. 6, three data communications links (716, 718, 720) are illustrated, although additional data communications links may exist in other embodiments.

Readers will appreciate that communication between the storage systems (714, 724, 728) across which the dataset (712) will be synchronously replicated serves some number of purposes. One purpose, for example, is to deliver data from one storage system (714, 724, 728) to another storage system (714, 724, 728) as part of I/O processing. For example, processing a write commonly requires delivering the write content and some description of the write to any paired storage systems for a pod. Another purpose served by data communications between the storage systems (714, 724, 728) may be to communicate configuration changes and analytics data in order to handle creating, extending, deleting or renaming volumes, files, object buckets, and so on. Another purpose served by data communications between the storage systems (714, 724, 728) may be to carry out communication involved in detecting and handling storage system and interconnect faults. This type of communication may be time critical and may need to be prioritized to ensure it doesn't get stuck behind a long network queue delay when a large burst of write traffic is suddenly dumped on the datacenter interconnect.

Readers will further appreciate that different types of communication may use the same connections, or different connections, and may use the same networks, or different networks, in various combinations. Further, some communications may be encrypted and secured while other communications might not be encrypted. In some cases, the data communications links could be used to forward I/O requests (either directly as the requests themselves or as logical descriptions of the operations the I/O requests represent) from one storage system to another. This could be used, for example, in cases where one storage system has up-to-date and in-sync content for a pod, and another storage system does not currently have up-to-date and in-sync content for the pod. In such cases, as long as the data communications links are running, requests can be forwarded from the storage system that is not up-to-date and in-sync to the storage system that is up-to-date and in-sync.

The example method depicted in FIG. 7 also includes exchanging (706), between the plurality of storage systems (714, 724, 728), timing information (710, 722, 726) for at least one of the plurality of storage systems (714, 724, 728). In the example method depicted in FIG. 6, timing information (710, 722, 726) for a particular storage system (714, 724, 728) may be embodied, for example, as the value of a clock within the storage system (714, 724, 728). In an alternative embodiment, the timing information (710, 722, 726) for a particular storage system (714, 724, 728) may be embodied as a value which serves as a proxy for a clock value. The value which serves as a proxy for a clock value may be included in a token that is exchanged between the storage systems. Such a value which serves as a proxy for a clock value may be embodied, for example, a sequence number that a particular storage system (714, 724, 728) or storage system controller can internally record as having been sent at a particular time. In such an example, if the token (e.g., the sequence number) is received back, the associated clock value can be found and utilized as the basis for determining whether a valid lease is still in place. In the example method depicted in FIG. 6, exchanging (706) timing information (710, 722, 726) for at least one of the plurality of storage systems (714, 724, 728) between the plurality of storage systems (714, 724, 728) may be carried out, for example, by each storage system (714, 724, 728) sending timing information to each other storage system (714, 724, 728) in a pod on a periodic basis, on demand, within a predetermined amount of time after a lease is established, within a predetermined amount of time before a lease is set to expire, as part of an attempt to initiate or re-establish a synchronous replication relationship, or in some other way.

The example method depicted in FIG. 7 also includes establishing (708), in dependence upon the timing information (710, 722, 726) for at least one of the plurality of storage systems (714, 724, 728), a synchronous replication lease, the synchronous replication lease identifying a period of time during which the synchronous replication relationship is valid. In the example method depicted in FIG. 7, a synchronous replication relationship is formed as a set of storage systems (714, 724, 728) that replicate some dataset (712) between these largely independent stores, where each storage systems (714, 724, 728) has its own copy and its own separate internal management of relevant data structures for defining storage objects, for mapping objects to physical storage, for deduplication, for defining the mapping of content to snapshots, and so on. A synchronous replication relationship can be specific to a particular dataset, such that a particular storage system (714, 724, 728) may be associated with more than one synchronous replication relationship, where each synchronous replication relationship is differentiated by the dataset being described and may further consist of a different set of additional member storage systems.

In the example method depicted in FIG. 7, a synchronous replication lease may be established (708) in dependence upon the timing information (710, 722, 726) for at least one of the plurality of storage systems (714, 724, 728) in a variety of different ways. In one embodiment, the storage systems may establish (708) a synchronous replication lease by utilizing the timing information (710, 722, 726) for each of the plurality of storage systems (714, 724, 728) to coordinate clocks. In such an example, once the clocks are coordinated for each of the storage systems (714, 724, 728), the storage system may establish (708) a synchronous replication lease that extends for a predetermined period of time beyond the coordinated clock values. For example, if the clocks for each storage system (714, 724, 728) are coordinated to be at a value of X, the storage systems (714, 724, 728) may each be configured to establish a synchronous replication lease that is valid until X+2 seconds.

In an alternative embodiment, the need to coordinate clocks between the storage systems (714, 724, 728) may be avoided while still achieving a timing guarantee. In such an embodiment, a storage controller within each storage system (714, 724, 728) may have a local monotonically increasing clock. A synchronous replication lease may be established (708) between storage controllers (such as a primary controller in one storage system communicating with a primary controller in a paired storage system) by each controller sending its clock value to the other storage controllers along with the last clock value it received from the other storage controller. When a particular controller receives back its clock value from another controller, it adds some agreed upon lease interval to that received clock value and uses that to establish (708) its local synchronous replication lease. In such a way, the synchronous replication lease may be calculated in dependence upon a value of a local clock that was received from another storage system.

Consider an example in which a storage controller in a first storage system (714) is communicating with a storage controller in a second storage system (724). In such an example, assume that the value of the monotonically increasing clock for the storage controller in the first storage system (714) is 1000 milliseconds. Further assume that the storage controller in the first storage system (714) sends a message to the storage controller in the second storage system (724) indicating that its clock value at the time that the message was generated was 1000 milliseconds. In such an example, assume that 500 milliseconds after the storage controller in the first storage system (714) sent a message to the storage controller in the second storage system (724) indicating that its clock value at the time that the message was generated was 1000 milliseconds, the storage controller in the first storage system (714) receives a message from the storage controller in a second storage system (724) indicating that: 1) the value of the monotonically increasing clock in the storage controller in the second storage system (724) was at a value of 5000 milliseconds when the message was generated, and 2) the last value of the monotonically increasing clock in the storage controller in the first storage system (714) that was received by the second storage system (724) was 1000 milliseconds. In such an example, if the agreed upon lease interval is 2000 milliseconds, the first storage system (714) will establish (708) a synchronous replication lease that is valid until the monotonically increasing clock for the storage controller in the first storage system (714) is at a value of 3000 milliseconds. If the storage controller in the first storage system (714) does not receive a message from the storage controller in the second storage system (724) that includes an updated value of the monotonically increasing clock for the storage controller in the first storage system (714) by the time that the monotonically increasing clock for the storage controller in the first storage system (714) reaches a value of 3000 milliseconds, the first storage system (714) will treat the synchronous replication lease to have expired and may take various actions as described in greater detail below. Readers will appreciate that storage controllers within the remaining storage systems (724, 728) in a pod may react similarly and perform a similar tracking and updating of the synchronous replication lease. Essentially, the receiving controller can be assured that the network and the paired controllers were running somewhere during that time interval, and it can be assured that the paired controller received a message that it sent somewhere during that time interval. Without any coordination in clocks, the receiving controller can't know exactly where in that time interval the network and the paired controller were running, and can't really know if there were queue delays in sending its clock value or in receiving back its clock value.

In a pod consisting of two storage systems, each with a simple primary controller, where the primary controllers are exchanging clocks as part of their cluster communication, each primary controller can use the activity lease to put a bound on when it won't know for certain that the paired controller was running. At the point it becomes uncertain (when the controller's connection's activity lease has expired), it can start sending messages indicating that it is uncertain and that a properly synchronized connection must be reestablished before activity leases can again be resumed. These messages may be received and responses may not be received, if the network is working in one direction but is not working properly in the other direction. This may be the first indication by a running paired controller that the connection isn't running normally, because its own activity lease may not yet have expired, due to a different combination of lost messages and queue delays. As a result, if such a message is received, it should also consider its own activity lease to be expired, and it should start sending messages of its own attempting to coordinate synchronizing the connection and resuming of activity leases. Until that happens and a new set of clock exchanges can succeed, neither controller can consider its activity lease to be valid.

In this model, a controller can wait for lease interval seconds after it started sending reestablish messages, and if it hasn't received a response, it can be assured that either the paired controller is down or the paired controller's own lease for the connection will have expired. To handle minor amounts of clock drift, it may wait slightly longer than the lease interval (i.e., a reestablishment lease). When a controller receives a reestablish message, it could consider the reestablishment lease to be expired immediately, rather than waiting (since it knows that the sending controller's activity lease has expired), but it will often make sense to attempt further messaging before giving up, in case message loss was a temporary condition caused, for example, by a congested network switch.

In an alternative embodiment, in addition to establishing a synchronous replication lease, a cluster membership lease may also be established upon receipt of a clock value from a paired storage system or upon receipt back of a clock exchanged with a paired storage system. In such an example, each storage system may have its own synchronous replication lease and its own cluster membership lease with every paired storage system. The expiration of a synchronous replication lease with any pair may result in paused processing. Cluster membership, however, cannot be recalculated until the cluster membership lease has expired with all pairs. As such, the duration of the cluster membership lease should be set, based on the message and clock value interactions, to ensure that the cluster membership lease with a pair will not expire until after a pair's synchronous replication link for that link has expired. Readers will appreciate that a cluster membership lease can be established by each storage system in a pod and may be associated with a communication link between any two storage systems that are members of the pod.

Furthermore, the cluster membership lease may extend after the expiration of the synchronous replication lease for a duration of time that is at least as long as the time period for expiration of the synchronous replication lease. The cluster membership lease may be extended on receipt of a clock value received from a paired storage system as part of a clock exchange, where the cluster membership lease period from the current clock value may be at least as long as the period established for the last synchronous replication lease extension based on exchanged clock values. In additional embodiments, additional cluster membership information can be exchanged over a connection, including when a session is first negotiated. Readers will appreciate that in embodiments that utilize a cluster membership lease, each storage system (or storage controller) may have its own value for the cluster membership lease. Such a lease should not expire until it can be assured that all synchronous replication leases across all pod members will have expired given that the cluster lease expiration allows establishing new membership such as through a mediator race and the synchronous replication lease expiration forces processing of new requests to pause. In such an example, the pause must be assured to be in place everywhere before cluster membership actions can be taken.

Readers will appreciate that although only one of the storage systems (714) is depicted as identifying (702), for a dataset (712), a plurality of storage systems (714, 724, 728) across which the dataset (712) will be synchronously replicated, configuring (704) one or more data communications links (716, 718, 720) between each of the plurality of storage systems (714, 724, 728) to be used for synchronously replicating the dataset (712), exchanging (706), between the plurality of storage systems (714, 724, 728), timing information (710, 722, 726) for at least one of the plurality of storage systems (714, 724, 728), and establishing (708), in dependence upon the timing information (710, 722, 726) for at least one of the plurality of storage systems (714, 724, 728), a synchronous replication lease, the remaining storage systems (724, 728) may also carry out such steps. In fact, all three storage systems (714, 724, 728) may carry out one or more of the steps described above at the same time, as establishing a synchronous replication relationship between two or more storage systems (714, 724, 728) may require collaboration and interaction between two or more storage systems (714, 724, 728).

Figure 8:
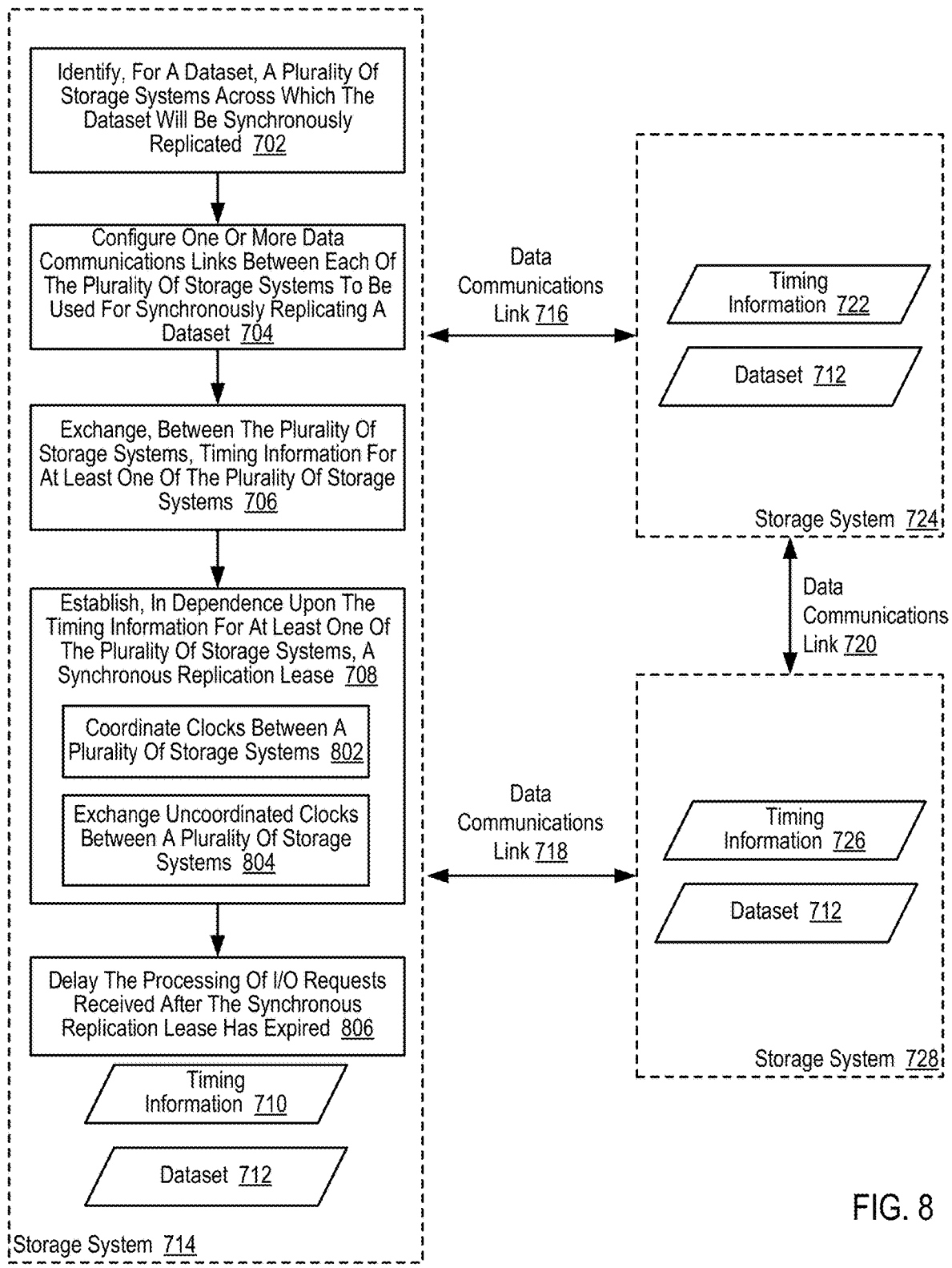
FIG. 8 sets forth a flow chart illustrating an additional example method of establishing a synchronous replication relationship between two or more storage systems according to some embodiments of the present disclosure.

For further explanation, FIG. 8 sets forth a flow chart illustrating an additional example method of establishing a synchronous replication relationship between two or more storage systems (714, 724, 728) according to some embodiments of the present disclosure. The example method depicted in FIG. 8 is similar to the example method depicted in FIG. 46, as the example method depicted in FIG. 8 also includes identifying (702), for a dataset (712), a plurality of storage systems (714, 724, 728) across which the dataset (712) will be synchronously replicated, configuring (704) one or more data communications links (716, 718, 720) between each of the plurality of storage systems (714, 724, 728) to be used for synchronously replicating the dataset (712), exchanging (706), between the plurality of storage systems (714, 724, 728), timing information (710, 722, 726) for at least one of the plurality of storage systems (714, 724, 728), and establishing (708), in dependence upon the timing information (710, 722, 726) for at least one of the plurality of storage systems (714, 724, 728), a synchronous replication lease, the synchronous replication lease identifying a period of time during which the synchronous replication relationship is valid.

In the example method depicted in FIG. 8, establishing (708), in dependence upon the timing information (710, 722, 726) for at least one of the plurality of storage systems (714, 724, 728), a synchronous replication lease can include coordinating (802) clocks between a plurality of storage systems (714, 724, 728). In the example method depicted in FIG. 8, coordinating (802) clocks between a plurality of storage systems (714, 724, 728) may be carried out, for example, through the exchange of one or more messages sent between the storage systems (714, 724, 728). The one or more messages sent between the storage systems (714, 724, 728) may include information such as, for example, the clock value of a storage system whose clock value will be used by all other storage systems, an instruction for all storage systems to set their clock values to a predetermined value, confirmation messages from a storage system that has updated its clock value, and so on. In such an example, the storage systems (714, 724, 728) may be configured such that the clock value for a particular storage system (e.g., a leader storage system) should be used by all other storage systems, the clock value from all of the storage system that meets some particular criteria (e.g., the highest clock value) should be used all other storage systems, and so on. In such an example, some predetermined amount of time may be added to a clock value received from another storage system to account for transmission times associated with the exchange of messages.

In the example method depicted in FIG. 8, establishing (708), in dependence upon the timing information (710, 722, 726) for at least one of the plurality of storage systems (714, 724, 728), a synchronous replication lease can include exchanging (804) uncoordinated clocks between a plurality of storage systems (714, 724, 728). Exchanging (804) uncoordinated clocks between a plurality of storage systems (714, 724, 728) may be carried, for example, by a storage controller in each storage system (714, 724, 728) exchanging values for a local monotonically increasing clock as described in greater detail above. In such an example, each storage system (714, 724, 728) may utilize an agreed upon synchronous replication lease interval and messaging received from other storage systems (714, 724, 728) to establish (708) a synchronous replication lease.

The example method depicted in FIG. 8 also includes delaying (806) the processing of I/O requests received after the synchronous replication lease has expired. I/O requests received by any of the storage systems after the synchronous replication lease has expired may be delayed (806), for example, for a predetermined amount of time that is sufficient for attempting to re-establish a synchronous replication relationship, until a new synchronous replication lease has been established, and so on. In such an example, a storage system may delay (806) the processing of I/O requests by failing with some type of 'busy' or temporary failure indication, or in some other way.

Figure 9:
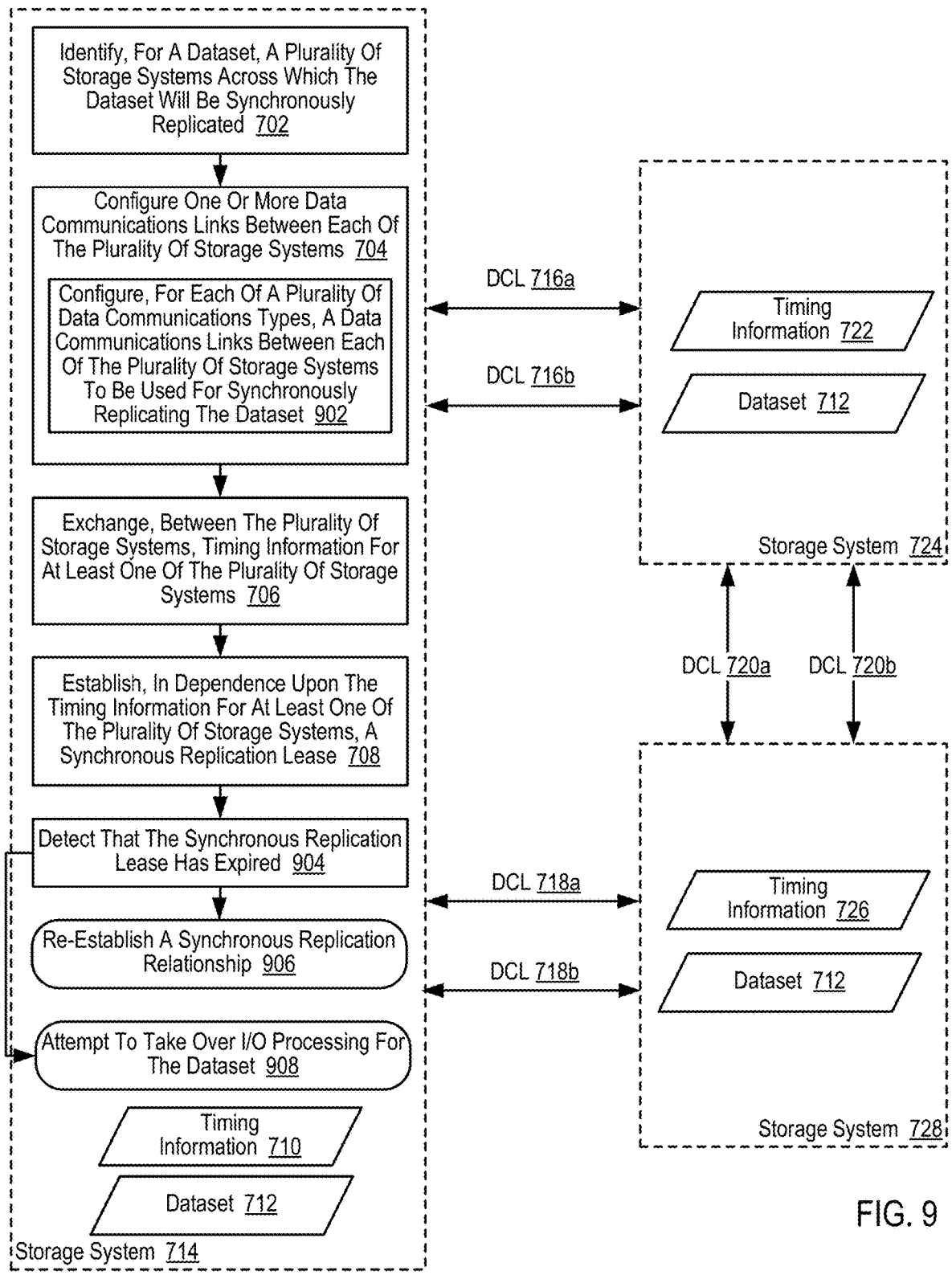
FIG. 9 sets forth a flow chart illustrating an additional example method of establishing a synchronous replication relationship between two or more storage systems according to some embodiments of the present disclosure.

For further explanation, FIG. 9 sets forth a flow chart illustrating an additional example method of establishing a synchronous replication relationship between two or more storage systems (714, 724, 728) according to some embodiments of the present disclosure. The example method depicted in FIG. 9 is similar to the example method depicted in FIG. 46, as the example method depicted in FIG. 9 also includes identifying (702), for a dataset (712), a plurality of storage systems (714, 724, 728) across which the dataset (712) will be synchronously replicated, configuring (704) one or more data communications links (716a, 716b, 718a, 718b, 720a, 720b) between each of the plurality of storage systems (714, 724, 728) to be used for synchronously replicating the dataset (712), exchanging (706), between the plurality of storage systems (714, 724, 728), timing information (710, 722, 726) for at least one of the plurality of storage systems (714, 724, 728), and establishing (708), in dependence upon the timing information (710, 722, 726) for at least one of the plurality of storage systems (714, 724, 728), a synchronous replication lease, the synchronous replication lease identifying a period of time during which the synchronous replication relationship is valid.

In the example method depicted in FIG. 9, configuring (704) one or more data communications links (716a, 716b, 718a, 718b, 720a, 720b) between each of the plurality of storage systems (714, 724, 728) to be used for synchronously replicating the dataset (712) can include configuring (902), for each of a plurality of data communications types, a data communications link (716a, 716b, 718a, 718b, 720a, 720b) between each of the plurality of storage systems (714, 724, 728) to be used for synchronously replicating the dataset (712). In the example method depicted in FIG. 9, each storage system may be configured to generate a plurality of data communications types that the storage system sends to other storage systems in a pod. For example, a storage system may generate data communications of a first type that includes data that is part of I/O processing (e.g., data to be written to a storage system as part of a write request issued by a host), the storage system may be configured to generate data communications of a second type that includes configuration changes (e.g., information generated in response to create, extend, delete or rename volumes), the storage system may be configured to generate data communications of a third type that includes communication involved in detecting and handling storage system and interconnect faults, and so on. In such an example, the data communications type may be determined, for example, based on which software module initiated the message, based on which hardware component initiated the message, based on the type of event that caused the message to be initiated, and in other ways. In the example method depicted in FIG. 9, configuring (902) a data communications link (716a, 716b, 718a, 718b, 720a, 720b) between each of the plurality of storage systems (714, 724, 728) for each of a plurality of data communications types may be carried out, for example, by configuring the storage systems to use distinct interconnects for each of a plurality of data communications types, by configuring the storage systems to use distinct networks for each of a plurality of data communications types, or in other ways.

The example method depicted in FIG. 9 also includes detecting (904) that the synchronous replication lease has expired. In the example method depicted in FIG. 9, detecting (904) that the synchronous replication lease has expired may be carried out, for example, by a particular storage system comparing a current clock value to the period of time during which the lease was valid. Consider an example in which the storage systems (714, 724, 728) coordinated clocks to set the value of a clock within each storage system (714, 724, 728) to a value of 5000 milliseconds and each storage system (714, 724, 728) was configured to establish (708) a synchronous replication lease that extended for a lease interval of 2000 milliseconds beyond their clock values, such that the synchronous replication lease for each storage system (714, 724, 728) expired when the clock within a particular storage system (714, 724, 728) reached a value that exceeds 7000 milliseconds. In such an example, detecting (904) that the synchronous replication lease has expired may be carried out by determining that the clock within a particular storage system (714, 724, 728) reached a value of 7001 milliseconds or higher.

Readers will appreciate that the occurrence of other events may also cause each storage system (714, 724, 728) to immediately treat a synchronous replication lease as being expired, For example, a storage system (714, 724, 728) may immediately treat a synchronous replication lease as being expired upon detecting a communications failure between the storage system (714, 724, 728) and another storage system (714, 724, 728) in the pod, a storage system (714, 724, 728) may immediately treat a synchronous replication lease as being expired upon receiving a lease re-establishment message from another storage system (714, 724, 728) in the pod, a storage system (714, 724, 728) may immediately treat a synchronous replication lease as being expired upon detecting that another storage system (714, 724, 728) in the pod has failed, and so on. In such an example, the occurrence of any of the events described in the preceding sentence may cause a storage system to detect (904) that the synchronous replication lease has expired.

The example method depicted in FIG. 9 also includes re-establishing (906) a synchronous replication relationship. In the example method depicted in FIG. 9, re-establishing (906) a synchronous replication relationship may be carried out, for example, through the use of one or more re-establishment messages. Such re-establishment messages can include, for example, an identification of a pod for which the synchronous replication relationship is to be re-established, information needed to configure one or more data communications links, updated timing information, and so on. In such a way, the storage systems (714, 724, 728) may re-establish (906) a synchronous replication relationship in much the same way that the synchronous replication relationship was initially created, including but not limited to, each storage system performing one or more of: identifying (702), for a dataset (712), a plurality of storage systems (714, 724, 728) across which the dataset (712) will be synchronously replicated, configuring (704) one or more data communications links (716a, 716b, 718a, 718b, 720a, 720b) between each of the plurality of storage systems (714, 724, 728) to be used for synchronously replicating the dataset (712), exchanging (706), between the plurality of storage systems (714, 724, 728), timing information (710, 722, 726) for at least one of the plurality of storage systems (714, 724, 728), and establishing (708), in dependence upon the timing information (710, 722, 726) for at least one of the plurality of storage systems (714, 724, 728), a synchronous replication lease, the synchronous replication lease identifying a period of time during which the synchronous replication relationship is valid.

In the example method depicted in FIG. 9, the expiration of a synchronous replication lease may be followed by some set of events, followed by a reestablishment message, followed by a new activity lease, or followed by some other action. Data communications, configuration communications, or other communications might be in transit while the synchronous replication lease expires and is re-established. In fact, communication may not be received, for example, until after a new synchronous replication lease has been established. In such cases, the communications may have been sent based on one understanding of the pod, cluster, or network link state, and may be received by a storage system (714, 724, 728) that now has a different understanding of one or another aspect of that state. As such, there should generally be some means of ensuring that received communications are discarded if the communications were sent prior to some set of cluster or link state changes. There are several possible ways of ensuring that received communications are discarded if the communications were sent prior to some set of cluster or link state changes. One way of ensuring that received communications are discarded if the communications were sent prior to some set of cluster or link state changes is to establish some session identifier (e.g., a number) that is associated with establishing or reestablishing a link with a working synchronous replication lease that is being extended. After a cluster communications link is reestablished, the link gets a new session identifier. This identifier can be included with data, configuration, or other communication messages. Any message that is received with the wrong session identifier is discarded or results in an error response indicating a mismatched session identifier.

Readers will appreciate that the manner in which storage systems (714, 724, 728) respond to the re-establishment of a synchronous replication lease may change based on different embodiments that the storage systems and the pods may take. In the case of simple primary controllers with two storage systems, any new request to perform an operation on a storage system (reads, writes, file operations, object operations, administrative operations, etc.) that is received after the receiving controller's synchronous replication lease has expired may have its processing delayed, dropped, or failed with some kind of "retry later" error code. As such, a running primary storage controller can be assured that the paired storage controller is not processing new requests if it can be assured that the paired storage controller's synchronous replication lease has expired, which it can be assured of when its own reestablishment lease has expired. After the reestablishment lease has expired it is safe for the controller to start looking further at corrective actions, including considering the paired controller to be offline and then continuing storage processing without the paired controller. Exactly what actions those might be can differ based on a wide variety of considerations and implementation details.

In the case of storage systems with primary and secondary controllers, a still running primary controller on one storage system might try to connect to the paired storage system's previous secondary controller, on the presumption that the paired storage system's previous secondary controller might be taking over. Or, a still running primary controller on one storage system might wait for some particular amount of time that is the likely maximum secondary takeover time. If the secondary controller connects and establishes a new connection with a new synchronous replication lease within a reasonable time, then the pod may then recover itself to a consistent state (described later) and then continue normally. If the paired secondary controller doesn't connect quickly enough, then the still running primary controller may take further action, such as trying to determine whether the still running primary controller should consider the paired storage system to be faulted and then continue operating without the paired storage system. Primary controllers might instead keep active, leased, connections to secondary controllers on paired storage systems within a pod. In that case, expiration of the primary-to-primary reestablishment lease might result instead in a surviving primary using that connection to query for secondary takeover, rather than there being a need to establish that connection in the first place. It is also possible that two primary storage controllers are running, while the network isn't working between them, but the network is working between one or the other primary controller and the paired secondary controller. In that case, internal high availability monitoring within the storage system might not detect a condition on its own that triggers a failover from primary to secondary controller. Responses to that condition include: triggering a failover from primary to secondary anyway, just to resume synchronous replication, routing communication traffic from a primary through a secondary, or operating exactly as if communication had failed completely between the two storage systems, resulting in the same fault handling as if that had happened.

If multiple controllers are active for a pod (including in both dual active-active controller storage systems and in scale-out storage systems), leases might still be kept by individual controller cluster communications with any or all controllers in a paired storage system. In this case, an expired synchronous replication lease might need to result in pausing of new request processing for a pod across the entire storage system. The lease model can be extended with exchanging of clocks and paired clock responses between all active controllers in a storage system, with the further exchanging of those clocks with any paired controllers in the paired storage systems. If there is an operating path over which a particular local controller's clock is exchanged with any paired controller, then the controller can use that path for an independent synchronous replication lease and possibly for an independent reestablishment lease. In this case, local controllers within a storage system may be further exchanging clocks between each other for local leases between each other as well. This may already be incorporated into the local storage system's high availability and monitoring mechanisms, but any timings related to the storage system's high availability mechanisms should be taken into account in the duration of the activity and reestablishment leases, or in any further delays between reestablishment lease expiration and actions taken to handle an interconnect fault.

Alternately, storage-system-to-storage-system cluster communications or lease protocols alone may be assigned to one primary controller at a time within an individual multi-controller or scale-out storage system, at least for a particular pod. This service may migrate from controller to controller as a result of faults or, perhaps, as a result of load imbalances. Or cluster communications or lease protocols might run on a subset of controllers (for example, two) in order to limit clock exchanges or the complexity of analyzing fault scenarios. Each local controller may need to exchange clocks within the controllers that handle storage system to storage system leases, and the time to respond after a lease expiration might have to be adjusted accordingly, to account for potential cascading delays in when individual controllers can be ensured to have effected a processing pause. Connections that are not currently depended on for leases related to processing pausing might still be monitored for alerting purposes.

The example method depicted in FIG. 9 also includes attempting (908) to take over I/O processing for the dataset. In the example method depicted in FIG. 9, attempting (908)

to take over I/O processing for the dataset (712) may be carried, for example, by a storage system (714, 724, 728) racing to a mediator. If a particular storage system (714, 724, 728) successfully takes over I/O processing for the dataset (712), all accesses of the dataset (712) will be serviced by the particular storage system (714, 724, 728) until a synchronous replication relationship can be reestablished and any changes to the dataset (712) that occurred after the previous synchronous replication relationship expired can then be transferred and persisted on the other storage systems (714, 724, 728). In such an example, an attempt (908) to take over I/O processing for the dataset (712) may only occur after the expiration of some period of time after the synchronous replication lease expires. For example, attempts to resolve how to proceed after link failure (including one or more of the storage systems attempting to take over I/O processing for the dataset) may not start until a time period after the synchronous replication lease has expired that is, for example, at least as long as the maximum lease time resulting from clock exchanges.

Readers will appreciate that in many of the examples depicted above, although only one of the storage systems (714) is depicted as carrying out the steps described above, in fact, all storage systems (714, 724, 728) in a pod (or in a pod that is being formed) may carry out one or more of the steps described above at the same time, as establishing a synchronous replication relationship between two or more storage systems may require collaboration and interaction between two or more storage systems.

Figure 10:
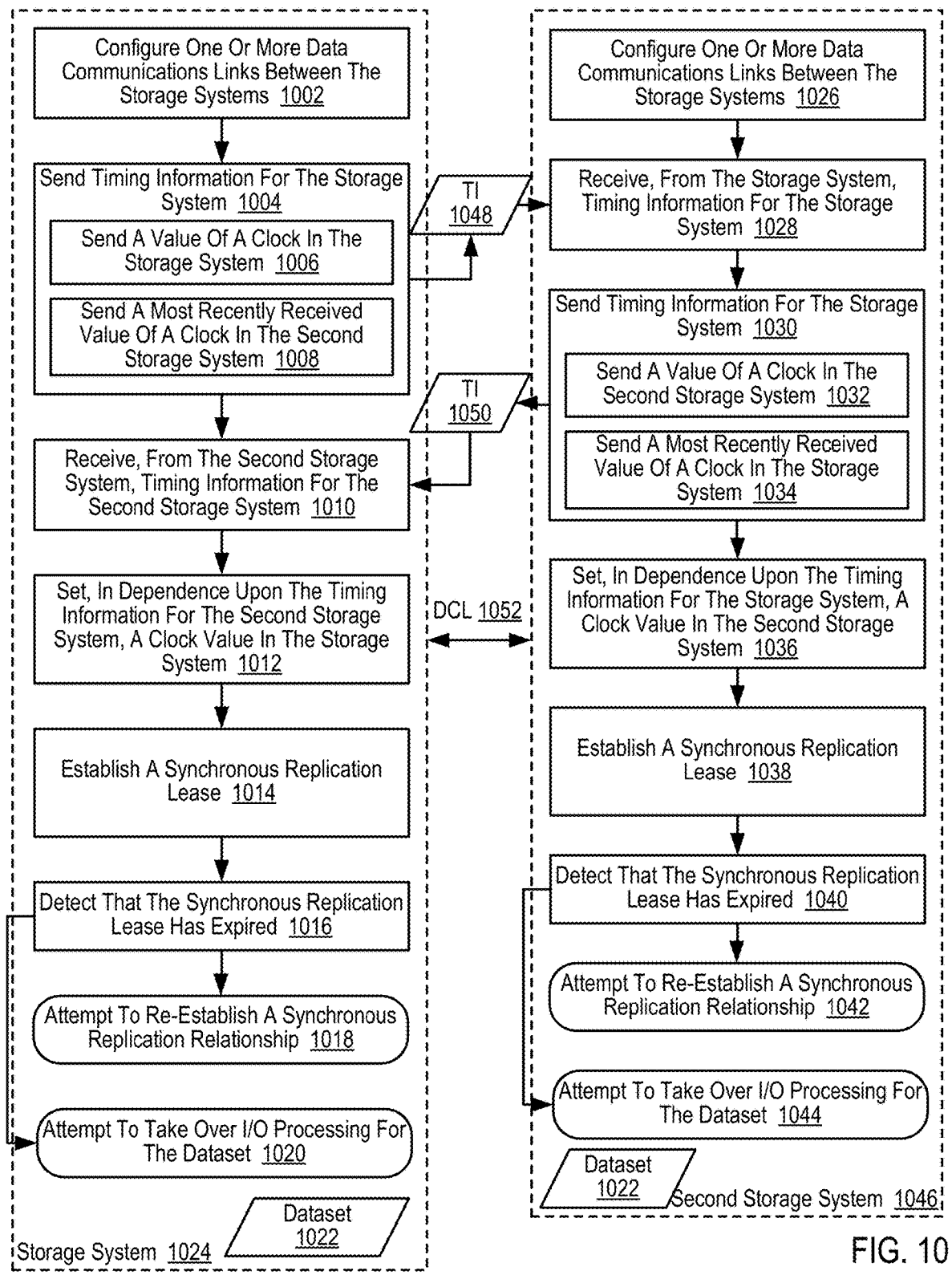
FIG. 10 sets forth a flow chart illustrating an additional example method of establishing a synchronous replication relationship between two or more storage systems according to some embodiments of the present disclosure.

For further explanation, FIG. 10 sets forth a flow chart illustrating an additional example method of establishing a synchronous replication relationship between two or more storage systems (1024, 1046) according to some embodiments of the present disclosure. Although the example method depicted in FIG. 10 illustrates an embodiment in which a dataset (1022) is synchronously replicated across only two storage systems (1024, 1046), the example depicted in FIG. 10 can be extended to embodiments in which the dataset (1022) is synchronously replicated across additional storage systems that may perform steps that are similar to the steps performed by the two illustrated storage systems (1024, 1046).

The example method depicted in FIG. 10 includes configuring (1002), by the storage system (1024), one or more data communications links (1052) between the storage systems (1024, 1046) and the second storage system (1046). In the example method depicted in FIG. 10, the storage system (1024) may configure (1002) one or more data communications links (1052) between the storage system (1024) and the second storage system (1046), for example, by identifying a defined port over a data communications network to be used for exchanging data communications with the second storage system (1046), by identifying a point-to-point data communications link to be used for exchanging data communications with the second storage system (1046), by identifying a data communications network to be used for exchanging data communications with the second storage system (1046), or in a variety of ways. If secure communication is required, some form of key exchange may be needed, or communication could be done or bootstrapped through some service such as SSH (Secure SHell), SSL, or some other service or protocol built around public keys or Diffie-Hellman key exchange or reasonable alternatives. Secure communications could also be mediated through some vendor-provided cloud service tied in some way to customer identities. Alternately, a service configured to run on customer facilities, such as running in a virtual machine or container, could be used to mediate key exchanges necessary for secure communications between replicating storage systems (1024, 1046). Readers will appreciate that a pod including more than two storage systems may need communication links between most or all of the individual storage systems. In the example method depicted in FIG. 10, the second storage system (1046) may similarly configure (1026) one or more data communications links (1052) between the storage system (1024) and the second storage system (1046).

The example method depicted in FIG. 10 also includes sending (1004), from the storage system (1024) to the second storage system (1046), timing information (1048) for the storage system (1024). The timing information (1048) for the storage system (1024) may be embodied, for example, as the value of a clock within the storage system (1024), as a representation of a clock value (e.g., a sequence number that the storage system (1024) can internally record), as the most recently received value of a clock within the second storage system (1046), and so on. In the example method depicted in FIG. 10, the storage system (1024) may send (1004) timing information (1048) for the storage system (1024) to the second storage system (1046), for example, via one or more messages sent from the storage system (1024) to the second storage system (1046) over a data communications link (1052) between the two storage systems (1024, 1046). In the example method depicted in FIG. 10, the second storage system (1046) may similarly send (1030), from the second storage system (1046) to the storage system (1024), timing information (1050) for the second storage system (1046).

In the example method depicted in FIG. 10, sending (1004), from the storage system (1024) to the second storage system (1046), timing information (1048) for the storage system (1024) can include sending (1006) a value of a clock in the storage system (1024). In the example depicted in FIG. 10, the storage system (1024) may send (1006) a value of a clock in the storage system (1024) to the second storage system (1046) as part of an effort to coordinate clocks between the storage systems (1024, 1046). In such an example, the storage system (1024) may include a local monotonically increasing clock whose value is sent (1006) via one or more messages that are sent to the second storage system (1046) via a data communications link (1052) between the two storage systems (1024, 1046). In the example method depicted in FIG. 10, sending (1030), from the second storage system (1046) to the storage system (1024), timing information (1050) for the second storage system (1046) may similarly include sending (1032) a value of a clock in the second storage system (1046).

In the example method depicted in FIG. 10, sending (1004), from the storage system (1024) to the second storage system (1046), timing information (1048) for the storage system (1024) can also include sending (1008) a most recently received value of a clock in the second storage system (1046). In the example method depicted in FIG. 10, sending (1008) a most recently received value of a clock in the second storage system (1046) may be carried out, for example, as part of an effort to eliminate the need to coordinate clocks between the storage systems (1024, 1046) while still achieving a timing guarantee. In such an embodiment, each storage system (1024, 1046) may have a local monotonically increasing clock. A synchronous replication lease may be established between the storage systems (1024, 1048) by each storage system (1024, 1048) sending its clock value to the other storage system (1024, 1048) along with the last clock value it received from the other storage system (1024, 1048). When a particular storage system (1024, 1048) receives back its clock value from another storage system (1024, 1048), it may add some agreed upon lease interval to that received clock value and use that to establish the synchronous replication lease. In the example method depicted in FIG. 10, sending (1030), from the second storage system (1046) to the storage system (1024), timing information (1050) for the second storage system (1046) may similarly include sending (1034) a most recently received value of a clock in the storage system (1024).

The example method depicted in FIG. 10 also includes receiving (1010), by the storage system (1024) from the second storage system (1046), timing information (1050) for the second storage system (1046). In the example method depicted in FIG. 10, the storage system (1024) may receive (1010) timing information (1050) for the second storage system (1046) from the second storage system (1046) via one or more messages sent from the second storage system (1046) via a data communications link (1052) between the two storage arrays (1024, 1046). In the example depicted in FIG. 10, the second storage system (1046) may similarly receive (1028), from the storage system (1024), timing information for the storage system (1024).

The example method depicted in FIG. 10 also includes setting (1012), in dependence upon the timing information (1050) for the second storage system (1046), a clock value in the storage system (1024). In the example method depicted in FIG. 10, setting (1012) a clock value in the storage system (1024) in dependence upon the timing information (1050) for the second storage system (1046) may be carried out, for example, as part of an effort to coordinate clocks between the two storage systems (1024, 1046). In such an example, the two storage systems (1024, 1046) may be configured, for example, to set their respective clocks values to a value that is some predetermined amount higher than the highest clock value between the pair of storage systems (1024, 1046), to set their respective clocks values to a value that is equal to the highest clock value between the pair of storage systems (1024, 1046), to set their respective clocks values to a value that is generated by applying some function to the respective clock values in each storage system (1024, 1046), or in some other way. In the example method depicted in FIG. 10, the second storage system (1046) may similarly set (1036), in dependence upon timing information (1048) for the storage system (1024), a clock value in the second storage system (1046).

The example method depicted in FIG. 10 also includes establishing (1014) a synchronous replication lease. In the example method depicted in FIG. 10, establishing (1014) a synchronous replication lease may be carried out, for example, by establishing a synchronous replication lease that extends for some predetermined lease interval beyond a coordinate clock value between the two storage systems (1024, 1046), by establishing a synchronous replication lease that extends for some predetermined lease interval beyond an uncoordinated clock value associated with one of the storage systems (1024, 1046), or in some other way. In the example method depicted in FIG. 10, the second storage system (1046) may similarly set (1036), in dependence upon timing information (1048) for the storage system (1024), a clock value in the second storage system (1046).

The example method depicted in FIG. 10 also includes detecting (1016), by the storage system (1024), that the synchronous replication lease has expired. In the example method depicted in FIG. 10, detecting (1016) that the synchronous replication lease has expired may be carried out, for example, by the storage system (1024) comparing a current clock value to the period of time during which the lease was valid. Consider an example in which the storage systems (1024, 1046) coordinated clocks to set the value of a clock within each storage system (1024, 1046) to a value of 5000 milliseconds and each storage system (1024, 1046) was configured to establish (1038) a synchronous replication lease that extended for a lease interval of 2000 milliseconds beyond their clock values, such that the synchronous replication lease for each storage system (1024, 1046) expired when the clock within a particular storage system (1024, 1046) reached a value that exceeds 10000 milliseconds. In such an example, detecting (1006) that the synchronous replication lease has expired may be carried out by determining that the clock within the storage system (1024) reached a value of 10001 milliseconds or higher. In the example method depicted in FIG. 10, the second storage system (1046) may similarly detect (1040) that the synchronous replication lease has expired.

The example method depicted in FIG. 10 also includes attempting (1020), by the storage system (1024), to take over I/O processing for the dataset (1022). In the example method depicted in FIG. 10, attempting (1020) to take over I/O processing for the dataset (1022) may be carried, for example, by the storage system (1024) racing to a mediator. If the storage system (1024) successfully takes over I/O processing for the dataset (1022), all accesses of the dataset (1022) will be serviced by the storage system (1024) until a synchronous replication relationship can be reestablished and any changes to the dataset (1022) that occurred after the previous synchronous replication relationship expired can be transferred to and persisted on the second storage system (1046). In the example method depicted in FIG. 10, the second storage system (1046) may similarly attempt (1044) to take over I/O processing for the dataset (1022).

The example method depicted in FIG. 10 also includes attempting (1018), by the storage system (1024) to re-establish the synchronous replication relationship. In the example method depicted in FIG. 10, attempting (1018) to re-establish a synchronous replication relationship may be carried out, for example, through the use of one or more re-establishment messages. Such re-establishment messages can include, for example, an identification of a pod for which the synchronous replication relationship is to be re-established, information needed to configure one or more data communications links, updated timing information, and so on. In such a way, the storage system (1024) may re-establish a synchronous replication relationship in much the same way that the synchronous replication relationship was initially created. In the example method depicted in FIG. 10, the second storage system (1046) may similarly attempt (1042) to re-establish the synchronous replication relationship.

Figure 11:
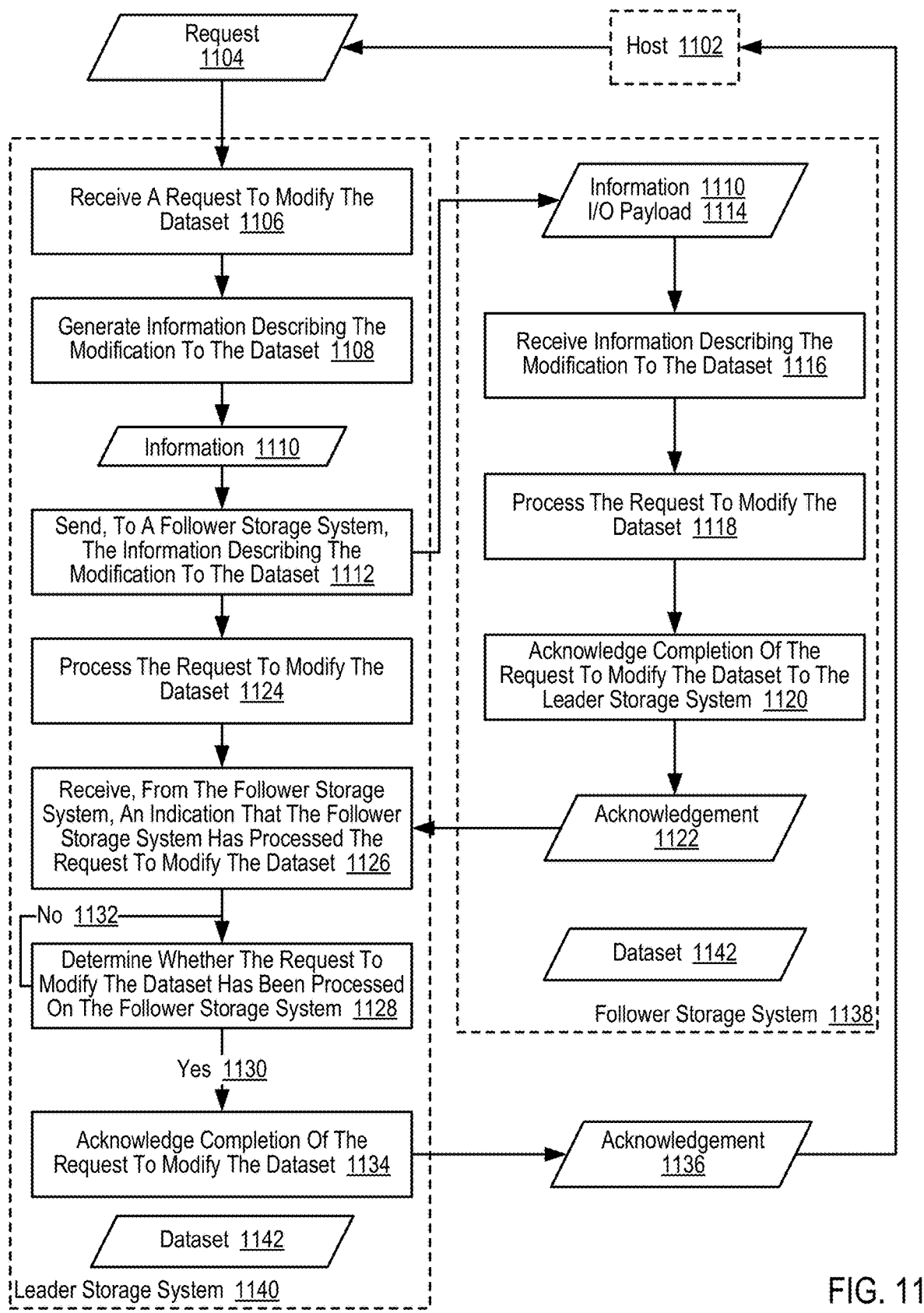
FIG. 11 sets forth a flow chart illustrating an example method for servicing I/O operations directed to a dataset that is synchronized across a plurality of storage systems according to some embodiments of the present disclosure.

For further explanation, FIG. 11 sets forth a flow chart illustrating an example method for servicing I/O operations directed to a dataset (1142) that is synchronized across a plurality of storage systems (1138, 1140) according to some embodiments of the present disclosure. Although depicted in less detail, the storage systems (1138, 1140) depicted in FIG. 11 may be similar to the storage systems described above with reference to FIGS. 1A-1D, FIGS. 2A-2G, FIGS. 3A-3B, or any combination thereof. In fact, the storage system depicted in FIG. 11 may include the same, fewer, additional components as the storage systems described above.

The dataset (1142) depicted in FIG. 11 may be embodied, for example, as the contents of a particular volume, as the contents of a particular shared of a volume, or as any other collection of one or more data elements. The dataset (1142) may be synchronized across a plurality of storage systems (1138, 1140) such that each storage system (1138, 1140) retains a local copy of the dataset (1142). In the examples described herein, such a dataset (1142) is synchronously replicated across the storage systems (1138, 1140) in such a way that the dataset (1142) can be accessed through any of the storage systems (1138, 1140) with performance characteristics such that any one storage system in the cluster doesn't operate substantially more optimally any other storage system in the cluster, at least as long as the cluster and the particular storage system being accessed are running nominally. In such systems, modifications to the dataset (1142) should be made to the copy of the dataset that resides on each storage system (1138, 1140) in such a way that accessing the dataset (1142) on any storage system (1138, 1140) will yield consistent results. For example, a write request issued to the dataset must be serviced on all storage systems (1138, 1140) or on none of the storage systems (1138, 1140) that were running nominally at the beginning of the write and that remained running nominally through completion of the write. Likewise, some groups of operations (e.g., two write operations that are directed to same location within the dataset) must be executed in the same order, or other steps must be taken as described in greater detail below, on all storage systems (1138, 1140) such that the dataset is ultimately identical on all storage systems (1138, 1140). Modifications to the dataset (1142) need not be made at the exact same time, but some actions (e.g., issuing an acknowledgement that a write request directed to the dataset, enabling read access to a location within the dataset that is targeted by a write request that has not yet been completed on both storage systems) may be delayed until the copy of the dataset on each storage system (1138, 1140) has been modified.

In the example method depicted in FIG. 11, the designation of one storage system (1140) as the 'leader' and another storage system (1138) as the 'follower' may refer to the respective relationships of each storage system for the purposes of synchronously replicating a particular dataset across the storage systems. In such an example, and as will be described in greater detail below, the leader storage system (1140) may be responsible for performing some processing of an incoming I/O operation and passing such information along to the follower storage system (1138) or just performing other tasks that are not required of the follower storage system (1140). The leader storage system (1140) may be responsible for performing tasks that are not required of the follower storage system (1138) for all incoming I/O operations or, alternatively, the leader-follower relationship may be specific to only a subset of the I/O operations that are received by either storage system. For example, the leader-follower relationship may be specific to I/O operations that are directed towards a first volume, a first group of volumes, a first group of logical addresses, a first group of physical addresses, or some other logical or physical delineator. In such a way, a first storage system may serve as the leader storage system for I/O operations directed to a first set of volumes (or other delineator) while a second storage system may serve as the leader storage system for I/O operations directed to a second set of volumes (or other delineator). The example method depicted in FIG. 11 depicts an embodiment where synchronizing a plurality of storage systems (1138, 1140) occurs in response to the receipt of a request (1104) to modify a dataset (1142) by the leader storage system (1140), although synchronizing a plurality of storage systems (1138, 1140) may also be carried out in response to the receipt of a request (1104) to modify a dataset (1142) by the follower storage system (1138), as will be described in greater detail below.

The example method depicted in FIG. 11 includes receiving (1106), by a leader storage system (1140), a request (1104) to modify the dataset (1142). The request (1104) to modify the dataset (1142) may be embodied, for example, as a request to write data to a location within the storage system (1140) that contains data that is included in the dataset (1142), as a request to write data to a volume that contains data that is included in the dataset (1142), as a request to take a snapshot of the dataset (1142), as a virtual range copy, as an UNMAP operation that essentially represents a deletion of some portion of the data in the dataset (1142), as a modifying transformations of the dataset (1142) (rather than a change to a portion of data within the dataset), or as some other operation that results in a change to some portion of the data that is included in the dataset (1142). In the example method depicted in FIG. 11, the request (1104) to modify the dataset (1142) is issued by a host (1102) that may be embodied, for example, as an application that is executing on a virtual machine, as an application that is executing on a computing device that is connected to the storage system (1140), or as some other entity configured to access the storage system (1140).

The example method depicted in FIG. 11 also includes generating (1108), by the leader storage system (1140), information (1110) describing the modification to the dataset (1142). The leader storage system (1140) may generate (1108) the information (1110) describing the modification to the dataset (1142), for example, by determining ordering versus any other operations that are in progress, by determining the proper outcome of overlapping modifications (e.g., the appropriate outcome of two requests to modify the same storage location), calculating any distributed state changes such as to common elements of metadata across all members of the pod (e.g., all storage systems across which the dataset is synchronously replicated), and so on. The information (1110) describing the modification to the dataset (1142) may be embodied, for example, as system-level information that is used to describe an I/O operation that is to be performed by a storage system. The leader storage system (1140) may generate (1108) the information (1110) describing the modification to the dataset (1142) by processing the request (1104) to modify the dataset (1142) just enough to figure out what should happen in order to service the request (1104) to modify the dataset (1142). For example, the leader storage system (1140) may determine whether some ordering of the execution of the request (1104) to modify the dataset (1142) relative to other requests to modify the dataset (1142) is required, or some other steps must be taken as described in greater detail below, to produce an equivalent result on each storage system (1138, 1140).

Consider an example in which the request (1104) to modify the dataset (1142) is embodied as a request to copy blocks from a first address range in the dataset (1142) to a second address range in the dataset (1142). In such an example, assume that three other write operations (write A, write B, write C) are directed to the first address range in the dataset (1142). In such an example, if the leader storage system (1140) services write A and write B (but does not service write C) prior to copying the blocks from the first address range in the dataset (1142) to the second address range in the dataset (1142), the follower storage system (1138) must also service write A and write B (but does not service write C) prior to copying the blocks from the first address range in the dataset (1142) to the second address range in the dataset (1142) in order to yield consistent results. As such, when the leader storage system (1140) generates (1108) the information (1110) describing the modification to the dataset (1142), in this example, the leader storage system (1140) could generate information (e.g., sequence numbers for write A and write B) that identifies other operations that must be completed before the follower storage system (1138) can process the request (1104) to modify the dataset (1142).

Consider an additional example in which two requests (e.g., Write A and Write B) are directed to overlapping portions of the dataset (1142). In such an example, if the leader storage system (1140) services write A and subsequently services write B, while the follower storage system (1138) services write B and subsequently services write A, the dataset (1142) would not be consistent across both storage systems (1138, 1140). As such, when the leader storage system (1140) generates (1108) the information (1110) describing the modification to the dataset (1142), in this example, the leader storage system (1140) could generate information (e.g., sequence numbers for write A and write B) that identifies the order in which the requests should be executed. Alternatively, rather than generating information (1110) describing the modification to the dataset (1142) which requires intermediate behavior from each storage system (1138, 1140), the leader storage system (1140) may generate (1108) information (1110) describing the modification to the dataset (1142) that includes information that identifies the proper outcome of the two requests. For example, if write B logically follows write A (and overlaps with write A), the end result must be that the dataset (1142) includes the parts of write B that overlap with write A, rather than including the parts of write A that overlap with write B. Such an outcome could be facilitated by merging a result in memory and writing the result of such a merge to the dataset (1142), rather than strictly requiring that a particular storage system (1138, 1140) execute write A and then subsequently execute write B. Readers will appreciate that more subtle cases relate to snapshots and virtual address range copies.

Readers will further appreciate that correct results for any operation must be committed to the point of being recoverable before the operation can be acknowledged. But, multiple operations can be committed together, or operations can be partially committed if recovery would ensure correctness. For example, a snapshot could locally commit with a recorded dependency on an expected write of A and B, but A or B might not have themselves committed. The snapshot cannot be acknowledged, and recovery might end up backing out the snapshot if the missing I/O cannot be recovered from another array. Also, if write B overlaps with write A, then the leader may "order" B to be after A, but A could actually be discarded and the operation to write A would then simply wait for B. Writes A, B, C, and D, coupled with a snapshot between A,B and C,D could commit and/or acknowledge some or all parts together as long as recovery cannot result in a snapshot inconsistency across arrays and as long as acknowledgement does not complete a later operation before an earlier operation has been persisted to the point that it is guaranteed to be recoverable.

The example method depicted in FIG. 11 also includes sending (1112), from the leader storage system (1140) to a follower storage system (1138), information (1110) describing the modification to the dataset (1142). Sending (1112) information (1110) describing the modification to the dataset (1142) from the leader storage system (1140) to a follower storage system (1138) may be carried out, for example, by the leader storage system (1140) sending one or more messages to the follower storage system (1138). The leader storage system (1140) may also send, in the same messages or in one or more different messages, I/O payload (1114) for the request (1104) to modify the dataset (1142). The I/O payload (1114) may be embodied, for example, as data that is to be written to storage within the follower storage system (1138) when the request (1104) to modify the dataset (1142) is embodied as a request to write data to the dataset (1142). In such an example, because the request (1104) to modify the dataset (1142) was received (1106) by the leader storage system (1140), the follower storage system (1138) has not received the I/O payload (1114) associated with the request (1104) to modify the dataset (1142). In the example method depicted in FIG. 11, the information (1110) describing the modification to the dataset (1142) and the I/O payload (1114) that is associated with the request (1104) to modify the dataset (1142) may be sent (1112) from the leader storage system (1140) to the follower storage system (1138) via one or more data communications networks that couple the leader storage system (1140) to the follower storage system (1138), via one or more dedicated data communications links (e.g., a first link for sending I/O payload and a second link for sending information describing modifications to datasets) that couples the leader storage system (1140) to the follower storage system (1138), or via some other mechanism.

The example method depicted in FIG. 11 also includes receiving (1116), by the follower storage system (1138), the information (1110) describing the modification to the dataset (1142). The follower storage system (1138) may receive (1116) the information (1110) describing the modification to the dataset (1142) and I/O payload (1114) from the leader storage system (1140), for example, via one or more messages that are sent from the leader storage system (1140) to the follower storage system (1138). The one or more messages may be sent from the leader storage system (1140) to the follower storage system (1138) via one or more dedicated data communications links between the two storage systems (1138, 1140), by the leader storage system (1140) writing the message to a predetermined memory location (e.g., the location of a queue) on the follower storage system (1138) using RDMA or a similar mechanism, or in other ways.

In one embodiment, the follower storage system (1138) may receive (1116) the information (1110) describing the modification to the dataset (1142) and I/O payload (1114) from the leader storage system (1140) through the use of the use of SCSI requests (writes from sender to receiver, or reads from receiver to sender) as a communication mechanism. In such an embodiment, a SCSI Write request is used to encode information that is intended to be sent (which includes whatever data and metadata), and which may be delivered to a special pseudo-device or over a specially configured SCSI network, or through any other agreed upon addressing mechanism. Or, alternately, the model can issue a set of open SCSI read requests from a receiver to a sender, also using special devices, specially configured SCSI networks, or other agreed upon mechanisms. Encoded information including data and metadata will be delivered to the receiver as a response to one or more of these open SCSI requests. Such a model can be implemented over Fibre Channel SCSI networks, which are often deployed as the "dark fibre" storage network infrastructure between data centers. Such a model also allows the use of the same network lines for host-to-remote-array multipathing and bulk array-to-array communications.

The example method depicted in FIG. 11 also includes processing (1118), by the follower storage system (1138), the request (1104) to modify the dataset (1142). In the example method depicted in FIG. 11, the follower storage system (1138) may process (1118) the request (1104) to modify the dataset (1142) by modifying the contents of one or more storage devices (e.g., an NVRAM device, an SSD, an HDD) that are included in the follower storage system (1138) in dependence upon the information (1110) describing the modification to the dataset (1142) as well as the I/O payload (1114) that was received from the leader storage system (1140). Consider an example in which the request (1104) to modify the dataset (1142) is embodied as a write operation that is directed to a volume that is included in the dataset (1142) and the information (1110) describing the modification to the dataset (1142) indicates that the write operation can only be executed after a previously issued write operation has been processed. In such an example, processing (1118) the request (1104) to modify the dataset (1142) may be carried out by the follower storage system (1138) first verifying that the previously issued write operation has been processed on the follower storage system (1138) and subsequently writing I/O payload (1114) associated with the write operation to one or more storage devices that are included in the follower storage system (1138). In such an example, the request (1104) to modify the dataset (1142) may be considered to have been completed and successfully processed, for example, when the I/O payload (1114) has been committed to persistent storage within the follower storage system (1138).

The example method depicted in FIG. 11 also includes acknowledging (1120), by the follower storage system (1138) to the leader storage system (1140), completion of the request (1104) to modify the dataset (1142). In the example method depicted in FIG. 11, acknowledging (1120), by the follower storage system (1138) to the leader storage system (1140), completion of the request (1104) to modify the dataset (1142) may be carried out by the follower storage system (1138) sending an acknowledgment (1122) message to the leader storage system (1140). Such messages may include, for example, information identifying the particular request (1104) to modify the dataset (1142) that was completed as well as any additional information useful in acknowledging (1120) the completion of the request (1104) to modify the dataset (1142) by the follower storage system (1138). In the example method depicted in FIG. 11, acknowledging (1120) completion of the request (1104) to modify the dataset (1142) to the leader storage system (1140) is illustrated by the follower storage system (1138) issuing an acknowledgment (1122) message to the leader storage system (1138).

The example method depicted in FIG. 11 also includes processing (1124), by the leader storage system (1140), the request (1104) to modify the dataset (1142). In the example method depicted in FIG. 11, the leader storage system (1140) may process (1124) the request (1104) to modify the dataset (1142) by modifying the contents of one or more storage devices (e.g., an NVRAM device, an SSD, an HDD) that are included in the leader storage system (1140) in dependence upon the information (1110) describing the modification to the dataset (1142) as well as the I/O payload (1114) that was received as part of the request (1104) to modify the dataset (1142). Consider an example in which the request (1104) to modify the dataset (1142) is embodied as a write operation that is directed to a volume that is included in the dataset (1142) and the information (1110) describing the modification to the dataset (1142) indicates that the write operation can only be executed after a previously issued write operation has been processed. In such an example, processing (1124) the request (1104) to modify the dataset (1142) may be carried out by the leader storage system (1140) first verifying that the previously issued write operation has been processed by the leader storage system (1140) and subsequently writing I/O payload (1114) associated with the write operation to one or more storage devices that are included in the leader storage system (1140). In such an example, the request (1104) to modify the dataset (1142) may be considered to have been completed and successfully processed, for example, when the I/O payload (1114) has been committed to persistent storage within the leader storage system (1140).

The example method depicted in FIG. 11 also includes receiving (1106), from the follower storage system (1138), an indication that the follower storage system (1138) has processed the request (1104) to modify the dataset (1126). In this example, the indication that the follower storage system (1138) has processed the request (1104) to modify the dataset (1126) is embodied as an acknowledgement (1122) message sent from the follower storage system (1138) to the leader storage system (1140). Readers will appreciate that although many of the steps described above are depicted and described as occurring in a particular order, no particular order is actually required. In fact, because the follower storage system (1138) and the leader storage system (1140) are independent storage systems, each storage system may be performing some of the steps described above in parallel. For example, the follower storage system (1138) may receive (1116) the information (1110) describing the modification to the dataset (1142), process (1118) the request (1104) to modify the dataset (1142), or acknowledge (1120) completion of the request (1104) to modify the dataset (1142) before the leader storage system (1140) has processed (1124) the request (1104) to modify the dataset (1142). Alternatively, the leader storage system (1140) may have processed (1124) the request (1104) to modify the dataset (1142) before the follower storage system (1138) has received (1116) the information (1110) describing the modification to the dataset (1142), processed (1118) the request (1104) to modify the dataset (1142), or acknowledged (1120) completion of the request (1104) to modify the dataset (1142).

The example method depicted in FIG. 11 also includes acknowledging (1134), by the leader storage system (1140), completion of the request (1104) to modify the dataset (1142). In the example method depicted in FIG. 11, acknowledging (1134) completion of the request (1104) to modify the dataset (1142) may be carried out through the use of one or more acknowledgement (1136) messages that are sent from the leader storage system (1140) to the host (1102) or via some other appropriate mechanism. In the example method depicted in FIG. 11, the leader storage system (1140) may determine (1128) whether the request (1104) to modify the dataset (1142) has been processed (1118) by the follower storage system (1138) prior to acknowledging (1134) completion of the request (1104) to modify the dataset (1142). The leader storage system (1140) may determine (1128) whether the request (1104) to modify the dataset (1142) has been processed (1118) by the follower storage system (1138), for example, by determining whether the leader storage system (1140) has received an acknowledgment message or other message from the follower storage system (1138) indicating that the request (1104) to modify the dataset (1142) has been processed (1118) by the follower storage system (1138). In such an example, if the leader storage system (1140) affirmatively (1130) determines that the request (1104) to modify the dataset (1142) has been processed (1118) by the follower storage system (1138) and also processed (1124) by the leader storage system (1138), the leader storage system (1140) may proceed by acknowledging (1134) completion of the request (1104) to modify the dataset (1142) to the host (1102) that initiated the request (1104) to modify the dataset (1142). If the leader storage system (1140) determines that the request (1104) to modify the dataset (1142) has not (1132) been processed (1118) by the follower storage system (1138) or has not been processed (1124) by the leader storage system (1138), however, the leader storage system (1140) may not yet acknowledge (1134) completion of the request (1104) to modify the dataset (1142) to the host (1102) that initiated the request (1104) to modify the dataset (1142), as the leader storage system (1140) may only acknowledge (1134) completion of the request (1104) to modify the dataset (1142) to the host (1102) that initiated the request (1104) to modify the dataset (1142) when the request (1104) to modify the dataset (1142) has been successfully processed on all storage systems (1138, 1140) across which a dataset (1142) is synchronously replicated.

Readers will appreciate that in the example method depicted in FIG. 11, sending (1112), from the leader storage system (1140) to a follower storage system (1138), information (1110) describing the modification to the dataset (1142) and acknowledging (1120), by the follower storage system (1138) to the leader storage system (1140), completion of the request (1104) to modify the dataset (1142) can be carried out using single roundtrip messaging. Single roundtrip messaging may be used, for example, through the use of Fibre Channel as a data interconnect. Typically, SCSI protocols are used with Fibre Channel. Such interconnects are commonly provisioned between data centers because some older replication technologies may be built to essentially replicate data as SCSI transactions over Fibre Channel networks. Also, historically Fibre Channel SCSI infrastructure had less overhead and lower latencies than networks based on Ethernet and TCP/IP. Further, when data centers are internally connected to block storage arrays using Fibre Channel, the Fibre Channel networks may be stretched to other data centers so that hosts in one data center can switch to accessing storage arrays in a remote data center when local storage arrays fail.

SCSI could be used as a general communication mechanism, even though it is normally designed for use with block storage protocols for storing and retrieving data in block-oriented volumes (or for tape). For example, SCSI READ or SCSI WRITE could be used to deliver or retrieve message data between storage controllers in paired storage systems. A typical implementation of SCSI WRITE requires two message round trips: a SCSI initiator sends a SCSI CDB describing the SCSI WRITE operation, a SCSI target receives that CDB and the SCSI target sends a "Ready to Receive" message to the SCSI initiator. The SCSI initiator then sends data to the SCSI target and when SCSI WRITE is complete the SCSI target responds to the SCSI initiator with a Success completion. A SCSI READ request, on the other hand, requires only one round trip: the SCSI initiator sends a SCSI CDB describing the SCSI READ operation, a SCSI target receives that CDB and responds with data and then a Success completion. As a result, over distance, a SCSI READ incurs half of the distance-related latency as a SCSI WRITE. Because of this, it may be faster for a data communications receiver to use SCSI READ requests to receive messages than for a sender of messages to use SCSI WRITE requests to send data. Using SCSI READ simply requires a message sender to operate as a SCSI target, and for a message receiver to operate as a SCSI initiator. A message receiver may send some number of SCSI CDB READ requests to any message sender, and the message sender would respond to one of the outstanding CDB READ requests when message data is available. Since SCSI subsystems may timeout if a READ request is outstanding for too long (e.g., 10 seconds), READ requests should be responded to within a few seconds even if there is no message data to be sent.

SCSI tape requests, as described in the SCSI Stream Commands standard from the T10 Technical Committee of the InterNational Committee on Information Technology Standards, support variable response data, which can be more flexible for returning variable-sized message data. The SCSI standard also supports an Immediate mode for SCSI WRITE requests, which could allow single-round-trip SCSI WRITE commands. Readers will appreciate that many of the embodiments described below also utilize single roundtrip messaging.

Figure 12:
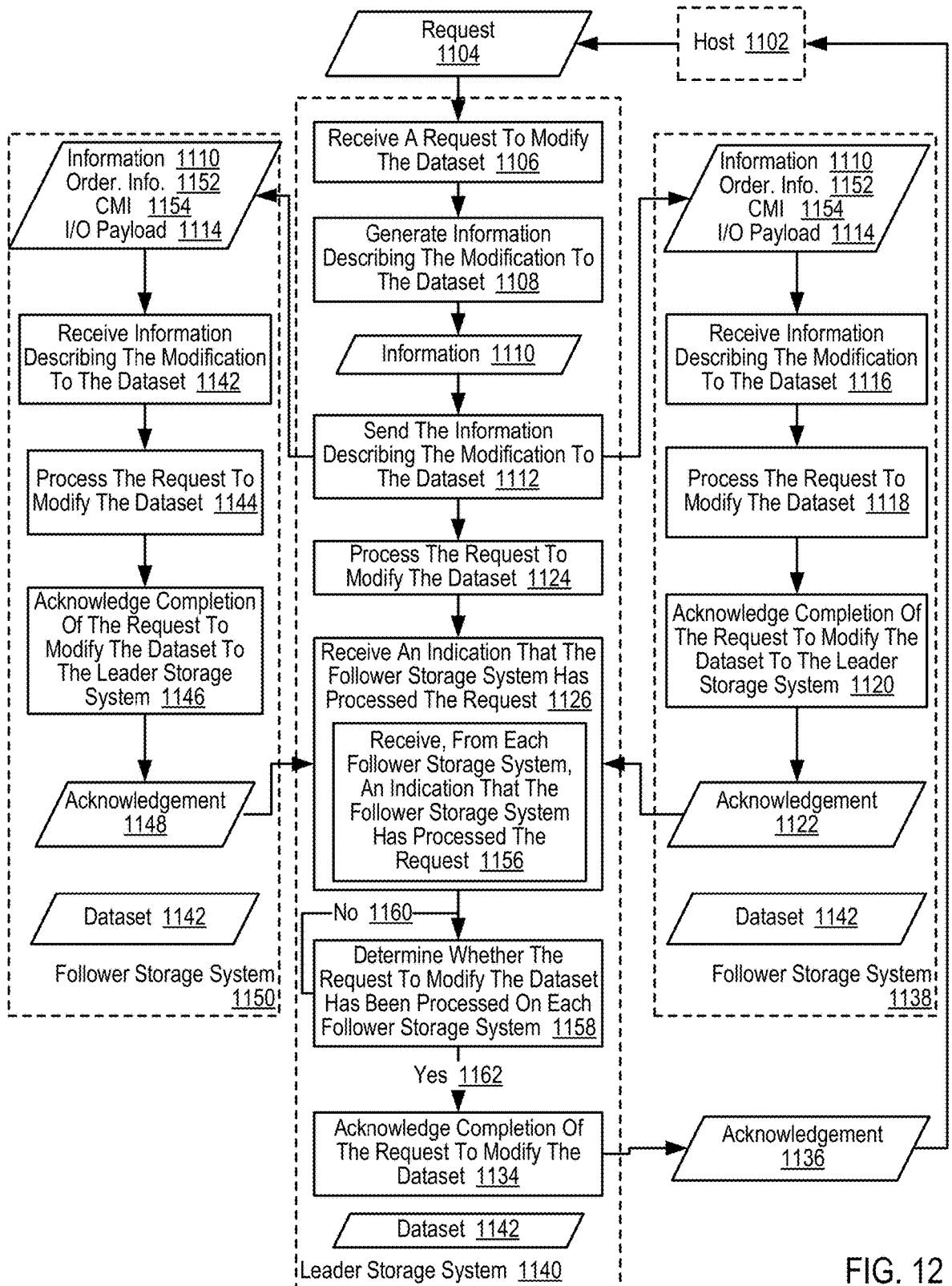
FIG. 12 sets forth a flow chart illustrating an additional example method for servicing I/O operations directed to a dataset that is synchronized across a plurality of storage systems according to some embodiments of the present disclosure.

For further explanation, FIG. 12 sets forth a flow chart illustrating an additional example method for servicing I/O operations directed to a dataset (1142) that is synchronized across a plurality of storage systems (1138, 1140, 1150) according to some embodiments of the present disclosure. Although depicted in less detail, the storage systems (1138, 1140, 1150) depicted in FIG. 11 may be similar to the storage systems described above with reference to FIGS. 1A-1D, FIGS. 2A-2G, FIGS. 3A-3B, or any combination thereof. In fact, the storage system depicted in FIG. 11 may include the same, fewer, additional components as the storage systems described above. The example method depicted in FIG. 12 is similar to the example method depicted in FIG. 11, as the example method depicted in FIG. 12 also includes: receiving (1106), by a leader storage system (1140), a request (1104) to modify the dataset (1142); generating (1108), by the leader storage system (1140), information (1110) describing the modification to the dataset (1142); sending (1112), from the leader storage system (1140) to a follower storage system (1138), information (1110) describing the modification to the dataset (1142); receiving (1116), by the follower storage system (1138), the information (1110) describing the modification to the dataset (1142); processing (1118), by the follower storage system (1138), the request (1104) to modify the dataset (1142); acknowledging (1120), by the follower storage system (1138) to the leader storage system (1140), completion of the request (1104) to modify the dataset (1142); processing (1124), by the leader storage system (1140), the request (1104) to modify the dataset (1142); and acknowledging (1134), by the leader storage system (1140), completion of the request (1104) to modify the dataset (1142).

The example method depicted in FIG. 12 differs from the example method depicted in FIG. 11, however, as the example method depicted in FIG. 12 depicts an embodiment in which the dataset (1142) is synchronously replicated across three storage systems, where one of the storage systems is a leader storage system (1140) and the remaining storage systems are follower storage systems (1138, 1150). In such an example, the additional follower storage system (1150) carries out many of the same steps as the follower storage system (1138) that was depicted in FIG. 11, as the additional follower storage system (1150) can: receive (1142), from the leader storage system (1140), information (1110) describing the modification to the data set (1142); process (1142) the request (1104) to modify the data set (1142) in dependence upon the information (1110) describing the modification to the data set (1142); acknowledge (1146), to the leader storage system (1140), completion of the request (1104) to modify the dataset (1142) through the use of an acknowledgement (1148) message or other appropriate mechanism; and so on.

In the example method depicted in FIG. 12, the information (1110) describing the modification to the data set (1142) can include ordering information (1152) for the request (1104) to modify the dataset (1142). In the example method depicted in FIG. 12, the ordering information (1152) for the request (1104) to modify the dataset (1142) can represent descriptions of relationships between operations (e.g., requests to modify the dataset) and common metadata updates that can be described by the leader storage system (1140) as a set of interdependencies between separate requests to modify the dataset and possibly between requests to modify the dataset and various metadata changes. These interdependencies can be described as a set of precursors that one request to modify the dataset depends on in some way, as predicates that must be true for that request to modify the dataset to complete.

A queue predicate is one example of predicates that must be true for that request to modify the dataset to complete. A queue predicate can stipulate that a particular request to modify the dataset cannot complete until a previous request to modify the dataset completes. Queue predicates can be used, for example, for overlapping write-type operations. In such an example, the leader storage system (1140) can declare that a second write-type operation logically follows a first such operation, so the second write-type operation can't complete until the first write-type operation completes. Depending on the implementation, the second write-type operation may not even be made durable until it is ensured that the first such write-type operation is durable (the two operations can be made durable together). Queue predicates could also be used for snapshot operations and virtual block range copy operations, by declaring that a known set of incomplete precursor (e.g., a set of write-type) operations must each complete before a snapshot can complete, and as further operations are identified as following the snapshot (prior to the snapshot being complete) each of these operations can be predicated on the snapshot operation itself completing. This predicate could also indicate that those following operations apply to the post-snapshot image of a volume rather than included in the snapshot.

An alternative predicate that could be used for snapshots is to assign an identifier to every snapshot, and to associate all modifying operations that can be included in a particular snapshot with that identifier. Then, the snapshot can complete when all of the included modifying operations complete. This can be done with a counting predicate. Each storage system across which a dataset is synchronously replicated can implement its own count of operations associated with time since the last snapshot or since some other relatively infrequent operation (or for embodiments that implement multiple leader storage systems, with those operations organized by a particular leader storage system, a count can be established by that leader storage system for the parts of a dataset it controls). The snapshot operation itself can then include a counting predicate that depends on that number of operations being received and made durable before the snapshot can itself be made durable or be signaled as completed. Modifying operations that should follow the snapshot (prior to the snapshot completing) can either be delayed, given a queue predicate dependent on the snapshot, or the snapshot identity can be used as an indication that the modifying operation should be excluded from the snapshot.

Virtual block range copies (SCSI EXTENDED COPY or similar operations) could use queue predicates or they could use counting predicates and snapshot or similar identifiers. With counting predicates and snapshot or virtual copy identifiers, each virtual block range copy might establish a new virtual snapshot or virtual copy identifier, even if copy operation only covers two small regions of one or two volumes. In the examples described above, the request (1104) to modify the dataset (1142) can include a request to take a snapshot of the dataset (1142) and the ordering information (1152) for the request (1104) to modify the dataset (1142) can therefore include an identification of one or more other requests to modify the dataset that must be completed prior to taking the snapshot of the dataset (1142).

In the example method depicted in FIG. 12, the information (1110) describing the modification to the data set (1142) can include common metadata information (1154) associated with the request (1104) to modify the dataset (1142). The common metadata information (1154) associated with the request (1104) to modify the dataset (1142) may be used to ensure common metadata that is associated with the dataset (1142) in a storage system (1138, 1140, 1150) that a dataset (1142) is synchronously replicated across. Common metadata in this context may be embodied, for example, as any data other than the content stored into the dataset (1142) by one or more requests (e.g., one or more write requests issued by a host). The common metadata may include data that a synchronous replication implementation keeps in some way consistent across storage systems (1138, 1140, 1150) that a dataset (1142) is synchronously replicated across, particularly if that common metadata relates to how the stored content is managed, recovered, resynchronized, snapshotted, or asynchronously replicated. Readers will appreciate that two or more modifying operations may depend on the same common metadata, where ordering of the modifying operations themselves is unnecessary, but consistent application of the common metadata once rather than twice is necessary. One way to handle multiple dependence on common metadata is to define the metadata in a separate operation instantiated and described from a leader storage system. Then, two modifying operations that depend on that common metadata can be given a queue predicate that depends on that modifying operation. Another way to handle multiple dependence on common metadata is to associate the common metadata with a first of two operations, and make the second operation depend on the first. A variation makes the second operation dependent only on the common metadata aspects of the first, such that only that part of the first operation has to be made durable before the second operation can be processed. Yet another way of handling multiple dependence on common metadata is to include the common metadata in all operation descriptions that depend on that common metadata. This works well if applying the common metadata can be idempotent, for example, simply by attaching an identifier to the common metadata. If that identifier has already been processed it can be ignored. In some cases, identifiers might be associated with parts of the common metadata.

In the example method depicted in FIG. 12, receiving (1106) an indication that the follower storage system has processed the request (1104) to modify the dataset (1142) can include receiving (1156), from each of the follower storage systems (1138, 1150), an indication that the follower storage system (1138, 1150) has processed the request (1104) to modify the dataset (1142). In this example, the indication that each follower storage system (1138, 1150) has processed the request (1104) to modify the dataset (1126) is embodied as distinct acknowledgement (1122, 1148) messages sent from each follower storage system (1138, 1150) to the leader storage system (1140). Readers will appreciate that although many of the steps described above are depicted and described as occurring in a particular order, no particular order is actually required. In fact, because the follower storage systems (1138, 1150) and the leader storage system (1140) are independent storage systems, each storage system may be performing some of the steps described above in parallel. For example, one or more of the follower storage systems (1138, 1150) may receive (1116, 1142) the information (1110) describing the modification to the dataset (1142), process (1118, 1144) the request (1104) to modify the dataset (1142), or acknowledge (1120, 1146) completion of the request (1104) to modify the dataset (1142) before the leader storage system (1140) has processed (1124) the request (1104) to modify the dataset (1142). Alternatively, the leader storage system (1140) may have processed (1124) the request (1104) to modify the dataset (1142) before one or more of the follower storage systems (1138, 1150) have received (1116, 1142) the information (1110) describing the modification to the dataset (1142), processed (1118, 1144) the request (1104) to modify the dataset (1142), or acknowledged (1120, 1146) completion of the request (1104) to modify the dataset (1142).

The example method depicted in FIG. 12 also includes determining (1158), by the leader storage system (1140), whether the request (1104) to modify the dataset (1142) has been processed (1118, 1144) by each of the follower storage systems (1138, 1150) prior to acknowledging (1134) completion of the request (1104) to modify the dataset (1142). The leader storage system (1140) may determine (1158) whether the request (1104) to modify the dataset (1142) has been processed (1118, 1144) by each of the follower storage systems (1138, 1150), for example, by determining whether the leader storage system (1140) has received an acknowledgment messages or other messages from each of the follower storage systems (1138, 1150) indicating that the request (1104) to modify the dataset (1142) has been processed (1118, 1144) by each of the follower storage systems (1138, 1150). In such an example, if the leader storage system (1140) affirmatively (1162) determines that the request (1104) to modify the dataset (1142) has been processed (1118, 1144) by each of the follower storage systems (1138, 1150) and also processed (1124) by the leader storage system (1138), the leader storage system (1140) may proceed by acknowledging (1134) completion of the request (1104) to modify the dataset (1142) to the host (1102) that initiated the request (1104) to modify the dataset (1142). If the leader storage system (1140) determines that the request (1104) to modify the dataset (1142) has not (1160) been processed (1118, 1144) by at least one of the follower storage systems (1138, 1150) or has not been processed (1124) by the leader storage system (1138), however, the leader storage system (1140) may not yet acknowledge (1134) completion of the request (1104) to modify the dataset (1142) to the host (1102) that initiated the request (1104) to modify the dataset (1142), as the leader storage system (1140) may only acknowledge (1134) completion of the request (1104) to modify the dataset (1142) to the host (1102) that initiated the request (1104) to modify the dataset (1142) when the request (1104) to modify the dataset (1142) has been successfully processed on all storage systems (1138, 1140, 1150) across which a dataset (1142) is synchronously replicated.

Readers will appreciate that although the example method depicted in FIG. 12 depicts an embodiment in which the dataset (1142) is synchronously replicated across three storage systems, where one of the storage systems is a leader storage system (1140) and the remaining storage systems are follower storage systems (1138, 1150), other embodiments may include even additional storage systems. In such other embodiments, additional follower storage systems may operate in the same way as the follower storage systems (1138, 1150) depicted in FIG. 12.

Figure 13:
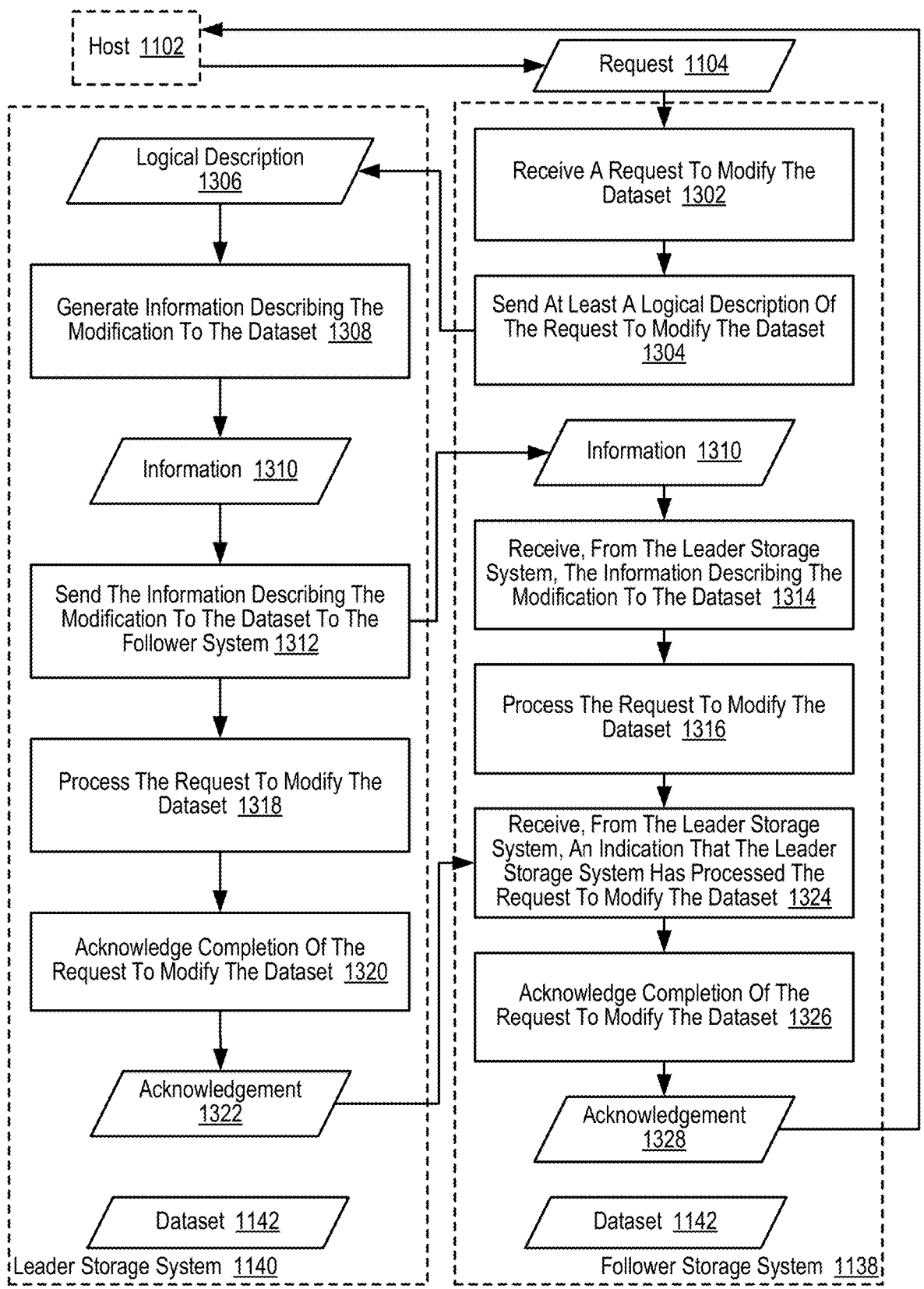
FIG. 13 sets forth a flow chart illustrating an additional example method for servicing I/O operations directed to a dataset that is synchronized across a plurality of storage systems according to some embodiments of the present disclosure.

For further explanation, FIG. 13 sets forth a flow chart illustrating an example method for servicing I/O operations directed to a dataset (1142) that is synchronized across a plurality of storage systems (1138, 1140) according to some embodiments of the present disclosure. Although depicted in less detail, the storage systems (1138, 1140) depicted in FIG. 13 may be similar to the storage systems described above with reference to FIGS. 1A-1D, FIGS. 2A-2G, FIGS. 3A-3B, or any combination thereof. In fact, the storage system depicted in FIG. 13 may include the same, fewer, additional components as the storage systems described above.

The example method depicted in FIG. 13 includes receiving (1302), by a follower storage system (1138), a request (1104) to modify the dataset (1142). The request (1104) to modify the dataset (1142) may be embodied, for example, as a request to write data to a location within the storage system (1138) that contains data that is included in the dataset (1142), as a request to write data to a volume that contains data that is included in the dataset (1142), or as some other operation that results in a change to some portion of the data that is included in the dataset (1142). In the example method depicted in FIG. 13, the request (1104) to modify the dataset (1142) is issued by a host (1102) that may be embodied, for example, as an application that is executing on a virtual machine, as an application that is executing on a computing device that is connected to the storage system (1138), or as some other entity configured to access the storage system (1138).

The example method depicted in FIG. 13 also includes sending (1304), from the follower storage system (1138) to a leader storage system (1140), a logical description (1306) of the request (1104) to modify the dataset (1142). In the example method depicted in FIG. 13, the logical description (1306) of the request (1104) to modify the dataset (1142) may be formatted in a way that is understood by the leader storage system (1138) and may contain information describing the type of operation (e.g. a read-type operation, a snapshot-type operation) requested in the request (1104) to modify the dataset (1142), information describing a location where I/O payload is being placed, information describing the size of the I/O payload, or some other information. In an alternative embodiment, the follower storage system (1138) may simply forward some portion (including all of) the request (1104) to modify the dataset (1142) to the leader storage system (1140).

The example method depicted in FIG. 13 also includes generating (1308), by the leader storage system (1140), information (1310) describing the modification to the dataset (1142). The leader storage system (1140) may generate (1308) the information (1310) describing the modification to the dataset (1142), for example, by determining ordering versus any other operations that are in progress, calculating any distributed state changes such as to common elements of metadata across all members of the pod (e.g., all storage systems across which the dataset is synchronously replicated), and so on. The information (1310) describing the modification to the dataset (1142) may be embodied, for example, as system-level information that is used to describe an I/O operation that is to be performed by a storage system. The leader storage system (1140) may generate (1308) the information (1310) describing the modification to the dataset (1142) by processing the request (1104) to modify the dataset (1142) just enough to figure out what should happen in order to service the request (1104) to modify the dataset (1142). For example, the leader storage system (1140) may determine whether some ordering of the execution of the request (1104) to modify the dataset (1142) relative to other requests to modify the dataset (1142) is required to produce an equivalent result on each storage system (1138, 1140).

Consider an example in which the request (1104) to modify the dataset (1142) is embodied as a request to copy blocks from a first address range in the dataset (1142) to a second address range in the dataset (1142). In such an example, assume that three other write operations (write A, write B, write C) are directed to the first address range in the dataset (1142). In such an example, if the leader storage system (1140) orders write A and write B (but does not order write C) prior to copying the blocks from the first address range in the dataset (1142) to the second address range in the dataset (1142), the follower storage system (1138) must also order write A and write B (but not order write C) prior to copying the blocks from the first address range in the dataset (1142) to the second address range in the dataset (1142) in order to yield consistent results. As such, when the leader storage system (1140) generates (1308) the information (1310) describing the modification to the dataset (1142), in this example, the leader storage system (1140) could generate information (e.g., sequence numbers for write A and write B) that identifies other operations that must be ordered before the follower storage system (1138) can process the request (1104) to modify the dataset (1142).

Readers will further appreciate that correct results for any operation must be committed to the point of being recoverable before the operation can be acknowledged. But, multiple operations can be committed together, or operations can be partially committed if recovery would ensure correctness. For example, a snapshot could locally commit with a recorded dependency on an expected write of A and B, but A or B might not have themselves committed. The snapshot cannot be acknowledged, and recovery might end up backing out the snapshot if the missing I/O cannot be recovered from another array. Also, if write B overlaps with write A, then the leader may "order" B to be after A, but A could actually be discarded and the operation to write A would then simply wait for B. Writes A, B, C, and D, coupled with a snapshot between A,B and C,D could commit and/or acknowledge some or all parts together as long as recovery cannot result in a snapshot inconsistency across arrays and as long as acknowledgement does not complete a later operation before an earlier operation has been persisted to the point that it is guaranteed to be recoverable.

The example method depicted in FIG. 13 also includes sending (1312), from the leader storage system (1140) to the follower storage system (1338), the information (1310) describing the modification to the dataset (1142). Sending (1312) the information (1310) describing the modification to the dataset (1142) from the leader storage system (1140) to a follower storage system (1138) may be carried out, for example, by the leader storage system (1140) sending one or more messages to the follower storage system (1138). The leader storage system (1140) may not need to send I/O payload for the request (1104) to modify the dataset (1142), however, in view of the fact that the follower storage system (1138) was the original recipient of the request (1104) to modify the dataset (1142). As such, the follower storage system (1138) may extract the I/O payload from the request (1104) to modify the dataset (1142), the follower storage system (1138) may receive the I/O payload as part of one or more other messages associated with the request (1104) to modify the dataset (1142), the follower storage system (1138) may have access to the I/O payload as the I/O payload may have been stored by the host (1104) in a known location (e.g., a buffer in the follower storage system (1138) that was accessed via an RDMA or RDMA-like access), or in some other way.

The example method depicted in FIG. 13 also includes processing (1318), by the leader storage system (1140), the request (1104) to modify the dataset (1142). In the example method depicted in FIG. 13, the leader storage system (1140) may process (1318) the request (1104) to modify the dataset (1142), for example, by modifying the contents of one or more storage devices (e.g., an NVRAM device, an SSD, an HDD) that are included in the leader storage system (1140) in dependence upon the information (1110) describing the modification to the dataset (1142) as well as the I/O payload that was received from the follower storage system (1138). Consider an example in which the request (1104) to modify the dataset (1142) is embodied as a write operation that is directed to a volume that is included in the dataset (1142) and the information (1110) describing the modification to the dataset (1142) indicates that the write operation can only be executed after a previously issued write operation has been processed. In such an example, processing (1318) the request (1104) to modify the dataset (1142) may be carried out by the leader storage system (1140) first verifying that the previously issued write operation has been processed on the leader storage system (1140) and subsequently writing I/O payload associated with the write operation to one or more storage devices that are included in the leader storage system (1140). In such an example, the request (1104) to modify the dataset (1142) may be considered to have been completed and successfully processed, for example, when the I/O payload has been committed to persistent storage within the leader storage system (1140).

The example method depicted in FIG. 13 also includes acknowledging (1320), by the leader storage system (1140) to the follower storage system (1138), completion of the request (1104) to modify the dataset (1142). In the example method depicted in FIG. 13, the leader storage system (1140) may acknowledge (1320) completion of the request (1104) to modify the dataset (1142), for example, through the use of one or more acknowledgement (1322) messages that are sent from the leader storage system (1140) to the follower storage system (1138), or via some other appropriate mechanism.

The example method depicted in FIG. 13 also includes receiving (1314), from the leader storage system (1140), the information (1310) describing the modification to the dataset (1142). The follower storage system (1138) may receive (1314) the information (1110) describing the modification to the dataset (1142) from the leader storage system (1140), for example, via one or more messages that are sent from the leader storage system (1140) to the follower storage system (1138). The one or more messages may be sent from the leader storage system (1140) to the follower storage system (1138) via one or more dedicated data communications links between the two storage systems (1138, 1140), by the leader storage system (1140) writing the message to a predetermined memory location (e.g., the location of a queue) on the follower storage system (1138) using RDMA or a similar mechanism, or in other ways. Readers will appreciate that in the example method depicted in FIG. 13, however, the leader storage system (1140) does not need to send I/O payload associated with the request (1104) to modify the dataset (1142) to the follower storage system (1138), as the follower storage system (1138) can extract such I/O payload from the request (1104) to modify the dataset (1142) that was received by the follower storage system (1138), the follower storage system (1138) can extract such I/O payload from one or more other messages that were received from the host (1102), or the follower storage system (1138) can obtain the I/O payload in some other way by virtue of the fact that the follower storage system (1138) was the target of the request (1104) to modify the dataset (1142) that was issued by the host (1102).

In one embodiment, the follower storage system (1138) may receive (1314) the information (1110) describing the modification to the dataset (1142) from the leader storage system (1140) through the use of the use of SCSI requests (writes from sender to receiver, or reads from receiver to sender) as a communication mechanism. In such an embodiment, a SCSI Write request is used to encode information that we intend to send (which includes whatever data and metadata), and which may be delivered to a special pseudo-device or over a specially configured SCSI network, or through any other agreed upon addressing mechanism. Or, alternately, the model can issue a set of open SCSI read requests from a receiver to a sender, also using special devices, specially configured SCSI networks, or other agreed upon mechanisms. Encoded information including data and metadata will be delivered to the receiver as a response to one or more of these open SCSI requests. Such a model can be implemented over Fibre Channel SCSI networks, which are often deployed as the "dark fibre" storage network infrastructure between data centers. Such a model also allows the use of the same network lines for host-to-remote-array multipathing and bulk array-to-array communications.

The example method depicted in FIG. 13 also includes processing (1316), by the follower storage system (1138), the request (1104) to modify the dataset (1142). In the example method depicted in FIG. 13, the follower storage system (1138) may process (1316) the request (1104) to modify the dataset (1142) by modifying the contents of one or more storage devices (e.g., an NVRAM device, an SSD, an HDD) that are included in the follower storage system (1138) in dependence upon the information (1110) describing the modification to the dataset (1142). Consider an example in which the request (1104) to modify the dataset (1142) is embodied as a write operation that is directed to a volume that is included in the dataset (1142) and the information (1110) describing the modification to the dataset (1142) indicates that the write operation can only be executed after a previously issued write operation has been processed. In such an example, processing (1316) the request (1104) to modify the dataset (1142) may be carried out by the follower storage system (1138) first verifying that the previously issued write operation has been processed on the follower storage system (1138) and subsequently writing I/O payload associated with the write operation to one or more storage devices that are included in the follower storage system (1138). In such an example, the request (1104) to modify the dataset (1142) may be considered to have been completed and successfully processed, for example, when the I/O payload associated with the request (1104) to modify the dataset (1142) has been committed to persistent storage within the follower storage system (1138).

The example method depicted in FIG. 13 also includes receiving (1324), from the leader storage system (1140), an indication that the leader storage system (1140) has processed the request (1104) to modify the dataset (1142). In this example, the indication that the leader storage system (1140) has processed the request (1104) to modify the dataset (1142) is embodied as an acknowledgement (1322) message sent from the leader storage system (1140) to the follower storage system (1138). Readers will appreciate that although many of the steps described above are depicted and described as occurring in a particular order, no particular order is actually required. In fact, because the follower storage system (1138) and the leader storage system (1140) are independent storage systems, each storage system may be performing some of the steps described above in parallel. For example, the follower storage system (1138) may receive (1324), from the leader storage system (1140), an indication that the leader storage system (1140) has processed the request (1104) to modify the dataset (1142) prior to processing (1316) the request (1104) to modify the dataset (1142). Likewise, the follower storage system (1138) may receive (1324), from the leader storage system (1140), an indication that the leader storage system (1140) has processed the request (1104) to modify the dataset (1142) prior to receiving (1314) the information (1110) describing the modification to the dataset (1142) from the leader storage system (1140).

The example method depicted in FIG. 13 also includes acknowledging (1326), by the follower storage system (1138), completion of the request (1104) to modify the dataset (1142). Acknowledging (1326) completion of the request (1104) to modify the dataset (1142) may be carried out, for example, by the follower storage system (1138) issuing an acknowledgement (1328) message to the host (1102) that issued the request (1104) to modify the dataset (1142). In the example method depicted in FIG. 13, the follower storage system (1138) may determine whether the request (1104) to modify the dataset (1142) has been processed (1318) by the leader storage system (1140) prior to acknowledging (1328) completion of the request (1104) to modify the dataset (1142). The follower storage system (1138) may determine whether the request (1104) to modify the dataset (1142) has been processed (1318) by the leader storage system (1140), for example, by determining whether the follower storage system (1138) has received an acknowledgment message or other message from the leader storage system (1140) indicating that the request (1104) to modify the dataset (1142) has been processed (1318) by the leader storage system (1140). In such an example, if the follower storage system (1138) affirmatively determines that the request (1104) to modify the dataset (1142) has been processed (1318) by the leader storage system (1140) and the follower storage system (1138) has also processed (1316) the request (1104) to modify the dataset (1142), the follower storage system (1138) may proceed by acknowledging (1326) completion of the request (1104) to modify the dataset (1142) to the host (1102) that initiated the request (1104) to modify the dataset (1142). If the leader storage system (1140) determines that the request (1104) to modify the dataset (1142) has not been processed (1318) by the leader storage system (1140) or the follower storage system (1138) has not yet processed (1316) the request (1104) to modify the dataset (1142), however, the follower storage system (1138) may not yet acknowledge (1326) completion of the request (1104) to modify the dataset (1142) to the host (1102) that initiated the request (1104) to modify the dataset (1142), as the follower storage system (1138) may only acknowledge (1134) completion of the request (1104) to modify the dataset (1142) to the host (1102) that initiated the request (1104) to modify the dataset (1142) when the request (1104) to modify the dataset (1142) has been successfully processed on all storage systems (1138, 1140) across which the dataset (1142) is synchronously replicated.

Figure 14:
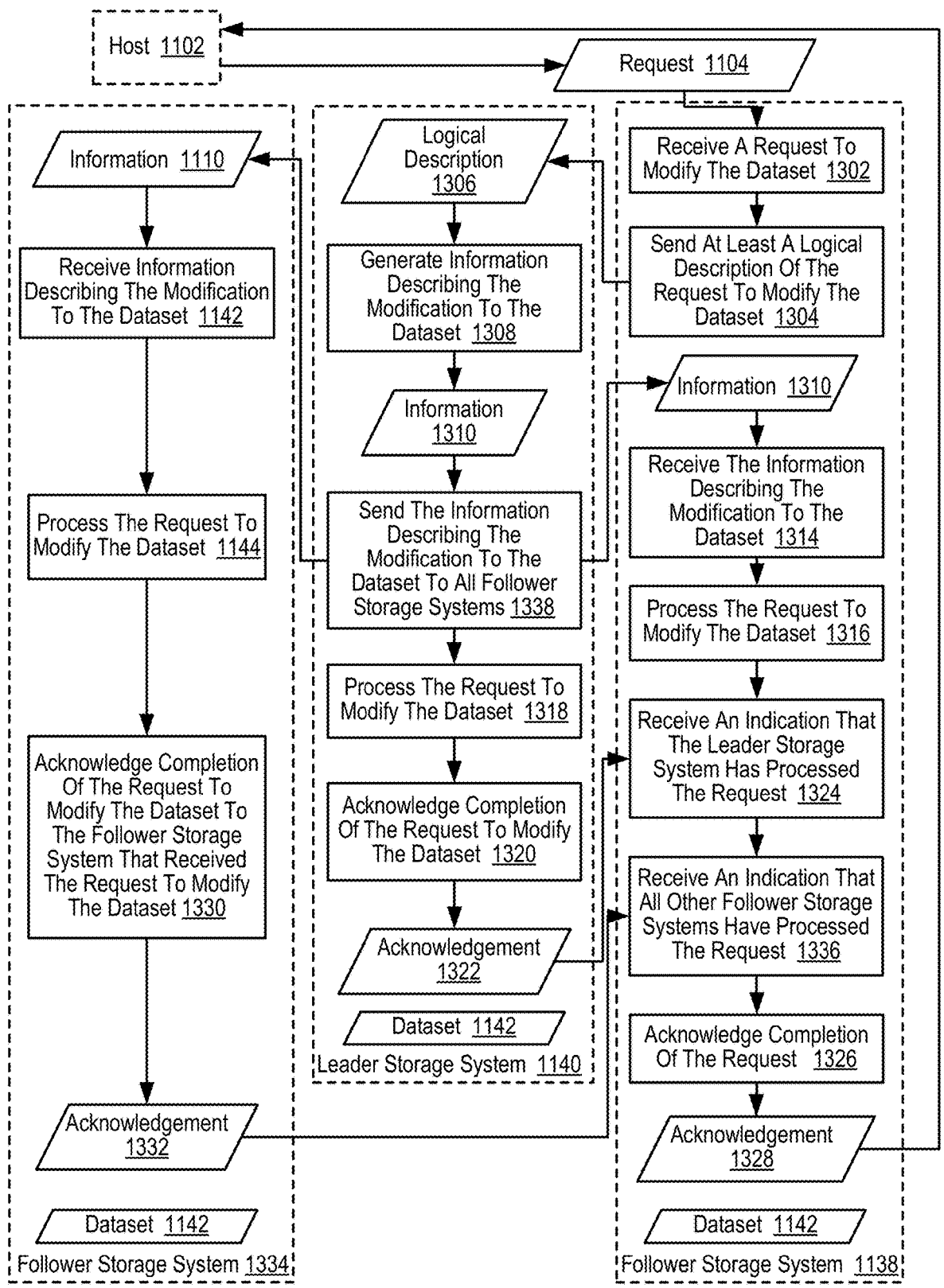
FIG. 14 sets forth a flow chart illustrating an additional example method for servicing I/O operations directed to a dataset that is synchronized across a plurality of storage systems according to some embodiments of the present disclosure.

For further explanation, FIG. 14 sets forth a flow chart illustrating an example method for servicing I/O operations directed to a dataset (1142) that is synchronized across a plurality of storage systems (1138, 1140, 1334) according to some embodiments of the present disclosure. Although depicted in less detail, the storage systems (1138, 1140, 1334) depicted in FIG. 13 may be similar to the storage systems described above with reference to FIGS. 1A-1D, FIGS. 2A-2G, FIGS. 3A-3B, or any combination thereof. In fact, the storage system depicted in FIG. 13 may include the same, fewer, additional components as the storage systems described above.

The example method depicted in FIG. 14 may be similar to the example method depicted in FIG. 13, as the example method depicted in FIG. 14 also includes: receiving (1302), by a follower storage system (1138), a request (1104) to modify the dataset (1142); sending (1304), from the follower storage system (1138) to a leader storage system (1140), a logical description (1306) of the request (1104) to modify the dataset (1142); generating (1308), by the leader storage system (1140), information (1310) describing the modification to the dataset (1142); processing (1318), by the leader storage system (1140), the request (1104) to modify the dataset (1142); acknowledging (1320), by the leader storage system (1140) to the follower storage system (1138), completion of the request (1104) to modify the dataset (1142); receiving (1314), from the leader storage system (1140), the information (1310) describing the modification to the dataset (1142); processing (1316), by the follower storage system (1138), the request (1104) to modify the dataset (1142); receiving (1324), from the leader storage system (1140), an indication that the leader storage system (1140) has processed the request (1104) to modify the dataset (1142); and acknowledging (1326), by the follower storage system (1138), completion of the request (1104) to modify the dataset (1142).

The example method depicted in FIG. 14 differs from the example method depicted in FIG. 13, however, as the example method depicted in FIG. 14 depicts an embodiment in which the dataset (1142) is synchronously replicated across three storage systems, where one of the storage systems is a leader storage system (1140) and the remaining storage systems are follower storage systems (1138, 1334). In such an example, the additional follower storage system (1334) carries out many of the same steps as the follower storage system (1138) that was depicted in FIG. 13, as the additional follower storage system (1334) can: receive (1142), from the leader storage system (1140), information (1110) describing the modification to the data set (1142) and also process (1142) the request (1104) to modify the data set (1142) in dependence upon the information (1110) describing the modification to the data set (1142).

In the example method depicted in FIG. 14, the leader storage system (1140) can send (1338) the information (1110) describing the modification to the data set (1142) to all of the follower storage systems (1138, 1334). In the example method depicted in FIG. 14, the additional follower storage system (1334) can also acknowledge (1330) completion of the request (1104) to modify the dataset (1142) to the follower storage system (1138) that received (1302) the request (1104) to modify the dataset (1142). In the example method depicted in FIG. 14, the additional follower storage system (1334) can acknowledge (1330) completion of the request (1104) to modify the dataset (1142) to the follower storage system (1138) that received (1302) the request (1104) to modify the dataset (1142), for example, through the use of one or more acknowledgement (1332) messages that are sent from the additional follower storage system (1334) to the follower storage system (1138) that received (1302) the request (1104) to modify the dataset (1142), or via some other appropriate mechanism.

In the example method depicted in FIG. 14, the follower storage system (1138) that received (1302) the request (1104) to modify the dataset (1142) may also receive (1336) an indication that all other follower storage systems (1334) have processed the request (1104) to modify the dataset (1142). In this example, the indication all other follower storage systems (1334) have processed the request (1104) to modify the dataset (1142) is embodied as an acknowledgement (1332) message sent from the other follower storage system (1334) to the follower storage system (1138) that received (1302) the request (1104) to modify the dataset (1142). Readers will appreciate that although many of the steps described above are depicted and described as occurring in a particular order, no particular order is actually required. In fact, because the follower storage systems (1138, 1334) and the leader storage system (1140) are each independent storage systems, each storage system may be performing some of the steps described above in parallel. For example, the follower storage system (1138) may receive (1324), from the leader storage system (1140), an indication that the leader storage system (1140) has processed the request (1104) to modify the dataset (1142) prior to processing (1316) the request (1104) to modify the dataset (1142). In addition, the follower storage system (1138) may receive (1336) an indication that all other follower storage systems (1334) have processed the request (1104) to modify the dataset (1142) prior to receiving (1324) an indication that the leader storage system (1140) has processed the request (1104) to modify the dataset (1142). Alternatively, the follower storage system (1138) may receive (1336) an indication that all other follower storage systems (1334) have processed the request (1104) to modify the dataset (1142) prior to processing (1316) the request (1104) to modify the dataset (1142). Likewise, the follower storage system (1138) may receive (1324), from the leader storage system (1140), an indication that the leader storage system (1140) has processed the request (1104) to modify the dataset (1142) prior to receiving (1314) the information (1110) describing the modification to the dataset (1142) from the leader storage system (1140). In addition, the follower storage system (1138) may receive (1336) an indication that all other follower storage systems (1334) have processed the request (1104) to modify the dataset (1142) prior to receiving (1314) the information (1110) describing the modification to the dataset (1142) from the leader storage system (1140).

Although not expressly depicted in FIG. 14, the follower storage system (1138) may determine whether the request (1104) to modify the dataset (1142) has been processed (1318) by the leader storage system (1140) and also processed (1144) by all other follower storage systems (1334) prior to acknowledging (1328) completion of the request (1104) to modify the dataset (1142). The follower storage system (1138) may determine whether the request (1104) to modify the dataset (1142) has been processed (1318) by the leader storage system (1140) and also processed (1144) by all other follower storage systems (1334), for example, by determining whether the follower storage system (1138) has received an acknowledgment messages from the leader storage system (1140) and all other follower storage systems (1334) indicating that the request (1104) to modify the dataset (1142) has been processed (1318, 1144) by each storage system (1140, 1334). In such an example, if the follower storage system (1138) affirmatively determines that the request (1104) to modify the dataset (1142) has been processed by the leader storage system (1140), all other follower storage systems (1334), and the follower storage system (1138), the follower storage system (1138) may proceed by acknowledging (1326) completion of the request (1104) to modify the dataset (1142) to the host (1102) that initiated the request (1104) to modify the dataset (1142). If the leader storage system (1140) determines that the request (1104) to modify the dataset (1142) has not been processed by at least one of the leader storage system (1140), all other follower storage systems (1334), or the follower storage system (1138), however, the follower storage system (1138) may not yet acknowledge (1326) completion of the request (1104) to modify the dataset (1142) to the host (1102) that initiated the request (1104) to modify the dataset (1142), as the follower storage system (1138) may only acknowledge (1134) completion of the request (1104) to modify the dataset (1142) to the host (1102) that initiated the request (1104) to modify the dataset (1142) when the request (1104) to modify the dataset (1142) has been successfully processed on all storage systems (1138, 1140, 1334) across which the dataset (1142) is synchronously replicated.

Although not expressly depicted in FIG. 14, in some embodiments, in an effort to unblock any concurrent overlapping reads executing on the one or the storage systems (1138, 1140, 1334), the follower storage system (1138) that received (1302) the request (1104) to modify the dataset (1122) can send a message back to the leader storage system (1140) and to other follower storage systems (1334) to signal that the modifying operation has completed everywhere. Alternately, the follower storage system (1138) that received (1302) the request (1104) to modify the dataset (1122) could send that message to the leader storage system (1138) and the leader storage system (1138) could send a message to propagate the completion and unblock reads elsewhere.

Readers will appreciate that although the example method depicted in FIG. 14 depicts an embodiment in which the dataset (1142) is synchronously replicated across three storage systems, where one of the storage systems is a leader storage system (1140) and the remaining storage systems are follower storage systems (1138, 1334), other embodiments may include even additional storage systems. In such other embodiments, additional follower storage systems may operate in the same way as the other follower storage system (1334) depicted in FIG. 14.

Readers will also appreciate that although only the example depicted in FIG. 12 expressly depicts an embodiments in which the information (1310) describing the modification to the dataset (1142) includes ordering information (1152) for the request (1104) to modify the dataset (1142), common metadata information (1154) associated with the request (1104) to modify the dataset (1142), and I/O payload (1114) associated with the request (1104) to modify the dataset (1142), the information (1310) describing the modification to the dataset (1142) can include all of (or a subset) of such information in the examples depicted in the remaining figures. Further, in embodiments where the request (1104) to modify the dataset (1142) includes a request to take a snapshot of the dataset (1142), the information (1310) describing the modification to the dataset (1142) can also include an identification of one or more other requests to modify the dataset (1142) that are to be included in the content of the snapshot of the dataset (1142) in each of the figures described above.

Readers will appreciate that as a result of the information (1310) describing the modification to the dataset (1142) including an identification of one or more other requests to modify the dataset (1142) that are to be included in the content of the snapshot of the dataset (1142), rather than including information identifying one or more other requests to modify the dataset (1142) that must be completed prior to taking the snapshot, a few situations can be addressed. One is that an atomic operation could perform a snapshot and complete the last few writes in the same atomic update, meaning that the last few writes do not complete "prior" to the snapshot. Another is that writes could actually be completed after the snapshot point is taken as long as when the writes are completed they are included and as long as the snapshot itself isn't considered complete until all writes are completed by all in-sync storage systems. Finally, a write that had not been indicated to a requestor as completed prior to the snapshot being received could be included or left out of the snapshot as a result of recovery actions. Essentially, recovery can rewrite the detailed history of received operations as long as the result is consistent and doesn't violate any guarantees related to operations that were signaled as having completed.

Figure 15:
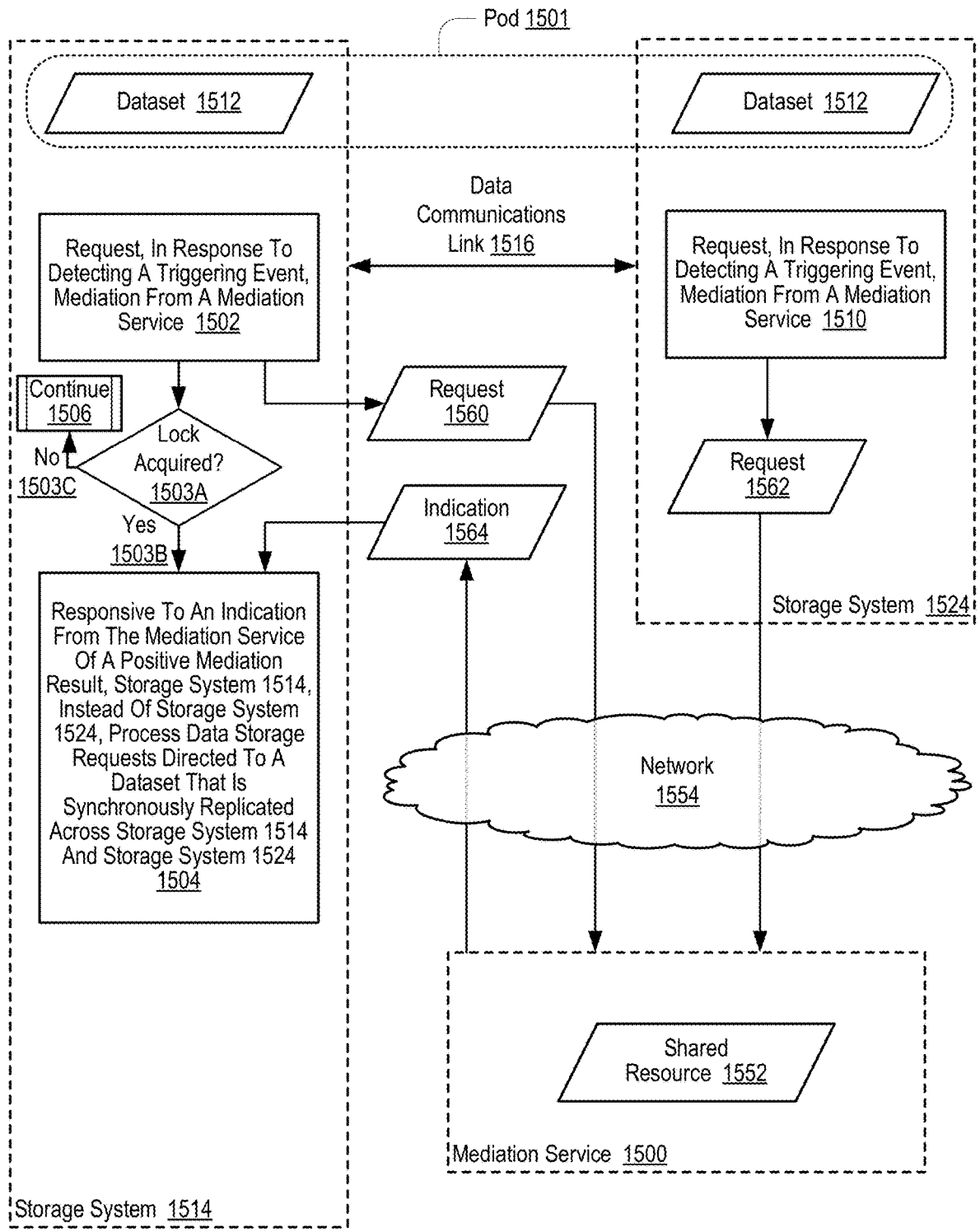
FIG. 15 sets forth a flow chart illustrating an example method for mediating between storage systems synchronously replicating a dataset according to some embodiments of the present disclosure.

For further explanation, FIG. 15 sets forth a flow chart illustrating an example method for mediating between storage systems synchronously replicating a dataset according to some embodiments of the present disclosure. Although the example method depicted in FIG. 15 illustrates an embodiment in which a dataset (1512) is synchronously replicated across only two storage systems (1514, 1524), the example depicted in FIG. 15 can be extended to embodiments in which the dataset (1512) is synchronously replicated across additional storage systems.

In the following examples, mediation among a set of storage systems (1514, 1524) for a pod allows the storage systems to resolve lost communication with a paired system, where communication may be lost due to communication faults or some other kind of system fault. As described below, solutions to mediation may include use of quorums and an external control system that dictates which of the storage systems should continue processing I/O operations directed to a pod dataset, and racing for a resource such as a mediator. However, an advantage of mediation is that it is simpler than quorum protocols, and mediation works well with a two storage system configuration for synchronously replicated storage systems, which is a common configuration. Further, mediation may be more robust and easier to configure than external control systems and many other types of resources that may be raced against.

As depicted in FIG. 15, multiple storage systems (1514, 1524) that are synchronously replicating a dataset (1512) may be in communication with a mediation service (1500) over a network (1554)—where a mediation service (1500) may resolve which storage system continues to service the dataset in the event of a communication fault between storage systems, in the event of a storage system going offline, or due to some other triggering event. Mediation is advantageous because if the storage systems are unable to communicate with each other, they may be unable to maintain a synchronously replicated dataset, and any received requests to modify a dataset would be unserviceable because otherwise the dataset would become unsynchronized. In this example, mediation services for storage systems that are synchronously replicating a dataset may be provided by a mediation service (1500) that is external to the storage systems (1514, 1524). While in this example, there are only two storage systems (1514, 1524) depicted, in general, some other number of two or more storage systems may be part of an in-sync list that is synchronously replicating a dataset. Specifically, if a first storage system (1514) has detected a triggering event, such as loss of a communication link (1516) to a second storage system (1524), the first storage system (1514) may contact an external mediation service (1500) to determine whether it can safely take over the task of removing the non-communicating storage system from an in-sync list that specifies the storage systems that are synchronized with respect to replicating a dataset. In other cases, the first storage system (1514) may contact the external mediation service (1500) and determine that it, the first storage system (1500), may have been removed from the in-sync list by a second storage system. In these examples, the storage systems (1514, 1524) need not be in continuous communication with the external mediation service (1500) because under normal conditions the storage systems (1514, 1524) do not need any information from the mediation service (1500) to operate normally and to maintain synchronous replication of a dataset (1512). In other words, in this example, the mediation service (1500) may not have an active role in membership management of an in-sync list, and further, the mediation service (1500) may not even be aware of the normal operation of the storage systems (1514, 1524) in the in-sync list. Instead, the mediation service (1500) may simply provide persistent information that is used by the storage systems (1514, 1524) to determine membership in an in-sync list, or to determine whether a storage system can act to detach another storage system.

In some examples, a mediation service (1500) may be contacted by one or more storage systems (1514, 1524) in response to a triggering event such as a communication link failure preventing the storage systems (1514, 1524) from communication with each other; however, each storage system (1514, 1524) may be able to communicate with the mediation service (1500) over a communication channel that is different from the communication channel used between the storage systems (1514, 1524). Consequently, while the storage systems (1514, 1524) may be unable to communicate with each other, yet each of the storage systems (1514, 1524) may still be in communication with the mediation service (1500), where the storage systems (1514, 1524) may use the mediation service (1500) to resolve which storage system may proceed to service data storage requests. Further, the storage system that wins mediation from the mediation service (1500) may detach another storage system and update an in-sync list indicating the storage systems that may continue to synchronously replicate a dataset (1512). In some examples, a mediation service (1500) may handle various types of requests, such as a request to set a membership list that includes a requestor storage system and excludes another storage system. In this example, a request completes successfully if the mediation service (1500) currently lists the requestor as a member, and the request fails if the mediation service (1500) does not currently list the requestor as a member. In this way, if two storage systems (1514, 1524) are each making requests at approximately the same time, where the requests serve to exclude the other, then the first request received may succeed—where the mediation service sets the membership list to exclude the other storage system according to the first request—and the second request received may fail because the membership list has been set to exclude it. The mutually exclusive access to a shared resource storing a membership list serves to ensure that only a single system as a time is allowed to set a membership list.

In another example, mediation may be based on a partition identifier, where a value may be defined to indicate a pod membership partition identifier to assert that membership has partitioned off, or removed, some set of storage systems from a pod. A 'pod', as the term is used here and throughout the remainder of the present application, may be embodied as a management entity that represents a dataset, a set of managed objects and management operations, a set of access operations to modify or read the dataset, and a plurality of storage systems. Such management operations may modify or query managed objects equivalently through any of the storage systems, where access operations to read or modify the dataset operate equivalently through any of the storage systems. Each storage system may store a separate copy of the dataset as a proper subset of the datasets stored and advertised for use by the storage system, where operations to modify managed objects or the dataset performed and completed through any one storage system are reflected in subsequent management objects to query the pod or subsequent access operations to read the dataset. Additional details regarding a 'pod' may be found in previously filed provisional patent application No. 62/518,071, which is incorporated herein by reference.

A partition identifier may be local information stored on a given storage system, in addition to the given storage system storing a pod membership list. Systems that are in proper communication with each other and are in-sync may have the same partition identifier, and when storage systems are added to a pod, then the current partition identifier may be copied along with the pod data contents. In this example, when one set of storage systems is not communicating with another set of storage systems, one storage system from each set may come up with a new and unique partition identifier and attempt to set it in the shared resource maintained by the mediation service (1500) by using a particular operation that succeeds for a storage system that first acquires a lock on the shared resource, where another storage system—that failed to acquire a lock on the shared resource—fails an attempt at performing the particular operation. In one implementation, an atomic compare-and-set operation may be used, where the last partition identifier value stored by the mediation service (1500) may be provided by a storage system to have the permission to change the partition identifier to a new value. In this example, a compare-and-set operation may be successful for a storage system that is aware of the current partition identifier value—where a storage system that first sets the partition identifier value would be the storage system aware of the current partition identifier value. Further, a conditional-store or a PUT operation, which may be available in web service protocols, may work to set the partition identifier value as described in this example. In other cases, such as in a SCSI environment, a compare-and-write operation may be used. In still other cases, the mediation service (1500) may perform the compare-and-set operation by receiving a request from a storage system, where the request indicates an old partition identifier value and also a new partition identifier value, and where the mediation service (1500) changes the stored partition identifier to the new partition identifier value if and only if the currently stored value is equal to the old partition identifier.

In this way, mediation based on a partition identifier may be used to persist information that may be used by storage systems to determine whether or not a given storage system is included within a partitioned off set of consistent pod members. In some cases, a partition identifier may only change in the case of a spontaneous detach due to a fault in either a storage system or a network interconnect. In these examples, a storage system that brings itself offline for a pod in a controlled way may communicate with other storage systems to remove itself as an in-sync pod member, thus not requiring the formation of a mediated new partition identifier. Further, a storage system that removes itself as a member of an in-sync pod may then add itself back as an in-sync pod member in a controlled way that does not require a mediated new partition identifier. In addition, new storage system may be added to the in-sync pod as long as the storage systems are communicating with in-sync pod members, where the new storage systems may add themselves in a controlled way that does not require a mediated new partition identifier.

Consequently, an advantage of the mediated partition identifier mechanism is that the mediation service (1500) may only be necessary when there is a fault, or other triggering event, that at least one set of storage systems react to by attempting to remove one or more non-communicating storage systems from the in-sync pod membership list, where the non-communicating storage systems may attempt to do the same, but in reverse. Another advantage is that a mediation service (1500) may be less than absolutely reliable and have little impact on the availability of the overall storage service provided by in-sync pod members. For example, if two synchronously replicated storage systems each fail once per year, then unless the mediation service (1500) is unavailable at the exact moment a first of the two storage systems fail, the second storage system should successfully mediate to remove the first storage system. In short, if the mediation service (1500) is up and available at least 99% of the time, the probability of the mediation service (1500) not being available when needed becomes exceedingly low. In this example, the chances would be only 1 out of 100 (1% or less) that the mediation service (1500) would not be available at a critical time—which can reduce a once-a-year outage into a once-a-century outage. However, to lessen the odds of unavailability of a mediation service (1500), the mediation service (1500) may be monitored on a periodic basis to alert an administrator if a mediation service is not generally available, where the mediation service (1500) may also monitor storage systems to generate an alert in case a particular storage system becomes unavailable.

In another example, as an alternative to using a partition identifier associated with in-sync members for a pod, the mediation service (1500) may provide a one-time mediation race target. Specifically, each time the in-sync member storage systems for a pod may need to allow for the possibility that one storage system may be detached by others, a mediation race target may be established. For example, an agreed-upon key in a table of mediation values may be set one time to a new value, where to win mediation, a storage system sets the agreed-upon key to a unique value that no other separately racing storage system would use. Previous to the mediation race, the agreed-upon key may not exist, or if it does exist, it may be set to some agreed-upon precursor value such as an UNSET, or null, value. In this example, an operation to set the key to a particular value succeeds if the key does not exist, if the key is in the UNSET state, or if the key is being set to a value equal to a current value—otherwise, the operation to set the key fails. Once a set of storage systems wins mediation, the remaining set of storage systems may define a new key to use for future mediations. In this example, a storage system may record the value it uses prior to the mediation race so that the storage system may use the value again if it faults and recovers, or reboots, before learning that it may have won the mediation race. If two or more storage systems are communicating and are together racing against some other set of storage systems that are not communicating, this value may be shared to those other communicating storage system so that any one of them may continue the mediation race, and perhaps engage in a second mediation race, after some additional sequence of faults. For example, it may be necessary for correctness to race for or validate the first mediation race target before racing for a unique value for a second mediation race target. In particular, this sequence may be necessary until a second mediation race target is reliably distributed to all storage systems that share the first mediation race target and all storage systems are made aware that it has been reliably distributed. At that point, there may be no continuing need to first race for the first mediation target before racing for the second mediation target.

In some examples, a mediation service (1500) may be managed on computer systems provided by an organization other than an organization or owner of the storage systems being mediated. For example, if a vendor sells two storage systems to a customer, the vendor may host the mediators on servers provided in vendor-owned or managed data centers, or the vendor may contract with a cloud services provider to host the service. A vendor may also ensure that the mediation service is sufficiently reliable and distinct from any of the customer's fault zones. In one case, without excluding other cloud services providers, the mediation service may be hosted in Amazon Web Services™, and the mediation service may be implemented with DynamoDB for reliable database service, where DynamoDB may provide support for conditional-store primitives as web API database updates. In some cases, a mediation service may be implemented to operate across multiple cloud services provider regions or fault zones to further improve reliability. One advantage of using a vendor to provide mediation services is that the mediation service is straightforward to configure. Further, during creation of a pod a storage system may obtain a cryptographic token from the mediation service, and store the cryptographic token in addition to storing a partition identifier and a pod membership list—where the cryptographic token may be used to securely communicate the unique mediation service information for a pod.

In some cases, the mediation service (1500) may be unavailable when a storage system attempts to mediate, and the following method provides a process of recovering, at least eventually, from such a service outage. For example, if a first set of storage systems attempts to detach a second set of storage systems through a mediation service, but the first set of storage systems cannot communicate with the mediation service (1500), then the first set of storage systems cannot complete the detach operation and cannot continue serving the pod. In some cases, if the two sets of storage systems manage to reconnect with each other, such that all in-sync storage systems are communicating again—but with the mediation service (1500) still being unavailable—the two sets of storage systems may synchronize and resume servicing the pod. However, in this example, one or more requests may have been sent to the mediation service (1500) to change the partition identifier, or to change whatever other properties associated with mediation, and none of the storage systems may be certain whether a request was or was not received and processed, where a confirming response may have been lost. As a result, if there is a set of faulted storage systems or network interconnects, then no storage system may be sure which value to assert for the partition identifier if and when the mediation service (1500) comes back online. In such a scenario, it is preferable for the pod's service to resume either when all in-sync storage systems come back online and resume communicating, or when an in-sync storage system can reconnect to the mediation service (1500). In one implementation, when all in-sync storage systems reconnect, the in-sync storage systems all exchange known partition identifier values that may have been sent to the mediation service (1500). For example, if two storage systems had each tried to change the partition identifier value, where one storage system attempts to change the partition identifier to, say, 1749137481890, and another storage system attempts to change the partition identifier to, say, 87927401839, and the last value known to have been acknowledged by the mediation service (1500) was 79223402936, then the mediation service (1500) may currently store any of these three partition identifier values. As a result, any future attempt to change the mediation partition identifier to a new value may supply any or all of these three partition identifiers in attempts to gain the authority to make the change. Further, a fourth attempt to change the partition identifier value may also encounter a fault, resulting in a fourth value that may need to be remembered by any storage systems that later attempts yet another mediation. In addition, if any storage system successfully changes the mediation service (1500) partition identifier value, that storage system may purge the older partition identifier values from any in-sync storage systems and from any storage systems that become in-sync in the future.

In another example, a mediation service (1500) may mediate based on a unique key arranged for each potential future race. In such a case, the in-sync storage systems may agree to use a new key. Given that a new key may not be set atomically on all storage systems at the same time, until all in-sync storage systems receive and record the new key, all storage systems should retain their old keys and the values each storage system attempted to set in any previous mediation attempt. In this example, any earlier non-raced keys and any earlier key/value mediation attempts may be circulated between all in-sync storage systems for the pod and recorded on each such storage system, along with a new key to use for future mediation attempts. For each previous non-raced key (not including the new key), this exchange may also select a single, agreed-upon value that all systems may use in racing for that key. After all in-sync storage systems for a pod have received and recorded all of these mediation keys and values (and the new agreed-upon key for any future race), the storage systems in the pod may then agree to discard the older keys and values in favor of the single new key. Note that two or more storage systems may have attempted to set the same mediation key to different values, and all such values may be recorded. If there is a fault during the process of exchanging or receiving all these mediation keys and key/value pairs for past mediation attempts, then some storage systems may not have received and recorded the new mediation keys and values, while others might have. If the mediation service (1500) becomes available before all in-sync storage systems for the pod can reconnect with each other, then a subset of storage systems for the pod may attempt to use the mediation service (1500) to detach another storage system from the pod. To win mediation, a storage system may attempt to set all recorded keys to their recorded values, and if that works, to then set the new key to a unique value. If more than one value was recorded for the same key, then that step succeeds if setting any one of those values is successful. If the first step (setting previous keys) fails or the second step (setting the new key to the new unique value) fails, then the storage systems participating in that attempt at mediation may go offline (retaining the value it attempted to set for the new key). If both steps succeed, then the communicating storage systems may detach the non-communicating storage systems and continue serving the pod. As an alternative to exchanging all past keys and values, a storage system may record only the keys and values that it tries, with no exchange of keys and values from other storage systems for a pod. Then, if an in-sync storage system reconnects with other in-sync storage systems for a pod (where none had succeeded in interacting with a mediation service), the in-sync storage system may exchange one new mediation key, and then exchange an acknowledgment that they both received and recorded the agreed upon new key. If a fault prevents exchanging the acknowledgment, then a future attempt at mediation (to a now-available mediation service) by a storage system that had never received the new key may attempt to reassert its previous keys and values. A storage system that had received the new key but had not received an indication that all storage systems for the pod had received the key may assert its previous mediation keys as well as asserting a value for the new key, previous keys first, then the new key. That future mediation attempt may still fail, and then the storage system may again reconnect to other in-sync storage systems and may again incompletely exchange new keys, leading to another key. This adds another key. As keys build up over time with a set of incomplete exchanges of new keys, future mediation attempts by a storage system may reassert each of its keys, along with any values it previously asserted for those keys, in the order that they were recorded, until it successfully asserts a value for all keys, or it encounters a failure to assert a key at which point it stops asserting keys and goes offline.

In another example, a new mediation service may be configured when a current mediation service is unavailable. For example, if all in-sync storage systems for a pod are communicating with each other, but are not in communication with the current mediation service, then the pod may be configured with a new mediation service. This is similar to the previous algorithm of selecting a new key or new mediation values, but the new key is further configured to use a new mediation service rather than merely being another key associated with the same service. Further, if there is a fault during this operation, as with the previous algorithm, some systems may race for older keys, and so systems that know both the old keys and the new key with the new mediation service may race for the new key on the new mediator service. If the previous mediation service is permanently unavailable, then all in-sync storage systems should eventually reconnect with each other and complete the exchange of the new mediation service and any keys and values associated with the new mediation service before pod service can be resumed safely.

In another example, a model for resolving faults may be to implement preference rules to favor one storage system over other storage systems. In this example, if a preferred storage system is running, it stays running and detaches any storage systems it is not communicating with. Further, any other system that is not in proven communication with the preferred system takes itself offline. In this example, when a non-preferred storage system eventually reconnects with a preferred storage system, then if the preferred storage system had not yet detached the reconnecting storage system, then the two storage systems may recover and resume from the state of both storage systems being in-sync, whereas if the preferred storage system had detached the reconnecting storage system then the reconnecting storage system must be resynchronized first to get it in-sync for the pod before it can resume servicing the pod. Having, a preferred storage system may not be as useful for providing high availability, but may be useful for other uses of synchronous replication, particularly asymmetric synchronous replication. Take for example, the case of mirroring a pod from a central, large storage system in a data center or campus, to a smaller (perhaps less managed) storage system running closer to application servers, such as in top-of-rack configurations. In this case, it may be beneficial to always favor the larger, more managed central storage system in cases of network failures or when the top-of-rack storage system fails, while bringing down service for a pod altogether if the centrally managed storage system fails. Such top-of-rack storage systems might be used only to improve read performance or to reduce load on data-center storage networks, but if asynchronous replication or other data management services are running only on the centrally managed system, it may be preferable to reroute traffic to the central storage system or stop servicing and call tech support than to allow the top-of-rack storage system to continue alone. Further, preference rules may be more complex—there may be two or more such "preferred" storage systems coupled, perhaps, with some number of additional storage systems that rely on the preferred or required storage systems. In this example, the pod is online if all the preferred or required storage systems are running, and is down if some of them are not running. This is similar to a quorum model where the size of the quorum is the same as the number of voting members, but it is simpler to implement than a generalized quorum model that allows for fewer than all voting members.

In another example, a combination of mechanisms may be used, which may be useful when a pod is stretched across more than two storage systems. In one example, preference rules may be combined with mediation. In the top-of-rack example, the larger central storage system in a data center or campus might itself be synchronously replicated to a large storage system in a second location. In that case, the top-of-rack storage systems may never resume alone, and may prefer any of the larger central storage systems in the two locations. The two larger storage systems in that case might be configured to mediate between each other, and any smaller storage systems that can connect to whichever of the two larger storage systems that remain online may continue servicing their pod, and any smaller storage systems that cannot connect to either of the two large storage systems (or that can only connect to one which is offline for the pod) may stop servicing the pod. Further, a preference model may also be combined with a quorum-based model. For example, three large storage systems in three locations might use a quorum model between each other, with smaller satellite or top-of-rack storage systems lacking any votes and working only if they can connect to one of the larger in-sync storage systems that are online.

In another example of combining mechanisms, mediation may be combined with a quorum model. For example, there may be three storage systems that normally vote between each other to ensure that two storage systems can safely detach a third that is not communicating, while one storage system can never detach the two other storage systems by itself. However, after two storage systems have successfully detached a third storage system, the configuration is now down to two storage systems that agree they are in-sync and that agree on the fact that the third storage system is detached. In that case, the two remaining storage systems may agree to use mediation (such as with a cloud service) to handle an additional storage system or network fault. This mediation and quorum combination may be extended further. For example, in a pod stretched between four storage systems, any three can detach a fourth, but if two in-sync storage systems are communicating with each other but not to two other storage systems they both currently consider to be in-sync, then they could use mediation to safely detach the other two. Even in a five storage system pod configuration, if four storage systems vote to detach a fifth, then the remaining four can use mediation if they are split into two equal halves, and once the pod is down to two storage systems, they can use mediation to resolve a successive fault. Five to three might then use quorum between the three allowing a drop to two, with the two remaining storage systems again using mediation if there is a further failure. This general multi-mode quorum and mediation mechanism can handle an additional number of situations that neither quorum between symmetric storage systems nor mediation by itself can handle. This combination may increase the number of cases where faulty or occasionally unreachable mediators can be used reliably (or in the case of cloud mediators, where customers may not entirely trust them). Further, this combination better handles the case of three storage system pods, where mediation alone might result in a first storage system successfully detaching a second and third storage systems on a network fault affecting just the first storage system. This combination may also better handle a sequence of faults affecting one storage system at a time, as described in the three to two, and then to one example. These combinations work because being in-sync and a detach operation result in specific states—in other words, the system is stateful because it is a process to go from detached to in-sync, and each stage in a sequence of quorum/mediator relationships ensures that at every point all online/in-sync storage systems agree on the current persistent state for the pod. This is unlike in some other clustering models where simply having a majority of cluster nodes communicating again is expected to be enough to resume operation. However, the preference model can still be added in, with satellite or top-of-rack storage systems never participating in either mediation or quorum, and serving the pod only if they can connect to an online storage system that does participate in mediation or quorum.

In some examples, a mediation service (1500), or external pod membership managers, may be located in fault zones that are different than fault zones for the synchronously replicated storage systems (1514, 1524). For example, with a two storage system pod (1501), if the two storage systems (1514, 1524) are separated into distinct fault zones by, for example, physical location—one in a city and the other in the outskirts of the city, or one in a data center connected to one power grid or Internet access point and the other in another data center connected to a different power grid or Internet access point—then it is generally preferable to be in some other fault zone than the two storage systems. As one example, the mediation service (1500) may be in a different part of the extended urban area of the city, or connected to a different power grid or Internet access point. However, synchronously replicated storage systems may also be within a same data center to provide better storage reliability, and in this case, network, power, and cooling zones may be taken into account.

The example method depicted in FIG. 15 includes requesting (1502), by a first storage system (1514) in response to detecting a triggering event, mediation from a mediation service (1500). In this example, a triggering event may be a communication fault in the data communications link (1516) between the first storage system (1514) and the second storage system (1524), where detecting the fault may be based on a hardware failure initiating an interrupt, based on a failure to acknowledge a transmission, or based on failed retry efforts, or through some other method. In other cases, a triggering event may be expiration of a synchronous replication lease, and requesting mediation may be part of attempting to coordinate synchronizing the connection and resuming of activity leases. Such a lease may initially be established in dependence upon the timing information for at least one of the plurality of storage systems in a variety of different ways. For example, the storage systems may establish a synchronous replication lease by utilizing the timing information for each of the plurality of storage systems to coordinate or exchange clocks. In such an example, once the clocks are coordinated for each of the storage systems, the storage system may establish a synchronous replication lease that extends for a predetermined period of time beyond the coordinated or exchanged clock values. For example, if the clocks for each storage system are coordinated at time X, the storage systems may each be configured to establish a synchronous replication lease that is valid until X+2 seconds. A further explanation for coordinating or exchanging clocks may be found within U.S. Provisional Application 62/518,071, which is incorporated by reference herein in its entirety.

Further, requesting (1502), by the first storage system (1514) in response to detecting the triggering event, mediation from the mediation service (1500) may be implemented by a controller of the first storage system (1514) detecting a triggering event and sending a request (1560) over a network (1554) to a mediation service (1500). In some examples, a mediation service (1500) may be a third party service that provides—to multiple computer systems—mutually exclusive access to a resource, such as a particular database entry for storing a value. For example, the mediation service (1500) may be provided by a database service provided by a cloud service provider, provided by a host computer issuing requests to modify the dataset, or by some third party service providing mutually exclusive access to a resource, where the resource may be storage, a state machine, or some other type of resource capable of indicating a particular modification based on a request from a particular client. In this example, after sending the request (1560) for mediation, the first storage system (1514) waits (1503A) for an indication from the mediation service (1500) that indicates a positive mediation result (1503B) or a negative mediation result or lack of response (1503C). If the first storage system (1514) receives a negative mediation result or receives no response (1503C), and if a threshold amount of time to wait has not been exceeded, then the first storage system (1514) may continue (1506) to wait more time. However, if the amount of time waiting exceeds the threshold amount, then the first storage system (1514) may continue (1506) by determining that another computer system won mediation, and taking itself offline. In some examples, as discussed above, a request for mediation may be received by the mediation service (1500) as an atomic compare-and-set operation that attempts to set a value for a shared resource (1552) that may also be the target of a compare-and-set operation received from another of the storage systems maintaining the pod (1501), where the storage system that successfully sets the shared resource (1552) wins mediation.

The example in FIG. 15 also includes the second storage system (1524) requesting (1510), in response to detecting a triggering event, mediation from the mediation service (1500). Requesting (1510), in response to detecting a triggering event, mediation from the mediation service (1500) may be implemented similarly to the implementation of requesting (1502), in response to the triggering event, mediation on the first storage system (1514). However, in this example, the second storage system (1524), in response to sending a request (1562) to the mediation service, may—contrary to the mediation success of the first storage system (1514)—receive a failure message, or some indication that the request (1562) for mediation was not successful.

The example method in FIG. 15 continues by, in the event that an indication (1564) of a positive mediation result is received by the first computer system (1514), responsive to the indication (1564) of the positive mediation result from the mediation service (1500), the first computer system (1514)—instead of the second storage system (1524)—processing (1504) data storage requests directed to a dataset (1512) that is synchronously replicated across the first storage system (1514) and the second storage system (1524). Synchronous replication of a dataset (1512), which implements a pod (1501), in addition to receiving and processing data storage requests directed to a dataset (1512) may be implemented as described with reference to FIGS. 8A and 8B of U.S. Provisional Applications 62/470,172 and 62/518,071, which are incorporated herein in their entirety. In this example, as described earlier with reference to FIG. 15, responsive to an indication (1564) of a positive mediation result, the first storage system (1514) may be considered the storage system that wins mediation, and the first storage system (1514) may detach the storage system with which communication was lost. However, in other examples, mediation may be implemented according to any of the other described methods of mediation, or combinations of methods of mediation.

In some examples, defining a preference for which storage system among a plurality of storage systems synchronously replicating a dataset (1512) is to win mediation may be implemented by specifying a delay value for each of the plurality of storage systems. For example, if a first storage system (1514) is designated as a preferred storage system, then the first storage system (1514) may be assigned a delay value of zero (0) before making a request for mediation from the mediation service. However, for non-preferred storage systems, a delay value may be assigned to be greater than zero, such as 3 seconds, or some other value that would generally result in the preferred storage system winning mediation simply due to a loss of communications between synchronously replicated storage systems.

Figure 16:
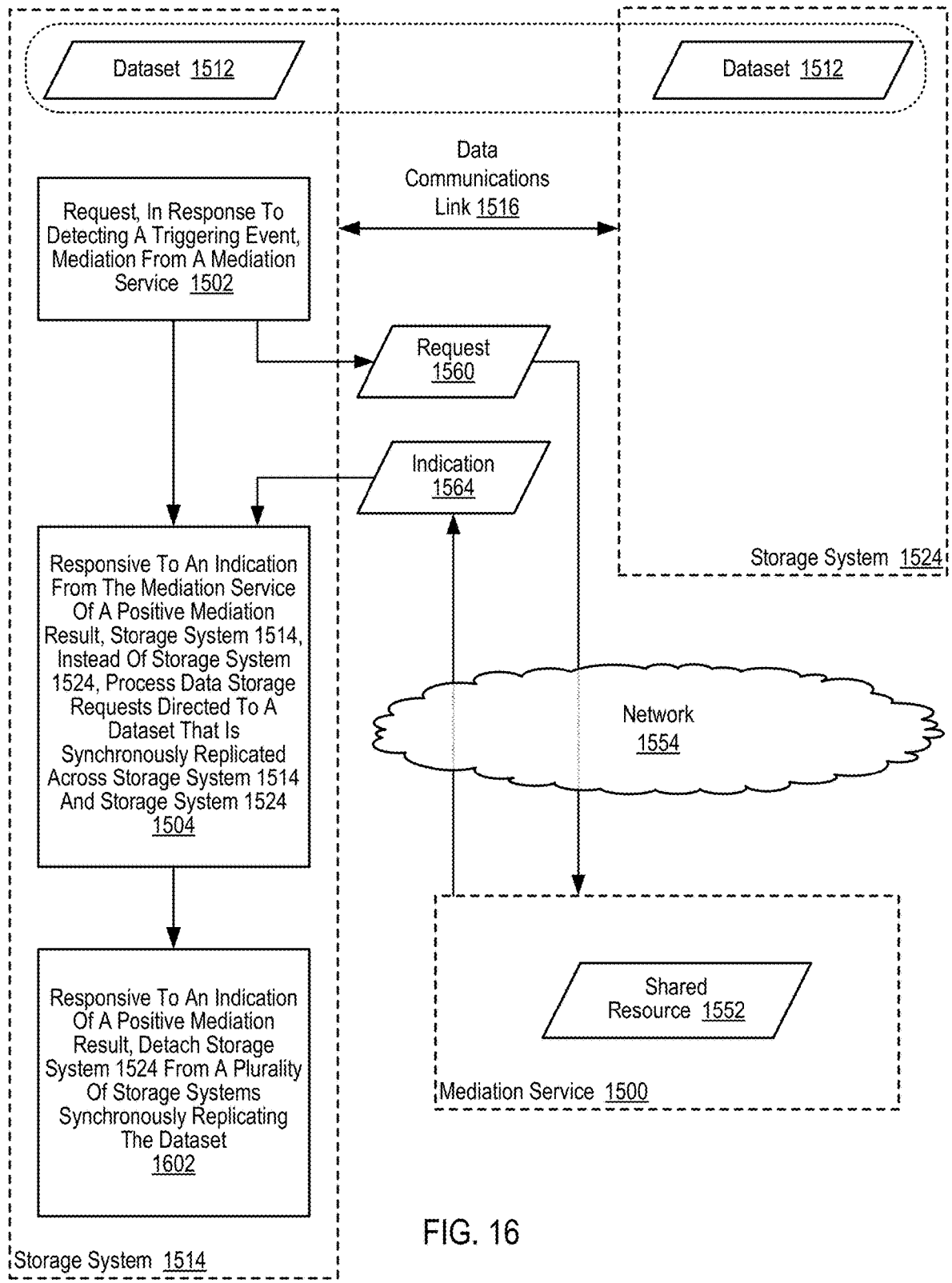
FIG. 16 sets forth a flow chart illustrating an example method for mediating between storage systems synchronously replicating a dataset according to some embodiments of the present disclosure.

For further explanation, FIG. 16 sets forth a flow chart illustrating an example method for mediating between storage systems synchronously replicating a dataset according to some embodiments of the present disclosure. The example method depicted in FIG. 16 is similar to the example method depicted in FIG. 15, as the example method depicted in FIG. 16 also includes requesting (1502), by a first storage system (1514) in response to detecting a triggering event, mediation from a mediation service (1500); and responsive to an indication (1564) of a positive mediation result from the mediation service (1500), the first computer system (1514)—instead of the second storage system (1524)—processing (1504) data storage requests directed to a dataset (1512) that is synchronously replicated across the first storage system (1514) and the second storage system (1524).

However, the example method depicted in FIG. 16 further includes, responsive to an indication (1564) of a positive mediation result, detaching (1602) the second storage system (1524) from a plurality of storage systems (1514, 1524)

synchronously replicating the dataset (1512). Detaching (1602) another storage system may be implemented on the storage system that receives an indication of a positive mediation result from the mediation service (1500) by removing the storage system (1524) that is no longer communicative from an in-sync list of storage systems that are replicating a dataset (1512), where removal from the in-sync list results in the storage system (1514) that wins mediation not attempting to synchronize the detached storage system for subsequently received requests to modify the dataset. While in this example there are two storage systems (1514, 1524), in other examples, other quantities of storage systems are contemplated.

Figure 17:
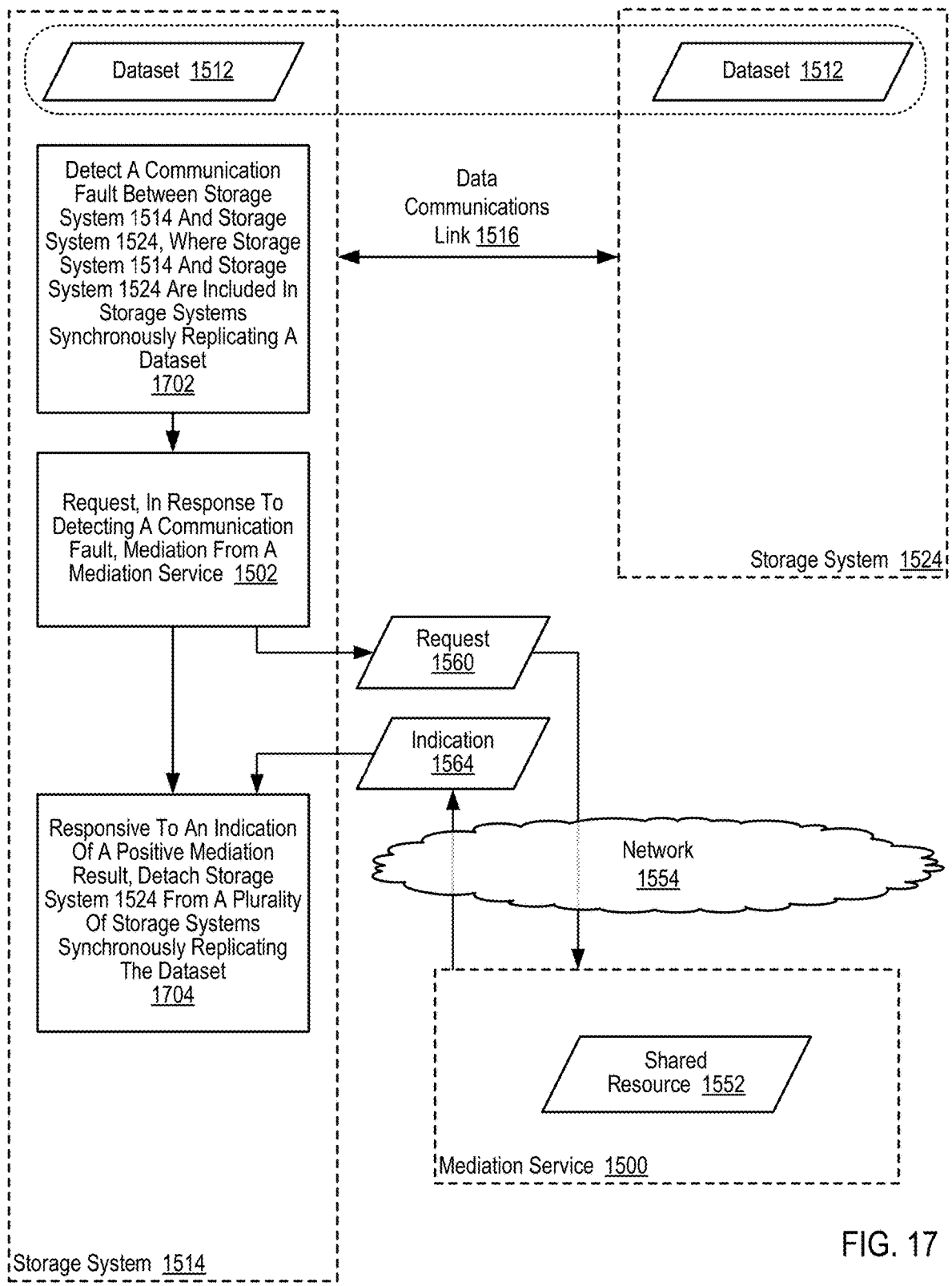
FIG. 17 sets forth a flow chart illustrating an example method for mediating between storage systems synchronously replicating a dataset according to some embodiments of the present disclosure.

For further explanation, FIG. 17 sets forth a flow chart illustrating an example method for mediating between storage systems synchronously replicating a dataset according to some embodiments of the present disclosure. The example method depicted in FIG. 17 is similar to the example method depicted in FIG. 15, as the example method depicted in FIG. 17 also includes requesting (1502), by a first storage system (1514) in response to detecting a triggering event, mediation from a mediation service (1500), where in this example the triggering event is a communication fault.

However, the example method depicted in FIG. 17 is different from the example method depicted in FIG. 15 because the example method depicted in FIG. 17 does not include any activity or actions performed by the second storage system (1524). This distinction allows for a storage system among a plurality of storage systems to fail or otherwise be unresponsive, and for one or more other storage systems to request mediation from a mediation service (1500) to continue to service data storage requests directed to the synchronously replicated dataset (1512).

The example method depicted in FIG. 17 includes detecting (1702) a communication fault between the first storage system (1514) and the second storage system (1524), where the first storage system (1514) and the second storage system (1524) are included in the storage systems synchronously replicating the dataset (1512). Detecting (1702) the communication fault may be implemented as discussed above with reference to FIG. 15.

Further, the example method depicted in FIG. 17 also includes, responsive to an indication (1564) of a positive mediation result, detaching (1704) the second storage system (1524) from a plurality of storage systems (1514, 1524) synchronously replicating the dataset (1512). Detaching (1704) the second storage system (1524) may be implemented similarly to detaching (1602) the second storage system (1524) described with reference to FIG. 16.

Figure 18:
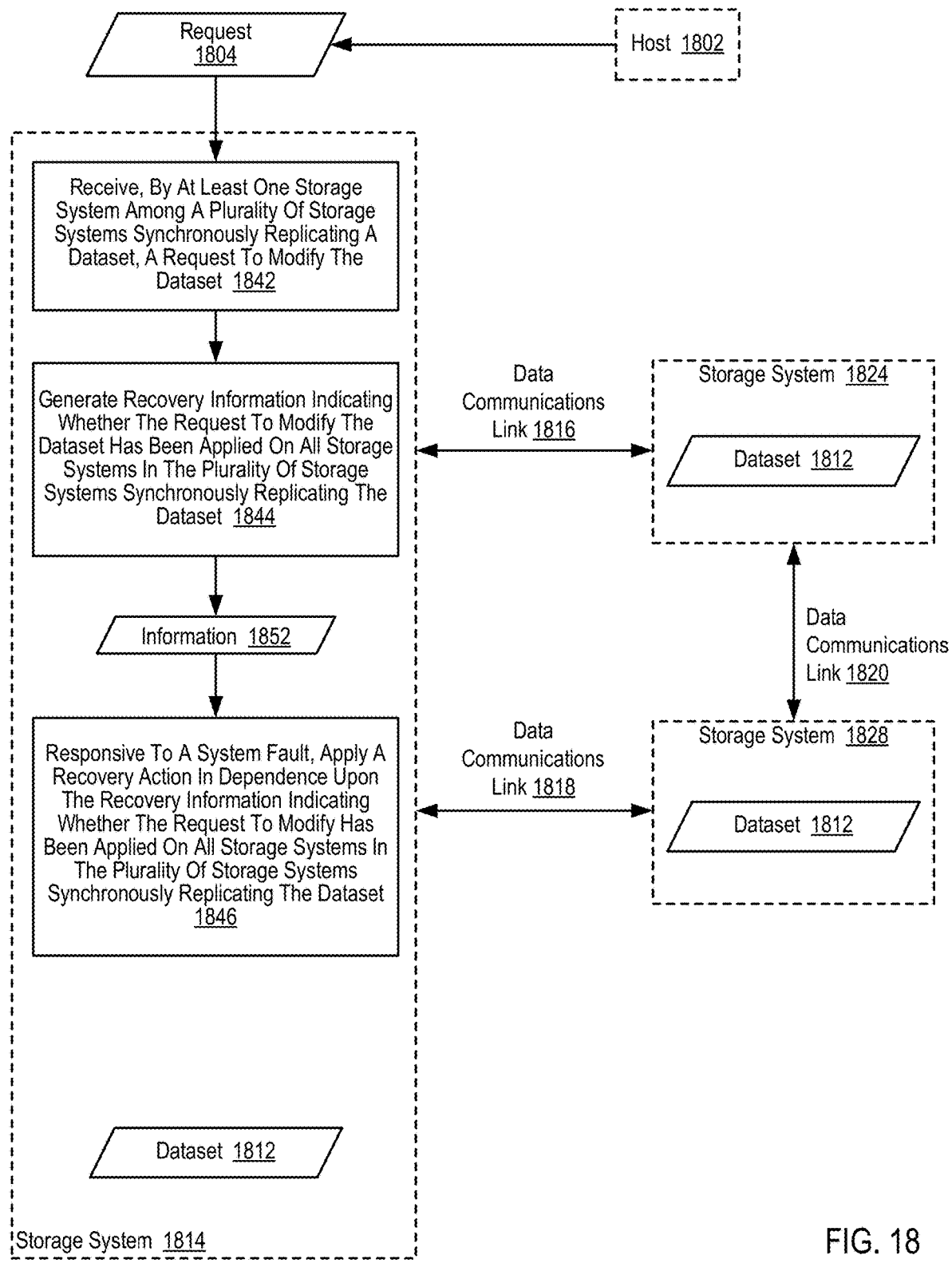
FIG. 18 sets forth a flow chart illustrating an example method for recovery for storage systems synchronously replicating a dataset according to some embodiments of the present disclosure.

For further explanation, FIG. 18 sets forth a flow chart illustrating an example method for recovery for storage systems synchronously replicating a dataset according to some embodiments of the present disclosure. Although the example method depicted in FIG. 18 illustrates an embodiment in which a dataset (1812) is synchronously replicated across only two storage systems (1814, 1824, 1828), each of which may independently be coupled to each other via one or more data communications links (1816, 1818, 1820), the example depicted in FIG. 18 can be extended to embodiments in which the dataset (1812) is synchronously replicated across additional storage systems.

Multiple storage systems (1814, 1824, 1828) that are synchronously replicating a dataset (1842) may be in communication with each other during normal operation for receiving and processing requests (1804) from a host (1802) computing device. However, in some instances, one or more of the storage systems (1814, 1824, 1828) may fail, restart, upgrade or otherwise be unavailable. Recovery in this context is the process of making in-sync pod member storage systems consistent after a fault or some other service outage causes at least one of the in-sync storage systems to be interrupted and possibly lose the context of in-flight operations. A 'pod', as the term is used here and throughout the remainder of the present application, may be embodied as a management entity that represents a dataset, a set of managed objects and management operations, a set of access operations to modify or read the dataset, and a plurality of storage systems. Such management operations may modify or query managed objects equivalently through any of the storage systems, where access operations to read or modify the dataset operate equivalently through any of the storage systems. Each storage system may store a separate copy of the dataset as a proper subset of the datasets stored and advertised for use by the storage system, where operations to modify managed objects or the dataset performed and completed through any one storage system are reflected in subsequent management objects to query the pod or subsequent access operations to read the dataset. Additional details regarding a 'pod' may be found in previously filed provisional patent application No. 62/518,071, which is incorporated herein by reference. While in this example, there are only three storage systems (1814, 1824, 1828) depicted, in general, any number of storage systems may be part of an in-sync list that is synchronously replicating a dataset (1812).

When any one or more storage systems that are members of a pod are interrupted, then any remaining storage systems, or any storage systems that resume operation earlier, may either detach them (so that they are no longer in-sync) or will wait for them and participate in a recovery action to ensure consistency before moving forward. If the outage is short enough, and recovery is quick enough, then operating systems and applications external to the storage systems, or running on a storage system that does not fault in a way that brings the application itself down, may experience a temporary delay in storage operation processing but may not experience a service outage. SCSI and other storage protocols support retries, including to alternate target storage interfaces, in the case of operations lost due to a temporary storage controller or interface target controller outage, and SCSI in particular supports a BUSY status which requests initiator retries which could be used while a storage controller participates in recovery.

In general, one of the goals of recovery is to handle any inconsistencies from an unexpected disruption of in-progress, distributed operations and to resolve the inconsistencies by making in-sync pod member storage systems sufficiently identical. At that point, providing the pod service can be safely resumed. Sufficiently identical at least includes the content stored in the pod, and in other cases, sufficiently identical may include the state of persistent reservations. Sufficiently identical may also include ensuring that snapshots are either consistent—and still correct with respect to completed, concurrent, or more recently received modifying operations—or consistently deleted. Depending on an implementation, there may be other metadata that should be made consistent. If there is metadata used for tracking or optimizing the transfer of content from a replication source to an asynchronous or snapshot-based replication target, then that might need to be made consistent to allow the replication source to switch seamlessly from one member storage system of a pod to another member storage system. The existence and properties of volumes may also need to be recovered, and perhaps definitions related to applications or initiating host systems. Many of these properties may be recovered using standard database transaction recovery techniques, depending on how they are implemented.

In some examples, beyond ensuring that administrative metadata is sufficiently identical in a storage system that implements modifying operations to content in a block-based storage system, recovery must ensure that that those modifications are applied or discarded consistently across a pod and with proper consideration for block storage semantics (order, concurrency, consistency, atomicity for operations such as COMPARE AND WRITE and XDWRIT-EREAD). At core, this implementation relies on being able to know during recovery what operations might have been applied to at least one in-sync storage system for a pod that might not have been applied to all other in-sync storage systems for the pod, and either applying them everywhere or backing them out. Either action results in consistency—apply everywhere or backout everywhere—and there is no inherent reason why the answer has to be uniform across all operations. Backout may be allowed if at least one in-sync storage system for the pod did not apply the operation. In general, it is often simpler to reason about applying all updates that were found on any in-sync storage system for a pod rather than backing out some or all updates that are on one or more in-sync storage systems for a pod but that are not on all in-sync storage systems for the pod. To be efficient, knowing what was applied on some systems that might not have been applied on other systems generally requires that the storage systems record something other than the raw data (otherwise, all data might have to be compared which could be enormously time consuming). Discussed below is additional detail regarding implementations for recording such information that may enable storage system recovery.

Two examples for persistently tracking information for ensuring consistency include: (1) identifying that the content of volumes might be different across in-sync storage systems for the pod, and (2) identifying collections of operations that might not have been universally applied across all in-sync storage systems for the pod. The first example is a traditional model for mirroring: keep a tracking map of logical regions that are being written (often as a list or as a bitmap covering a volume's logical space with some granularity) and use that list during recovery to note which regions might differ between one copy and another. The tracking map is written to some or all mirrors (or is written separately) prior or during the write of the volume data in such a way that recovery of the tracking map is guaranteed to cover any volume regions that were in flux at the time of a fault. Recovery in this first variation generally consists of copying content from one copy to another to make sure they are the same.

The second example in persistent tracking—based on operation tracking—may be useful in storage systems that support synchronously replicating virtual copying of large volume ranges within and between volumes in a pod since this case can be more difficult or expensive to track simply as potential differences in volume content between synchronously replicated storage systems (though see a later section describing tracking and recovery in content-addressable storage systems). Also, simple content tracking might work less well in storage systems where synchronous replication must track more complex information, such as in content tracking graphs with extent and larger granularity identifiers that drive forms of asynchronous replication and where the asynchronous replication source can be migrated or faulted over from one in-sync storage system in a pod to another.

When operations are tracked instead of content, recovery includes identifying operations that may not have completed everywhere. Once such operations have been identified, any ordering consistency issues should be resolved, just as they should be during normal run-time using techniques such as leader-defined ordering or predicates or through interlock exceptions. An interlock exception is described below, and with regard to predicates, descriptions of relationships between operations and common metadata updates may be described as a set of interdependencies between separate, modifying operations—where these interdependencies may be described as a set of precursors that one operation depends on in some way, where the set of precursors may be considered predicates that must be true for an operation to complete. To continue with this example, given the identified operations, the operations may then be reapplied. Recorded information about operations should include any metadata changes that should be consistent across pod member storage systems, and this recorded information can then be copied and applied. Further, predicates, if they are used to disseminate restrictions on concurrency between leaders and followers, might not need to be preserved, if those predicates drive the order in which storage systems persist information, since the persisted information implies the various plausible outcomes.

As discussed more thoroughly within U.S. Provisional Patent Application Ser. No. 62/470,172 and U.S. Provisional Patent Application Ser. No. 62/518,071, references that are incorporated herein in their entirety, a set of in-sync storage systems may implement a symmetric I/O model for providing data consistency. In a symmetric I/O model, multiple storage systems may maintain a dataset within a pod, and a member storage system that receives an I/O operation may process the I/O operation locally concurrent with the processing of the I/O operation on all the other storage systems in the pod—where the receiving storage system may initiate the processing of the I/O operation on the other storage systems. However, in some cases, multiple storage systems may receive independent I/O operations that write to overlapping memory regions. For example, if a first write comes in to a first storage system, then the first storage system may begin persisting the first write locally while also sending the first write to a second storage system—while at about the same time, a second write, to an overlapping volume region with the first write, is received at a second storage system, where the second storage system begins persisting the second write locally while also sending the second write to the first storage system. In this scenario, at some point, either the first storage system, the second storage system, or both storage systems may notice that there is a concurrent overlap. Further in this scenario, the first write can not be completed on the first storage system until both the second storage system has persisted the first write and responded with a success indication, and the first storage system has successfully persisted the first write—where the second storage system is in a similar situation with the second write. Because both storage systems have access to both the first and second writes, either storage system may detect the concurrent overlap, and when one storage system detects the concurrent overlap, the storage system may trigger an exception, which is referred to herein as an "interlock exception." One solution includes the two, or possibly more storage systems when the scenario is expanded to additional storage systems, storage systems involved in an interlock exception to reach agreement on which write operation prevails.

In another example, such as in the case of overlapping write requests, write-type requests (e.g., WRITE, WRITE SAME, and UNMAP requests, or combinations) that were overlapping in time and in volume address range at the time of an event that interrupted replication and led to an eventual recovery might have completed inconsistently between the in-sync storage systems. The manner in which this situation is handled can depend on the implementation of the I/O path during normal operation. In this example, discussed further below, is a first and second write that overlapped in time, where each was received by one storage system or another for a pod before either was signaled as having completed. This example is readily extended to more than two writes by considering each two in turn, and to more than two storage systems by considering that a first write and a second write might have completed on more than one storage system, and by considering that a first, second, and third write (or additional writes) might have completed inconsistently on three or more storage systems. The techniques described are easily extended to these cases. In a symmetric I/O-based storage system implementation based on interlock exceptions, only the first write might have completed on one storage system while only the second of the two overlapping writes might have completed on a second storage system. This case can be detected by noticing that the ranges overlap between each write, and by noticing that neither storage system includes the alternate overlapping write. If the two writes overlap completely (one completely covers the other), then one of the two writes may simply be copied to the other storage system and applied to replace that storage system's content for that volume address range. If the writes overlap only partially, then the content that partially overlaps can be copied from one storage system to the other (and applied), while the parts that don't overlap can be copied between each storage system so that the content is made uniform and up-to-date on both storage systems. In a leader based system with predicates or some other means for the leader to declare that one write precedes another, the storage systems performing the writes may well persist one before the other, or persist the two together. In another case, the implementation may persist the two writes separately and out of order, with the ordering predicates used merely to control completion signaling. If the implementation allows out-of-order write processing, then the preceding example explains how consistency can be recovered. In cases where storage systems enforce ordering of persistence during normal operation, then recovery might still see only the first write on a first storage system, but the first and second writes on a second storage system. In that case, the second write can be copied from the second storage system to the first storage system as part of recovery.

In another example snapshots may also be recovered. In some cases, such as for snapshots concurrent with modifications where a leader determined some modifications should be included in the snapshot and others shouldn't, the recorded information might include information about whether a particular write should be included within a snapshot or not. In that model, it may not be necessary to ensure that everything that a leader decided to include in a snapshot must end up included in the snapshot after a recovery. If one in-sync storage system for a pod recorded the existence of the snapshot and no in-sync storage system for the pod recorded a write that was ordered for inclusion in the snapshot, then uniformly applying the snapshot without including that write still results in snapshot content that is entirely consistent across all in-sync storage systems for the pod. This discrepancy should only occur in the case of concurrent writes and snapshots that had never been signaled as completed so no inclusion guarantee is warranted: the leader assigning predicates and ordering may be necessary only for run-time consistency rather than for recovery order consistency. In cases where recovery identifies a write for inclusion in a snapshot, but where recovery doesn't locate the write, the snapshot operation itself might safely ignore the snapshot depending on the implementation. The same argument about snapshots applies to virtual copying of a volume address range through SCSI EXTENDED COPY and similar operations: the leader defines which writes to the source address range might logically precede the copy and which writes to the target address range might logically precede or follow the address range copy. However, during recovery, the same arguments apply as with snapshots: a concurrent write with a volume range copy could miss either the concurrent write or the volume range copy as long as the result is consistent across in-sync storage systems for a pod and does not roll back a modification that had completed everywhere and does not reverse a modification that a dataset consumer might have read.

Further with regard to this example describing recovery of snapshots, if any storage system applied the write for a COMPARE AND WRITE, then the comparison must have succeeded on one in-sync storage system for a pod, and run-time consistency should have meant that the comparison should have succeeded on all in-sync storage systems for the pod, so if any such storage system had applied the write, it can be copied and applied to any other in-sync storage system for the pod that had not applied it prior to recovery. Further still, recovery of XDWRITEREAD or XPWRITE requests (or similar arithmetic transformation operations between pre-existing data and new data) could operate either by delivering the result of the transformation after reading that result from one storage system, or it can operate by delivering the operation with the transforming data to other storage systems if it can be ensured that any ordering data preceding the transforming write is consistent across in-sync storage systems for the pod and if it can be reliably determined which such storage systems had not yet applied the transforming write.

As another example, recovery of metadata may be implemented. In this case, recovery should also result in consistent recovery of metadata between in-sync storage system for a pod, where that metadata is expected to be consistent across the pod. As long as this metadata is included with operations, these can be applied along with content updates described by those operations. The manner in which this data is merged with existing metadata depends on the metadata and the implementation. Longer-term change tracking information for driving asynchronous replication can often be merged quite simply as nearby or otherwise related modifications are identified.

As another example, recording recent activity for operation tracking may be implemented in various ways to identify operations that were in progress on in-sync storage systems in a pod at the time of a fault or other type of service interruption that led to a recovery. For example, one model is to record recovery information in modifications to each in-sync storage system within a pod either atomically with any modification (which can work well if the updates are staged through fast journaling devices) or by recording information about operations that will be in progress before they can occur. The recorded recovery information may include a logical operation identifier, such as based on the original request or based on some identifier assigned by a leader as part of describing the operation, and whatever level of operation description may be necessary for recovery to operate. Information recorded by a storage system for a write which is to be included in the content of a concurrent snapshot should indicate that the write is to be included in the snapshot as well as in the content of the volume that the write is applied to. In some storage system implementations, the content of a snapshot is automatically included in the content of the volume unless replaced by specific overlapping content in a newer snapshot or replaced by specific overlapping content written later to the live the volume. Two concurrent write-type requests (e.g., WRITE, WRITE SAME or UNMAP requests, or combinations) which overlap in time and in volume address may be explicitly ordered by a leader such that the leader ensures that the first write is persisted first to all in-sync storage systems for a pod before the second one can be persisted by any in-sync storage system for the pod. This ensures, in a simple way, that inconsistencies cannot happen. Further, since concurrent overlapping writes to a volume are very rare, this may be acceptable. In that case, if there is a record on any recovering storage system for the second write, then the first write must have completed everywhere so it should not need recovery. Alternately, a predicate may be described by the leader requiring that storage systems order a first write before a second write. The storage systems may then perform both writes together, such that they are guaranteed to either both persist or both fail to persist. In another case, the storage system may persist the first write and then the second write after the persistence of the first write is assured. A COMPARE AND WRITE, XDWRITEREAD, or XPWRITE request should be ordered in such a way that the precursor content is identical on all storage systems at the time each performs the operation. Alternately, one storage system might calculate the result and deliver the request to all storage systems as a regular write-type request. Further, with regard to making these operations recoverable, tracking which operations have completed everywhere may allow their recency to be discounted and recorded information that causes an operation recovery analysis for completed operations can then be either discarded or efficiently skipped over by recovery.

In another example, clearing out completed operations may be implemented. One example to handle clearing of recorded information is to clear it across all storage systems after the operation is known to have been processed on all in-sync storage systems for the pod. This can be implemented by having the storage system which received the request and which signaled completion send a message to all storage systems for the pod after completion is signaled, allowing each storage system to clear them out. Recovery then involves querying for all recorded operations that have not been cleared out across all in-sync storage systems for the pod that are involved in the recovery. Alternately, these messages could be batched so that they happen periodically (e.g., every 50 ms), or after some number of operations (say, every 10 to 100). This batching process may reduce message traffic significantly at the expense of somewhat increased recovery times since more fully completed operations are reported as potentially incomplete. Further, in a leader based implementation (as an example), the leader could be made aware of which operations are completed and it could send out the clear messages.

In another example, a sliding window may be implemented. Such an example may work well in implementations based on leaders and followers, where the leader may attach a sequence number to operations or collections of operations. In this way, in response to the leader determining that all operations up to some sequence number have completed, it may send a message to all in-sync storage systems indicating that all operations up to that sequence number have completed. The sequence number could also be an arbitrary number, such that when all operations associated with an arbitrary number have completed, a message is sent to indicate all those operations have completed. With a sequence number based model, recovery could query for all operations on any in-sync storage system associated with a sequence number larger than the last completed sequence number. In a symmetric implementation without a leader, each storage system that receives request for the pod could define its own sliding window and sliding window identity space. In that case, recovery may include querying for all operations on any in-sync storage window that are associated with any sliding window identity space whose sliding window identity is after the last identity which has completed where operations for all preceding identifiers have also completed.

In another example, checkpoints may be implemented. In a checkpoint model, special operations may be inserted by a leader which depend on the completion of a uniform set of precursor operations and that all successive operations then depend on. Each storage system may then persist the checkpoint in response to all precursor operations having been persisted or completed. A successive checkpoint may be started sometime after the previous checkpoint has been signaled as persisted on all in-sync storage systems for the pod. A successive checkpoint would thus not be initiated until some time after all precursor operations are persisted across the pod; otherwise, the previous checkpoint would not have completed. In this model, recovery may include querying for all operations on all in in-sync storage systems that follow after the previous to last checkpoint. This could be accomplished by identifying the second to last checkpoint known to any in-sync storage system for the pod, or by asking each storage system to report all operations since its second to last persisted checkpoint. Alternately, recovery may include searching for the last checkpoint known to have completed on all in-sync storage systems and may include querying for all operations that follow on any in-sync storage system—if a checkpoint completed on all in-sync storage systems, then all operations prior to that checkpoint were clearly persisted everywhere.

In another example, recovery of pods based on replicated directed acyclic graphs of logical extents may be implemented. However, prior to describing such an implementation, storage systems using directed acyclic graphs of logical extents are first described.

A storage system may be implemented based on directed acyclic graphs comprising logical extents. In this model, logical extents can be categorized into two types: leaf logical extents, which reference some amount of stored data in some way, and composite logical extents, which reference other leaf or composite logical extents.

A leaf extent can reference data in a variety of ways. It can point directly to a single range of stored data (e.g., 64 kilobytes of data), or it can be a collection of references to stored data (e.g., a 1 megabyte "range" of content that maps some number of virtual blocks associated with the range to physically stored blocks). In the latter case, these blocks may be referenced using some identity, and some blocks within the range of the extent may not be mapped to anything. Also, in that latter case, these block references need not be unique, allowing multiple mappings from virtual blocks within some number of logical extents within and across some number of volumes to map to the same physically stored blocks. Instead of stored block references, a logical extent could encode simple patterns: for example, a block which is a string of identical bytes could simply encode that the block is a repeated pattern of identical bytes.

A composite logical extent can be a logical range of content with some virtual size, which comprises a plurality of maps that each map from a subrange of the composite logical extent logical range of content to an underlying leaf or composite logical extent. Transforming a request related to content for a composite logical extent, then, involves taking the content range for the request within the context of the composite logical extent, determining which underlying leaf or composite logical extents that request maps to, and transforming the request to apply to an appropriate range of content within those underlying leaf or composite logical extents.

Volumes, or files or other types of storage objects, can be described as composite logical extents. Thus, these presented storage objects (which in most of our discussion will simply be referred to as volumes) can be organized using this extent model.

Depending on implementation, leaf or composite logical extents could be referenced from a plurality of other composite logical extents, effectively allowing inexpensive duplication of larger collections of content within and across volumes. Thus, logical extents can be arranged essentially within an acyclic graph of references, each ending in leaf logical extents. This can be used to make copies of volumes, to make snapshots of volumes, or as part of supporting virtual range copies within and between volumes as part of EXTENDED COPY or similar types of operations.

An implementation may provide each logical extent with an identity which can be used to name it. This simplifies referencing, since the references within composite logical extents become lists comprising logical extent identities and a logical subrange corresponding to each such logical extent identity. Within logical extents, each stored data block reference may also be based on some identity used to name it.

To support these duplicated uses of extents, we can add a further capability: copy-on-write logical extents. When a modifying operation affects a copy-on-write leaf or composite logical extent the logical extent is copied, with the copy being a new reference and possibly having a new identity (depending on implementation). The copy retains all references or identities related to underlying leaf or composite logical extents, but with whatever modifications result from the modifying operation. For example, a WRITE, WRITE SAME, XDWRITEREAD, XPWRITE, or COMPARE AND WRITE request may store new blocks in the storage system (or use deduplication techniques to identify existing stored blocks), resulting in modifying the corresponding leaf logical extents to reference or store identities to a new set of blocks, possibly replacing references and stored identities for a previous set of blocks. Alternately, an UNMAP request may modify a leaf logical extent to remove one or more block references. In both types of cases, a leaf logical extent is modified. If the leaf logical extent is copy-on-write, then a new leaf logical extent will be created that is formed by copying unaffected block references from the old extent and then replacing or removing block references based on the modifying operation.

A composite logical extent that was used to locate the leaf logical extent may then be modified to store the new leaf logical extent reference or identity associated with the copied and modified leaf logical extent as a replacement for the previous leaf logical extent. If that composite logical extent is copy-on-write, then a new composite logical extent is created as a new reference or with a new identity, and any unaffected references or identities to its underlying logical extents are copied to that new composite logical extent, with the previous leaf logical extent reference or identity being replaced with the new leaf logical extent reference or identity.

This process continues further backward from referenced extent to referencing composite extent, based on the search path through the acyclic graph used to process the modifying operation, with all copy-on-write logical extents being copied, modified, and replaced.

These copied leaf and composite logical extents can then drop the characteristic of being copy on write, so that further modifications do not result in an additional copy. For example, the first time some underlying logical extent within a copy-on-write "parent" composite extent is modified, that underlying logical extent may be copied and modified, with the copy having a new identity which is then written into a copied and replaced instance of the parent composite logical extent. However, a second time some other underlying logical extent is copied and modified and with that other underlying logical extent copy's new identity being written to the parent composite logical extent, the parent can then be modified in place with no further copy and replace necessary on behalf of references to the parent composite logical extent.

Modifying operations to new regions of a volume or of a composite logical extent for which there is no current leaf logical extent may create a new leaf logical extent to store the results of those modifications. If that new logical extent is to be referenced from an existing copy-on-write composite logical extent, then that existing copy-on-write composite logical extent will be modified to reference the new logical extent, resulting in another copy, modify, and replace sequence of operations similar to the sequence for modifying an existing leaf logical extent.

If a parent composite logical extent cannot be grown large enough (based on implementation) to cover an address range associated that includes new leaf logical extents to create for a new modifying operation, then the parent composite logical extent may be copied into two or more new composite logical extents which are then referenced from a single "grandparent" composite logical extent which yet again is a new reference or a new identity. If that grandparent logical extent is itself found through another composite logical extent that is copy-on-write, then that another composite logical extent will be copied and modified and replaced in a similar way as described in previous paragraphs. This copy-on-write model can be used as part of implementing snapshots, volume copies, and virtual volume address range copies within a storage system implementation based on these directed acyclic graphs of logical extents. To make a snapshot as a read-only copy of an otherwise writable volume, a graph of logical extents associated with the volume is marked copy-on-write and a reference to the original composite logical extents are retained by the snapshot. Modifying operations to the volume will then make logical extent copies as needed, resulting in the volume storing the results of those modifying operations and the snapshots retaining the original content. Volume copies are similar, except that both the original volume and the copied volume can modify content resulting in their own copied logical extent graphs and subgraphs.

Virtual volume address range copies can operate either by copying block references within and between leaf logical extents (which does not itself involve using copy-on-write techniques unless changes to block references modifies copy-on-write leaf logical extents). Alternately, virtual volume address range copies can duplicate references to leaf or composite logical extents, which works well for volume address range copies of larger address ranges. Further, this allows graphs to become directed acyclic graphs of references rather than merely reference trees. Copy-on-write techniques associated with duplicated logical extent references can be used to ensure that modifying operations to the source or target of a virtual address range copy will result in the creation of new logical extents to store those modifications without affecting the target or the source that share the same logical extent immediately after the volume address range copy operation.

Input/output operations for pods may also be implemented based on replicating directed acyclic graphs of logical extents. For example, each storage system within a pod could implement private graphs of logical extents, such that the graphs on one storage system for a pod have no particular relationship to the graphs on any second storage system for the pod. However, there is value in synchronizing the graphs between storage systems in a pod. This can be useful for resynchronization and for coordinating features such as asynchronous or snapshot based replication to remote storage systems. Further, it may be useful for reducing some overhead for handling the distribution of snapshot and copy related processing. In such a model, keeping the content of a pod in sync across all in-sync storage systems for a pod is essentially the same as keeping graphs of leaf and composite logical extents in sync for all volumes across all in-sync storage systems for the pod, and ensuring that the content of all logical extents is in-sync. To be in sync, matching leaf and composite logical extents should either have the same identity or should have mappable identities. Mapping could involve some set of intermediate mapping tables or could involve some other type of identity translation. In some cases, identities of blocks mapped by leaf logical extents could also be kept in sync.

In a pod implementation based on a leader and followers, with a single leader for each pod, the leader can be in charge of determining any changes to the logical extent graphs. If a new leaf or composite logical extent is to be created, it can be given an identity. If an existing leaf or composite logical extent is to be copied to form a new logical extent with modifications, the new logical extent can be described as a copy of a previous logical extent with some set of modifications. If an existing logical extent is to be split, the split can be described along with the new resulting identities. If a logical extent is to be referenced as an underlying logical extent from some additional composite logical extent, that reference can be described as a change to the composite logical extent to reference that underlying logical extent.

Modifying operations in a pod thus comprises distributing descriptions of modifications to logical extent graphs (where new logical extents are created to extend content or where logical extents are copied, modified, and replaced to handle copy-on-write states related to snapshots, volume copies, and volume address range copies) and distributing descriptions and content for modifications to the content of leaf logical extents. An additional benefit that comes from using metadata in the form of directed acyclic graphs, as described above, is that I/O operations that modify stored data in physical storage may be given effect at a user level through the modification of metadata corresponding to the stored data in physical storage—without modifying the stored data in physical storage. In the disclosed embodiments of storage systems, where the physical storage may be a solid state drive, the wear that accompanies modifications to flash memory may be avoided or reduced due to I/O operations being given effect through the modifications of the metadata representing the data targeted by the I/O operations instead of through the reading, erasing, or writing of flash memory. Further, in virtualized storage systems, the metadata described above may be used to handle the relationship between virtual, or logical, addresses and physical, or real, addresses—in other words, the metadata representation of stored data enables a virtualized storage system that may be considered flash-friendly in that it reduces, or minimizes, wear on flash memory.

Leader storage systems may perform their own local operations to implement these descriptions in the context of their local copy of the pod dataset and the local storage system's metadata. Further, the in-sync followers perform their own separate local operations to implement these descriptions in the context of their separate local copy of the pod dataset and their separate local storage system's metadata. When both leader and follower operations are complete, the result is compatible graphs of logical extents with compatible leaf logical extent content. These graphs of logical extents then become a type of "common metadata" as described in previous examples. This common metadata can be described as dependencies between modifying operations and required common metadata. Transformations to graphs can be described as separate operations with a queue predicate relationship with subsequent modifying operations. Alternately, each modifying operation that relies on a particular same graph transformation that has not yet been known to complete across the pod can include the parts of any graph transformation that it relies on. Processing an operation description that identifies a "new" leaf or composite logical extent that already exists can avoid creating the new logical extent since that part was already handled in the processing of some earlier operation, and can instead implement only the parts of the operation processing that change the content of leaf or composite logical extents. It is a role of the leader to ensure that transformations are compatible with each other. For example, we can start with two writes come that come in for a pod. A first write replaces a composite logical extent A with a copy of formed as composite logical extent B, replaces a leaf logical extent C with a copy as leaf logical extent D and with modifications to store the content for the second write, and further writes leaf logical extent D into composite logical extent B. Meanwhile, a second write implies the same copy and replacement of composite logical extent A with composite logical extent B but copies and replaces a different leaf logical extent E with a logical extent F which is modified to store the content of the second write, and further writes logical extent F into logical extent B. In that case, the description for the first write can include the replacement of A with B and C with D and the writing of D into composite logical extent B and the writing of the content of the first write into leaf extend B; and, the description of the second write can include the replacement of A with B and E with F and the writing of F into composite logical extent B, along with the content of the second write which will be written to leaf extent F. A leader or any follower can then separately process the first write or the second write in any order, and the end result is B copying and replacing A, D copying and replacing C, F copying replacing E, and D and F being written into composite logical extent B. A second copy of A to form B can be avoided by recognizing that B already exists. In this way, a leader can ensure that the pod maintains compatible common metadata for a logical extent graph across in-sync storage systems for a pod.

Given an implementation of storage systems using directed acyclic graphs of logical extents, recovery of pods based on replicated directed acyclic graphs of logical extents may be implemented. Specifically, in this example, recovery in pods may be based on replicated extent graphs then involves recovering consistency of these graphs as well as recovering content of leaf logical extents. In this implementation of recovery, operations may include querying for graph transformations that are not known to have completed on all in-sync storage systems for a pod, as well as all leaf logical extent content modifications that are not known to have completed across all storage systems for the pod. Such querying could be based on operations since some coordinated checkpoint, or could simply be operations not known to have completed where each storage system keeps a list of operations during normal operation that have not yet been signaled as completed. In this example, graph transformations are straightforward: a graph transformation may create new things, copy old things to new things, and copy old things into two or more split new things, or they modify composite extents to modify their references to other extents. Any stored operation description found on any in-sync storage system that creates or replaces any logical extent can be copied and performed on any other storage system that does not yet have that logical extent. Operations that describe modifications to leaf or composite logical extents can apply those modifications to any in-sync storage system that had not yet applied them, as long as the involved leaf or composite logical extents have been recovered properly.

Further in this example, recovery of a pod may include the following:
- querying all in-sync storage systems for leaf and composite logical extent creations and their precursor leaf and composite logical extents if any that were not known to have completed on all in-sync storage systems for the pod;
- querying all in-sync storage systems for modifying operations to leaf logical extents that were not known to have completed on all in-sync storage systems for the pod;
- querying for logical address range copy operations as new references to pre-existing leaf and composite logical extents;
- identifying modifications that are not known to have completed to leaf logical extents and where that leaf logical extent is the source for a replacement leaf logical extent that also may need recovery—so that modifications can be completed to that leaf logical extent to all in-sync storage systems before the leaf logical extent copy is recovered on any in-sync storage systems that had not already copied it;
- completing all leaf and composite logical extent copy operations;
- applying all further updates to leaf and composite logical extents including naming new logical extent references, updating leaf logical extent content, or removing logical extent references; and
- determining that all necessary actions have completed, at which point further aspects of recovery can proceed.

In another example, as an alternative to using a logical extent graph, storage may be implemented based on a replicated content-addressable store. In a content-addressable store, for each block of data (for example, every 512 bytes, 4096 bytes, 8192 bytes or even 16384 bytes) a unique hash value (sometimes also called a fingerprint) is calculated, based on the block content, so that a volume or an extent range of a volume can be described as a list of references to blocks that have a particular hash value. In a synchronously replicated storage system implementation based on references to blocks with the same hash value, replication could involve a first storage system receiving blocks, calculating fingerprints for those blocks, identifying block references for those fingerprints, and delivering changes to one or a plurality of additional storage systems as updates to the mapping of volume blocks to referenced blocks. If a block is found to have already been stored by the first storage system, that storage system can use its reference to name the reference in each of the additional storage systems (either because the reference uses the same hash value or because an identifier for the reference is either identical or can be mapped readily). Alternately, if a block is not found by the first storage system, then content of the first storage system may be delivered to other storage systems as part of the operation description along with the hash value or identity associated with that block content. Further, each in-sync storage system's volume descriptions are then updated with the new block references. Recovery in such a store may then include comparing recently updated block references for a volume. If block references differ between different in-sync storage systems for a pod, then one version of each reference can be copied to other storage systems to make them consistent. If the block reference on one system does not exist, then it be copied from some storage system that does store a block for that reference. Virtual copy operations can be supported in such a block or hash reference store by copying the references as part of implementing the virtual copy operation.

With regard to a specific implementation for system recovery, the example method depicted in FIG. 18 includes receiving (1842), by at least one storage system among a plurality of storage systems (1814, 1824, 1828) synchronously replicating a dataset (1812), a request (1804) to modify the dataset (1812). Receiving (1842) a request (1804) to modify the dataset (1812) may be implemented similarly to receiving (1806) a request (1804) to modify the dataset (1842).

The example method depicted in FIG. 18 also includes generating (1844) recovery information (1852) indicating whether the request (1804) to modify the dataset (1812) has been applied on all storage systems in the plurality of storage systems (1814, 1824, 1828) synchronously replicating the dataset (1812). Generating (1844) recovery information (1852) indicating whether the request (1804) to modify the dataset (1812) has been applied on all storage systems in the plurality of storage systems (1814, 1824, 1828) synchronously replicating the dataset (1812) may be implemented using a variety of techniques described above, including: recovery based on difference tracking; recovery based on operation tracking, including recovery of overlapping writes; recovery of snapshots; recovery of metadata, and common metadata; recovery based on recording recent activity for operation tracking, including clearing out completed operations, using a sliding window, and using checkpoints; recovery of pods based on replicated directed acyclic graphs of logical extents; and tracking and recovery in a replicated content-addressable store. In short, various techniques may be used to generate recovery information, where the recovery information indicates on which storage systems among the plurality of storage systems (1814, 1824, 1828) the request (1804) to modify the dataset (1812).

The example method depicted in FIG. 18 also includes, responsive to a system fault, applying (1846) a recovery action in dependence upon the recovery information (1852) indicating whether the request to modify has been applied on all storage systems in the plurality of storage systems (1814, 1824, 1828) synchronously replicating the dataset (1812). A recovery action may be implemented by applying the request (1804) to modify the dataset (1812) on all storage systems that did not apply the request (1804) to modify the dataset (1812)—where the recovery information (1852) may include tracking information that indicates which storage systems among the plurality of storage systems (1814, 1824, 1828) did or did not apply one or more requests to modify the synchronously replicated dataset (1812), including the most recently received request (1804). However, in other cases, a recovery action may be implemented by backing out, or undoing, the application of the request (1804) to modify the dataset (1812) on the set of storage systems that completed, or partially completed, application of the request (1804). Generally, a default recovery action may be to identify each storage system that did not successfully complete the request (1804), and to apply the request (1804), in addition to any other pending requests to modify the dataset (1812). Other implementations of recovery actions are described above with reference to descriptions of: recovery based on difference tracking; recovery based on operation tracking, including recovery of overlapping writes; recovery of snapshots; recovery of metadata, and common metadata; recovery based on recording recent activity for operation tracking, including clearing out completed operations, using a sliding window, and using checkpoints; recovery of pods based on replicated directed acyclic graphs of logical extents; and tracking and recovery in a replicated content-addressable store.

Figure 19:
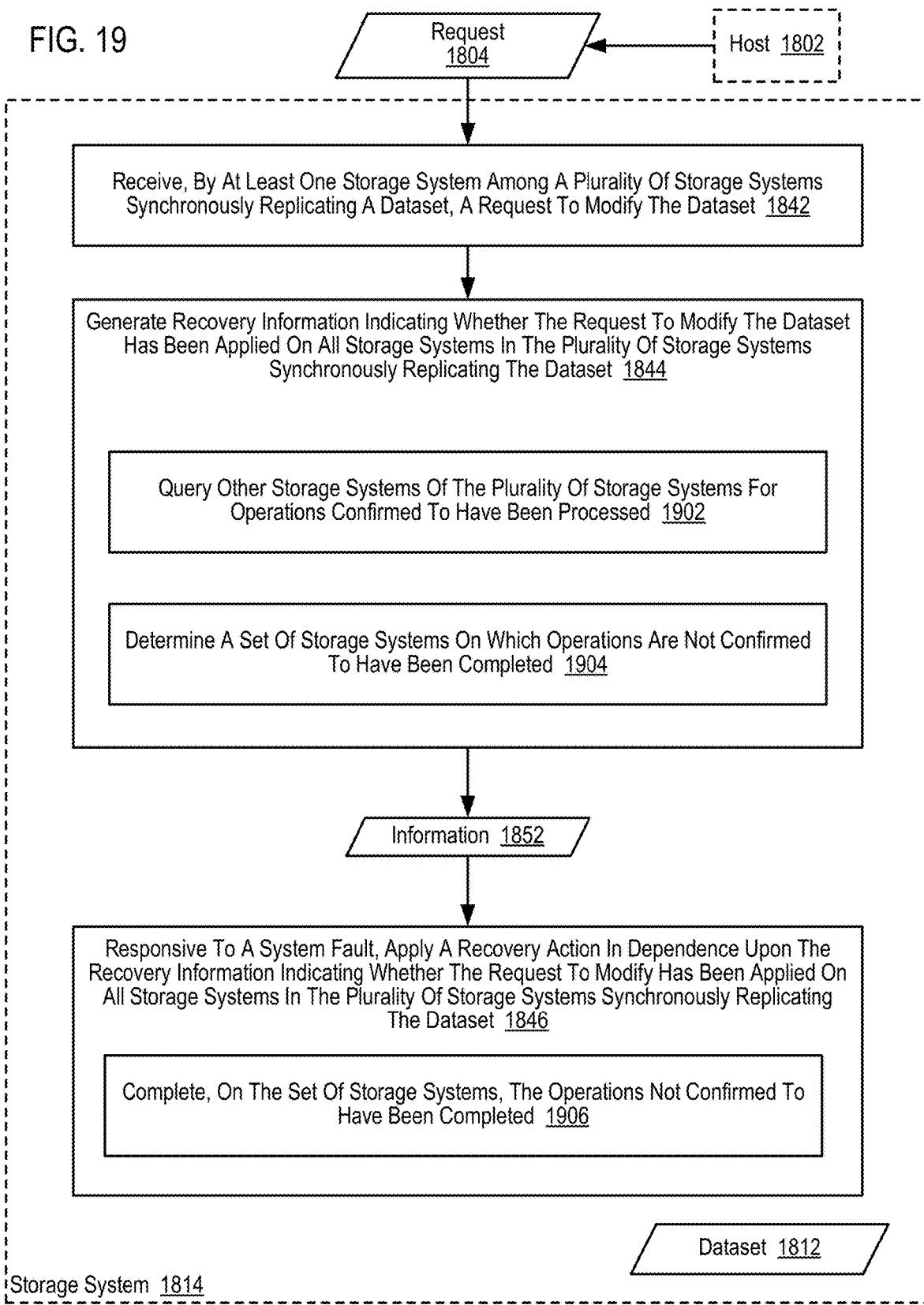
FIG. 19 sets forth a flow chart illustrating an example method for recovery for storage systems synchronously replicating a dataset according to some embodiments of the present disclosure.

For further explanation, FIG. 19 sets forth a flow chart illustrating an example method for recovery for storage systems synchronously replicating a dataset according to some embodiments of the present disclosure. The example method depicted in FIG. 19 is similar to the example method depicted in FIG. 18, as the example method depicted in FIG. 19 also includes receiving (1842), by at least one storage system among a plurality of storage systems (1814, 1824, 1828) synchronously replicating a dataset (1812), a request (1804) to modify the dataset (1812); generating (1844) recovery information (1852) indicating whether the request (1804) to modify the dataset (1812) has been applied on all storage systems in the plurality of storage systems (1814, 1824, 1828) synchronously replicating the dataset (1812); and responsive to a system fault, applying (1846) a recovery action in dependence upon the recovery information (1852) indicating whether the request to modify has been applied on all storage systems in the plurality of storage systems (1814, 1824, 1828) synchronously replicating the dataset (1812).

However, the example method depicted in FIG. 19 further specifies that generating (1844) the recovery information includes querying (1902) other storage systems of the plurality of storage systems for operations confirmed to have been processed; and determining (1904) a set of storage systems on which operations are not confirmed to have been completed; and further specifying that applying (1846) a recovery action includes completing (1906), on the set of storage systems, the operations not confirmed to have been completed.

Querying (1902) other storage systems of the plurality of storage systems for operations confirmed to have been completed or processed may be implemented as described above with reference to operation tracking for storage systems that support synchronously replicating virtual copying of volume ranges within and between volumes in a pod. Specifically, as described above with reference to clearing out completed operations across all storage systems after the operations is confirmed to have been processed on all in-sync storage systems for the pod may be implemented by having the storage system which received the request and which signaled completion send a message to all storage systems for the pod after completion is signaled, allowing each storage system to clear them out. Recovery then involves querying for all recorded operations that have not been cleared out across all in-sync storage systems for the pod that are involved in the recovery.

Determining (1904) the set of storage systems on which operations are not confirmed to have been completed may be implemented based on results from querying (1902) the other storage systems, where the set of storage systems is populated by one or more storage systems for which the querying (1902) included a list of operations that have not been cleared out.

Completing (1906), on the set of storage systems, the operations not confirmed to have been completed may be implemented by re-issuing the operations to the set of storage systems as described herein and sending (1812), for each uncompleted operation, information describing a modification to the dataset according to a corresponding request, and completing the steps described herein.

Figure 20:
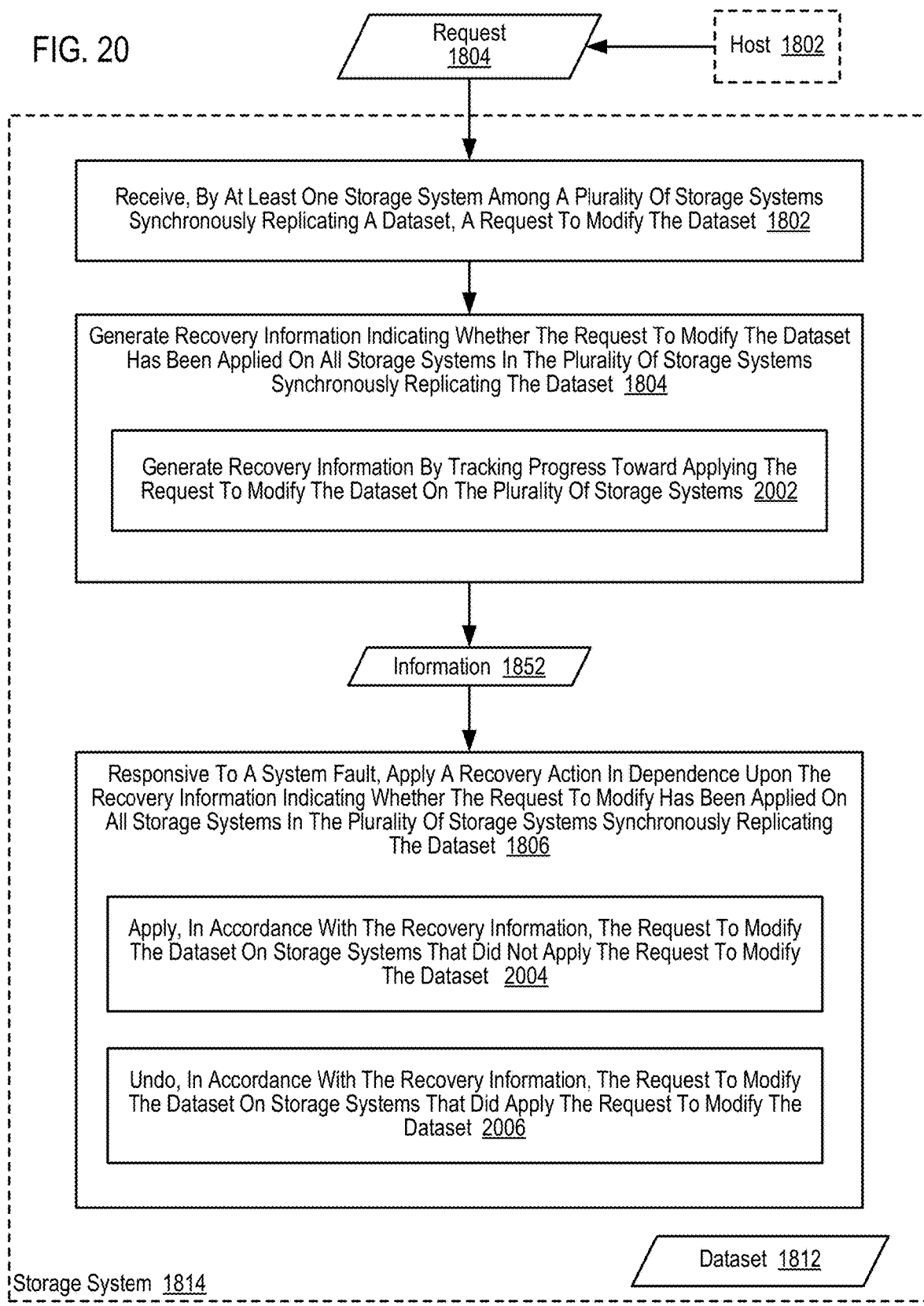
FIG. 20 sets forth a flow chart illustrating an example method for recovery for storage systems synchronously replicating a dataset according to some embodiments of the present disclosure.

For further explanation, FIG. 20 sets forth a flow chart illustrating an example method for recovery for storage systems synchronously replicating a dataset according to some embodiments of the present disclosure. The example method depicted in FIG. 20 is similar to the example method depicted in FIG. 18, as the example method depicted in FIG. 20 also includes receiving (1842), by at least one storage system among a plurality of storage systems (1814, 1824, 1828) synchronously replicating a dataset (1812), a request (1804) to modify the dataset (1812); generating (1844) recovery information (1852) indicating whether the request (1804) to modify the dataset (1812) has been applied on all storage systems in the plurality of storage systems (1814, 1824, 1828) synchronously replicating the dataset (1812); and responsive to a system fault, applying (1846) a recovery action in dependence upon the recovery information (1852) indicating whether the request to modify has been applied on all storage systems in the plurality of storage systems (1814, 1824, 1828) synchronously replicating the dataset (1812).

However, the example method depicted in FIG. 20 further specifies that generating (1844) the recovery information includes: generating (2002) recovery information (1852) by tracking progress toward applying the request (2004) to modify the dataset (1812) on the plurality of storage systems.

Generating (2002) recovery information (1852) by tracking progress toward applying the request (1804) to modify the dataset (1812) on the plurality of storage systems may be implemented, as described above, by using checkpointing to determine operations that are confirmed to have been processed or completed. In this way, the generated (2002) recovery information (1852) may indicate which storage systems have or have not processed or completed the request (1804) to modify the dataset (1812).

Applying (2004) the request (1804) to modify the dataset (1812) may be implemented by using the recovery information (1852) to identify the one or more storage systems on which to re-issue the request (1804), which may be implemented as described above and sending, for the request (1804) to modify the dataset (1812), information describing a modification to the dataset according to the request (1804), and completing the steps described above.

Undoing (2006) the request (1804) to modify the dataset (1812) on storage systems that did not apply the request to modify the dataset (1812) may be implemented by using the recovery information (1852) to identify the one or more storage systems on which the request (1804) was processed or completed. Further, undoing (2006) the request may depend upon, for each storage system on which the request (1804) was completed, maintaining, on each storage system, a log of changes corresponding to each request to modify the dataset (1812), where each request to modify the dataset (1812) may further be associated with an identifier. The log may also, for each request identifier, associate a version of a metadata representation that includes a directed acyclic graph that represents the state of the dataset prior to applying the request identifier. In some examples, such versioning information may correspond to snapshots. As discussed above, given a virtualized representation of the dataset, and given that only differences to the metadata representation of the dataset corresponding to a particular request are stored, in addition to overwritten data by the corresponding request to modify the dataset, storage requirements for the log should be minimized. In this way, using the log, a controller of a storage system may restore a state of the dataset to a prior state before application of the request (1804), and define a current state of the metadata representation to the prior state before application of the request (1804).

Figure 21:
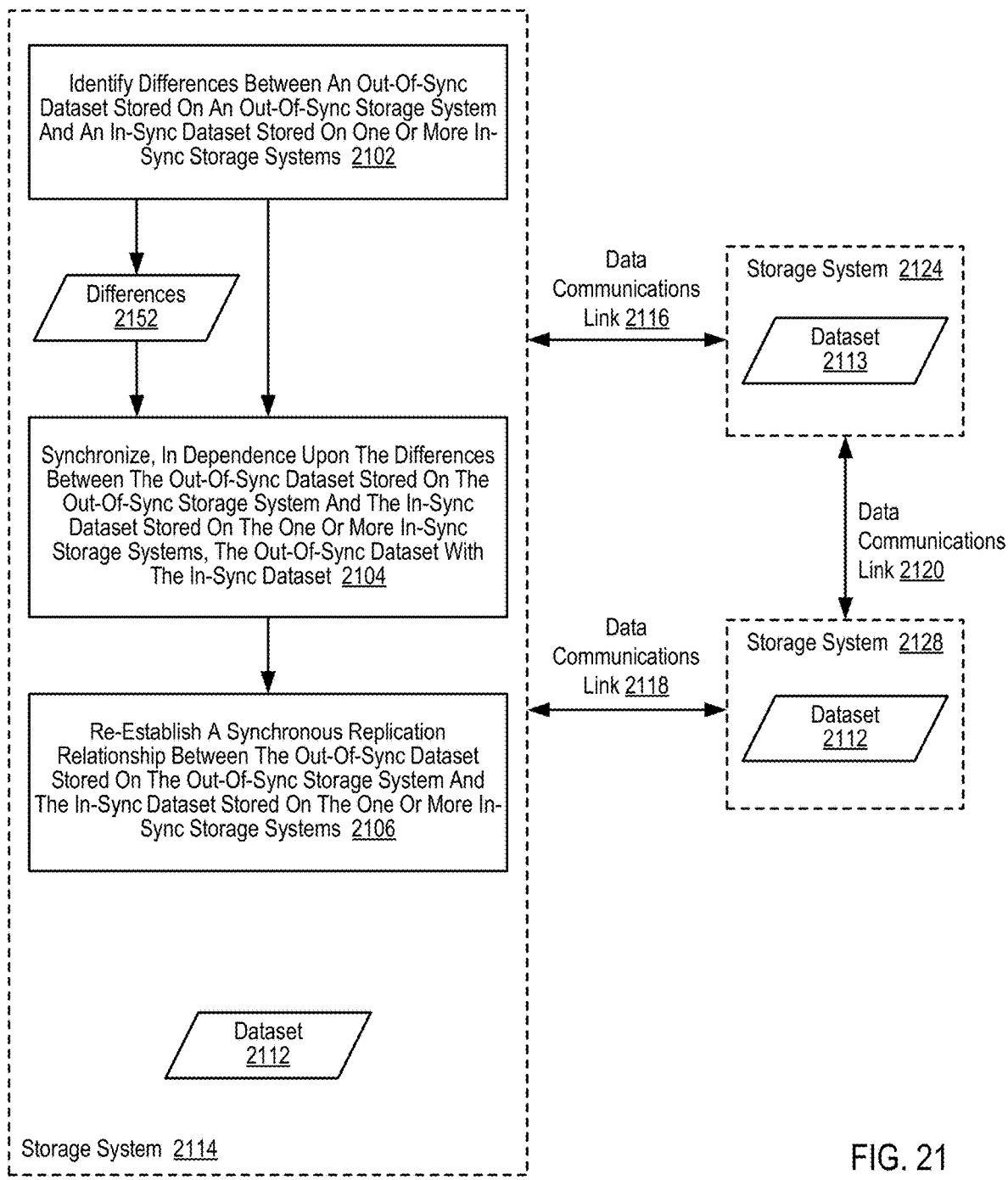
FIG. 21 sets forth a flow chart illustrating an example method for resynchronization for storage systems synchronously replicating a dataset according to some embodiments of the present disclosure.

For further explanation, FIG. 21 sets forth a flow chart illustrating an example method for resynchronization for storage systems synchronously replicating a dataset according to some embodiments of the present disclosure. Although depicted in less detail, the storage systems (2114, 2124, 2128) depicted in FIG. 21 may be similar to the storage systems described above with reference to FIGS. 1A-1D, FIGS. 2A-2G, FIGS. 3A-3B, or any combination thereof. In fact, the storage systems (2114, 2124, 2128) depicted in FIG. 21 may include the same, fewer, additional components as the storage systems described above.

The example storage system configuration depicted in FIG. 21 includes a dataset (2112) and a plurality of storage systems (2114, 2124, 2128) across which the dataset (2112) may be synchronously replicated. The dataset (2112) depicted in FIG. 21 may be embodied, for example, as the contents of a particular volume, as the contents of a particular shard of a volume, or as any other collection of one or more data elements. The dataset (2112) may be synchronized across a plurality of storage systems (2114, 2124, 2128) such that each storage system (2114, 2124, 2128) retains a local copy of the dataset (2112). In the examples described herein, such a dataset (2112) is synchronously replicated across the storage systems (2114, 2124, 2128) in such a way that the dataset (2112) can be accessed through any of the storage systems (2114, 2124, 2128) with performance characteristics such that any one storage system in the cluster doesn't operate substantially more optimally than any other storage system in the cluster, at least as long as the cluster and the particular storage system being accessed are running nominally. In such systems, modifications to the dataset (2112) should be made to the copy of the dataset that resides on each storage system (2114, 2124, 2128) in such a way that accessing the dataset (2112) on any of the storage systems (2114, 2124, 2128) will yield consistent results. For example, a write request issued to the dataset must be serviced on all storage systems (2114, 2124, 2128) or serviced on none of the storage systems (2114, 2124, 2128).

Further, for a dataset (2112), a plurality of storage systems (2114, 2124, 2128) across which the dataset (2112) will be synchronously replicated may be carried out, for example, by examining a pod definition or similar data structure that associates a dataset (2112) with one or more storage systems (2114, 2124, 2128) that nominally store that dataset (2112). In such an example, the pod definition may include at least an identification of a dataset (2112) and a set of storage systems (2114, 2124, 2128) across which the dataset (2112) is synchronously replicated. Such a pod may encapsulate some of number of (perhaps optional) properties including symmetric access, flexible addition/removal of replicas, high availability data consistency, uniform user administration across storage systems in relationship to the dataset, managed host access, application clustering, and so on. Storage systems can be added to a pod, resulting in the pod's dataset (2112) being copied to that storage system and then kept up to date as the dataset (2112) is modified. Storage systems can also be removed from a pod, resulting in the dataset (2112) being no longer kept up to date on the removed storage system. In such examples, a pod definition or similar data structure may be updated as storage systems are added to and removed from a particular pod.

The example storage system depicted in FIG. 21 also includes one or more data communications links (2116, 2118, 2120) between each of the plurality of storage systems (2114, 2124, 2128) to be used for synchronously replicating the dataset (2112). In the example method depicted in FIG. 21, the storage systems (2114, 2124, 2128) in a pod communicate with each other both for high bandwidth data transfer, and for cluster, status, and administrative communication. These distinct types of communication could be over the same data communications links (2116, 2118, 2120) or, in an alternative embodiment, these distinct types of communication could be over separate data communications links (2116, 2118, 2120).

Additional details for implementing storage systems that synchronously replicate a dataset may be found within U.S. Provisional Applications 62/470,172 and 62/518,071, which are included by reference in their entirety.

As depicted in FIG. 21, multiple storage systems (2114, 2124, 2128) are synchronously replicating a dataset (2112) and may be in communication with each other during normal operation for receiving and processing I/O requests from a host computing device. However, in some instances, one or more of the storage systems (2114, 2124, 2128) may fail, restart, upgrade or otherwise be unavailable, and consequently the one or more storage systems (2114, 2124, 2128) may become out-of-sync. In order to resume normal operation, the in-sync storage systems and the out-of-sync storage systems undergo recovery and re-synchronization operations—where recovery is described in greater detail in application Ser. No. 15/696,418, which is included by reference herein in its entirety, and re-synchronization is described below.

Initial synchronization of a storage system added to a pod—or subsequent resynchronization of a storage system that had been detached from a pod—includes copying all content, or all missing content, from an in-sync storage system for a pod to an uninitialized, or out-of-sync, storage system prior to that storage system being brought online for active use in providing the pod service. Such an initial synchronization may be performed for each storage system introduced as an extension of a pod.

A difference between initial synchronization of content to a storage system added to a pod versus resynchronizing a storage system that had, through some set of events, become out-of-sync relative to the in-sync storage systems for a pod, are conceptually quite similar. In the case of a resynchronization, for example, all blocks that may differ between the in-sync pod member storage systems and the out-of-sync pod member are made up-to-date before the out-of-sync pod member can come back online as an in-sync pod member storage system for the pod. In an initial synchronization, this may include updating all blocks, and consequently, it is conceptually similar to resynchronization where all blocks may differ. In other words, initial synchronization may be considered equivalent to reattaching a storage system that was detached at the beginning of a pod, prior to any volume having been modified from an initial state, or prior to any volume having been created or added to the pod.

Generally, resynchronization accomplishes at least two things to bring a detached pod back to a point where it is in-sync and can be brought back online: (a) backing out, overwriting or otherwise replacing, any changes that were persisted on the detached pod around the time it was detached that had not been retained by the in-sync pod members, and (b) updating the attaching storage system to match content and common metadata for the pod. To be brought back online, a reattachment of a storage system may include re-enabling synchronous replication, re-enabling symmetric synchronous replication, and re-enabling the receiving and processing of operations for the pod on the reattached storage system. Operations for the pod may include reads, data modification operations, or administrative operations.

In the process of detaching a storage system, some number of operations may have been in progress for the pod. Further, some of those operations may have persisted only on the detached storage system, other operations may have persisted only on the storage systems that remained in-sync immediately after the detachment was processed, and other operations may have persisted on both the detached storage system and the storage systems that remained in-sync. In this example, because the in-sync state for the pod could not have recorded the operations persisted only on the detached storage system, any updates to the in-sync content and common metadata for the pod since the detachment of the storage system would not include those updates, which is the reason these updates should be backed out—either explicitly by undoing the updates, or implicitly by overwriting that content as part of a resynchronization process. On the in-sync storage systems themselves, there may be two lists to be accounted for prior to starting a reattachment of a detached storage system: (a) a list of operations, which may be referred to as an in-sync pending operations list at detach, that were in progress and were persisted on any storage system that was in-sync when the reattaching storage system was detached from a pod and that remained in-sync for any duration of time after the detach from the pod, and (b) a list of changes to content or common metadata during the window of time the reattaching storage system was detached from the pod. Further, depending on the pod and storage system implementations, the two lists associated with the in-sync storage systems may be represented by a single list: content not known to be on the reattaching storage system. In a pod where multiple storage systems are detached, and in particular where those storage systems at different times, tracking of changes since each detach may yield separate lists—and how those lists are described may vary considerably from one pod implementation to another. In some cases, an additional issue beyond tracking changes from the time of detach and copying those changes to the attaching storage system is ensuring that new modifying operations received during the resynchronization are applied to the attaching storage system. Conceptually, this problem may be described as ensuring that operations to copy data and processing of modifying operations received by the pod may be merged in such a way that the result is correctly up-to-date at the end of the attach and prior to considering the attaching storage system to be in-sync for the pod.

With respect to simple changed content resynchronization, one model for resynchronization is to generate a complete list of blocks—a detached block list—that may differ between the in-sync storage systems and the attaching storage system, and to start replicating any modifying operations as they would happen for a follower storage system. A complete list of blocks that may differ may include those from the in-sync pending operations list at detach from the in-sync storage systems, the pending operations at the time of detach from the attaching storage system, and blocks that were known to have changed since the detach. Modifying operations may store their modifying content as described, and resynchronization may proceed by locating ranges of blocks from the detached block list and copying those blocks, in sections, from an in-sync storage system to the attaching storage system. In this example, while copying a particular section, incoming modifying operations that overlap with the section being copied may be held off during the copy, or an arrangement may be made to apply those modifying operations after the section has been copied. This solution may create a problem for virtual block range copy operations, such as virtualized implementations of the EXTENDED COPY operation. Further, the source range for the copy may not yet be resynchronized, yet the target range may have already been resynchronized, which means that a straightforward implementation of the virtual block range copy operation may (depending on the implementation) fail to either copy the correct data to the target range because the data is not known at the time the virtual block range copy operation is received, or may fail to resynchronize the target range correctly because the resynchronize operation itself may have presumed the target range was correctly synchronized when it was never resynchronized in its final form. However, there are several solutions for this problem. One solution is to disallow virtual block range copy operations during resynchronization. This may work in many cases because common uses of virtual block range copy operations—including client operating file systems file copy operations and virtual machine clone or migration operations—typically respond to virtual block range copy failures by copying content directly themselves through sequences of read and write requests. Another solution is to remember incomplete virtual range copy operations, not modifying operations that overwrite the target address range of any virtual address range copy operation, and then perform the copy operation while accounting for overwrites when the source data becomes available. Given that the target of a resynchronization may not know that the source data for a copy is not correct, all such operations may have to be deferred until the entire copy completes. Optimizations are possible where the target of a resynchronization is made aware of which regions have not yet been copied, or may be aware of when a resynchronization has completed processing a particular region of a volume.

Another aspect of resynchronizing storage systems may be updated block tracking. For example, keeping a list of all individual blocks that are modified while a storage system was detached (and then resynchronizing them individually) may be impractical in some cases because an extended outage may result in a large number of blocks—and some storage systems cannot read large collections of non-sequential blocks very efficiently. Consequently, in some cases, it may be more practical to begin tracking regions, for example 1 MB ranges of a volume, to reduce the amount of tracked metadata. This course-grained tracking may be updated behind shorter term operation tracking, and may be preserved for as long as is needed to handle a resynchronization of any out-of-date storage system, whether down for minutes, hours, days, or weeks. With solid state storage, as opposed to mechanical spinning storage, tracking which individual blocks of a volume, or of a collection of volumes or an entire pod, may be quite practical, as is resynchronizing only those individual blocks that have changed. Generally, there is very little random read and write penalty, and there is little penalty to reading from a multi-level map, and consequently, it is relatively easy to merge fine-grained activity as operations over short time periods (for example, in the 100 millisecond to 10 second range or every few hundred to every few thousand operations), into a fine-grained map naming all modified blocks. Further, a list of recent activity may be a list that covers content modifications that have been recorded recently into journaling devices (fast write storage such as various flavors of NVRAM intended to support high write bandwidth and a high overwrite rate), but with metadata about those modifications perhaps preserved in journals for longer time periods than the actual content. In this example, a merged list of all activity may be a bitmap where each bit represents a block or a small group of blocks, or it may be a list of block numbers or lists of block ranges organized by volume into a tree structure, such as a B-tree. Such lists of block numbers may be compacted easily because nearby block numbers may be stored as differences from one block number to another block number.

Resynchronizing storage systems may also include block tracking by tracking sequence numbers. For example, some storage systems may, during normal operation, associate a respective sequence number with a respective modification—for all modifications. In such cases, the last sequence number known to have been synchronized with a storage system detached from a pod may be all that is needed to query an in-sync storage system for the pod to find all content that has been modified since the detach, including any content that might not have been replicated to the detached array round the time of the detach.

Resynchronizing storage systems may also include tracking changes as a snapshot. For example, snapshots may be used to track changes since some time in the past, and a storage system may manufacture a snapshot at the time of a detach by excluding content that is not known to have completed. Alternatively, snapshots may be created on a regular basis, or with some periodicity, where the time of the snapshot creation may be compared to a time of a detach to determine which snapshot may serve as a basis for resynchronizing the detached storage system. As a variation, any snapshot created across a pod prior to a detach should be present in both the in-sync and detached storage systems for the pod and may be used in various ways for resynchronization. For example, the content of a storage system that is being reattached may be reverted back to its last synchronized snapshot that predates the detach, and then rolled forward from that point to match current in-sync content in the pod. Generally, snapshots indicate a difference relative to a previous snapshot or indicate a difference to current content. Using these features of snapshots, resynchronizing content to a reattaching storage system may include replicating differences between the time of the reattach and the time of the last complete pre-detach synchronized snapshot. In some cases, resynchronization may use a snapshot-based model as a fallback. For example, short outages (such as outages of about a few minutes) may be handled through fine-grain tracking or recording and replaying operations that have occurred since the time a storage system detached, and longer outages may be handled by reverting to snapshots taken every few minutes—where the threshold number of minutes may be a default value or specified by a user or an administrator. Such a configuration may be practical because relatively infrequent snapshots may have low long-term overhead but may generate more data to be resynchronized. For example, a ten second outage may be handled through replaying recorded operations, where resynchronization may occur in ten seconds or less—whereas a snapshot taken five minutes prior to a detach may, in some cases, transfer up to five minutes worth of content modification. In other cases, resynchronization after an outage may be based on accumulated changes, such as by limits on the accumulated size of a short-term map.

In some cases, resynchronization may be based on asynchronous replication. For example, the snapshot-based resynchronization model discussed above may also support another resynchronization model: storage systems that support asynchronous or periodic replication may use the snapshot mechanisms to replicate content during resynchronization. An asynchronous or periodic replication model may potentially copy out-of-date data during short periods of outage, where periodic replication models may be based on snapshots or checkpoint differencing, and where the differencing automatically handles outages. As for asynchronous replication, there may be a reliance on snapshots or checkpoints as a backup for extended outages, similarly to the discussion above, and as a result, it may be practical to combine implementations or to utilize such an available asynchronous or periodic replication implementation for resynchronization. However, one issue may be that asynchronous or periodic replication models may not be configured to get a replication target all the way up-to-date, or completely in-sync. As a result, with such resynchronization implementations, new in-flight operations may also be tracked so that the in-flight operations may be applied so that all modifications to an attaching storage system are current for a pod.

In some cases, resynchronization may be implemented to include multi-phase resynchronization. For example, in a first phase, content up to some point may be replicated from in-sync storage systems for a pod to an attaching storage system for a pod. In this example, a second snapshot may be taken during the attach and differences between a first snapshot that was the last snapshot known to have been synchronized prior to a detach, and the differences between the first snapshot and the second snapshot to be replicated to the attaching storage system. Such a mechanism may get the attaching storage system more closely in sync than it was prior to the attach, however, it may still not be up-to-date. As such, a third snapshot may be created, and differences between the third snapshot and the second snapshot may be determined, and then replicated to an attaching storage system. This third snapshot, and the determined differences, may make up part of the differences between the content replicated up to the second snapshot and the current content. Further, it is possible that additional snapshots may be taken and replicated to get within a few seconds of being up-to-date. At this point, modifying operations may be paused until a last snapshot is replicated—thereby bringing the attaching storage system up-to-date for the pod. In other cases, it is possible to switch after replicating one or more snapshots to some mode where modifying operations that are received after a final resynchronization snapshot are handled in such a way that they can be merged with the replicated snapshot content. Such an implementation may include having the attaching storage system keep track of those modifying operations, and apply the modifying operations after the snapshot replication is complete—or after the snapshot replication is known to have synchronized specific volume regions affected by particular modifying operation. This implementation may have additional overhead since tracking all operations until the underlying content is known to have been copied may result in a large number of tracked operations. An alternative is to consider the content related to recently received operations, for example writes that rely on particular common metadata or extended copy operations from one block range to another block range, and request that the resynchronization prioritize the processing of that content or that common metadata information. In this way, any received operations tied to content known to have been copied by such a process may then have tracking structures released much more quickly.

In some cases, resynchronization may be implemented to use directed acyclic graphs of logical extents. As described above, replicated storage systems may be based on directed acyclic graphs of logical extents. In such a storage system, the process of resynchronization may be expected to replicate the logical extent graphs from in-sync storage systems for a pod to an attaching storage system for a pod— including all leaf logical extent content, and ensuring that the graphs are synchronized and are being kept synchronized prior to enabling an attaching storage system as an in-sync pod member. Resynchronization in this model may proceed by having a target storage system for an attach retrieve a top-level extent identity for each volume—or for each file or object in a file or object based storage system. Any logical extent identity that is already known to the attach target may be considered up-to-date, but any unknown composite logical extent may be retrieved and then decomposed into underlying leaf or composite logical extents, each of which is either already known to the attach target or unknown to the attach target. Further, any unknown leaf logical extent may retrieve content, or can retrieve identities for stored blocks to determine if the block are already stored by the target storage system—with unrecognized blocks then being retrieved from an in-sync storage system. However, such an approach may not always result in resynchronization because some number of extents from around a time of a detach of a storage system may have a same identity, but different content, because only operations that marked logical extents are read-only may form new logical extents as a result of modifying operations. Further, in-progress modifying operations may have completed differently on different storage systems during faults that lead to a detach, and if those modifying operations were to non-read-only logical extents, then those logical extents may have the same identity on two storage systems but have different content. However, some solutions include when one set of storage systems for a pod detach another storage system, the set of storage systems may mark the leaf and composite logical extents associated with in-progress modifying operations, and associate those leaf and composite logical extents with a future reattach operation that includes the detached storage system. Similarly, the reattaching storage system for a pod may identify the leaf and composite logical extents that it knew of that were associated with in-progress logical extents. As a result, two sets of logical extents whose contents (for leaf extents), or whose references (for composite logical extents), may need to be transferred in addition to transferring any unknown leaf or composite logical extents. Alternatively, coordinated snapshots may be taken periodically within replicated pods, and a target of a reattach operation may ensure that logical extents created after the last coordinated snapshot are discarded or ignored during resynchronization. As yet another alternative, during a time period for which a storage system is detached from a pod, the remaining in-sync storage systems may manufacture a snapshot that represents the content from all completed operations, that that replays all potentially in-progress operations to apply to pod content that post-dates the snapshot—this results in any content not already replicated to the detached storage system being given new logical extent identities that the detached storage system may never have received.

Another issue that may face resynchronization implementations is getting extent graph based synchronous replication fully synchronized and running live. For example, resynchronization may proceed by first transferring a more recent snapshot, such as one created at a beginning of an attach, by having the target storage system retrieve it from in-sync storage systems in the manner described above, where the target incrementally requests leaf and composite logical extents that it does not have. This process may include accounting for in-progress operations at the time of the detach, where at the end of this process, the content up to that more recent snapshot is synchronized between the in-sync storage systems for the pod and the attaching storage system. Further, this process may be repeated with another snapshot, and possibly with additional snapshots, to get the target storage system closer to the in-sync storage system. However, at some point, the live data may also have to be transferred, and to do this, replication of live modifying operations may be enabled for transfer to an attaching storage system after a last resynchronization snapshot, such that all modifying operations not included in the snapshot may be delivered to the attaching storage system. This implementation results in operations that describe modifications to leaf and composite logical extents that are included in the snapshot, where these descriptions may include the create of new leaf and composite logical extents (with specified content) or the replacement of existing leaf and composite logical extents with modified copies of those extents with new identities. In cases where an operation description creates new logical extents or replaces logical extents already known to an attaching storage system, the operation may be processed normally as if the attaching storage system is in-sync. In cases where the description for an operations includes at least one replacement of a logical extent not already known to an attaching storage system, that operation may be made durable to allow completion, but full processing of the operation may be delayed until the logical extent being replaced is received. Further, to reduce overhead associated with these operations that are waiting for such a logical extent content transfer, an attaching storage system may prioritize those logical extents to be retrieved earlier than other logical extents. In this example, in dependence upon how efficiently a storage system can handle these operations awaiting such a pre-existing logical extent, there may be no reason to transfer any sequence of snapshot images prior to enabling live operations. Instead, a resynchronization snapshot that describes state information from a time of a detach (or from some time prior to the detach) could be transferred—with operations being processed as described earlier, while transferring the snapshot from in-sync storage systems to the attaching storage system, also as described earlier.

In some cases, an issue that may face a resynchronization implementation is preserving block references during a resynchronization. For example, in a synchronously replicated storage system, a specific written block, or a specific set of blocks associated with an operation, may be given an identify that is included in the operation description for the write of that block, or that block set. In this example, a new write that replaces that block, or some or all of the block set, may supply a new identity for the block or block set, where this new identity may be built from a secure hash of the block content (such as using SHA-256 or some other mechanism that has a suitably infinitesimal chance of differing blocks yielding the same hash value), or the new identity may simply identity the write itself in a unique way irrespective of whether two writes included identical block contents. For example, the new identity may be a sequence number or a timestamp. Further, if the new identity for a block or block set is shared in the distributed description of a write operation and stored in some map in each storage system as part of writing the block or block set, then leaf logical extents may describe their content in terms of these block or block set identities. In such implementations, resynchronization of leaf extents may reference blocks or block sets already stored in an attaching storage system rather than transferring them from an in-sync storage system. This implementation may reduce the total data transferred during a resynchronization. For example, data which had already been written to the attaching storage system around the time of a detach, but that was not included in a resynchronization snapshot, may have been stored with that identity, and may not need to be transferred again because that block or block set identity is already known and stored. Further, if some number of virtual extended copy operations resulted in the copying of block references between two leaf logical extents during the time that a storage system was detached, then the block or block set identities may be used to ensure that the virtually copied blocks are not transferred twice.

In some cases, resynchronization implementations may use content-addressable stores, where stored blocks may have a unique identity that may be based on a secure hash of block content. In this example, resynchronization may proceed by transferring a list of all block identities related to a pod on in-sync storage systems to an attaching storage system, along with a mapping of those blocks identities to volumes (or files or objects) in the pod. In this case, an attach operation may proceed by transferring these blocks the attaching storage system is not aware of from an in-sync storage system for the pod—which may be integrated with processing of live operations that change a mapping from volume to content. Further, if some earlier version of a mapping from pod content to block identities is known from before a storage system detach from the pod, then differences between that earlier version and the current version may be transferred instead of transferring an entire mapping.

Continuing with the example method depicted in FIG. 21, the example method includes identifying (2102) differences (2152) between an out-of-sync dataset (2113) stored on an out-of-sync storage system (2124) and an in-sync dataset (2112) stored on one or more in-sync storage systems (2114, 2128). Identifying (2102) differences (2152) between an out-of-sync dataset (2113) stored on an out-of-sync storage system (2124) and an in-sync dataset (2112) stored on one or more in-sync storage systems (2114, 2128) may be implemented using various techniques, as described in detail above. One example technique includes one or more controllers using block tracking to keep a list of all individual blocks that are modified while any given storage system is detached, such as storage system (2124), and as described in detail above. Other example techniques include using a combination of block tracking and snapshots, or block tracking by sequence numbers, among other techniques, as described in detail above.

In this example, block tracking is used to generate a list of all individual blocks that are modified on the in-sync storage systems, where block tracking begins when the storage system (2124) is detected to have detached up until the storage system (2124) is reattached—which is when the next step, synchronizing (2104), described below, begins. Further, a "detached" storage system may be considered a storage system that is listed as a pod member, but that is not listed as in-sync for the pod—where storage systems that are listed as pod members are in-sync if the pod members are online, or currently available, for actively serving data for the pod. In this example, each storage system member of a pod may have its own copy of a membership list indicating member storage systems for the pod, where the membership list includes which storage systems are known to be currently in-sync, and which storage systems are included in the entire set of pod members. Generally, to be online for a pod, a membership list for a given storage system indicates that the given storage system is in-sync for the pod, and where the given storage system is able to communicate with all other storage systems in the membership list for the given storage system indicated as being in-sync for the pod. If a storage system is unable to communicate with other storage systems indicated by the membership list as being in-sync, then the storage system stops processing incoming requests (or completes them with errors or exceptions) to modify the dataset until the storage system can verify that it is again in-sync. A particular storage system may determine that a suspect storage system should be detached, which allows the particular storage system to continue operating based on being in-sync with the storage systems in the membership list indicated as being in-sync. Further in this scenario, to avoid a "split brain" situation where multiple, isolated, storage systems are processing I/O requests, the suspect storage system is prevented from continued processing by the particular storage system and the suspect storage system requesting a mediation service to determine which storage system is to continue processing I/O requests directed to the pod, and which storage system is to stop processing I/O requests directed to the pod. Additional details for such a mediation process is described further in application Ser. No. 15/703,559, which is included by reference in its entirety.

The example method of FIG. 21 also includes synchronizing (2104), in dependence upon the differences (2152) between the out-of-sync dataset (2113) stored on the out-of-sync storage system (2124) and the one or more in-sync storage systems (2114, 2128), the out-of-sync dataset (2113) with the in-sync dataset (2112). Synchronizing (2104) the out-of-sync dataset (2113) with the in-sync dataset (2112) may be implemented using multiple techniques, as described above. One example technique for resynchronization includes—given the list of modified blocks generated while the storage system (2124) was detached—replicating any modifying operations corresponding to the list of modified blocks on the reattached storage system (2124). In this example, replicating the modifying operations may be implemented similarly to how a follower storage system carries out I/O operations provided by a leader storage system when the follower storage system and the leader storage system are in-sync, as described above with reference to processing I/O operations. As described above, resynchronization may also include modifying operations may store modifying content, and resynchronization may also be implemented by locating ranges of blocks from the detached block list and copying those blocks, in sections from an in-sync storage system to the attaching storage system. Other example techniques for implementing synchronization (2104) are described in greater detail above.

The example method of FIG. 21 also includes re-establishing (2106) a synchronous replication relationship between the out-of-sync dataset (2113) stored on the out-of-sync storage system (2124) and the in-sync dataset (2112) stored on the one or more in-sync storage systems (2114, 2128). Re-establishing (2106) a synchronous relationship between the out-of-sync dataset (2113) and the in-sync dataset (2112) may be implemented similarly to initially establishing a synchronous replication relationship between storage systems when a pod is first created, as described with reference to FIGS. 4-7 in application Ser. No. 15/713,153, where this reference application is included by reference in its entirety, and includes: identifying (2102), for a dataset, a plurality of storage systems across which the dataset will be synchronously replicated; configuring (2104), one or more data communication links between each of the plurality of storage systems to be used for synchronously replicating the dataset; exchanging (2106), between the plurality of storage systems, timing information for at least one of the plurality of storage systems; and establishing (2108), in dependence upon the timing information for at least one of the plurality of storage systems, a synchronous replication lease, where the synchronous replication lease identifies a period of time during which the synchronous replication relationship is valid.

Figure 22:
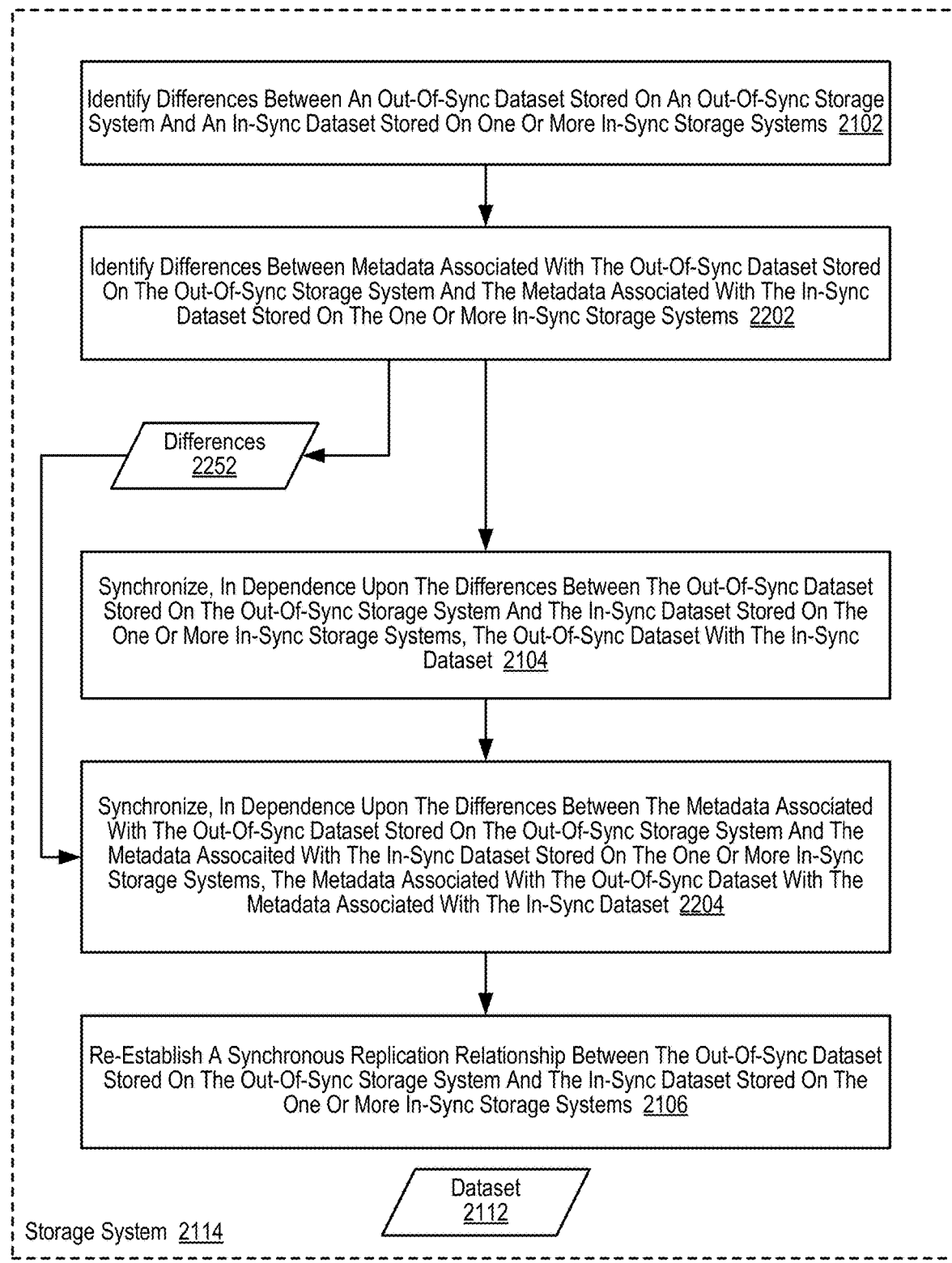
FIG. 22 sets forth a flow chart illustrating an additional example method for resynchronization for storage systems synchronously replicating a dataset according to some embodiments of the present disclosure.

For further explanation, FIG. 22 sets forth a flow chart illustrating an additional example method for resynchronization for storage systems synchronously replicating a dataset according to some embodiments of the present disclosure. The example method depicted in FIG. 22 is similar to the example method depicted in FIG. 21, as the example method in FIG. 22 also includes: identifying (2102) differences (2152) between an out-of-sync dataset (2113) stored on an out-of-sync storage system (2124) and an in-sync dataset (2112) stored on one or more in-sync storage systems (2114, 2128); synchronizing (2104), in dependence upon the differences (2152) between the out-of-sync dataset (2113) stored on the out-of-sync storage system (2124) and the one or more in-sync storage systems (2114, 2128), the out-of-sync dataset (2113) with the in-sync dataset (2112); and re-establishing (2106) a synchronous replication relationship between the out-of-sync dataset (2113) stored on the out-of-sync storage system (2124) and the in-sync dataset (2112) stored on the one or more in-sync storage systems (2114, 2128).

However, the example method depicted in FIG. 22 further includes identifying (2202) differences (2252) between metadata associated with the out-of-sync dataset (2113) stored on the out-of-sync storage system (2124) and the metadata associated with the in-sync dataset (2112) stored on the one or more in-sync storage systems (2114, 2128). Identifying (2202) the differences (2252) between metadata associated with the out-of-sync dataset (2113) stored on the out-of-sync storage system (2124) and the metadata associated with the in-sync dataset (2112) stored on the one or more in-sync storage systems (2114, 2128) may be implemented using various techniques, as described in greater detail above. As one example described above, in addition to tracking modifying operations that occur during a time period in which a storage system being re-synchronized was detached, the storage system may also track metadata that describes the modifying operations tracked during the time period in which the storage system being re-synchronized was detached, and store the tracked metadata in a log or journaling device.

The example method depicted in FIG. 22 further includes synchronizing (2204), in dependence upon the differences (2252) between the metadata associated with the out-of-sync dataset (2113) stored on the out-of-sync storage system (2124) and the metadata associated with the in-sync dataset (2112) stored on the one or more in-sync storage systems (2114, 2128), the metadata associated with the out-of-sync dataset (2113) with the metadata associated with the in-sync dataset (2112)—which may be implemented using various techniques. One example technique includes one or more in-sync storage systems (2114, 2128) generating and maintaining a list of changes to metadata that occurred after the storage system (2124) was detached, where the list of changes to metadata may be used to update the metadata representation of the pod data on the out-of-sync storage system (2124) to bring the out-of-sync storage system (2124) in-sync, where being in-sync includes having compatible graphs for representing "common metadata," where metadata and common metadata are described further in application Ser. No. 15/696,418, where this application is included by reference in its entirety. As described above, some operations may have persisted on the detached storage system (2124), resulting in modifications to the metadata associated with the out-of-sync dataset (2113) stored on the out-of-sync storage system (2124), and these modifications to metadata may be accounted for in a dedicated list or in the same list of operations described above with reference to identifying (2102) differences between an out-of-sync dataset (2113) stored on an out-of-sync storage system (2124) and an in-sync dataset (2112) stored on one or more in-sync storage system (2114, 2128). Additional examples are described above.

Figure 23:
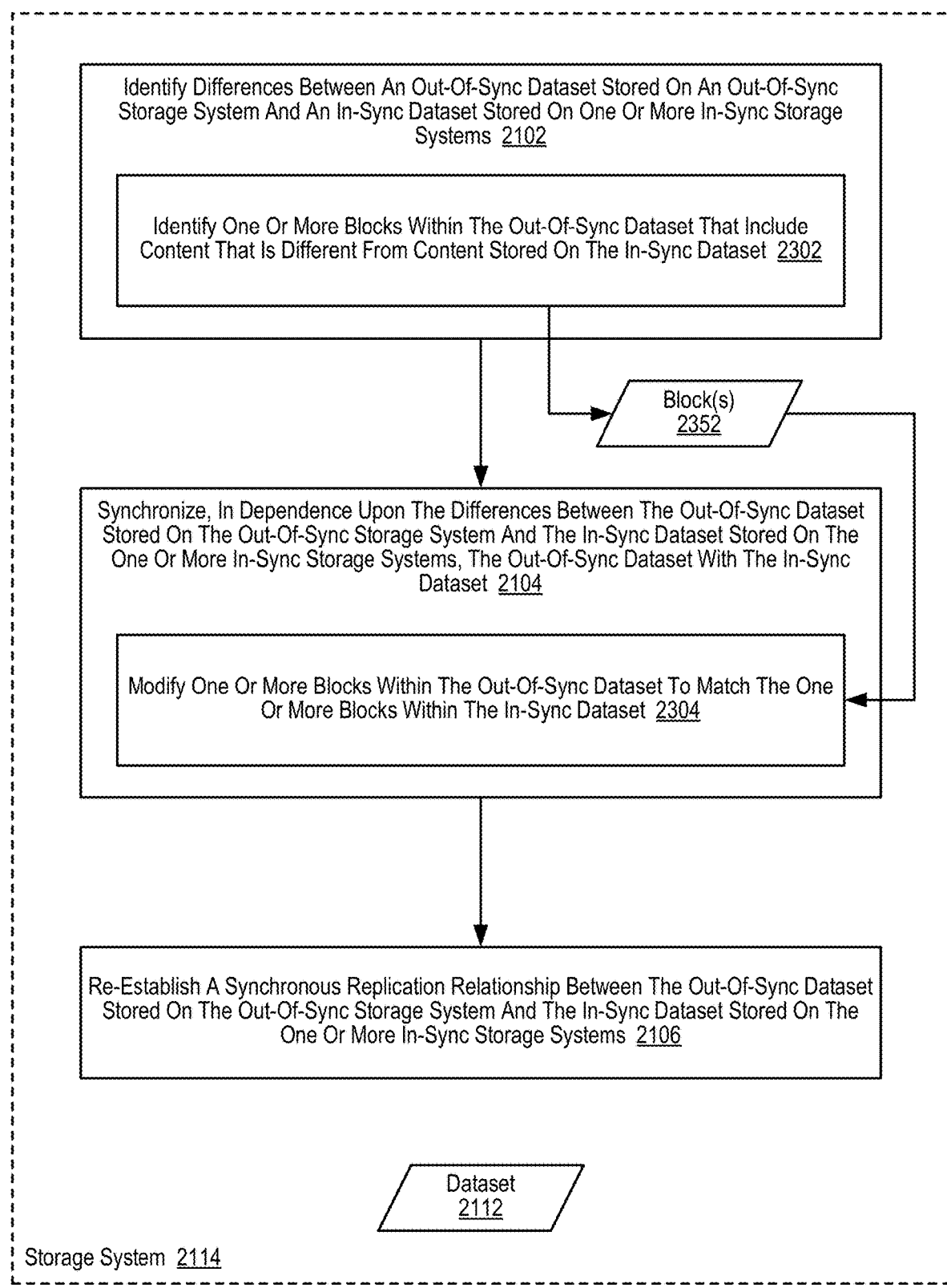
FIG. 23 sets forth a flow chart illustrating an additional example method for resynchronization for storage systems synchronously replicating a dataset according to some embodiments of the present disclosure.

For further explanation, FIG. 23 sets forth a flow chart illustrating an additional example method for resynchronization for storage systems synchronously replicating a dataset according to some embodiments of the present disclosure. The example method depicted in FIG. 23 is similar to the example method depicted in FIG. 21, as the example method in FIG. 23 also includes: identifying (2102) differences (2152) between an out-of-sync dataset (2113) stored on an out-of-sync storage system (2124) and an in-sync dataset (2112) stored on one or more in-sync storage systems (2114, 2128); synchronizing (2104), in dependence upon the differences (2152) between the out-of-sync dataset (2113) stored on the out-of-sync storage system (2124) and the one or more in-sync storage systems (2114, 2128), the out-of-sync dataset (2113) with the in-sync dataset (2112); and re-establishing (2106) a synchronous replication relationship between the out-of-sync dataset (2113) stored on the out-of-sync storage system (2124) and the in-sync dataset (2112) stored on the one or more in-sync storage systems (2114, 2128).

However, the example method depicted in FIG. 23 specifies that identifying (2102) differences between an out-of-sync dataset (2113) stored on an out-of-sync storage system (2124) and an in-sync dataset (2112) stored on one or more in-sync storage systems (2114, 2128) further includes identifying (2302) one or more blocks (2352) within the out-of-sync dataset (2113) that include content that is different from content stored on the in-sync dataset (2112), which may be implemented using various techniques. As one example technique, as described in greater detail above, includes generating a list of blocks (2352) that may differ between the in-sync storage systems (2114, 2128) and the attaching storage system (2124)—where one of the in-sync storage systems may begin generating the list of blocks in response to detaching a particular storage system, or detecting that a particular storage system has detached. Further, detaching a storage system is described in greater detail in application Ser. No. 15/696,418, which is herein incorporated in its entirety by reference.

The example method depicted in FIG. 23 further specifies that synchronizing (2104), in dependence upon the differences (2152) between the out-of-sync dataset (2113) stored on the out-of-sync storage system (2124) and the in-sync dataset (2112) stored on the one or more in-sync storage systems (2114, 2128), the out-of-sync dataset (2113) with the in-sync dataset includes modifying (2304) one or more blocks within the out-of-sync dataset (2113) to match the one or more blocks (2352) within the in-sync dataset (2113). Modifying (2304) the one or more blocks within the out-of-sync dataset (2113) to match the one or more blocks (2352) within the in-sync dataset (2113) may be implemented by locating ranges of memory addresses among the one or more blocks (2352) from the detached block list and copying content from those ranges of memory addresses from one of the in-sync storage systems (2114, 2128) to the attaching storage system (2124)—as described in greater detail above.

Figure 24:
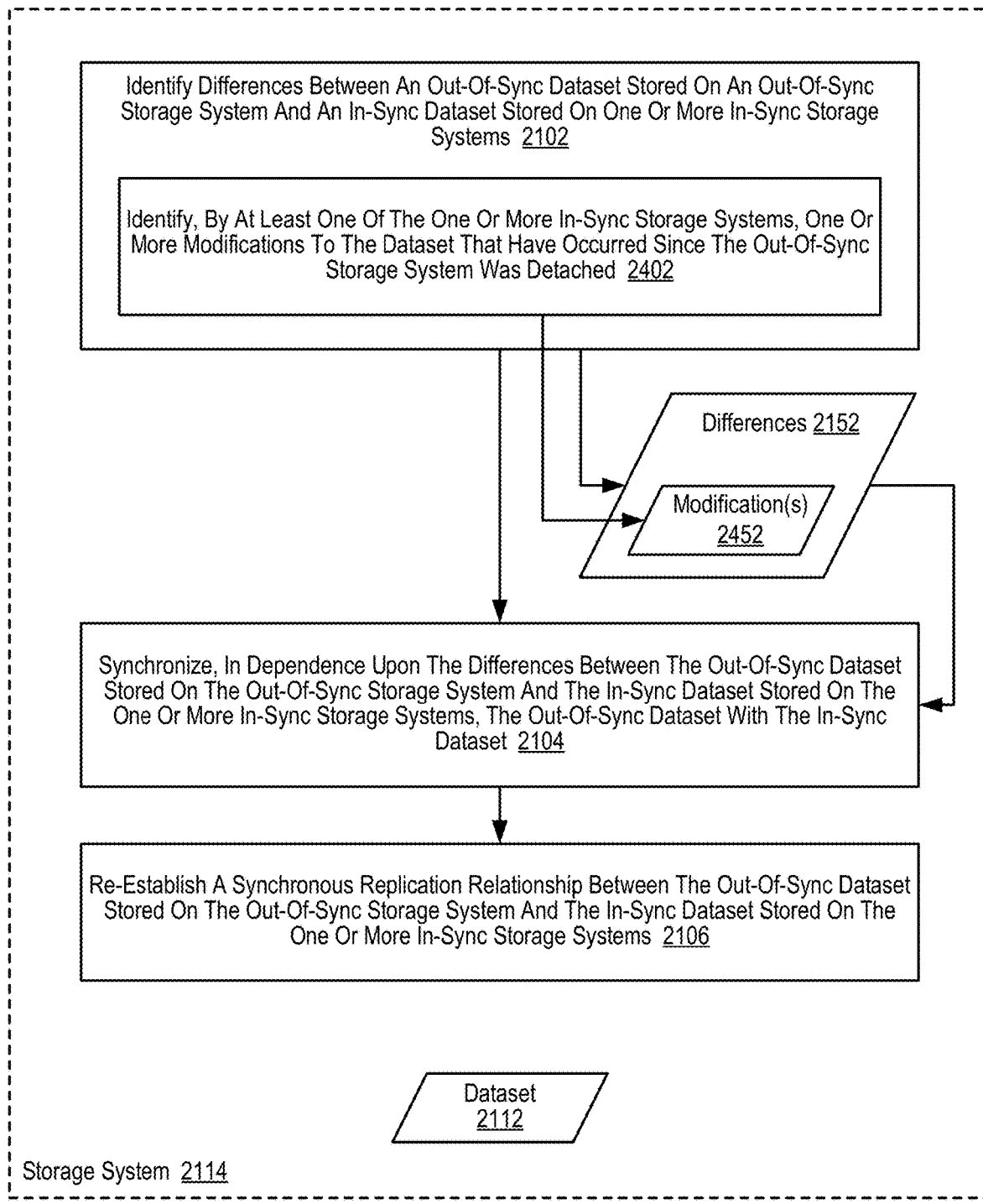
FIG. 24 sets forth a flow chart illustrating an additional example method for resynchronization for storage systems synchronously replicating a dataset according to some embodiments of the present disclosure.

For further explanation, FIG. 24 sets forth a flow chart illustrating an additional example method for resynchronization for storage systems synchronously replicating a dataset according to some embodiments of the present disclosure. The example method depicted in FIG. 24 is similar to the example method depicted in FIG. 21, as the example method in FIG. 24 also includes: identifying (2102) differences (2152) between an out-of-sync dataset (2113) stored on an out-of-sync storage system (2124) and an in-sync dataset (2112) stored on one or more in-sync storage systems (2114, 2128); synchronizing (2104), in dependence upon the differences (2152) between the out-of-sync dataset (2113) stored on the out-of-sync storage system (2124) and the one or more in-sync storage systems (2114, 2128), the out-of-sync dataset (2113) with the in-sync dataset (2112); and re-establishing (2106) a synchronous replication relationship between the out-of-sync dataset (2113) stored on the out-of-sync storage system (2124) and the in-sync dataset (2112) stored on the one or more in-sync storage systems (2114, 2128).

However, the example method depicted in FIG. 24 specifies that identifying (2102) differences between an out-of-sync dataset (2113) stored on an out-of-sync storage system (2124) and an in-sync dataset (2112) stored on one or more in-sync storage systems (2114, 2128) further includes identifying (2402), by at least one of the one or more in-sync storage systems (2114, 2128), one or more modifications (2452) to the dataset (2112) that have occurred since the out-of-sync storage system was detached. Identifying (2402), by at least one of the one or more in-sync storage systems (2114, 2128), the one or more modifications (2452) to the dataset (2112) that have occurred since the out-of-sync storage system was detached may be implemented by several techniques. As one example technique, one or more of the in-sync storage systems (2114, 2128) may implement one of the block tracking techniques described above. Other example techniques include using a combination of block tracking and snapshots, or block tracking by sequence numbers, among other techniques, as described in detail above.

Figure 25:
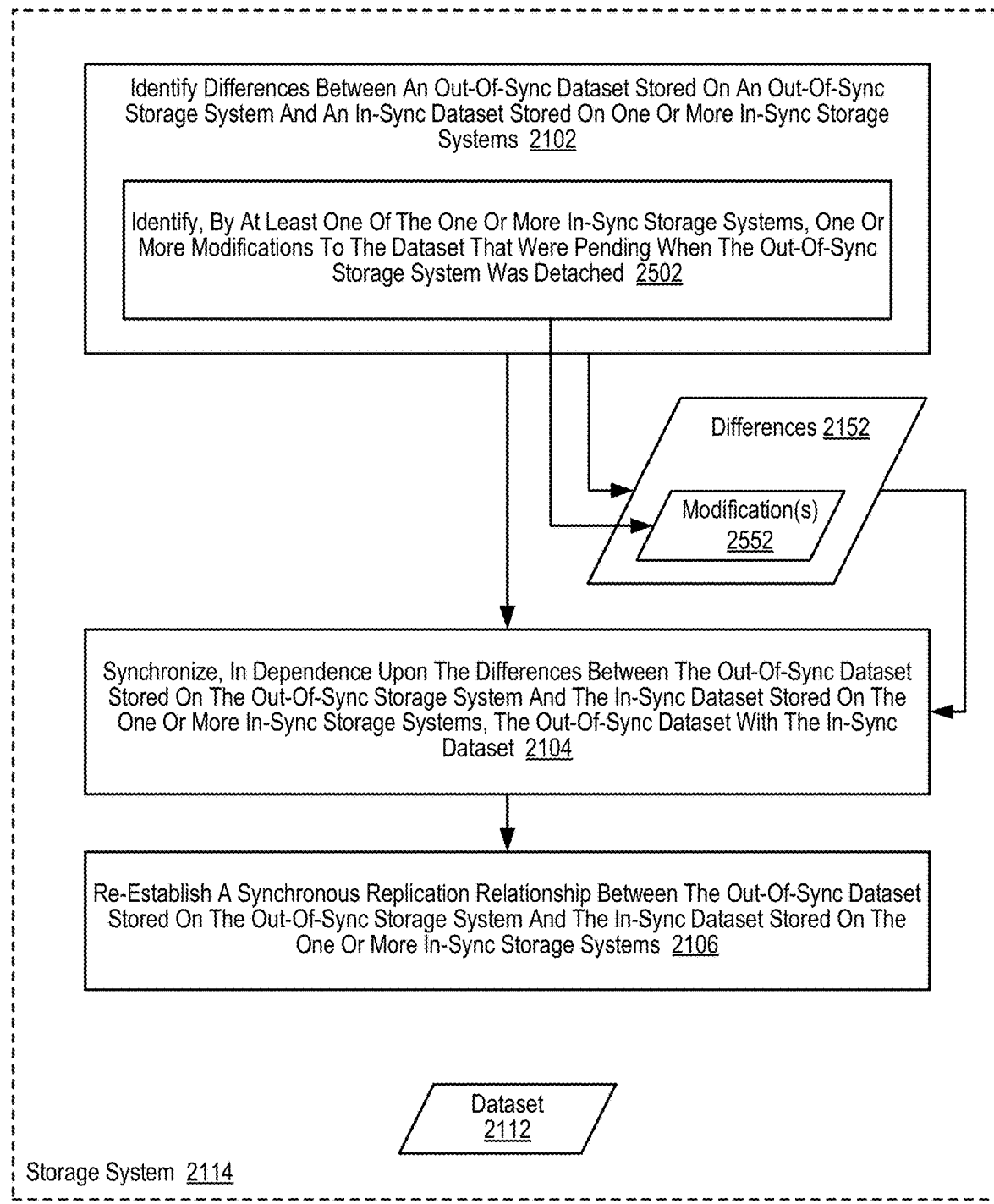
FIG. 25 sets forth a flow chart illustrating an additional example method for resynchronization for storage systems synchronously replicating a dataset according to some embodiments of the present disclosure.

For further explanation, FIG. 25 sets forth a flow chart illustrating an additional example method for resynchronization for storage systems synchronously replicating a dataset according to some embodiments of the present disclosure. The example method depicted in FIG. 25 is similar to the example method depicted in FIG. 21, as the example method in FIG. 25 also includes: identifying (2102) differences (2152) between an out-of-sync dataset (2113) stored on an out-of-sync storage system (2124) and an in-sync dataset (2112) stored on one or more in-sync storage systems (2114, 2128); synchronizing (2104), in dependence upon the differences (2152) between the out-of-sync dataset (2113) stored on the out-of-sync storage system (2124) and the one or more in-sync storage systems (2114, 2128), the out-of-sync dataset (2113) with the in-sync dataset (2112); and re-establishing (2106) a synchronous replication relationship between the out-of-sync dataset (2113) stored on the out-of-sync storage system (2124) and the in-sync dataset (2112) stored on the one or more in-sync storage systems (2114, 2128).

However, the example method depicted in FIG. 25 specifies that identifying (2102) differences between an out-of-sync dataset (2113) stored on an out-of-sync storage system (2124) and an in-sync dataset (2112) stored on one or more in-sync storage systems (2114, 2128) further includes identifying (2502), by at least one of the one or more in-sync storage systems (2114, 2128), one or more modifications (2552) to the dataset (2112) that were pending when the out-of-sync storage system (2124) was detached. Identifying (2502), by at least one of the one or more in-sync storage systems (2114, 2128), one or more modifications (2552) to the dataset (2112) that were pending when the out-of-sync storage system (2124) was detached may be implemented by using several techniques, as described above in greater detail.

Figure 26:
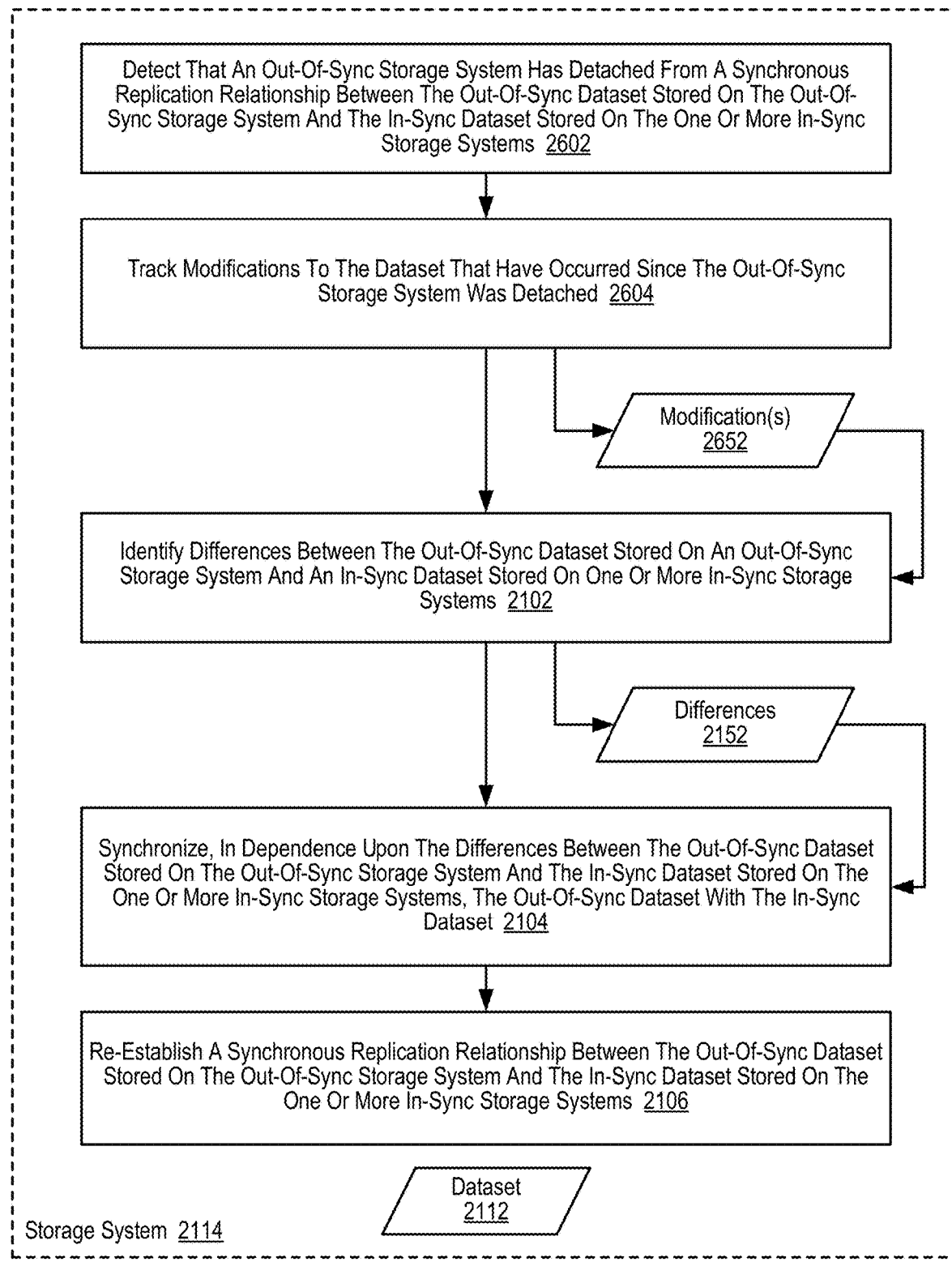
FIG. 26 sets forth a flow chart illustrating an additional example method for resynchronization for storage systems synchronously replicating a dataset according to some embodiments of the present disclosure.

For further explanation, FIG. 26 sets forth a flow chart illustrating an additional example method for resynchronization for storage systems synchronously replicating a dataset according to some embodiments of the present disclosure. The example method depicted in FIG. 26 is similar to the example method depicted in FIG. 21, as the example method in FIG. 26 also includes: identifying (2102) differences (2152) between an out-of-sync dataset (2113) stored on an out-of-sync storage system (2124) and an in-sync dataset (2112) stored on one or more in-sync storage systems (2114, 2128); synchronizing (2104), in dependence upon the differences (2152) between the out-of-sync dataset (2113) stored on the out-of-sync storage system (2124) and the one or more in-sync storage systems (2114, 2128), the out-of-sync dataset (2113) with the in-sync dataset (2112); and re-establishing (2106) a synchronous replication relationship between the out-of-sync dataset (2113) stored on the out-of-sync storage system (2124) and the in-sync dataset (2112) stored on the one or more in-sync storage systems (2114, 2128).

However, the example method depicted in FIG. 26 further includes detecting (2602) that an out-of-sync storage system (2124) has detached from a synchronous replication relationship between the out-of-sync dataset (2113) stored on the out-of-sync storage system (2124) and the in-sync dataset (2112) stored on the one or more in-sync storage systems (2114, 2128), which may be implemented using various techniques, as described above in greater detail. The example method depicted in FIG. 26 also includes tracking (2604) modifications (2652) to the dataset (2112) that have occurred since the out-of-sync storage system (2124) was detached, as described above in greater detail.

Figure 27:
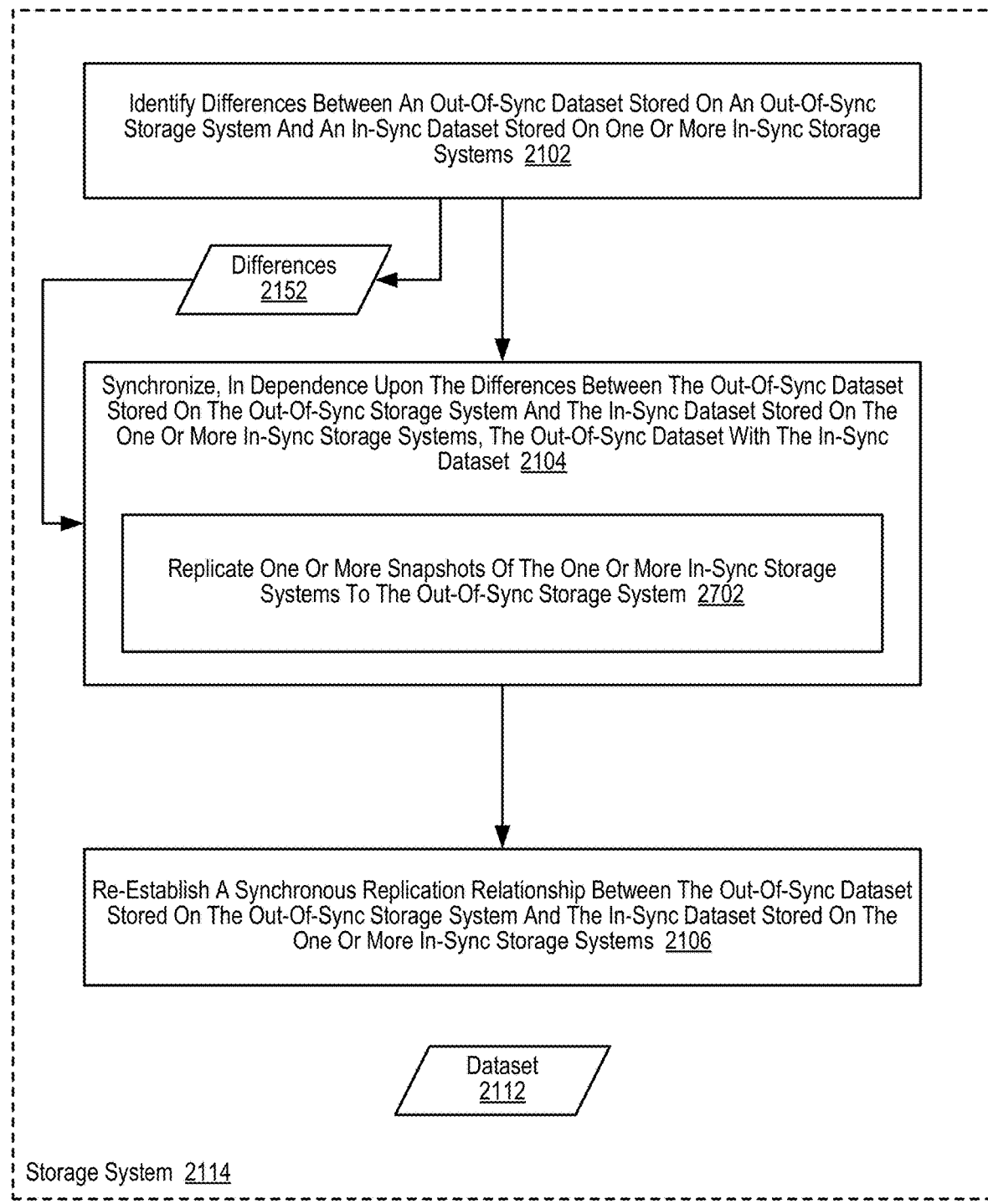
FIG. 27 sets forth a flow chart illustrating an additional example method for resynchronization for storage systems synchronously replicating a dataset according to some embodiments of the present disclosure.

For further explanation, FIG. 27 sets forth a flow chart illustrating an additional example method for resynchronization for storage systems synchronously replicating a dataset according to some embodiments of the present disclosure. The example method depicted in FIG. 23 is similar to the example method depicted in FIG. 21, as the example method in FIG. 23 also includes: identifying (2102) differences (2152) between an out-of-sync dataset (2113) stored on an out-of-sync storage system (2124) and an in-sync dataset (2112) stored on one or more in-sync storage systems (2114, 2128); synchronizing (2104), in dependence upon the differences (2152) between the out-of-sync dataset (2113) stored on the out-of-sync storage system (2124) and the one or more in-sync storage systems (2114, 2128), the out-of-sync dataset (2113) with the in-sync dataset (2112); and re-establishing (2106) a synchronous replication relationship between the out-of-sync dataset (2113) stored on the out-of-sync storage system (2124) and the in-sync dataset (2112) stored on the one or more in-sync storage systems (2114, 2128).

However, the example method depicted in FIG. 27 specifies that synchronizing (2104), in dependence upon the differences (2152) between the out-of-sync dataset (2113) stored on the out-of-sync storage system (2124) and the one or more in-sync storage systems (2114, 2128), the out-of-sync dataset (2113) with the in-sync dataset (2112) further includes replicating (2702) one or more snapshots of the one or more in-sync storage systems (2114, 2128) to the out-of-sync storage system (2124), which may be implemented using various techniques, as described above in greater detail.

Figure 28:
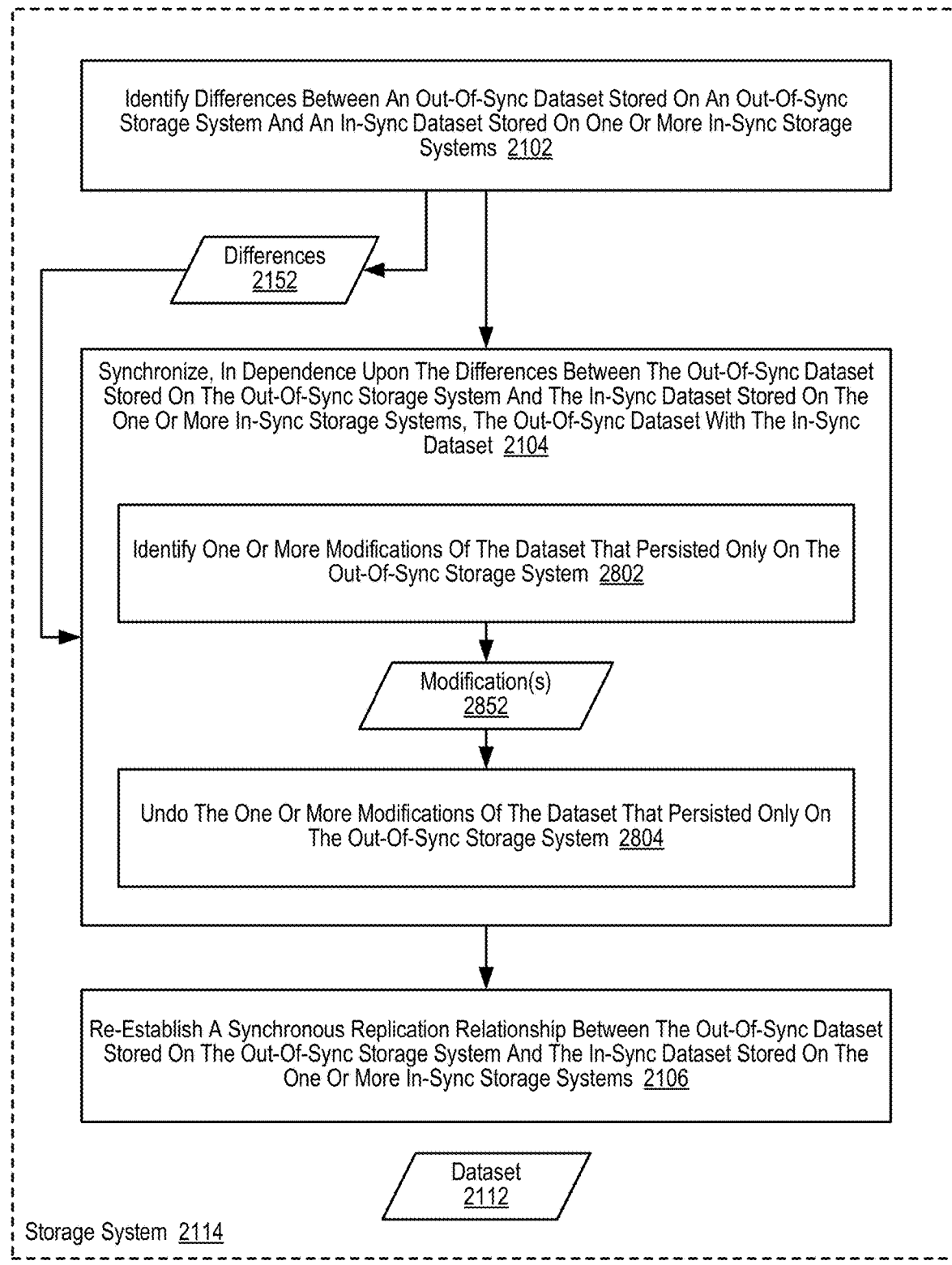
FIG. 28 sets forth a flow chart illustrating an additional example method for resynchronization for storage systems synchronously replicating a dataset according to some embodiments of the present disclosure.

For further explanation, FIG. 28 sets forth a flow chart illustrating an additional example method for resynchronization for storage systems synchronously replicating a dataset according to some embodiments of the present disclosure. The example method depicted in FIG. 28 is similar to the example method depicted in FIG. 21, as the example method in FIG. 28 also includes: identifying (2102) differences (2152) between an out-of-sync dataset (2113) stored on an out-of-sync storage system (2124) and an in-sync dataset (2112) stored on one or more in-sync storage systems (2114, 2128); synchronizing (2104), in dependence upon the differences (2152) between the out-of-sync dataset (2113) stored on the out-of-sync storage system (2124) and the one or more in-sync storage systems (2114, 2128), the out-of-sync dataset (2113) with the in-sync dataset (2112); and re-establishing (2106) a synchronous replication relationship between the out-of-sync dataset (2113) stored on the out-of-sync storage system (2124) and the in-sync dataset (2112) stored on the one or more in-sync storage systems (2114, 2128).

However, the example method depicted in FIG. 28 specifies that synchronizing (2104), in dependence upon the differences (2152) between the out-of-sync dataset (2113) stored on the out-of-sync storage system (2124) and the one or more in-sync storage systems (2114, 2128), the out-of-sync dataset (2113) with the in-sync dataset (2112) further includes: identifying (2802) one or more modifications (2852) of the dataset (2113) that persisted only on the out-of-sync storage system (2124), and undoing (2804) the one or more modifications (2852) of the dataset (2113) that persisted only on the out-of-sync storage system (2124), which may be implemented using various techniques, as described above in greater detail.

Figure 29:
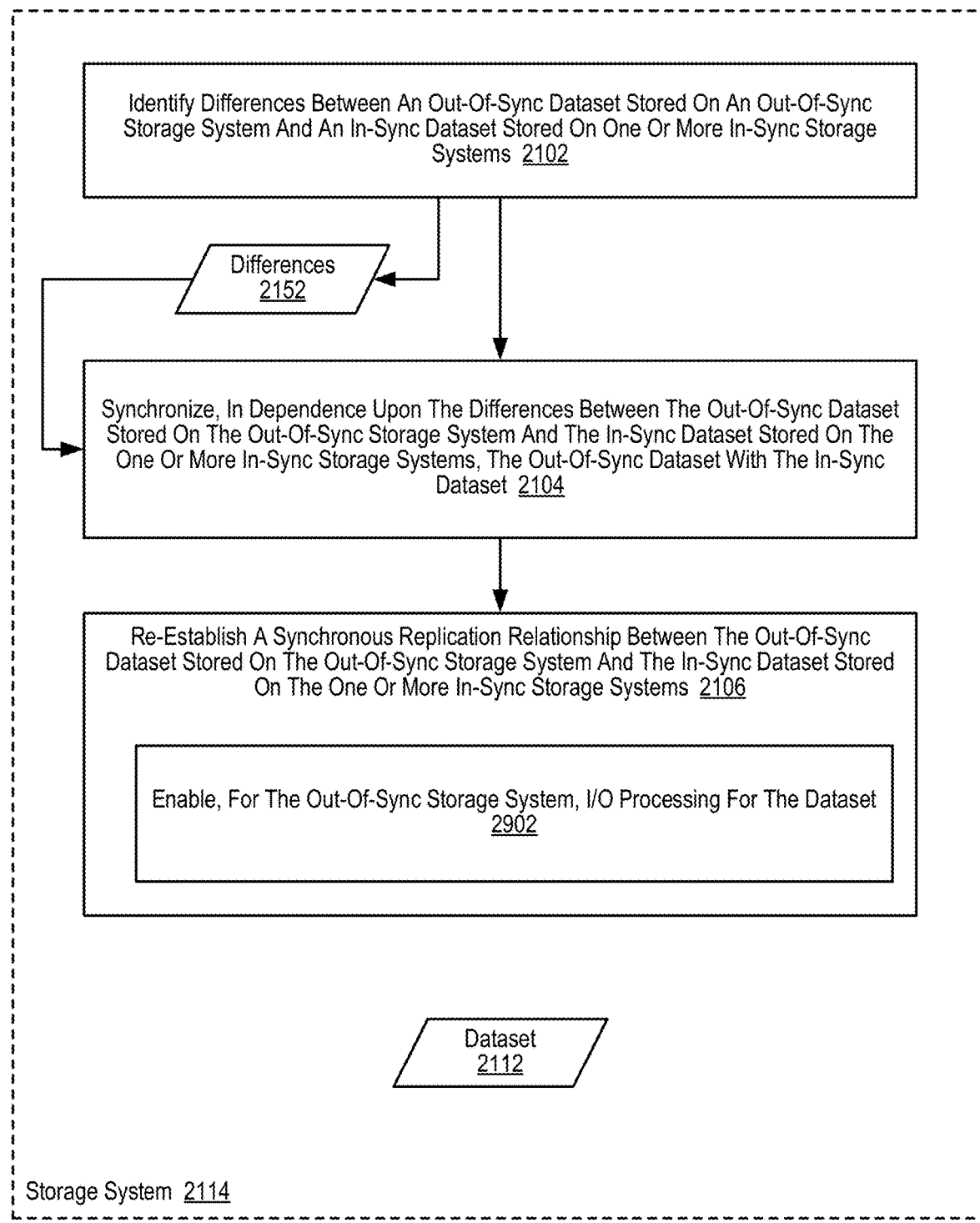
FIG. 29 sets forth a flow chart illustrating an additional example method for resynchronization for storage systems synchronously replicating a dataset according to some embodiments of the present disclosure.

For further explanation, FIG. 29 sets forth a flow chart illustrating an additional example method for resynchronization for storage systems synchronously replicating a dataset according to some embodiments of the present disclosure. The example method depicted in FIG. 29 is similar to the example method depicted in FIG. 21, as the example method in FIG. 29 also includes: identifying (2102) differences (2152) between an out-of-sync dataset (2113) stored on an out-of-sync storage system (2124) and an in-sync dataset (2112) stored on one or more in-sync storage systems (2114, 2128); synchronizing (2104), in dependence upon the differences (2152) between the out-of-sync dataset (2113) stored on the out-of-sync storage system (2124) and the one or more in-sync storage systems (2114, 2128), the out-of-sync dataset (2113) with the in-sync dataset (2112); and re-establishing (2106) a synchronous replication relationship between the out-of-sync dataset (2113) stored on the out-of-sync storage system (2124) and the in-sync dataset (2112) stored on the one or more in-sync storage systems (2114, 2128).

However, the example method depicted in FIG. 29 specifies that re-establishing (2106) a synchronous replication relationship between the out-of-sync dataset (2113) stored on the out-of-sync storage system (2124) and the in-sync dataset (2112) stored on the one or more in-sync storage systems (2114, 2128) further includes enabling (2902), for the out-of-sync storage system (2124), I/O processing for the dataset (2113), which may be implemented using various techniques, as described above in greater detail.

Figure 30:
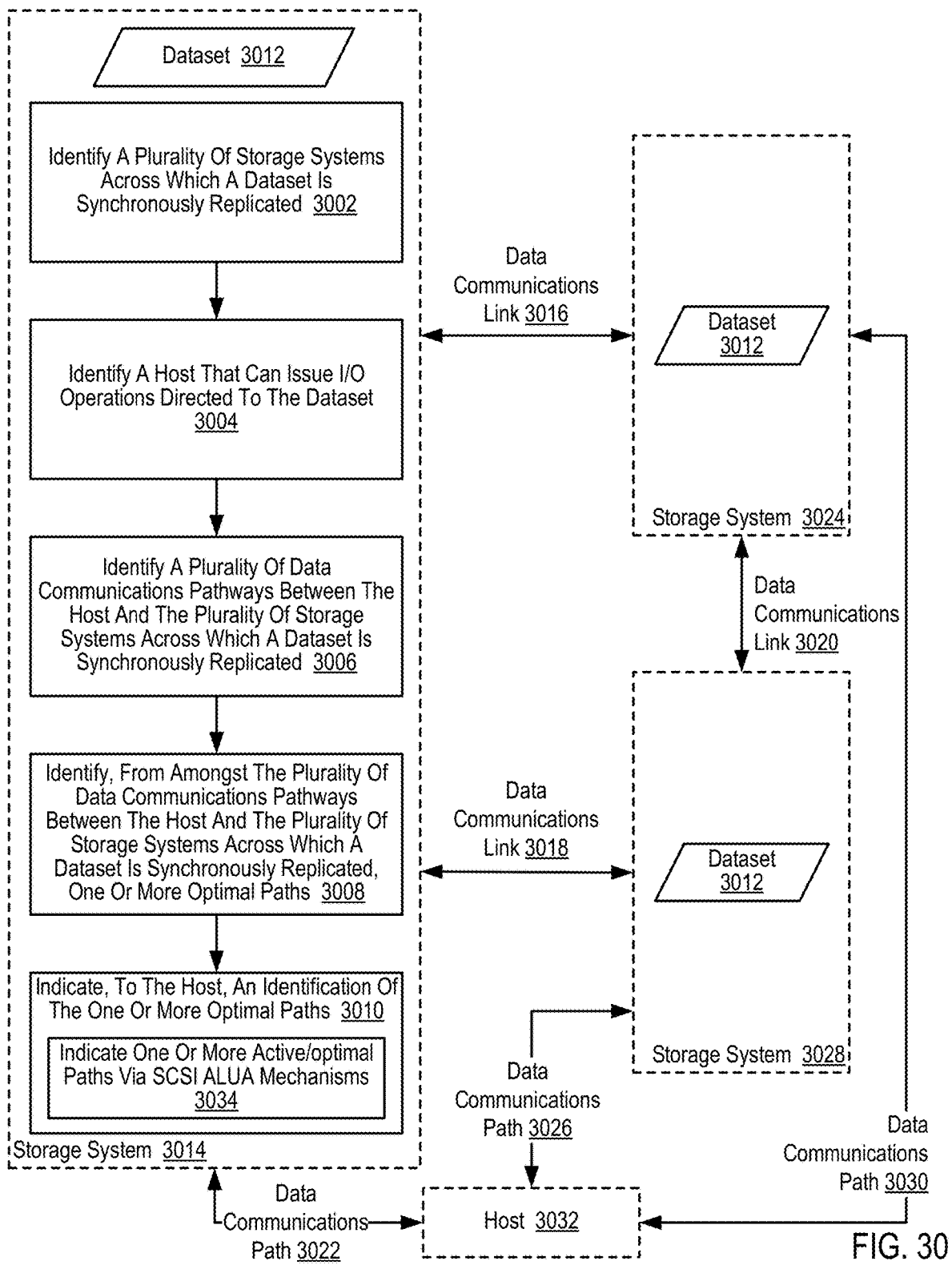
FIG. 30 sets forth a flow chart illustrating an example method for managing connectivity to synchronously replicated storage systems according to some embodiments of the present disclosure.

For further explanation, FIG. 30 sets forth a flow chart illustrating an example method for managing connectivity to synchronously replicated storage systems (3014, 3024, 3028) according to some embodiments of the present disclosure. Although depicted in less detail, the storage systems (3014, 3024, 3028) depicted in FIG. 30 may be similar to the storage systems described above with reference to FIGS. 1A-1D, FIGS. 2A-2G, FIGS. 3A-3B, or any combination thereof. In fact, the storage system depicted in FIG. 30 may include the same, fewer, additional components as the storage systems described above.

The example method depicted in FIG. 30 includes identifying (3002) a plurality of storage systems (3014, 3024, 3028) across which a dataset (3012) is synchronously replicated. The dataset (3012) depicted in FIG. 30 may be embodied, for example, as the contents of a particular volume, as the contents of a particular shard of a volume, or as any other collection of one or more data elements. The dataset (3012) may be synchronized across a plurality of storage systems (3014, 3024, 3028) such that each storage system (3014, 3024, 3028) retains a local copy of the dataset (3012). In the examples described herein, such a dataset (3012) is synchronously replicated across the storage systems (3014, 3024, 3028) in such a way that the dataset (3012) can be accessed through any of the storage systems (3014, 3024, 3028) with performance characteristics such that any one storage system in the cluster doesn't operate substantially more optimally than any other storage system in the cluster, at least as long as the cluster and the particular storage system being accessed are running nominally. In such systems, modifications to the dataset (3012) should be made to the copy of the dataset that resides on each storage system (3014, 3024, 3028) in such a way that accessing the dataset (3012) on any of the storage systems (3014, 3024, 3028) will yield consistent results. For example, a write request issued to the dataset must be performed on all storage systems (3014, 3024, 3028) or performed on none of the storage systems (3014, 3024, 3028). Likewise, some groups of operations (e.g., two write operations that are directed to same location within the dataset) must be executed in the same order, or as if they were executed in the same order, on all storage systems (3014, 3024, 3028) such that the copy of the dataset that resides on each storage system (3014, 3024, 3028) is ultimately identical on all storage systems (3014, 3024, 3028). Modifications to the dataset (3012) need not be made at the exact same time, but some actions (e.g., issuing an acknowledgement that a write request directed to the dataset, enabling read access to a location within the dataset that is targeted by a write request that has not yet been completed on all storage systems) may be delayed until the copy of the dataset (3012) on each storage system (3014, 3024, 3028) has been modified.

In contrast to the treatment of write requests (or other requests to modify the dataset that is synchronously replicated across a plurality of storage systems), other types of requests may be serviced locally by the storage system that received the request, with no distributed messaging increasing latency of such operations. For example, a read request, query request, or other request that does not result in a modification of the dataset (3012) can be processed locally by the storage system which received the request, usually with no distributed messaging increasing latency of such operations. For example, if a host issues a read request to a first storage system (3014) within a cluster of storage systems (3014, 3024, 3028) across which the dataset (3012) is synchronously replicated, then an implementation can ensure that there will typically be no inline messaging between the storage systems (3014, 3024, 3028) that is required to complete the read request, yielding read latency that is frequently identical to the latency of a local non-replicated storage system. In some instances, such operations (e.g., a read request) may be blocked within an implementation by conflicting write requests (i.e., a request to write data to a portion of the dataset that overlaps with the portion of the data set that is to be read in response to the read request) or other form of conflicting modifying operation that have not yet completed on all of the storage systems (3014, 3024, 3028). A block may be necessary, for example, to preserve ordering requirements for multiple read requests that overlap in time with one or more concurrent modifying requests. Such a block can be used to ensure that a first read on one storage system that is concurrent with a write or other modifying operation on the same or another storage system in the pod, and where the first read is followed by a second read on another storage system in the pod that also overlaps the same write or other modifying operation, will never return the results of the modifying operation for the first read while returning the content from prior to the modifying operation for the second read. A block of overlapping read requests for in-flight modifying operations that a storage system has learned about, and that have not yet been processed everywhere in the pod, can assure that this reverse time order for read operations will not happen by delaying read requests that might return the results from an overlapping modifying operation until all other overlapping read requests are also assured to return results from that overlapping modifying operation.

In the example method depicted in FIG. 30, identifying (3002), for a dataset (3012), a plurality of storage systems (3014, 3024, 3028) across which the dataset (3012) will be synchronously replicated may be carried out, for example, by examining a pod definition or similar data structure that associates a dataset (3012) with one or more storage systems (3014, 3024, 3028) which nominally store that dataset (3012). A 'pod', as the term is used here and throughout the remainder of the present application, may be embodied as a management entity that represents a dataset, a set of managed objects and management operations, a set of access operations to modify or read the dataset, and a plurality of storage systems. Such management operations may modify or query managed objects equivalently through any of the storage systems, where access operations to read or modify the dataset operate equivalently through any of the storage systems. Each storage system may store a separate copy of the dataset as a proper subset of the datasets stored and advertised for use by the storage system, where operations to modify managed objects or the dataset performed and completed through any one storage system are reflected in subsequent management objects to query the pod or subsequent access operations to read the dataset. Additional details regarding a 'pod' may be found in previously filed provisional patent application No. 62/518,071, which is incorporated herein by reference. Storage systems can be added to a pod, resulting in the pod's dataset (3012) being copied to that storage system and then kept up to date as the dataset (3012) is modified. Storage systems can also be removed from a pod, resulting in the dataset (3012) being no longer kept up to date on the removed storage system. In such examples, a pod definition or similar data structure may be updated as storage systems are added to and removed from a particular pod.

The example method depicted in FIG. 30 also includes identifying (3004) a host (3032) that can issue I/O operations directed to the dataset (3012). The host (3032) depicted in FIG. 30 may be embodied, for example, as an application server running externally to the storage systems (3014, 3024, 3028), or as any other device that issues access requests (e.g., read, writes) to the storage systems (3014, 3024, 3028) via one or more data communications paths. Identifying (3004) a particular host (3032) that can issue I/O operations directed to the dataset (3012) may be carried out, for example, by one or more of the storage systems (3014, 3024, 3028) retaining a list or other data structure that includes an identification of each host from which the storage system (3014, 3024, 3028) has received an I/O operation that is directed to the dataset (3012), by examining a list or other data structure that identifies each host that has the appropriate permissions necessary to access the dataset (3012), or in some other way.

The example method depicted in FIG. 30 also includes identifying (3006) a plurality of data communications paths (3022, 3026, 3030) between the host (3032) and the plurality of storage systems (3014, 3024, 3028) across which a dataset (3012) is synchronously replicated. Each data communications path (3022, 3026, 3030) between the host (3032) and the plurality of storage systems (3014, 3024, 3028) may represent a relationship between a host initiator port and storage system target port, between a network interface on a host and a network interface on a storage system, and so on. In such an example, there may be several host initiator ports and several storage system target ports, and the storage system can also contain several storage controllers each of which may host multiple target ports. Target ports or network interfaces on separate storage systems, even if in the same pod, should normally be distinct from each other. Target ports may be managed using Target Port Groups, which are groups of ports associated with a storage system volume that share a common state with respect to Active/Optimized, Active/Unoptimized, Standby, and Offline. A Target Port Group may be associated with each storage controller of an individual storage system rather than being associated with a storage system as a whole. In fact, a Target Port Group can be entirely arbitrary, including being associated with a subset of target ports even within a single storage controller. A storage system could also use host initiator information in constructing or informing Target Port Groups, though it will have to provide this information consistently (at least per volume) to each host initiator to ensure there is no confusion in the multi-pathing driver stack. In the example method depicted in FIG. 30, identifying (3006) a plurality of data communications paths (3022, 3026, 3030) between the host (3032) and the plurality of storage systems (3014, 3024, 3028) across which a dataset (3012) is synchronously replicated may be carried out, for example, through the use of the SCSI Asymmetric Logical Unit Access ('ALUA') mechanisms that are described in greater detail in the following paragraph, through the use of some other network discovery tools, or in some other way.

The example method depicted in FIG. 30 also includes identifying (3008), from amongst the plurality of data communications paths (3022, 3026, 3030) between the host (3032) and the plurality of storage systems (3014, 3024, 3028) across which a dataset (3012) is synchronously replicated, one or more optimal paths. The storage system depicted in FIG. 30 may identify (3008) one or more optimal paths from amongst the plurality of data communications paths (3022, 3026, 3030) between the host (3032) and the plurality of storage systems (3014, 3024, 3028) across which a dataset (3012) is synchronously replicated and storage communications endpoints associated with the storage systems. In the example method depicted in FIG. 30, identifying (3008) one or more optimal paths may include identifying a single optimal path or identifying a plurality of optimal paths. For example, a subset of more optimal paths (such as the paths between the host and a particular storage system) may be identified where any path that meets various performance thresholds may be identified, a predetermined number of the most optimal paths (e.g., those paths that exhibit superior performance relative to other available paths) may be identified, a predetermined percentage of the most optimal paths may be identified, and so on. Readers will appreciate that there may be performance advantages associated with the host (3032) issuing I/O operations to one storage system versus another storage system, as the storage systems (3014, 3024, 3028) may be located some distance from each other, the storage systems (3014, 3024, 3028) may be located in separate storage networks or separate parts of storage networks, or for some other reason. For example, there may be performance advantages associated with the host (3032) issuing I/O operations to a storage system that is physically located within the same data center or campus as the host (3032) relative to the host (3032) issuing I/O operations to a storage system that is physically located within a distant data center or campus. For reliability purposes it may be beneficial to have the host (3032) retain connectivity to all storage systems 3014, 3024, 3028), but for performance purposes it may be preferred that the host (3032) accesses the dataset (3012) through a particular storage system. Readers will appreciate that because different hosts may access the dataset (3012), the one or more optimal paths for one host to access the dataset (3012) may be different than the one or more optimal paths for another host to access the dataset (3012). In some embodiments, it is possible that two storage systems are sufficiently similar that paths to both storage systems may be viewed as being optimal. For example, if two storage systems are in the same data center or campus and have abundant networking between a host and those two storage systems, while a third storage system may be sufficiently distant that it should not be used except as a fallback, the paths between the host and the two sufficiently similar storage systems may all be candidates for being identified (3008) as the optimal path.

In the example method depicted in FIG. 30, identifying (3008), from amongst the plurality of data communications paths (3022, 3026, 3030) between the host (3032) and the plurality of storage systems (3014, 3024, 3028) across which a dataset (3012) is synchronously replicated, one or more optimal paths may be carried out, for example, through the use of the SCSI ALUA mechanisms. The SCSI ALUA mechanisms are described in the SCSI SPC-4 and SBC-3 technical standards as a set of commands and inquiries that describe support for asymmetric access to storage system volumes from through multiple target ports to a storage volume (also known in SCSI as a "logical unit"). In such an embodiment, a volume (whose content may represent a dataset that is synchronously replicated across a plurality of storage systems) can report a unique ID to the host (3032) through multiple SCSI target ports associated with one or more target port groups, such that the host (3032), through one or more SCSI host ports, can configure its I/O drivers to access the volume through some or all combinations of its host ports and the advertised target ports. The unique volume ID can be used by the host (3032) I/O drivers to recognize all the SCSI logical unit number, host port, and target port combinations that access the same volume. The host I/O drivers can then issue SCSI commands down several, any, or all of those combinations (paths) to modify the state and content of an identified volume. Faults can result in the host re-issuing requests down alternate paths and performance considerations may result in the host (3032) making substantial use of multiple paths to get benefits of improved host-to-storage-system bandwidth through the use of multiple ports and multiple network interconnects.

With the ALUA specifications for SCSI, multiple target port groups can be described that can access a volume, each of which can each be assigned a state. A target port group can represent one or more SCSI target ports on a storage system. In a multi-controller storage system, a target port group might represent all SCSI target ports on one controller, or with symmetrically accessible synchronously replicated storage systems, a target port group might represent all SCSI target ports on an individual storage system, or target ports might be grouped in some other way. The state that can be associated with a target port group indicates whether the port group should be preferred for issuing I/O (Active/Optimized), non-preferred for issuing I/O (Active/Non-optimized), standby (I/Os cannot be issued until there is a change in state back to Active/Optimized or Active/Non-optimized), or the target port group can be offline such as due to being unresponsive. The SCSI specification allows the definition of target port groups and ALUA target port group assigned states to be specific to each requesting host (or even each requesting host port), as well as specific to each volume, so that for each volume, a storage system can present a unique set of target port groups and target port group assigned states to each host or host port that can access that volume.

With symmetrically accessible synchronously replicated storage systems, all storage systems in a pod can present the same volumes out to hosts as if the all storage systems in the pod were, to the host, one storage system presenting the same volumes out through SCSI target ports on several or all storage systems for the pod. These mechanisms can then provide all the capabilities desired for directing and redirecting access to volumes in a pod. For hosts which get better performance (such as due to network or geographical proximity of the host to that storage system) to a particular storage system for a pod, the ALUA target port group assigned state for that storage system to that host's host ports can be indicated as Active/Optimized, while for other hosts that get lesser performance to that particular storage system for the pod, the ALUA target port group assigned state for the storage system to that other other's host ports can be indicated as Active/Non-optimized. In such a way, members of a target port group that is determined to be Active/Optimized may be identified (3008) to hosts as the optimal path(s).

If new storage systems are added to a pod, then new target port groups can be added for each volume in that pod to the host ports accessing that volume, with target port groups assigned states appropriate to the host/storage-system proximity for the new storage system. After some number of SAN-level events, the host can recognize the new ports for each volume and configure its drivers to use the new paths appropriately. The storage system can monitor for host accesses (such as waiting for REPORT LUNS and INQUIRY commands) to determine on behalf of the pod that a host is now properly configured to use SCSI target ports on the newly added storage system. If a storage system is removed from a pod, then other storage systems that remain in the pod can stop reporting any target ports or target port groups for the removed storage system for the pod's volumes to any host ports. Further, the removed storage system can stop listing the pod's volumes in any REPORT LUN request, and the storage system can start reporting that a volume doesn't exist in response to commands to the pod's volumes. If a volume is moved into or out of a pod, resulting in a volume being associated with an expanded or reduced set of storage systems, the same actions can be applied to the individual volume that would have been applied in adding or removing a storage system from a pod. As for handling faults, the host I/O drivers will access their volumes through target ports in a target port group that is assigned as Active/Optimized if any such paths are available and functioning properly, but can switch to Active/Non-optimized paths if no Active/Non-optimized paths are available and functioning properly.

In the example method depicted in FIG. 30, identifying (3008), from amongst the plurality of data communications paths (3022, 3026, 3030) between the host (3032) and the plurality of storage systems (3014, 3024, 3028) across which a dataset (3012) is synchronously replicated, one or more optimal paths may also be carried out, for example, in an automated manner by using timing or network information to determine that host paths to particular interfaces or storage systems in a pod has lower latency, better throughput, or less switching infrastructure than host paths to other particular interfaces or storage systems in the pod. In such an example, identifying (3008), from amongst the plurality of data communications paths (3022, 3026, 3030) between the host (3032) and the plurality of storage systems (3014, 3024, 3028) across which a dataset (3012) is synchronously replicated, one or more optimal paths may therefore include identifying one or more data communications pathways that exhibit the relatively lowest latencies between the host and one of the storage systems, identifying one or more data communications pathways that exhibit the latency between the host and one of the storage systems that is below a predetermined threshold, and so on.

On an IP based network, for example, ping and traceroute commands (or directly utilizing their underlying ICMP Echo requests) may be used to determine the latency and network routes between known host network interfaces and the network interfaces for storage systems in a pod. A traceroute facility, or direct use of ICMP Echo requests with a gradually increasing TTL field (to limit the number of network hops before a router sends an ICMP Time Exceeded response), can be used to determine that there is a particular network hop that has a higher latency, or to determine that there is no such network hop. In this case, a host interface to storage interface route with a high latency hop can be avoided in favor of host interface to storage interface routes without a high latency hop. Alternately, if there is a network route that has fewer hops than another and has low latency, the storage system with that network interface can be preferred.

On a Fibre Channel based network, the HBA API specification and plug-in libraries as supported by the Storage Networking Industry Association from their Fibre Channel Working Group, can be used to map out a FC storage network. Also, the ELS Echo feature in Fibre Channel protocol can be used to detect network latencies. As with IP networks described previously, this can be used to identify host port to target port networks with lower latency and fewer network hops than other host port and target port combinations, which can be used to determine which storage systems in a pod are closer or better connected to one host or another, for purposes of configuring storage systems in the pod for Active/Optimized versus Active/Non-optimal for each host.

The example method depicted in FIG. 30 also includes indicating (3010), to the host (3032), an identification of the one or more optimal paths. In the example method depicted in FIG. 30, a storage system (3014, 3024, 3028) may indicate (3010) an identification of the optimal path to the host (3032), for example, through one or more messages exchanged between the storage system (3014, 3024, 3028) and the host (3032). Such messages may be exchanged using many of the mechanisms described above and may identify the optimal path through the use of a port identifier, network interface identifier, or some other identifier. For example, indicating (3010), to the host (3032), an identification of the one or more optimal paths may be carried out by indicating (3034), to the host (3032), one or more Active/Optimized paths via SCSI ALUA mechanisms.

Readers will appreciate that the storage systems (3014, 3024, 3028) described herein may utilize host definitions to define a host (3032) as a named set of ports or network interfaces, where those host definitions may include additional connection-related information or additional characteristics such as operating system or application type or workload categorization. Host definitions can be given a name for administrative convenience, and can be represented as first-class objects in storage system user interfaces, or they can be grouped together in various ways, such as to list all hosts associated with a particular application, user, or host-based database or file system cluster. These host definitions can serve as convenient administrative objects for a storage system to associate information about host location or for host to storage system preferences for pods. It may be convenient for a storage system to manage one host definition for each host rather than one host definition for each pod. That may be convenient because the initiator ports and network interfaces associated with a host are likely the same for all pods. This might not be the case if pods are used as a strong form of virtual appliance where each pod is securely isolated from other pods, however, this may be convenient and easier to set up for any uses or implementations that are short of such secure pod isolation.

If pods can provision a dataset or a storage object to the same host from multiple storage systems in the pod, and if the ALUA states for that host and the host to storage system preferences must be managed in a coordinated fashion across all storage systems for the pod, then host definitions may need to be coordinated or synchronized across pods, but unlike most other administered objects for a pod, the host may be a storage system object (because network interfaces and SCSI target ports are often storage system objects) rather than a pod object. As a result, the host object may not be as readily synchronized between pod members because definitions may clash.

In addition, a host may be interconnected to one storage system for a pod through one set of host-side initiators and network interfaces, and to another storage system for a pod through a different set of host-side initiators and network interfaces. Furthermore, there may be some overlap between the two sets, or there may be no overlap between the two sets. In some cases, there may be host information that can be used by storage systems to determine that interfaces represent the same host. For example, the interfaces may use the same iSCSI IQN, or a host-side driver may supply host information to the storage systems to indicate that the various initiator or network interfaces represent the same host. In other cases, there may be no such information. In the absence of discoverable information, parameters for host definitions may instead be supplied to a storage system by a user or through some API or other interface to relate a host name to a set of network endpoints, iSCSI IQNs, initiator ports, and so on.

If part of a dataset associated with a pod is exported to a particular host through a host definition (meaning that it is provided to a host based on a host definition through a list of network endpoints, iSCSI IQNs, or initiator ports from one or more of a pod's current storage systems' own network endpoints, and SCSI targets), then when an additional storage system is added to the pod, the added storage system's host definitions can be examined. If no host with the same host object name, and no host with an overlapping list of host network endpoints, iSCSI IQNs, or initiator ports is present on the added storage system, then the host definition can be copied to the added storage system. If a host definition with the same name and the same configuration of host network endpoints, iSCSI IQNs, and initiator ports is present on the added storage system, then the host definition from the original pod member storage systems and that of the added storage system can be linked and coordinated from then on. If a host with the same name but a differing configuration of host network endpoints, iSCSI IQNs, or initiator ports is present on the added storage system, then qualified versions of the host objects can be exchanged between the storage systems for the pod, where differing versions are named with a storage system qualifier. For example, storage system A may present its host definition as A:H1, while storage system B may present its host definition as B:H1. The same can be provided for host definitions that differ in name but have some overlap in host network endpoints, iSCSI IQNs, or initiator ports. In that case, the host definitions may not be copied between storage systems but may instead stay storage system local, yielding, for example, a host definition A:H1 listing host initiators X and Y, and a host definition B:H2 listing host initiators Y and X. Further, an operation can be provided to synchronize these host definitions. If two host definitions have the same name, or an overlapping set of host network endpoints, iSCSI IQNs, or initiator ports, then a user can be provided with a simple interface for unifying them together with a common name, exchanged host network endpoints, iSCSI IQNs or initiator ports, that are then linked together. If the only clash between the two definitions is that some host definitions include host interfaces that aren't listed on another interface, but at least one host interface matches, then these definitions could be automatically merged and linked rather than waiting for a user to make such a request.

If a storage system in a pod detaches another storage system as a result of a set of conditions (faults, shutdowns, etc.), then the detached storage system, if it is offline for the pod but is otherwise still running, may make changes to its host definition. A storage system which remains online for a pod may also make changes to its host definition. The result can be mismatched host definitions. If the detached storage system is later reconnected to the pod, then the host definitions may no longer match. At that point, the pod may resume reporting host definitions with their storage system name prefix to differentiate the separate definitions on each storage system.

Another aspect of host definitions is that the host definition may define a location or a storage system preference, as part of configuring what will be returned for ALUA information in terms of which storage system's target ports should result in an ALUA status of Active/Optimized and which should result in an ALUA status of Active/Non-optimized. This state may also need to be coordinated and linked between storage systems. If so, that may be another aspect that requires coordination. A clash, or a lack of any setting, detected when reconciling host definitions for storage systems in a pod may also present an opportunity to prompt users to set a location or a storage system preference.

Readers will note that since host definitions may be storage system level objects in practice, rather than pod level objects, the same host definitions can be used for pods stretched between a plurality of storage systems as well as for pods that are not stretched beyond a single storage system. The use of hosts in the context of a purely local pod (or one pod stretched to a different set of storage systems than another pod) could alter how a host (or the list of hosts) is viewed. In the context of a local pod, for example, qualifying a host by a storage system may not make sense, and listing hosts that have no paths to the local storage system may also not make sense. This example could be extended to pods that have different member storage systems. For example, a host definition may clash with a paired storage system for one pod (making storage system qualification useful), while the host definition may not clash with a different paired storage system for a different pod (making storage system qualification potentially unnecessary). A similar issue may arise in the use of hosts when one pod is stretched to one set of additional storage systems and another pod is stretched to a different set of additional storage systems. In that case, only target interfaces for storage systems relevant to a particular pod matter, and only the host network endpoints, iSCSI IQNS, and initiator ports which are visible to the target interfaces on the relevant storage systems for the pod.

Although only one of the storage systems (3014, 3024, 3028) depicted in FIG. 30 is expressly illustrated as performing the steps described above, readers will appreciate that each of the storage systems (3014, 3024, 3028) may be performing the steps described above. In fact, each of the storage systems (3014, 3024, 3028) may be performing the steps described above at roughly the same time, such that the identification of an optimal pathway is a coordinated effort. For example, each storage system (3014, 3024, 3028) may individually identify all data communications pathways between itself and the host, gather various performance metrics associated with each data communications pathways between itself and the host, and share such information with the other storage systems in an effort to identify one or more optimal paths.

Figure 31:
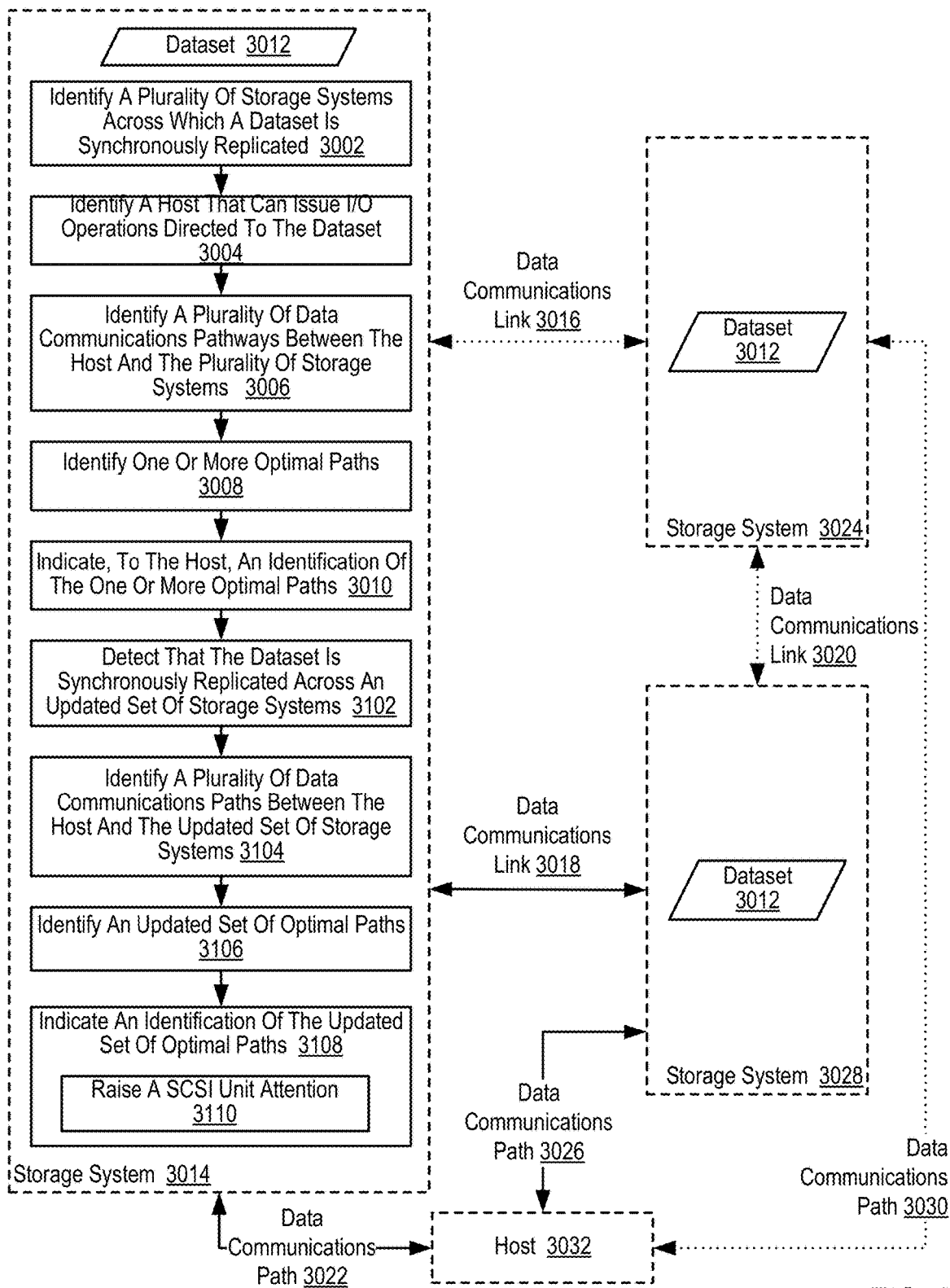
FIG. 31 sets forth a flow chart illustrating an additional example method for managing connectivity to synchronously replicated storage systems according to some embodiments of the present disclosure.

For further explanation, FIG. 31 sets forth a flow chart illustrating an additional example method for managing connectivity to synchronously replicated storage systems (3014, 3024, 3028) according to some embodiments of the present disclosure. Although depicted in less detail, the storage systems (3014, 3024, 3028) depicted in FIG. 31 may be similar to the storage systems described above with reference to FIGS. 1A-1D, FIGS. 2A-2G, FIGS. 3A-3B, or any combination thereof. In fact, the storage system depicted in FIG. 31 may include the same, fewer, or additional components as the storage systems described above.

The example method depicted in FIG. 31 is similar to the example method depicted in FIG. 30, as the example method depicted in FIG. 31 can also include identifying (3002) a plurality of storage systems (3014, 3024, 3028) across which a dataset (3012) is synchronously replicated, identifying (3004) a host (3032) that can issue I/O operations directed to the dataset (3012), identifying (3006) a plurality of data communications paths (3022, 3026, 3030) between the host (3032) and the plurality of storage systems (3014, 3024, 3028) across which a dataset (3012) is synchronously replicated, identifying (3008), from amongst the plurality of data communications paths (3022, 3026, 3030) between the host (3032) and the plurality of storage systems (3014, 3024, 3028) across which a dataset (3012) is synchronously replicated, one or more optimal paths, and indicating (3010), to the host (3032), an identification of the one or more optimal paths.

The example method depicted in FIG. 31 also includes detecting (3102) that the dataset (3012) is synchronously replicated across an updated set of storage systems. In the example method depicted in FIG. 31, the set of storage systems across which the dataset (3012) is synchronously replicated may change for a variety of reasons. The set of storage systems across which the dataset (3012) is synchronously replicated may change, for example, because one or more properly functioning storage systems are added to or removed from a pod. In addition, the set of storage systems across which the dataset (3012) is synchronously replicated may change, for example, because one or more storage systems becomes unreachable or otherwise becomes unavailable and, in response to becoming unreachable or unavailable, is detached from a pod. In the example method depicted in FIG. 31, detecting (3102) that the dataset (3012) is synchronously replicated across an updated set of storage systems may be carried out, for example, by detecting a change to a pod definition, by detecting that a storage system has becomes unreachable or otherwise becomes unavailable, or in some other way.

In the example method depicted in FIG. 31, an embodiment is depicted where the dataset (3012) is synchronously replicated across an updated set of storage systems. In such an example, storage system (3024) was described in FIG. 30 as being initially identified (3002) as one of the plurality of storage systems (3014, 3024, 3028) across which the dataset (3012) is synchronously replicated. The example depicted in FIG. 31, however, illustrates an embodiment in which the storage system (3024) has become unreachable or has otherwise become unavailable, which is depicted herein through the use of dotted lines (representing an absence of an active connection) for data communications links (3016, 3018, 3020) between the other storage systems (3014, 3028) and a data communications path (3030) that can be used to couple the host (3032) with the storage system (3024) for data communications with the storage system (3024). As such, the initial set of storage systems across which the dataset (3012) was synchronously replicated included all depicted storage systems (3014, 3024, 3028) whereas the updated set of storage systems across which the dataset (3012) is synchronously replicated include only two storage systems (3014, 3028).

The example method depicted in FIG. 31 also includes identifying (3104) a plurality of data communications paths between the host (3032) and the updated set of storage systems (3014, 3028). In the example method depicted in FIG. 31, identifying (3104) a plurality of data communications paths between the host (3032) and the updated set of storage systems (3014, 3028) may be carried out, for example, through the use of the SCSI ALUA mechanisms that are described in greater detail above, through the use of some other network discovery tools, or in some other way.

The example method depicted in FIG. 31 also includes identifying (3106), from amongst the plurality of data communications paths between the host (3032) and the updated set of storage systems, an updated set of optimal paths. In the example method depicted in FIG. 31, identifying (3106) an updated set of optimal paths may include identifying a single optimal path or identifying a plurality of optimal paths. For example, a subset of more optimal paths (such as the paths between the host and a particular storage system) may be identified where any path that meets various performance thresholds may be identified, a predetermined number of the most optimal paths (e.g., those paths that exhibit superior performance relative to other available paths) may be identified, a predetermined percentage of the most optimal paths may be identified, and so on. Readers will appreciate that there may be performance advantages associated with the host (3032) issuing I/O operations to one storage system versus another storage system, as the storage systems (3014, 3024, 3028) may be located some distance from each other, the storage systems (3014, 3024, 3028) may be located in separate storage networks or separate parts of storage networks, or for some other reason. For example, there may be performance advantages associated with the host (3032) issuing I/O operations to a storage system that is physically located within the same data center or campus as the host (3032) relative to the host (3032) issuing I/O operations to a storage system that is physically located within a distant data center or campus. For reliability purposes it may be beneficial to have the host (3032) retain connectivity to all storage systems (3032), but for performance purposes it may be preferred that the host (3032) accesses the dataset (3012) through a particular storage system or subset of storage systems. Readers will appreciate that because different hosts may access the dataset (3012), the one or more optimal paths for one host to access the dataset (3012) may be different than the one or more optimal paths for another host to access the dataset (3012). In the example method depicted in FIG. 30, identifying (3106), from amongst the plurality of data communications paths between the host (3032) and the updated set of storage systems, an updated set of optimal paths may be carried out, for example, through the use of the SCSI ALUA mechanisms described above, in an automated manner by using timing or network information to determine that host paths to particular interfaces or storage systems in a pod has lower latency, better throughput, or less switching infrastructure than host paths to other particular interfaces or storage systems in the pod, or in some other way. Readers will appreciate that although some of the preceding paragraphs refer to a 'set', such a set can include a single member and places no particular limitations as to how such a set is represented.

Readers will appreciate that there may be a variety of sources of the performance advantages described above. For writes, a host requesting writes to a more distant storage system requires long-distance bandwidth for the host-to-distant-storage-system network in addition to the long-distance bandwidth needed (in any case) for the storage-system-to-storage-system replication itself (this uses host-to-storage bandwidth that is otherwise not necessary, or it incurs traffic for write content in both directions when traffic in only one direction should have been necessary). Further, for writes, if long-distance latency is significant, then that latency is incurred four or six times (the first one or three phases of a two or four-phase write from host to distant storage system, plus delivery of write content from the distant storage system to the local storage system, plus delivery of a completion or similar indication from the local storage system to the distant storage system, plus a final completion sent from the distant storage system to the host for the last part of the two or four-phase write request). For writes to the local storage system, by contrast, long distance latency will be incurred only twice: once for delivery of the write content from the local storage system to the distant storage system, and once for delivery of the completion or similar indication from the distant storage system to the local storage system. For reads, a host requesting reads from a local storage system will often consume no long-distance bandwidth at all, and will usually incur no long-distance latency penalty.

The example method depicted in FIG. 31 also includes indicating (3108), to the host (3012), an identification of the updated optimal path. In the example method depicted in FIG. 31, a storage system (3014, 3024, 3028) may indicate (3108) an identification of the updated optimal path to the host (3032), for example, through one or more messages exchanged between the storage system (3014, 3024, 3028) and the host (3032). Such messages may be exchanged using many of the mechanisms described above and may identify the optimal path through the use of a port identifier, network interface identifier, or some other identifier. Readers will appreciate that in some embodiments, a portion of the process through which a storage system (3014, 3024, 3028) may indicate (3108) an identification of the updated optimal path to the host (3032) can include piggy-backing such information onto responses to commands issued by the host (3012). For example, one of the storage systems (3014, 3024, 3028) may raise (3110) a SCSI unit attention to the host. A SCSI unit attention is a mechanism that enables a device (e.g., the storage system) to tell a host-side SCSI driver that the operational state of the device or the fabric state has changed. Stated differently, by raising a unit attention the storage system may indicate to the host that the host should query the storage system for state changes through which the host can find that the target port group states have changed to indicate a different set of Active/Optimized and Active/Non-optimized target port groups. In such an example, the target (e.g., the storage system) internally raises a "unit attention" that is returned to the host (3012) the next time a response to a command is sent to the host (3012), which tells the host-side SCSI driver to request the updated ALUA state prior to clearing the unit attention. This mechanism may allow the storage system to get the host to update its ALUA state as desired, but it is dependent on a future SCSI request of some kind being issued to some target port which isn't offline. In such an example, because the SCSI protocol takes the form of a command issued by the host (3012), and a response returned by the target (e.g., the storage system), transferring information for updating optimal paths may need to piggy-back on this mechanism in a slightly roundabout way, as the SCSI "unit attention" mechanism provides a way for the target to give unsolicited updates back to the host (3012).

Figure 32:
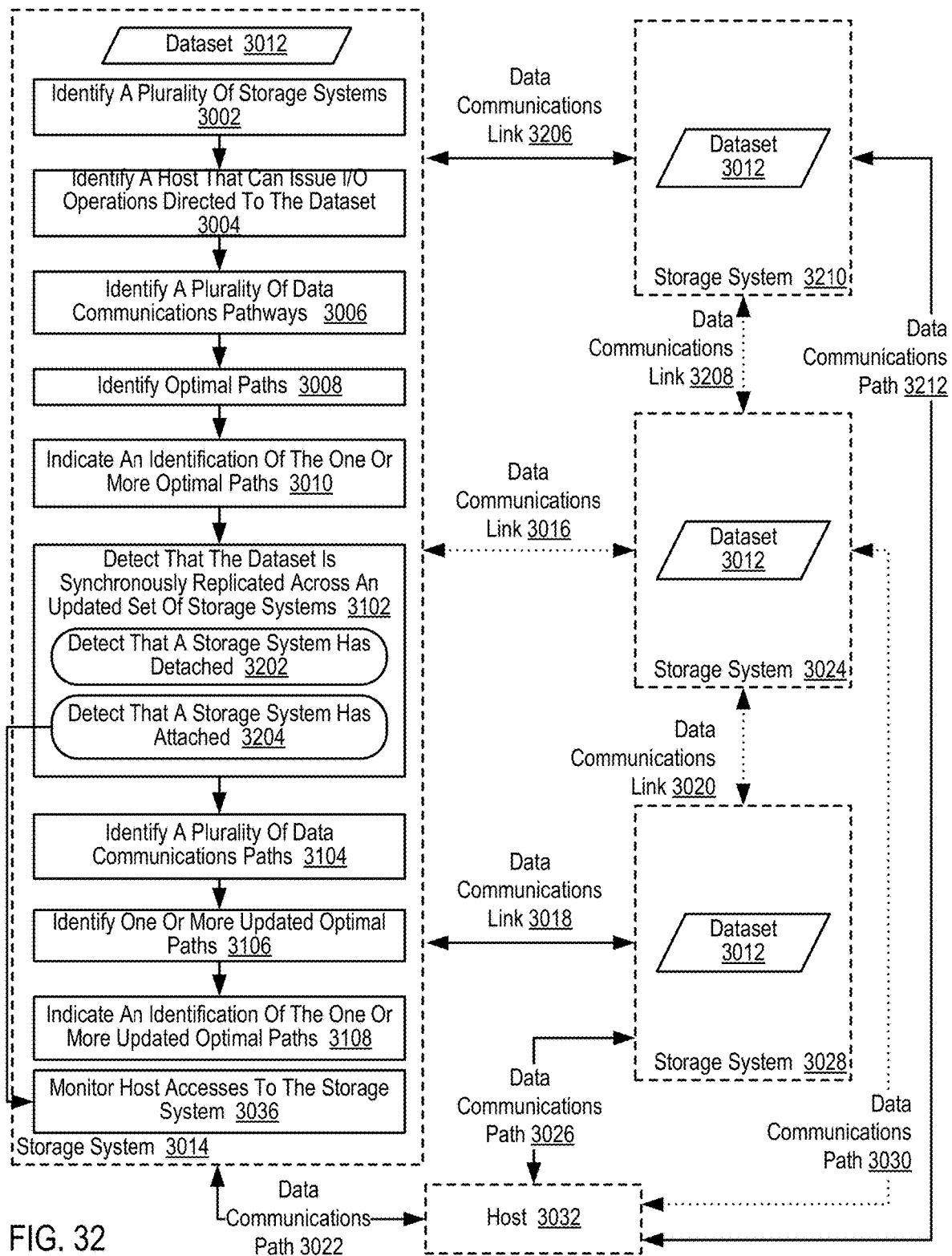
FIG. 32 sets forth a flow chart illustrating an additional example method for managing connectivity to synchronously replicated storage systems according to some embodiments of the present disclosure.

For further explanation, FIG. 32 sets forth a flow chart illustrating an additional example method for managing connectivity to synchronously replicated storage systems (3014, 3024, 3028) according to some embodiments of the present disclosure. Although depicted in less detail, the storage systems (3014, 3024, 3028, 3210) depicted in FIG. 32 may be similar to the storage systems described above with reference to FIGS. 1A-1D, FIGS. 2A-2G, FIGS. 3A-3B, or any combination thereof. In fact, the storage system depicted in FIG. 32 may include the same, fewer, additional components as the storage systems described above.

The example method depicted in FIG. 32 is similar to the example methods depicted in FIG. 30 and FIG. 31, as the example method depicted in FIG. 32 can also include identifying (3002) a plurality of storage systems (3014, 3024, 3028) across which a dataset (3012) is synchronously replicated, identifying (3004) a host (3032) that can issue I/O operations directed to the dataset (3012), identifying (3006) a plurality of data communications paths (3022, 3026, 3030) between the host (3032) and the plurality of storage systems (3014, 3024, 3028) across which a dataset (3012) is synchronously replicated, identifying (3008), from amongst the plurality of data communications paths (3022, 3026, 3030) between the host (3032) and the plurality of storage systems (3014, 3024, 3028) across which a dataset (3012) is synchronously replicated, one or more optimal paths, and indicating (3010), to the host (3032), an identification of the one or more optimal paths, detecting (3102) that the dataset (3012) is synchronously replicated across an updated set of storage systems, identifying (3104) a plurality of data communications paths between the host (3032) and the updated set of storage systems (3014, 3028), identifying (3106), from amongst the plurality of data communications paths between the host (3032) and the updated set of storage systems, one or more updated optimal paths, and indicating (3108), to the host (3012), an identification of the updated optimal path.

In the example method depicted in FIG. 32, detecting (3102) that the dataset (3012) is synchronously replicated across an updated set of storage systems can include detecting (3202) that a storage system (3024) has detached from an original set of storage systems across which the dataset (3012) was being synchronously replicated. In the example method depicted in FIG. 32, a storage system (3024) may be considered 'detached' when the storage system (3024) is no longer participating in the synchronous replication of the dataset (3012) across a plurality of storage systems. A particular storage system may detach, for example, due to a hardware failure within the storage system, due to a networking failure that prevents the storage system from engaging in data communications, due to a loss of power to the storage system, due to a software crash on the storage system, or for a variety of other reasons. In the example method depicted in FIG. 32, detecting (3202) that a storage system (3024) has detached from an original set of storage systems across which the dataset (3012) was being synchronously replicated may be carried out, for example, by determining that the storage system has become unavailable or otherwise unreachable. In the example method depicted in FIG. 32, one of the storage systems (3024) is depicted as being detached due to a networking failure that prevents the storage system from engaging in data communications, as all data communications links (3016, 3018, 3020, 3208) and data communications paths (3030) that are used by the storage system (3024) are represented with dotted lines to illustrate that the data communications links (3016, 3018, 3020, 3208) and data communications paths (3030) that are used by the storage system (3024) are not operational.

In the example method depicted in FIG. 32, detecting (3102) that the dataset (3012) is synchronously replicated across an updated set of storage systems can also include detecting (3204) that a storage system (3210) that was not included in an original set of storage systems across which the dataset (3012) was being synchronously replicated has attached to the set of storage systems across which the dataset (3012) is synchronously replicated. In the example method depicted in FIG. 32, a storage system (3210) may be considered 'attached' when the storage system (3210) is participating in the synchronous replication of the dataset (3012) across a plurality of storage systems. A particular storage system may attach, for example, due to the storage system being added to a pod, due to the storage system recovering from a hardware failure within the storage system, due to the storage system recovering from a networking failure, due to the storage system recovering from a loss of power to the storage system, due to the storage system recovering from a software crash on the storage system, or for a variety of other reasons. In the example method depicted in FIG. 32, one of the storage systems (3210) that was not included in any of the previous figures is depicted as being attached to the set of storage systems across which the dataset (3012) is synchronously replicated, where the storage system (3210) is coupled for data communications with the host (3032) and other storage systems (3024) via one or more data communications links (3206) and data communications paths (3212). Readers will appreciate that although no data communications links are illustrated between some of the storage systems (3028, 3210), such data communications links may actually exist but are only omitted here for convenience of illustration.

The example method depicted in FIG. 32 can also include monitoring (3036) host accesses to the storage system (3210) that was not included in the original set of storage systems across which the dataset (3012) was being synchronously replicated. As described above, if new storage systems are added to a pod, then new target port groups can be added for each volume in that pod to the host ports accessing that volume, with target port groups assigned states appropriate to the host/storage-system proximity for the new storage system. After some number of SAN-level events, the host can recognize the new ports for each volume and configure its drivers to use the new paths appropriately. The storage system can monitor for host accesses (such as waiting for REPORT LUNS and INQUIRY commands) to determine on behalf of the pod that a host is now properly configured to use SCSI target ports on the newly added storage system. In such an example, the host may be monitored for assurance that a host is ready to issue commands to the newly added members of a target port group before taking actions for a pod that depend on the hosts being ready to issue commands to members of that target port group. This may be useful, for example, when coordinating removal of a pod member. In such an example, if one or more hosts that are known to be using the storage system being removed have not yet been found to be using a storage system that was recently added, then if the member being removed is the last remaining storage system known to be working for one or more of those hosts, then it might be beneficial to issue an alert before allowing the operation to proceed (or the operation can be prevented outright).

Figure 33:
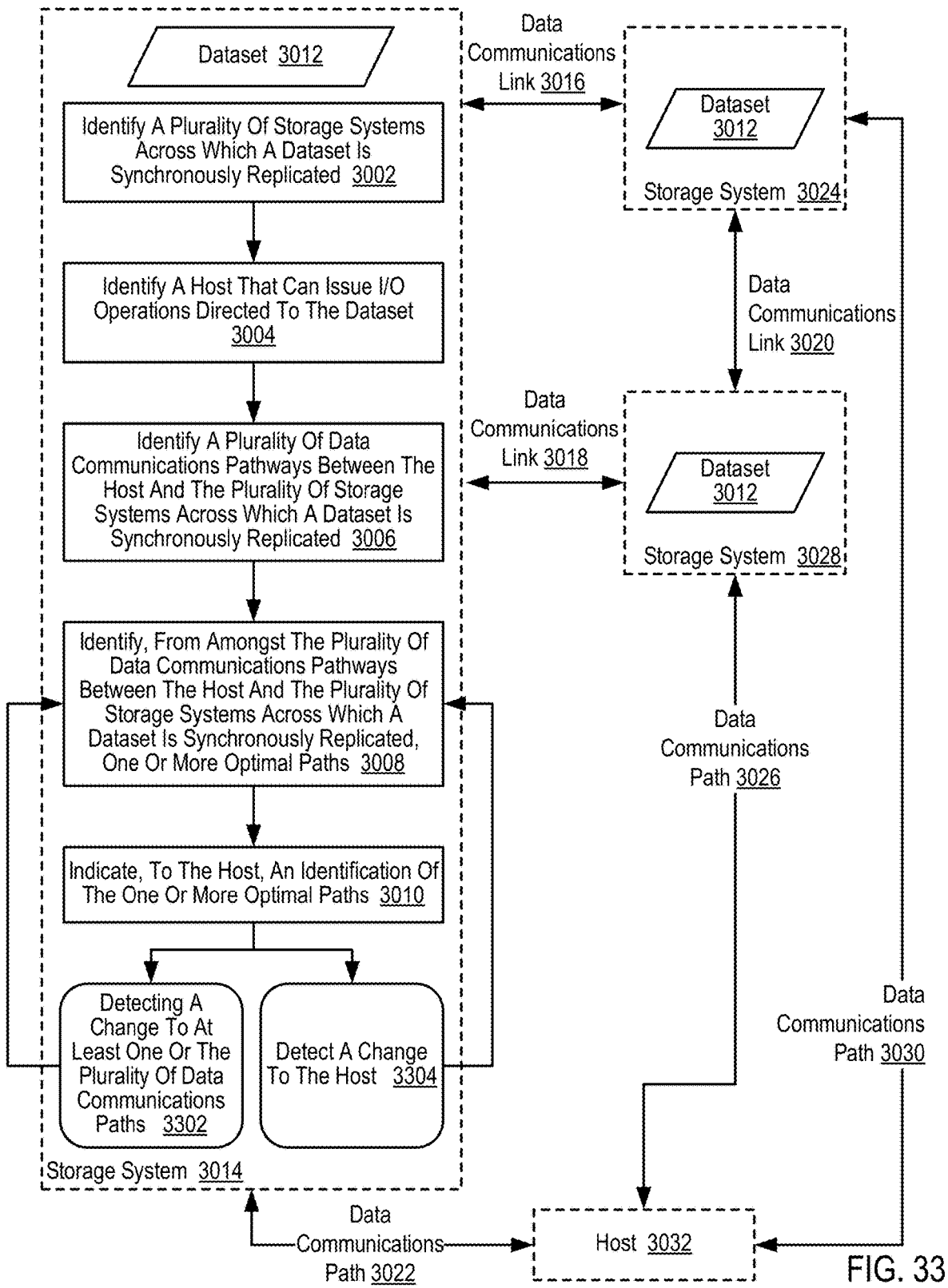
FIG. 33 sets forth a flow chart illustrating an additional example method for managing connectivity to synchronously replicated storage systems according to some embodiments of the present disclosure.

For further explanation, FIG. 33 sets forth a flow chart illustrating an additional example method for managing connectivity to synchronously replicated storage systems (3014, 3024, 3028) according to some embodiments of the present disclosure. Although depicted in less detail, the storage systems (3014, 3024, 3028) depicted in FIG. 33 may be similar to the storage systems described above with reference to FIGS. 1A-1D, FIGS. 2A-2G, FIGS. 3A-3B, or any combination thereof. In fact, the storage system depicted in FIG. 33 may include the same, fewer, additional components as the storage systems described above.

The example method depicted in FIG. 33 is similar to the example methods depicted in FIG. 30, FIG. 31, and FIG. 32, as the example method depicted in FIG. 33 can also include identifying (3002) a plurality of storage systems (3014, 3024, 3028) across which a dataset (3012) is synchronously replicated, identifying (3004) a host (3032) that can issue I/O operations directed to the dataset (3012), identifying (3006) a plurality of data communications paths (3022, 3026, 3030) between the host (3032) and the plurality of storage systems (3014, 3024, 3028) across which a dataset (3012) is synchronously replicated, identifying (3008), from amongst the plurality of data communications paths (3022, 3026, 3030) between the host (3032) and the plurality of storage systems (3014, 3024, 3028) across which a dataset (3012) is synchronously replicated, one or more optimal paths, and indicating (3010), to the host (3032), an identification of the one or more optimal paths.

The example method depicted in FIG. 33 also includes detecting (3302) a change to at least one or the plurality of data communications paths (3022, 3026, 3030) between the host (3032) and the plurality of storage systems (3014, 3024, 3028) across which a dataset (3012) is synchronously replicated. Detecting (3302) a change to at least one or the plurality of data communications paths (3022, 3026, 3030) between the host (3032) and the plurality of storage systems (3014, 3024, 3028) across which a dataset (3012) is synchronously replicated may be carried out, for example, by detecting that a particular data communications paths is no longer operational, by determining that the performance (e.g., bandwidth, throughput) across a particular data communications path has changed by more than a predetermined threshold amount, by determining that fewer or additional hops have been introduced to a particular data communications path, and so on. Readers will appreciate that a change to at least one or the plurality of data communications paths (3022, 3026, 3030) between the host (3032) and the plurality of storage systems (3014, 3024, 3028) across which a dataset (3012) is synchronously replicated may impact which particular data communications path is identified as the optimal path, and as such, the storage systems (3014, 3024, 3028) may need to repeat the steps of identifying (3008), from amongst the plurality of data communications paths (3022, 3026, 3030) between the host (3032) and the plurality of storage systems (3014, 3024, 3028) across which a dataset (3012) is synchronously replicated, an optimal path, and issuing (3010), to the host (3032), an identification of the optimal path.

The example method depicted in FIG. 33 also includes detecting (3304) a change to the host (3032). A change to the host (3032) may occur, for example, as the result of a software or hardware upgrade to the host (3032), as the result of a loss of power to the host (3032), as the result of a hardware or software failure on the host (3032), as the result of the host (3032) being moved, as the result of a new host being used to support the execution of some application that issues I/O operations that are directed to the dataset (3012), or for a variety of other reasons. Readers will appreciate that a change to the host (3032) may impact which particular data communications path is identified as the optimal path, and as such, the storage systems (3014, 3024, 3028) may need to repeat the steps of identifying (3008), from amongst the plurality of data communications paths (3022, 3026, 3030) between the host (3032) and the plurality of storage systems (3014, 3024, 3028) across which a dataset (3012) is synchronously replicated, an optimal path, and issuing (3010), to the host (3032), an identification of the optimal path.

Figure 34:
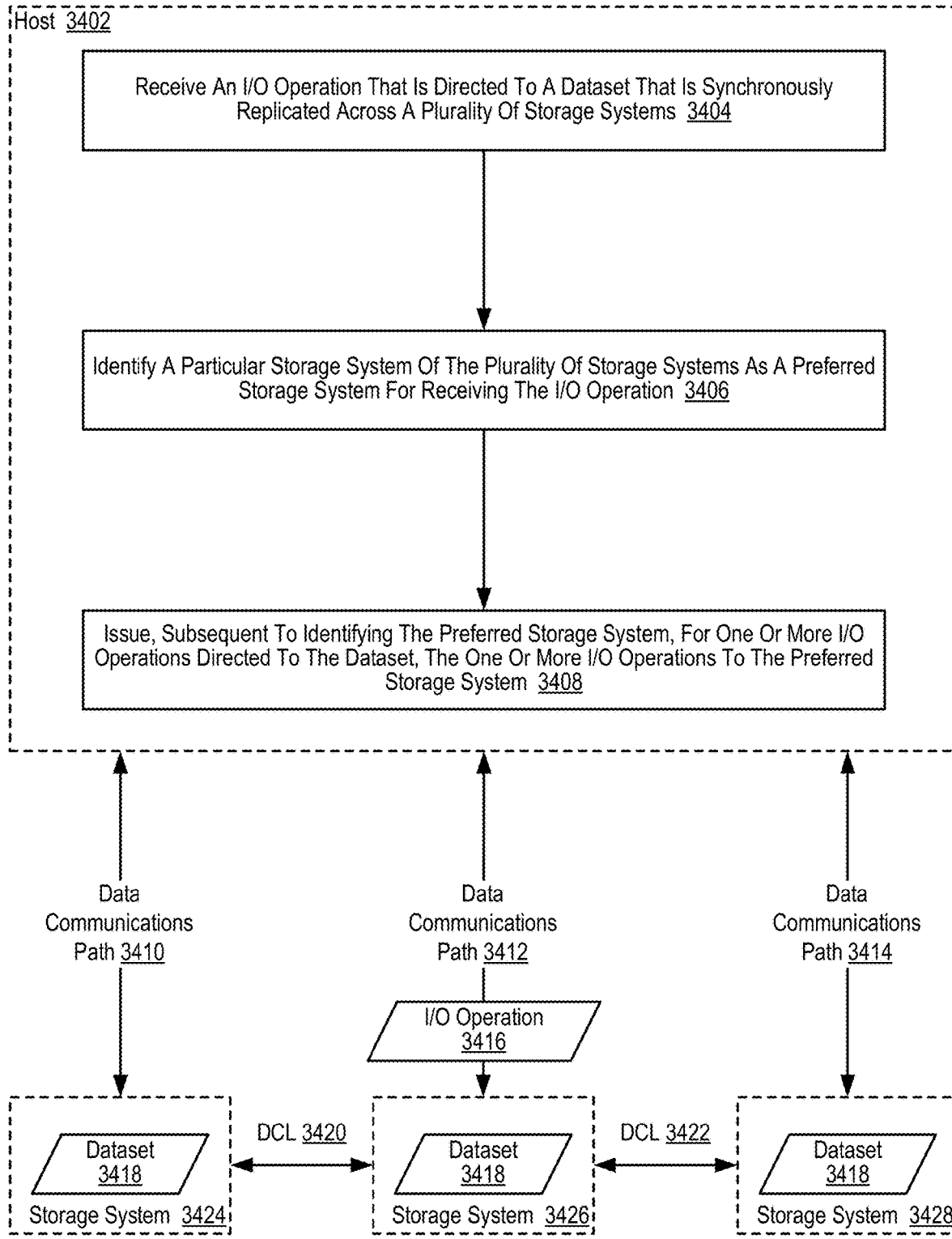
FIG. 34 sets forth a flow chart illustrating an additional example method for managing connectivity to synchronously replicated storage systems according to some embodiments of the present disclosure.

For further explanation, FIG. 34 sets forth a flow chart illustrating an additional example method of managing connectivity to synchronously replicated data across storage systems (3424, 3426, 3428) according to embodiments of the present disclosure. Although depicted in less detail, the storage systems (3424, 3426, 3428) depicted in FIG. 34 may be similar to the storage systems described above with reference to FIGS. 1A-1D, FIGS. 2A-2G, FIGS. 3A-3B, or any combination thereof. In fact, the storage system depicted in FIG. 34 may include the same, fewer, additional components as the storage systems described above. Furthermore, each of the storage systems (3424, 3426, 3428) depicted in FIG. 34 may be connected to each other via one or more data communications links (3420, 3422) and also connected to the host (3402) via one or more data communications paths (3410, 3412, 3414).

The example method depicted in FIG. 34 includes receiving (3404) an I/O operation (3416) that is directed to a dataset (3418) that is synchronously replicated across a plurality of storage systems (3424, 3426, 3428). In the example method depicted in FIG. 34, the host (3402) may receive (3404) an I/O operation (3416) that is directed to a dataset (3418) that is synchronously replicated across a plurality of storage systems (3424, 3426, 3428), for example, from an application that is executing on the host, as the result of some user interaction with the host (3402), or in a variety of other ways. The I/O operation (3416) that is directed to a dataset (3418) that is synchronously replicated across a plurality of storage systems (3424, 3426, 3428) may be embodied, for example, as a request to write data to the dataset (3418), as a request to read data from the dataset (3418), as a request to copy the data in the dataset (3418) and store such a copy elsewhere, as a request to take a snapshot of the data in the dataset (3418), and so on.

The example method depicted in FIG. 34 also includes identifying (3406) a particular storage system (3426) of the plurality of storage systems (3424, 3426, 3428) as a preferred storage system for receiving the I/O operation (3416). In the example method depicted in FIG. 34, the host (3402) may identify (3406) a particular storage system (3426) of the plurality of storage systems (3424, 3426, 3428) as a preferred storage system for receiving the I/O operation (3416), for example, by tracking (or otherwise having access to information describing) response times that the host (3402) has previously experienced when issuing I/O operations to each of the storage systems (3424, 3426, 3428) and selecting the storage system (3426) that exhibited the fastest response time as the preferred storage system for receiving the I/O operation (3416). Readers will appreciate that the host (3432) may track or otherwise having access to information describing other metrics (e.g., reliability related metrics, availability related metrics, throughput metrics) that may be used alone or in combination to identify (3406) a particular storage system (3426) as a preferred storage system for receiving the I/O operation (3416). Alternatively, the host (3402) may be configured to receive an identification of the preferred storage system from a system administrator, as a configuration parameter, from the storage arrays themselves, or in some other way, such that identifying (3406) a particular storage system (3426) as a preferred storage system for receiving the I/O operation (3416) may be carried out by simply examining some configuration parameter or other configuration information stored within the host (3402).

The example method depicted in FIG. 34 also includes issuing (3408), subsequent to identifying the preferred storage system (3426), for one or more I/O operations (3416) directed to the dataset (3418), the one or more I/O operations (3416) to the preferred storage system (3426). In the example method depicted in FIG. 34, the host (3402) may issue (3408) the one or more I/O operations (3416) that are directed to the dataset (3418) to the preferred storage system (3426), for example, via one or more messages that are exchanged between the host (3402) and the preferred storage system (3426) over a data communications path (812) between the host (3402) and the preferred storage system (3426).

Figure 35:
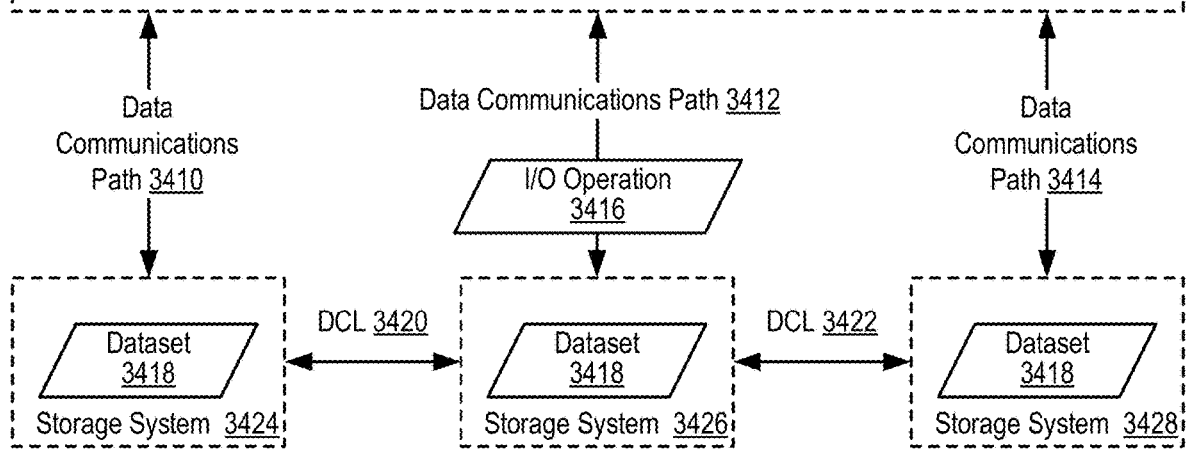
FIG. 35 sets forth a flow chart illustrating an additional example method for managing connectivity to synchronously replicated storage systems according to some embodiments of the present disclosure.

For further explanation, FIG. 35 sets forth a flow chart illustrating an additional example method of managing connectivity to synchronously replicated data across storage systems (3424, 3426, 3428) according to embodiments of the present disclosure. Although depicted in less detail, the storage systems (3424, 3426, 3428) depicted in FIG. 35 may be similar to the storage systems described above with reference to FIGS. 1A-1D, FIGS. 2A-2G, FIGS. 3A-3B, or any combination thereof. In fact, the storage system depicted in FIG. 35 may include the same, fewer, additional components as the storage systems described above.

The example method depicted in FIG. 35 is similar to the example method depicted in FIG. 34, as the example method depicted in FIG. 35 also includes receiving (3404) an I/O operation (3416) that is directed to a dataset (3418) that is synchronously replicated across a plurality of storage systems (3424, 3426, 3428), identifying (3406) a particular storage system (3426) of the plurality of storage systems (3424, 3426, 3428) as a preferred storage system for receiving the I/O operation (3416), and issuing (3408), subsequent to identifying the preferred storage system (3426), for one or more I/O operations (3416) directed to the dataset (3418), the one or more I/O operations (3416) to the preferred storage system (3426).

The example method depicted in FIG. 35 also includes determining (3502) respective response times for multiple storage systems of the plurality of storage systems (3424, 3426, 3428). In the example method depicted in FIG. 35, the host (3402) may determine (3502) respective response times for multiple storage systems of the plurality of storage systems (3424, 3426, 3428), for example, by determining the amount of time required by each of the storage systems (3424, 3426, 3428) to service similar I/O operations, by tracking the average amount of time required by each of the storage systems (3424, 3426, 3428) to service similar I/O operations, and so on. In such an example, the host (3402) may track such information through the use of one or more internal clocks, by examining timestamps attached to one or more messages, or in some other way.

In the example method depicted in FIG. 35, identifying (3406) a particular storage system (3426) of the plurality of storage systems (3424, 3426, 3428) as a preferred storage system for receiving the I/O operation (3416) can include identifying (3504) a particular storage system of the plurality of storage systems (3424, 3426, 3428) as a preferred storage system for receiving the I/O operation (3416) in dependence upon the respective response times for multiple storage systems of the plurality of storage systems (3424, 3426, 3428). In the example method depicted in FIG. 35, the host (3402) may identify (3504) a particular storage system of the plurality of storage systems (3424, 3426, 3428) as a preferred storage system for receiving the I/O operation (3416) in dependence upon the respective response times for multiple storage systems of the plurality of storage systems (3424, 3426, 3428), for example, by selecting the storage system associated with the fastest response times as the preferred storage system, by selecting any storage system whose response times satisfy a predetermined quality of service threshold as the preferred storage system, or in some other way.

The example method depicted in FIG. 35 also includes detecting (3506) a change in response times for at least one of the storage systems (3424, 3426, 3428). In the example method depicted in FIG. 35, the host (3402) may detecting (3506) a change in response times for at least one of the storage systems (3424, 3426, 3428) as the result of running additional tests against each of the storage systems, by determining that an average response time has deviated by more than a predetermined threshold amount, by detecting some disruption to the ability to exchange messages over a particular data communications link, or on some other way.

The example method depicted in FIG. 35 also includes selecting (3508), in dependence upon the change in response times, a different storage system of the plurality of storage systems (3424, 3426, 3428) as a preferred storage system. In the example method depicted in FIG. 35, the host (3402) may select (3508) a different storage system of the plurality of storage systems (3424, 3426, 3428) as a preferred storage system for receiving the I/O operation (3416), for example, by selecting the storage system associated with the fastest updated response times as the preferred storage system, by selecting any storage system whose updated response times satisfy a predetermined quality of service threshold as the preferred storage system, or in some other way.

Figure 36:
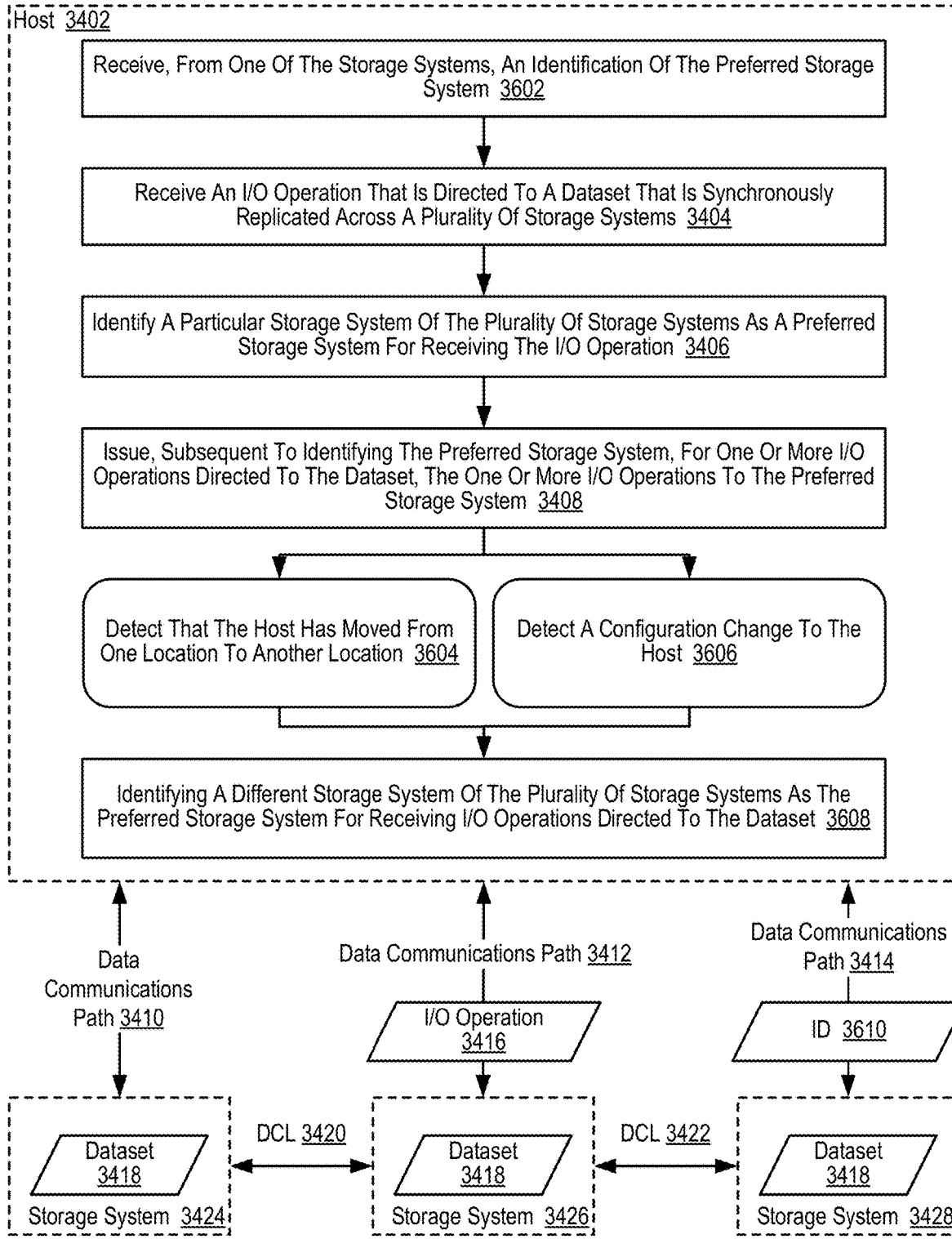
FIG. 36 sets forth a flow chart illustrating an additional example method for managing connectivity to synchronously replicated storage systems according to some embodiments of the present disclosure.

For further explanation, FIG. 36 sets forth a flow chart illustrating an additional example method of managing connectivity to synchronously replicated data across storage systems (3424, 3426, 3428) according to embodiments of the present disclosure. Although depicted in less detail, the storage systems (3424, 3426, 3428) depicted in FIG. 36 may be similar to the storage systems described above with reference to FIGS. 1A-1D, FIGS. 2A-2G, FIGS. 3A-3B, or any combination thereof. In fact, the storage system depicted in FIG. 36 may include the same, fewer, additional components as the storage systems described above.

The example method depicted in FIG. 36 is similar to the example method depicted in FIG. 34, as the example method depicted in FIG. 36 also includes receiving (3404) an I/O operation (3416) that is directed to a dataset (3418) that is synchronously replicated across a plurality of storage systems (3424, 3426, 3428), identifying (3406) a particular storage system (3426) of the plurality of storage systems (3424, 3426, 3428) as a preferred storage system for receiving the I/O operation (3416), and issuing (3408), subsequent to identifying the preferred storage system (3426), for one or more I/O operations (3416) directed to the dataset (3418), the one or more I/O operations (3416) to the preferred storage system (3426).

The example method depicted in FIG. 36 also includes receiving (3602), from one of the storage systems (3428), an identification (3610) of the preferred storage system. In the example method depicted in FIG. 36, the host (3402) may receiving (3602) an identification (3610) of the preferred storage system from one of the storage systems (3428) via one or more messages that are exchanged via a data communications path (3414) between the storage system (3428) and the host (3402). The host (3402) may retain the identification (3610) of the preferred storage system, for example, as a configuration setting that is stored within the host. As such, identifying (3406) a particular storage system (3426) of the plurality of storage systems (3424, 3426, 3428) as a preferred storage system for receiving the I/O operation (3416) may be carried out in dependence upon a configuration setting, although in other embodiments the configuration setting may be set in a different way (e.g., by a system administrator, by another software module executing on the host).

The example method depicted in FIG. 36 also includes detecting (3604) that the host (3402) has moved from one location to another location. In the example method depicted in FIG. 36, the host (3402) may detect (3604) that the it has moved from one location to another location, for example, by determining that the host (3402) has been connected to a new data communications interconnect, by detecting that the host (3402) has been mounted within a different position within a rack or mounted within a new rack, or in some other way. Location relative to racks or within a data center, or based on data center or campus network topology may be an aspect of "locality" that can affect performance between a host and a particular storage system for a pod. In a single storage system that spans racks or that is connected to multiple networks, locality might even apply to individual storage network adapters on an individual storage system within a pod.

The example method depicted in FIG. 36 also includes identifying (3608) a different storage system of the plurality of storage systems as the preferred storage system for receiving I/O operations directed to the dataset (3418). In the example method depicted in FIG. 36, the host (3402) may identify (3608) a different storage system of the plurality of storage systems as the preferred storage system for receiving I/O operations directed to the dataset (3418), for example, by re-measuring the response times associated with each of the storage systems and selecting the storage system that exhibits the fastest response times. In the example method depicted in FIG. 36, identifying (3608) a different storage system of the plurality of storage systems as the preferred storage system for receiving I/O operations directed to the dataset (3418) may be carried out in response to detecting that the host (3402) has moved.

The example method depicted in FIG. 36 also includes detecting (3606) a configuration change to the host (3402). In the example method depicted in FIG. 36, the host (3402) may detect (3606) a configuration change to the host (3402), for example, by detecting that a different version of some software has been installed on the host (3402), by detecting that some hardware component within the host (3402) has been changed or added, and so on. In the example method depicted in FIG. 36, identifying (3608) a different storage system of the plurality of storage systems as the preferred storage system for receiving I/O operations directed to the dataset (3418) may alternatively be carried out in response to detecting the configuration change to the host (3402).

Figure 37:
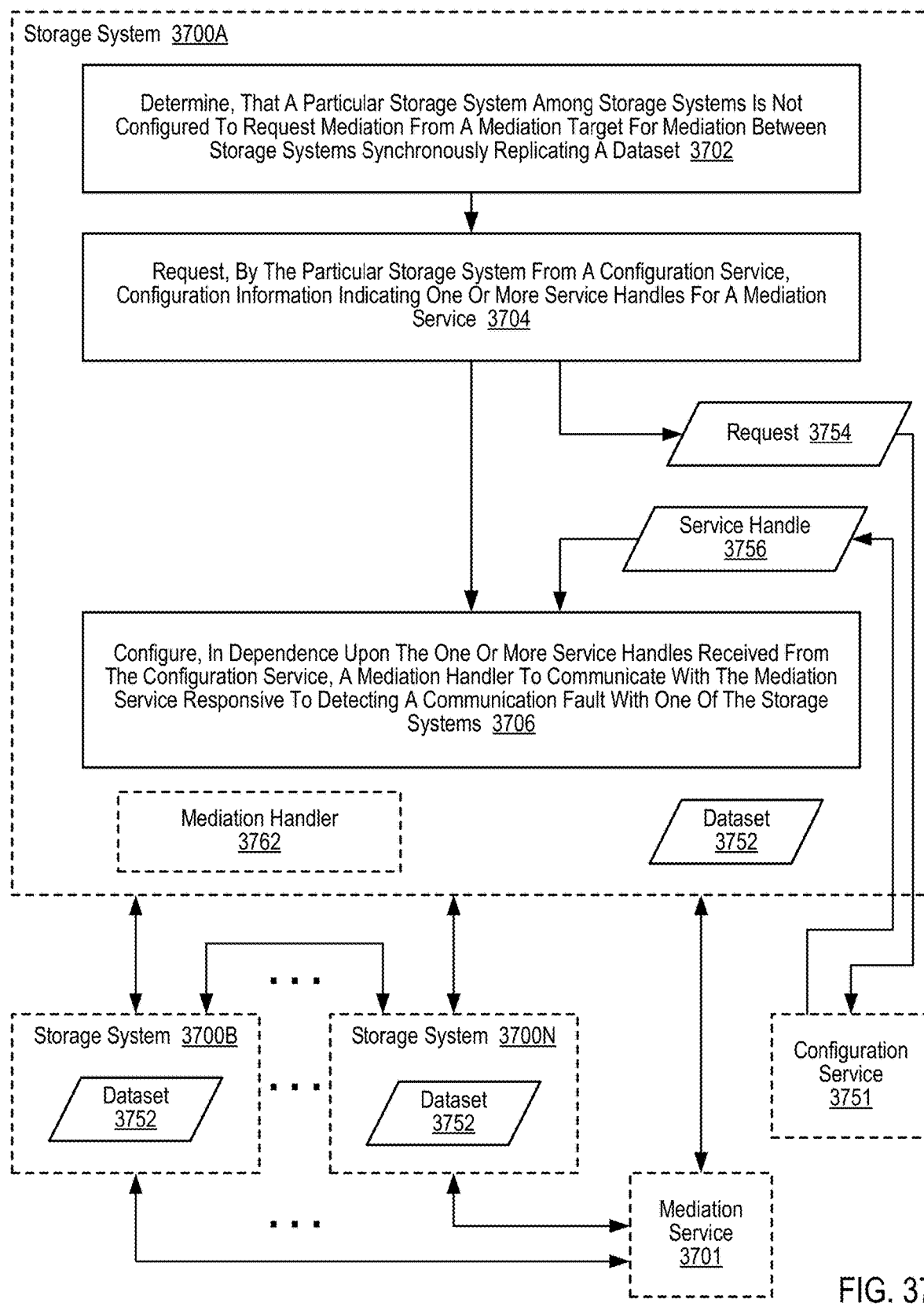
FIG. 37 sets forth a flow chart illustrating an example method for automatic storage system configuration for mediation services according to some embodiments of the present disclosure.

For further explanation, FIG. 37 sets forth a flow chart illustrating an example method for automatic storage system configuration for mediation services according to some embodiments of the present disclosure. Although depicted in less detail, the storage systems (3700A-3700N) depicted in FIG. 37 may be similar to the storage systems described above with reference to FIGS. 1A-1D, FIGS. 2A-2G, FIGS. 3A-3B, or any combination thereof. In fact, the storage systems (3700A-3700N) depicted in FIG. 37 may include the same, fewer, or additional components as the storage systems described above.

In the following examples, automatic storage system configuration for mediation services may include determining whether a given storage system (3700A) among a set of storage systems (3700A-3700N) is configured to request mediation from a mediation target or service—where, in the event that the given storage system (3700A) is not configured to request mediation, the given storage system (3700A) is, prior to being operational, configured to request or obtain a mediation service handle from a pre-configured location. Such a determination of whether or not a storage system is configured to request mediation may occur when the storage system is first brought online or booted up, where the storage system, prior to shipping, has been configured to request the configuration information from a specified configuration service, such as configuration service (3751), where the configuration service may operate within an independent computer system, or third party computing environment that provides the configuration service. In some examples, the mediation service may be configured, not by the storage system, but by a third party that provides the configuration service.

Further, in some examples, determining whether or not a given storage system (3700A) among a set of storage systems (3700A-3700N) is configured to request mediation from a mediation service is performed in response to initiating synchronous replication of a dataset among the set of storage systems (3700A-3700N). In this example, in response to storage systems being added to the set of storage systems synchronously replicating the dataset, or pod, a storage system that is currently a member of the pod may automatically transfer one or more handles for or related to a mediation service and a mediation race target to the storage systems being added. In this way, the first storage system receives a mediation target from the configuration service, and each storage system added to the pod receives its mediation target from a pod member, which results in all members storage systems being configured to request mediation from a same mediation target.

As noted above, the mediation service handle may be requested when a pod is created, when a pod is stretched, or when a pod is first stretched in such a way that mediation may be needed in the event of a future communication fault between storage systems in the pod. A mediation service handle may be a contact address over a wide area network and a cryptographically secure token that can be used to manage a pool of keys for handling mediation needs for a storage system cluster, or pod. Alternately, a first storage system in a pod may determine a secure handle to use with a well-known mediation service for use in a first or a subsequent mediation race, where the handle is determined privately by that first storage system, with no specific or necessary interaction with the mediation service and where that handle is then communicated to other storage systems already in the pod or as the pod is stretched to cover them.

The process of engaging a mediation service in response to an error, such as a communication fault between storage systems—where a storage system may be configured to store a handle that indicates as a contact address over a wide area network and a cryptographically secure token that can be used to manage a pool of keys for mediation—is described in greater detail within application Ser. No. 15/703,559, which is incorporated herein in its entirety. Also discussed within application Ser. No. 15/703,559 is the use of various quorum protocols to determine which storage systems among a set of storage systems replicating a dataset are to continue servicing I/O requests directed to the dataset.

However, while application Ser. No. 15/703,559 describes implementations for mediation and quorum protocols, the focus of this disclosure is automatic storage system configuration for mediation services. In other words, because a storage system, prior to shipment, may be set up to contact a configuration service to request a handle to a mediation service so that the storage system may configure itself to respond to communication faults through mediation, and where the storage system automatically transfers the mediation handled when more storage systems are added to a pod—a user, such as an administrator, need not take any actions in order for a storage system to be configured to perform mediation.

As depicted in FIG. 37, multiple storage systems (3700A-3700N) that are synchronously replicating a dataset (3752) may be in communication with each other storage system and with a mediation service (3701) over one or more networks (not depicted)—where the mediation service (3701) may resolve which storage system continues to service the dataset in the event of a communication fault between storage systems, in the event of a storage system going offline, or due to some other triggering event. Further, in this example, in response to a storage system being brought online, a configuration service (3751) may be automatically reachable, through the use of a pre-configured contact address, by a storage system to request one or more handles to the mediation service (3701). In general, any number of storage systems may be part of an in-sync list that is synchronously replicating a dataset (3752).

The example method depicted in FIG. 37 includes determining (3702), that a particular storage system (3700A) among storage systems (3700A-3700N) is not configured to request mediation from a mediation target for mediation between storage systems synchronously replicating a dataset (3752). Determining (3702), that a particular storage system (3700A) among storage systems (3700A-3700N) is not configured to request mediation from a mediation target may be implemented by the storage system (3700A) including a startup process within a controller, where the startup process may configure how a communication fault, or interrupt related to a communication fault, is handled. For example, the startup process of the controller 462), where the mediation handler (3762) may check, for example by reading a status flag, or condition code, indicating whether or not a mediation handle has been determined, received or requested. If the mediation handler (3762) detects that a mediation handle has already been configured, then this portion of the startup process is complete. However, if the mediation handler (3762) detects that no mediation handle has been configured, then the mediation handler (3762) may proceed to determine such a handle or request a mediation handle from a configuration service (3751)—where a contact address for the mediation service (3701) may be a system setting or system variable that was defined by a manufacturer prior to the storage system being shipped.

The example method depicted in FIG. 37 also includes requesting (3704), by the particular storage system (3700A) from a configuration service (3751), configuration information indicating one or more service handles for a mediation service (3701). Requesting (3704), by the particular storage system (3700A) from a configuration service (3751), configuration information indicating one or more service handles for a mediation service (3701) may be implemented by the mediation handler (3762) accessing the stored contact information for the configuration service (3751), and transmitting a request (3754) for the one or more service handles for the mediation service (3701).

The example method depicted in FIG. 37 also includes configuring (3706), in dependence upon the one or more service handles received from the configuration service (3751), a mediation handler to communicate with the mediation service responsive to detecting a communication fault with one of the storage systems (3700B-3700N). Configuring (3706), in dependence upon the one or more service handles received from the configuration service (3751), a mediation handler to communicate with the mediation service responsive to detecting a communication fault with one of the storage systems (3700B-3700N) may be implemented by the mediation handler (3762) defining a service handle, or contact address, for the mediation service (3701) used when responding to a communication fault, where the service handle (3756) may be specified within a response message from the configuration service (3751) responding to the request (3754).

Figure 38:
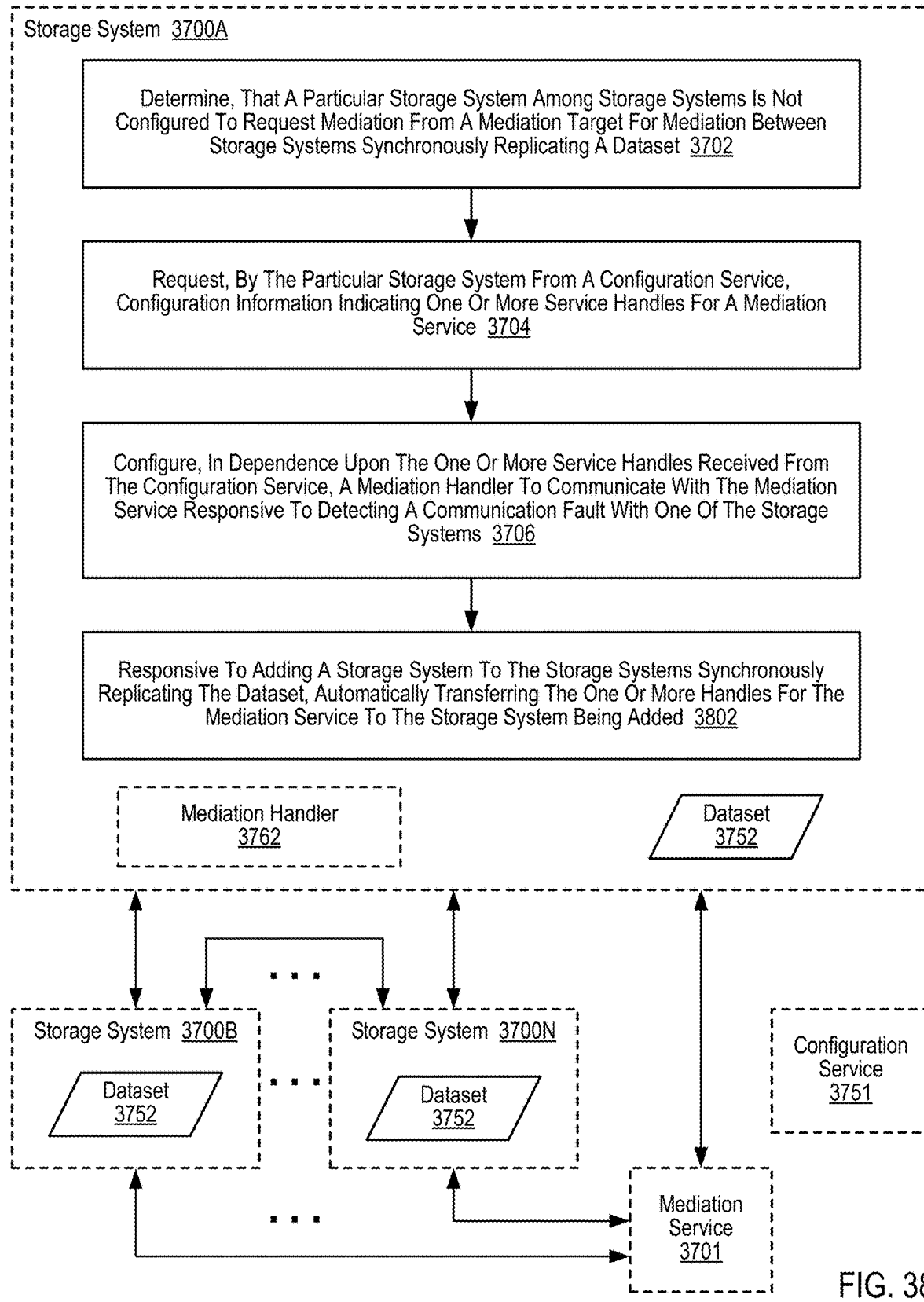
FIG. 38 sets forth a flow chart illustrating an example method for automatic storage system configuration for mediation services according to some embodiments of the present disclosure.

For further explanation, FIG. 38 sets forth a flow chart illustrating an example method for automatic storage system configuration for mediation services according to some embodiments of the present disclosure. The example method depicted in FIG. 38 is similar to the example method depicted in FIG. 37, as the example method depicted in FIG. 38 also includes: determining (3702), that a particular storage system (3700A) among storage systems (3700A-3700N) is not configured to request mediation from a mediation target for mediation between storage systems synchronously replicating a dataset (3752); requesting (3704), by the particular storage system (3700A) from a configuration service (3751), configuration information indicating one or more service handles for a mediation service (3701); and configuring (3706), in dependence upon the one or more service handles received from the configuration service (3751), a mediation handler to communicate with the mediation service responsive to detecting a communication fault with one of the storage systems (3700B-3700N).

However, the example method depicted in FIG. 38 further includes, responsive to adding a storage system to the storage systems (3700A-3700N) synchronously replicating the dataset (3752), automatically transferring (3802) the one or more handles for the mediation service to the storage system being added. The process for adding a storage system to a pod so that the added storage system may become a member of an in-sync list is described herein. Given the described process to add storage systems to a pod, automatically transferring (3802) the one or more handles for the mediation service to the storage system being added may be implemented by further specifying the described process to transmit, to the system being added, a command indicating that the service handle used by a mediation handler is to be defined to be the service handle being transmitted within the command.

Figure 39:
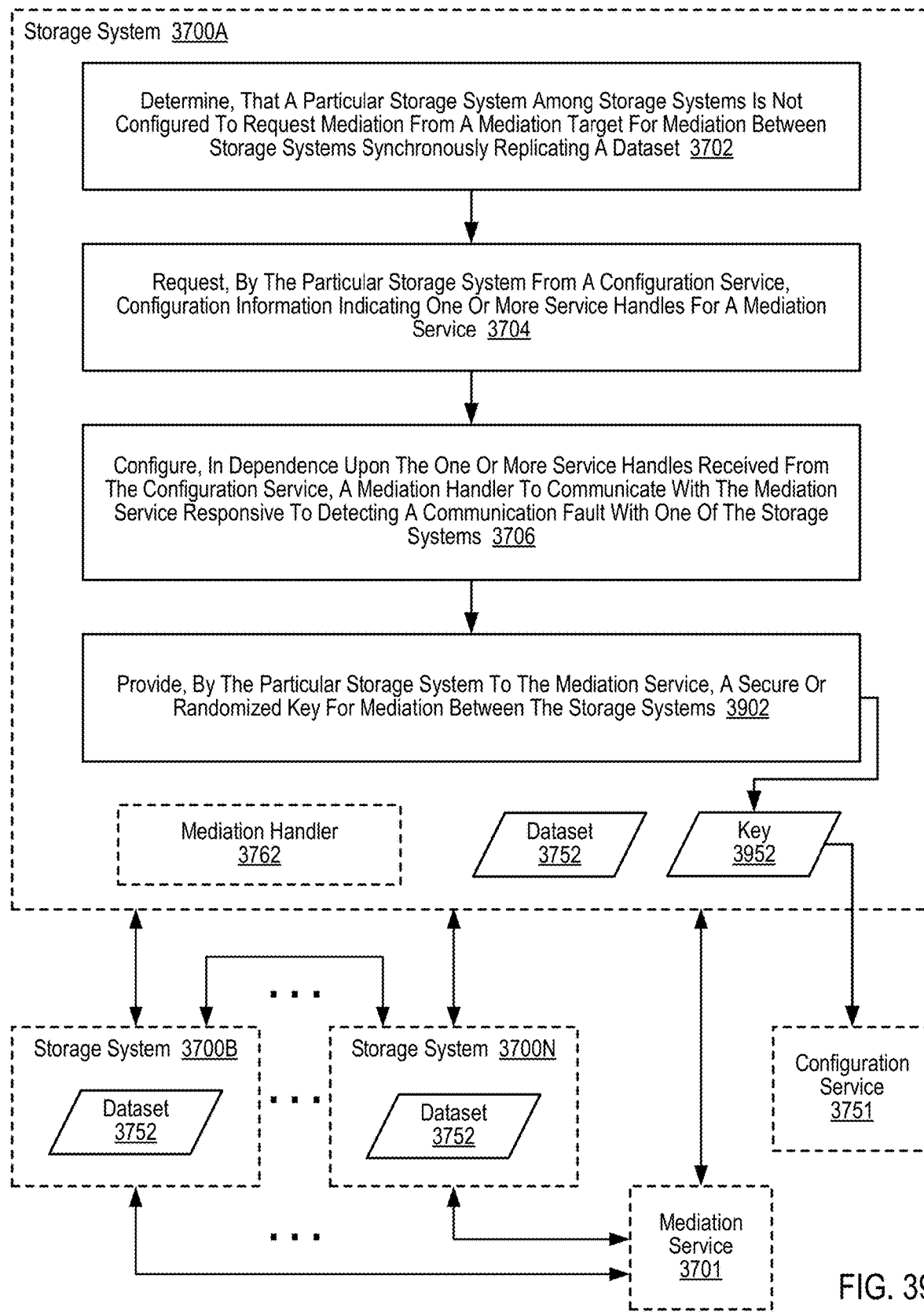
FIG. 39 sets forth a flow chart illustrating an example method for automatic storage system configuration for mediation services according to some embodiments of the present disclosure.

For further explanation, FIG. 39 sets forth a flow chart illustrating an example method for automatic storage system configuration for mediation services according to some embodiments of the present disclosure. The example method depicted in FIG. 39 is similar to the example method depicted in FIG. 37, as the example method depicted in FIG. 39 also includes: determining (3702), that a particular storage system (3700A) among storage systems (3700A-3700N) is not configured to request mediation from a mediation target for mediation between storage systems synchronously replicating a dataset (3752); requesting (3704), by the particular storage system (3700A) from a configuration service (3751), configuration information indicating one or more service handles for a mediation service (3701); and configuring (3706), in dependence upon the one or more service handles received from the configuration service (3751), a mediation handler to communicate with the mediation service responsive to detecting a communication fault with one of the storage systems (3700B-3700N).

However, the example method depicted in FIG. 39 further includes providing (3902), by the particular storage system (3700A) to the mediation service (3701), a secure or randomized key (3952) for mediation between the storage systems (3700A-3700N). Providing (3902), by the particular storage system (3700A) to the mediation service (3701), a secure or randomized key (3952) for mediation between the storage systems (3700A-3700N) may be implemented as described within application Ser. No. 15/703,559, which is incorporated herein in its entirety.

Figure 40:
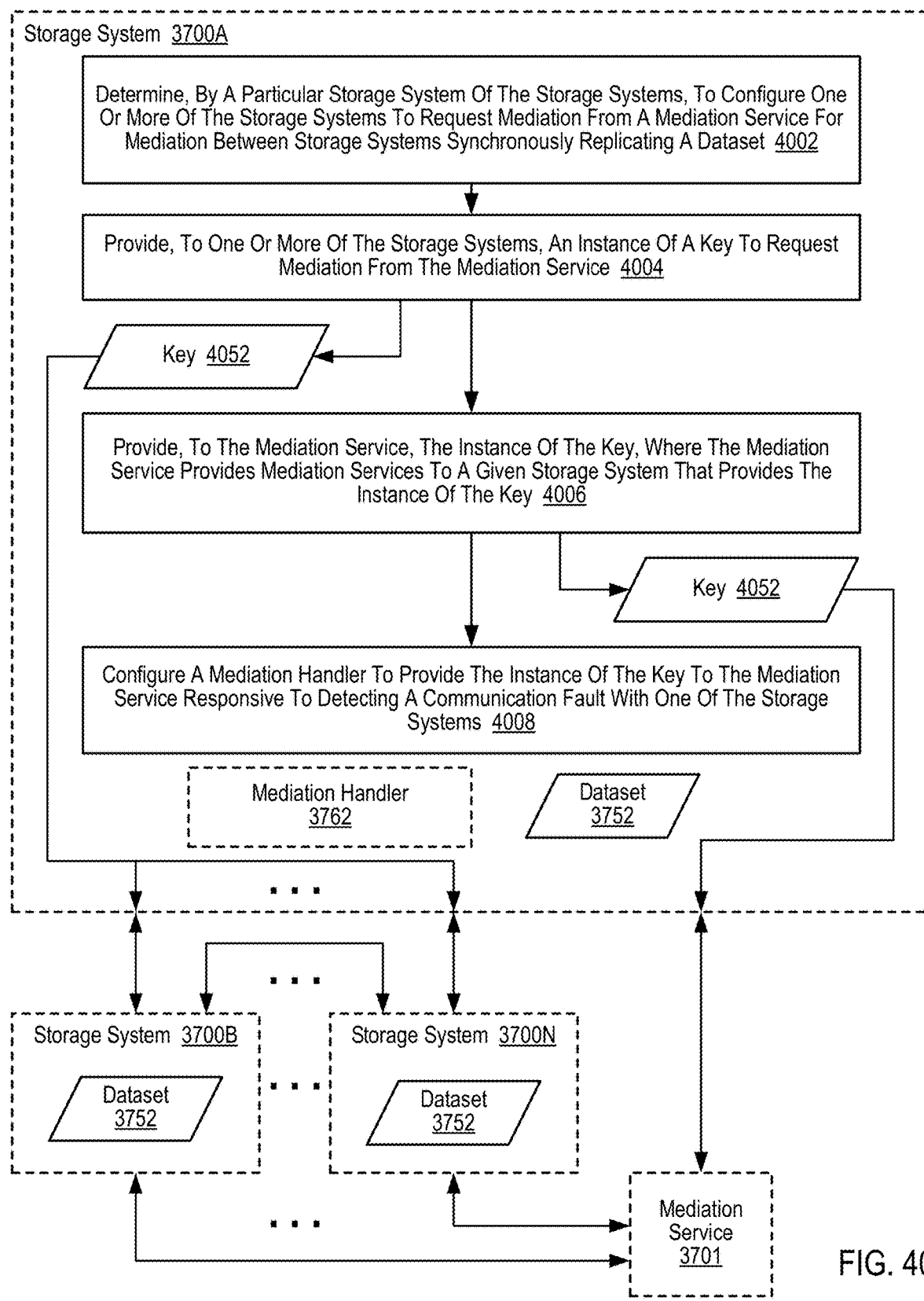
FIG. 40 sets forth a flow chart illustrating an example method for automatic storage system configuration for mediation services according to some embodiments of the present disclosure.

For further explanation, FIG. 40 sets forth a flow chart illustrating an example method for automatic storage system configuration for mediation services according to some embodiments of the present disclosure. Although depicted in less detail, the storage systems (3700A-3700N) depicted in FIG. 40 may be similar to the storage systems described above with reference to FIGS. 1A-1D, FIGS. 2A-2G, FIGS. 3A-3B, or any combination thereof. In fact, the storage systems (3700A-3700N) depicted in FIG. 40 may include the same, fewer, additional components as the storage systems described above.

In this example implementation of automatic storage system configuration, instead of a storage system being preconfigured, prior to being shipped and installed, to request or obtain a mediation service handle from a fixed, pre-configured location, such as a configuration service— the storage system may be preconfigured with fixed contact information for a mediation service. In creating a pod for a dataset, a given storage system may configure use of a mediation service to mediate between storage systems in the pod by generating an instance of a key and providing the key to the mediation service. Further, in creating the pod for the dataset, the given storage system may also configure the other storage systems in the pod—for example, as the storage systems are added to the pod—by providing the same generated key that can be provided to the mediation service to each of the storage systems in the pod. In receiving the generated key, the other storage systems may, in the event that a storage system determines that mediation is an appropriate response to a system fault, use the generated key to request mediation.

In this example, a mediation service may respond to a simple request to lock the use of a particular key, where the mediation service is not configured with the particular key in advance of receiving the particular key, and the mediation service is not configured to receive the particular key from any specific storage system, pod, or customer. If the particular key has been locked at the mediation service by a given storage system, then no other storage system will be able to lock that particular key at the mediation service.

Generally, the key may be generated, or named, using a cryptographically secure scheme in order to prevent exploits, or hacking attempts, where an attacker might predict a key value and pre-lock it. Further, a set of storage systems in a cluster, or pod, using a particular key to use in resolving a next race for the cluster, or pod, may exchange a newly generated key to be used after each mediation attempt. In another example, after a storage system is added to a cluster or pod, one of the aspects of pod configuration may include providing the storage systems being added with the current key to use for a next mediation request. If some event, such as a storage device failure or a network fault, triggers mediation, then one or more storage systems may request a lock on the current key to the mediation service. This request for the lock on the current key can succeed for at most one requestor—if the response to the request is lost, the lock may be requested again (or queried, depending on implementation), where the subsequent request may succeed if the subsequent request is identified by the mediation service as coming from the same requestor.

In some examples, after a single use of a particular mediation key, any remaining active storage systems in the cluster or pod may exchange a new key to use for a future mediation attempt. This exchange of the new key may also be performed in cases where a previous mediation was never confirmed through receiving a successful response from the mediation service—as long as the storage systems which were members at the time of a fault resume communications with each other.

In an alternate implementation, a customer may explicitly configure a mediation service, such as one that operates on virtual machines managed by the customer. In yet another implementation, there may be an intermediate step in configuring a cluster or a pod, whereby a storage system contacts a mediation configuration service on one address to determine a service location address or other contact information that the cluster or pod is to use for mediation. In this implementation, this intermediate step may be part of a core configuration process for a cluster or pod, where the service location address or other contact information is exchanged between storage systems within the cluster or pod, and where the service location address or other contact information is transmitted to new storage systems as they are added to the cluster or pod. Such an implementation may be useful in situations where a vendor arranges particular mediation service instances for particular customers. Alternatively, such an implementation may be used to explicitly locate mediation services based on geography or for matching customer locations to cloud service availability or reliability zones.

In some examples, with regard to a mediation service, the mediation service may be configured such that it may be contacted by storage systems with no customer interaction, where the mediation service operates by receiving requests to lock against a specific instance of mediation within a cluster or pod, and responding with success only if no conflicting request was made for the same lock, and where success is used by one storage system in the cluster or pod as part of ensuring that it can safely resume services for the cluster or pod after detecting a fault that isolated one storage system from at least one other storage system. The mediation service may be a cloud-based service such as one that provides multiple front-end web servers which receive requests from one or more connecting clients, where the front-end web servers may advertise against a particular DNS host name that maps to some number of IP addresses—and that may further be virtualized behind multiple network switches. In some examples, multiple host names may be provided, and the front-end web servers may be configured to scatter, or distribute, requests for mediation across multiple back-end servers. For example, for a mediation service, given a particular mediation key associated with a particular lock request from a storage system, the particular key may be hashed to any of multiple back-end databases that then implement the lock for each received key. Further, because multiple storage systems may use the same key to race to mediate against the same pod, the storage systems may contact any of the front-end web servers that—so long as they are associated with the same overall cloud-based mediation service—may hash to a same back-end database for implementing the lock. In this example, the back-end database may be implemented as a distributed transactional database with appropriate guarantees (e.g., DynamoDB™, among others), or it may be implemented as a high availability database server on shared storage, or it may be implemented as a synchronous replicated database server with appropriate mechanisms for high availability and data redundancy, or it may be implemented using an object storage model with an appropriate guaranteed conditional store primitive, or it may be implemented through any of a variety of other techniques.

Further, in some examples, the mediation service may be implemented to ensure that each key—each cluster's key, pod's key, or customer's key, or keys related to other types of domains, will be securely isolated from other keys, clusters, pods, customers, or other types of domains, depending on implementation. This can ensure, for example, an effective multi-tenancy model for the mediation service.

The example method depicted in FIG. 40 includes determining (4002), by a particular storage system (3700A) of the storage systems (3700A-3700N), to configure one or more of the storage systems to request mediation from a mediation service (3701) for mediation between storage systems (3700A-3700N) synchronously replicating a dataset (3752). Determining (4002), by the particular storage system (3700A) of the storage systems (3700A-3700N), to configure the one or more of the storage systems to request mediation from the mediation service (3701) for mediation between storage systems (3700A-3700N) synchronously replicating a dataset (3752) may be implemented using different techniques. In one example, determining (4002) to configure a storage system may be implemented based upon expansion of a cluster or pod to include another one or more storage systems, where if a new storage system is added to the cluster or pod, then each new storage system is provided a key for mediation that each other existing storage system is configured to use for mediation. In another example, determining (4002) to configure a storage systems may be implemented by maintaining metadata that describes, for each storage system that is a member of the pod synchronously replicating the dataset (3752), whether or not a given storage system has been provided an instance of the key, where an initial state for the metadata may indicate that no storage system has a key. For example, if there is no current consensus for a key, the particular storage system (3700A) may generate an instance of the key, as described above, using a cryptographic technique that generates keys that would not be computationally feasible to predict. Further, the particular storage system (3700A), during startup or periodically, may determine that no keys have been generated—or that there is no current consensus on a key value—and, in response, may generate an instance of a key. Further, in some examples, the mediation key may be part of the replicated content, including metadata, of the synchronized dataset (3752) among the storage systems that are in-sync with each other. Quorum policies may then be used among the storage systems as part of an overall collection of algorithms for determining which storage systems remain in-sync with each other. In this way, storage systems (3700A-3700N) may use the same instance of a key in the event that mediation services are used.

The example method depicted in FIG. 40 also includes providing (4004), to one or more of the storage systems (3700A-3700N), an instance of a key (4052) to request mediation from the mediation service (3701). Providing (4004), to one or more of the storage systems (3700A-3700N), an instance of a key (4052) to request mediation from the mediation service (3701) may be implemented by transmitting, from the particular storage system (3700A), to each of the one or more storage systems determined to not be configured to request mediation from the mediation service, the instance of the key using one or more network ports and across one or more communication networks. In some cases, providing (4004) the instance of the key to the one or more storage systems (3700B-3700N), may be performed in response to determining (4002), by a particular storage system (3700A) of the storage systems (3700A-3700N), that one or more of the storage systems are not configured to request mediation from a mediation service (3701) for mediation between storage systems (3700A-3700N) synchronously replicating a dataset (3752).

In some implementations, under normal circumstances, a pod may start with a mediation key, and would transmit the mediation key as the pod is stretched to include additional storage systems—where a particular storage system, which may be considered a "leader" in some cases, would transmit a new mediation key in response to one key being used once, and the new mediation key being required for a subsequent mediation race. In other words, in contrast to the above implementation, in some implementations, instead of explicitly determining whether a storage systems is configured to use a mediation key, the storage system, based on creation of the pod, may have access to a mediation key as part of the creation of the pod—where, in response to storage systems being added to the pod, the mediation key is distributed to new storage systems as part of the synchronization of data and metadata across the storage systems in the pod. Further, as noted above, in this implementation, in response to using a mediation key, or attempting to use a mediation key, a new key may be generated and distributed to the storage systems in the pod. In this way, the storage systems in a pod may be configured to use a same mediation key that is generated in response to creation of a pod, stretching a pod to include additional storage systems, and use or attempted use of a mediation key. As described above, configuration to use a mediation key may include specifying a current key usable by a mediation handler to be a mediation key that has been synchronized across the storage systems of the pod.

The example method depicted in FIG. 40 also includes providing (4006), to the mediation service (3701), the instance of the key (4052), where the mediation service provides mediation services to a given storage system that provides the instance of the key (4052). Providing (4006), to the mediation service (3701), the instance of the key (4052), where the mediation service provides mediation services to a given storage system that provides the instance of the key (4052) may be implemented by transmitting, from the particular storage system (3700A), to the mediation service (3701), the instance of the key using one or more network ports and across one or more communication networks. In some cases, providing (4006), to the mediation service (3701), the instance of the key (4052), where the mediation service provides mediation services to a given storage system that provides the instance of the key (4052), may be performed in response to determining (4002), by a particular storage system (3700A) of the storage systems (3700A-3700N), that one or more of the storage systems are not configured to request mediation from a mediation service (3701) for mediation between storage systems (3700A-3700N) synchronously replicating a dataset (3752).

The example method depicted in FIG. 40 also includes configuring (4008), a mediation handler (3762) to provide the instance of the key to the mediation service responsive to detecting a communication fault with at least one of the storage systems (3700B-3700N). Configuring (4008), the mediation handler (3762) to provide the instance of the key to the mediation service responsive to detecting the communication fault with at least one of the storage systems (3700B-3700N) may be implemented by the mediation handler (3762) defining a current key to be the generated instance of the key to be provided to the mediation service (3701) when responding to a communication fault.

For further explanation, FIG. 41 sets forth diagrams of metadata representations that may be implemented as a structured collection of metadata objects that, together, may represent a logical volume of storage data, or a portion of a logical volume, in accordance with some embodiments of the present disclosure. Metadata representations 4150, 4154, and 4160 may be stored within a storage system (4106), and one or more metadata representations may be generated and maintained for each of multiple storage objects, such as volumes, or portions of volumes, stored within a storage system (4106).

While other types of structured collections of the metadata objects are possible, in this example, metadata representations may be structured as a directed acyclic graph (DAG) of nodes, where, to maintain efficient access to any given node, the DAG may be structured and balanced according to various methods. For example, a DAG for a metadata representation may be defined as a type of B-tree, and balanced accordingly in response to changes to the structure of the metadata representation, where changes to the metadata representation may occur in response to changes to, or additions to, underlying data represented by the metadata representation. While in this example, there are only two levels for the sake of simplicity, in other examples, metadata representations may span across multiple levels and may include hundreds or thousands of nodes, where each node may include any number of links to other nodes.

Further, in this example, the leaves of a metadata representation may include pointers to the stored data for a volume, or portion of a volume, where a logical address, or a volume and offset, may be used to identify and navigate through the metadata representation to reach one or more leaf nodes that reference stored data corresponding to the logical address. For example, a volume (4152) may be represented by a metadata representation (4150), which includes multiple metadata object nodes (4152, 4152A-4152N), where leaf nodes (4152A-4152N) include pointers to respective data objects (4153A-4153N, 4157). Data objects may be any size unit of data within a storage system (4106). For example, data objects (4153A-4153N, 4157) may each be a logical extent, where logical extents may be some specified size, such as 1 MB, 4 MB, or some other size.

In this example, a snapshot (4156) may be created as a snapshot of a storage object, in this case, a volume (4152), where at the point in time when the snapshot (4156) is created, the metadata representation (4154) for the snapshot (4156) includes all of the metadata objects for the metadata representation (4150) for the volume (4152). Further, in response to creation of the snapshot (4156), the metadata representation (4154) may be designated to be read only. However, the volume (4152) sharing the metadata representation may continue to be modified, and while at the moment the snapshot is created, the metadata representations for the volume (4152) and the snapshot (4156) are identical, as modifications are made to data corresponding to the volume (4152), and in response to the modifications, the metadata representations for the volume (4152) and the snapshot (4156) may diverge and become different.

For example, given a metadata representation (4150) to represent a volume (4152) and a metadata representation (4154) to represent a snapshot (4156), the storage system (4106) may receive an I/O operation that writes to data that is ultimately stored within a particular data object (4153B), where the data object (4153B) is pointed to by a leaf node pointer (4152B), and where the leaf node pointer (4152B) is part of both metadata representations (4150, 4154). In response to the write operation, the read only data objects (4153A-4153N) referred to by the metadata representation (4154) remain unchanged, and the pointer (4152B) may also remain unchanged. However, the metadata representation (4150), which represents the current volume (4152), is modified to include a new data object to hold the data written by the write operation, where the modified metadata representation is depicted as the metadata representation (4160). Further, the write operation may be directed to only a portion of the data object (4153B), and consequently, the new data object (4157) may include a copy of previous contents of the data object (4153B) in addition to the payload for the write operation.

In this example, as part of processing the write operation, the metadata representation (4160) for the volume (4152) is modified to remove an existing metadata object pointer (4152B) and to include a new metadata object pointer (4158), where the new metadata object pointer (4158) is configured to point to a new data object (4157), where the new data object (4157) stores the data written by the write operation. Further, the metadata representation (4160) for the volume (4152) continues to include all metadata objects included within the previous metadata representation (4150)—with the exclusion of the metadata object pointer (4152B) that referenced the target data object, where the metadata object pointer (4152B) continues to reference the read only data object (4153B) that would have been overwritten.

In this way, using metadata representations, a volume or a portion of a volume may be considered to be snapshotted, or considered to be copied, by creating metadata objects, and without actual duplication of data objects—where the duplication of data objects may be deferred until a write operation is directed at one of the read only data objects referred to by the metadata representations.

In other words, an advantage of using a metadata representation to represent a volume is that a snapshot or a copy of a volume may be created and be accessible in constant order time, and specifically, in the time it takes to create a metadata object for the snapshot or copy, and to create a reference for the snapshot or copy metadata object to the existing metadata representation for the volume being snapshotted or copied.

As an example use, a virtualized copy-by-reference may make use of a metadata representation in a manner that is similar to the use of a metadata representation in creating a snapshot of a volume—where a metadata representation for a virtualized copy-by-reference may often correspond to a portion of a metadata representation for an entire volume. An example implementation of virtualized copy-by-reference may be within the context of a virtualized storage system, where multiple block ranges within and between volumes may reference a unified copy of stored data. In such virtualized storage system, the metadata described above may be used to handle the relationship between virtual, or logical, addresses and physical, or real, addresses—in other words, the metadata representation of stored data enables a virtualized storage system that may be considered flash-friendly in that it reduces, or minimizes, wear on flash memory.

In some examples, logical extents may be combined in various ways, including as simple collections or as logically related address ranges within some larger-scale logical extent that is formed as a set of logical extent references. These larger combinations could also be given logical extent identities of various kinds, and could be further combined into still larger logical extents or collections. A copy-on-write status could apply to various layers, and in various ways depending on the implementation. For example, a copy on write status applied to a logical collection of logical collections of extents might result in a copied collection retaining references to unchanged logical extents and the creation of copied-on-write logical extents (through copying references to any unchanged stored data blocks as needed) when only part of the copy-on-write logical collection is changed.

Deduplication, volume snapshots, or block range snapshots may be implemented in this model through combinations of referencing stored data blocks, or referencing logical extents, or marking logical extents (or identified collections of logical extents) as copy-on-write.

Further, with flash storage systems, stored data blocks may be organized and grouped together in various ways as collections are written out into pages that are part of larger erase blocks. Eventual garbage collection of deleted or replaced stored data blocks may involve moving content stored in some number of pages elsewhere so that an entire erase block can be erased and prepared for reuse. This process of selecting physical flash pages, eventually migrating and garbage collecting them, and then erasing flash erase blocks for reuse may or may not be coordinated, driven by, or performed by the aspect of a storage system that is also handling logical extents, deduplication, compression, snapshots, virtual copying, or other storage system functions. A coordinated or driven process for selecting pages, migrating pages, garbage collecting and erasing erase blocks may further take into account various characteristics of the flash memory device cells, pages, and erase blocks such as number of uses, aging predictions, adjustments to voltage levels or numbers of retries needed in the past to recover stored data. They may also take into account analysis and predictions across all flash memory devices within the storage system.

To continue with this example, where a storage system may be implemented based on directed acyclic graphs comprising logical extents, logical extents can be categorized into two types: leaf logical extents, which reference some amount of stored data in some way, and composite logical extents, which reference other leaf or composite logical extents.

A leaf extent can reference data in a variety of ways. It can point directly to a single range of stored data (e.g., 64 kilobytes of data), or it can be a collection of references to stored data (e.g., a 1 megabyte "range" of content that maps some number of virtual blocks associated with the range to physically stored blocks). In the latter case, these blocks may be referenced using some identity, and some blocks within the range of the extent may not be mapped to anything. Also, in that latter case, these block references need not be unique, allowing multiple mappings from virtual blocks within some number of logical extents within and across some number of volumes to map to the same physically stored blocks. Instead of stored block references, a logical extent could encode simple patterns: for example, a block which is a string of identical bytes could simply encode that the block is a repeated pattern of identical bytes.

A composite logical extent can be a logical range of content with some virtual size, which comprises a plurality of maps that each map from a subrange of the composite logical extent logical range of content to an underlying leaf or composite logical extent. Transforming a request related to content for a composite logical extent, then, involves taking the content range for the request within the context of the composite logical extent, determining which underlying leaf or composite logical extents that request maps to, and transforming the request to apply to an appropriate range of content within those underlying leaf or composite logical extents.

Volumes, or files or other types of storage objects, can be described as composite logical extents. Thus, these presented storage objects can be organized using this extent model.

Depending on implementation, leaf or composite logical extents could be referenced from a plurality of other composite logical extents, effectively allowing inexpensive duplication of larger collections of content within and across volumes. Thus, logical extents can be arranged essentially within an acyclic graph of references, each ending in leaf logical extents. This can be used to make copies of volumes, to make snapshots of volumes, or as part of supporting virtual range copies within and between volumes as part of EXTENDED COPY or similar types of operations.

An implementation may provide each logical extent with an identity which can be used to name it. This simplifies referencing, since the references within composite logical extents become lists comprising logical extent identities and a logical subrange corresponding to each such logical extent identity. Within logical extents, each stored data block reference may also be based on some identity used to name it.

To support these duplicated uses of extents, we can add a further capability: copy-on-write logical extents. When a modifying operation affects a copy-on-write leaf or composite logical extent the logical extent is copied, with the copy being a new reference and possibly having a new identity (depending on implementation). The copy retains all references or identities related to underlying leaf or composite logical extents, but with whatever modifications result from the modifying operation. For example, a WRITE, WRITE SAME, XDWRITEREAD, XPWRITE, or COMPARE AND WRITE request may store new blocks in the storage system (or use deduplication techniques to identify existing stored blocks), resulting in modifying the corresponding leaf logical extents to reference or store identities to a new set of blocks, possibly replacing references and stored identities for a previous set of blocks. Alternately, an UNMAP request may modify a leaf logical extent to remove one or more block references. In both types of cases, a leaf logical extent is modified. If the leaf logical extent is copy-on-write, then a new leaf logical extent will be created that is formed by copying unaffected block references from the old extent and then replacing or removing block references based on the modifying operation.

A composite logical extent that was used to locate the leaf logical extent may then be modified to store the new leaf logical extent reference or identity associated with the copied and modified leaf logical extent as a replacement for the previous leaf logical extent. If that composite logical extent is copy-on-write, then a new composite logical extent is created as a new reference or with a new identity, and any unaffected references or identities to its underlying logical extents are copied to that new composite logical extent, with the previous leaf logical extent reference or identity being replaced with the new leaf logical extent reference or identity.

This process continues further backward from referenced extent to referencing composite extent, based on the search path through the acyclic graph used to process the modifying operation, with all copy-on-write logical extents being copied, modified, and replaced.

These copied leaf and composite logical extents can then drop the characteristic of being copy on write, so that further modifications do not result in an additional copy. For example, the first time some underlying logical extent within a copy-on-write "parent" composite extent is modified, that underlying logical extent may be copied and modified, with the copy having a new identity which is then written into a copied and replaced instance of the parent composite logical extent. However, a second time some other underlying logical extent is copied and modified and with that other underlying logical extent copy's new identity being written to the parent composite logical extent, the parent can then be modified in place with no further copy and replace necessary on behalf of references to the parent composite logical extent.

Modifying operations to new regions of a volume or of a composite logical extent for which there is no current leaf logical extent may create a new leaf logical extent to store the results of those modifications. If that new logical extent is to be referenced from an existing copy-on-write composite logical extent, then that existing copy-on-write composite logical extent will be modified to reference the new logical extent, resulting in another copy, modify, and replace sequence of operations similar to the sequence for modifying an existing leaf logical extent.

If a parent composite logical extent cannot be grown large enough (based on implementation) to cover an address range associated that includes new leaf logical extents to create for a new modifying operation, then the parent composite logical extent may be copied into two or more new composite logical extents which are then referenced from a single "grandparent" composite logical extent which yet again is a new reference or a new identity. If that grandparent logical extent is itself found through another composite logical extent that is copy-on-write, then that another composite logical extent will be copied and modified and replaced in a similar way as described in previous paragraphs. This copy-on-write model can be used as part of implementing snapshots, volume copies, and virtual volume address range copies within a storage system implementation based on these directed acyclic graphs of logical extents. To make a snapshot as a read-only copy of an otherwise writable volume, a graph of logical extents associated with the volume is marked copy-on-write and a reference to the original composite logical extents are retained by the snapshot. Modifying operations to the volume will then make logical extent copies as needed, resulting in the volume storing the results of those modifying operations and the snapshots retaining the original content. Volume copies are similar, except that both the original volume and the copied volume can modify content resulting in their own copied logical extent graphs and subgraphs.

Virtual volume address range copies can operate either by copying block references within and between leaf logical extents (which does not itself involve using copy-on-write techniques unless changes to block references modifies copy-on-write leaf logical extents). Alternately, virtual volume address range copies can duplicate references to leaf or composite logical extents, which works well for volume address range copies of larger address ranges. Further, this allows graphs to become directed acyclic graphs of references rather than merely reference trees. Copy-on-write techniques associated with duplicated logical extent references can be used to ensure that modifying operations to the source or target of a virtual address range copy will result in the creation of new logical extents to store those modifications without affecting the target or the source that share the same logical extent immediately after the volume address range copy operation.

Input/output operations for pods may also be implemented based on replicating directed acyclic graphs of logical extents. For example, each storage system within a pod could implement private graphs of logical extents, such that the graphs on one storage system for a pod have no particular relationship to the graphs on any second storage system for the pod. However, there is value in synchronizing the graphs between storage systems in a pod. This can be useful for resynchronization and for coordinating features such as asynchronous or snapshot based replication to remote storage systems. Further, it may be useful for reducing some overhead for handling the distribution of snapshot and copy related processing. In such a model, keeping the content of a pod in sync across all in-sync storage systems for a pod is essentially the same as keeping graphs of leaf and composite logical extents in sync for all volumes across all in-sync storage systems for the pod, and ensuring that the content of all logical extents is in-sync. To be in sync, matching leaf and composite logical extents should either have the same identity or should have mappable identities. Mapping could involve some set of intermediate mapping tables or could involve some other type of identity translation. In some cases, identities of blocks mapped by leaf logical extents could also be kept in sync.

In a pod implementation based on a leader and followers, with a single leader for each pod, the leader can be in charge of determining any changes to the logical extent graphs. If a new leaf or composite logical extent is to be created, it can be given an identity. If an existing leaf or composite logical extent is to be copied to form a new logical extent with modifications, the new logical extent can be described as a copy of a previous logical extent with some set of modifications. If an existing logical extent is to be split, the split can be described along with the new resulting identities. If a logical extent is to be referenced as an underlying logical extent from some additional composite logical extent, that reference can be described as a change to the composite logical extent to reference that underlying logical extent.

Modifying operations in a pod thus comprises distributing descriptions of modifications to logical extent graphs (where new logical extents are created to extend content or where logical extents are copied, modified, and replaced to handle copy-on-write states related to snapshots, volume copies, and volume address range copies) and distributing descriptions and content for modifications to the content of leaf logical extents. An additional benefit that comes from using metadata in the form of directed acyclic graphs, as described above, is that I/O operations that modify stored data in physical storage may be given effect at a user level through the modification of metadata corresponding to the stored data in physical storage—without modifying the stored data in physical storage. In the disclosed embodiments of storage systems, where the physical storage may be a solid state drive, the wear that accompanies modifications to flash memory may be avoided or reduced due to I/O operations being given effect through the modifications of the metadata representing the data targeted by the I/O operations instead of through the reading, erasing, or writing of flash memory. Further, as noted above, in such a virtualized storage system, the metadata described above may be used to handle the relationship between virtual, or logical, addresses and physical, or real, addresses—in other words, the metadata representation of stored data enables a virtualized storage system that may be considered flash-friendly in that it reduces, or minimizes, wear on flash memory.

Leader storage systems may perform their own local operations to implement these descriptions in the context of their local copy of the pod dataset and the local storage system's metadata. Further, the in-sync followers perform their own separate local operations to implement these descriptions in the context of their separate local copy of the pod dataset and their separate local storage system's metadata. When both leader and follower operations are complete, the result is compatible graphs of logical extents with compatible leaf logical extent content. These graphs of logical extents then become a type of "common metadata" as described in previous examples. This common metadata can be described as dependencies between modifying operations and required common metadata. Transformations to graphs can be described as separate operations within a set of or more predicates that may describe relationships, such as dependencies, with one or more other operations. In other words, interdependencies between operations may be described as a set of precursors that one operation depends on in some way, where the set of precursors may be considered predicates that must be true for an operation to complete. A fuller description of predicates may be found within application Ser. No. 15/696,418, which is included herein by reference in its entirety. Alternately, each modifying operation that relies on a particular same graph transformation that has not yet been known to complete across the pod can include the parts of any graph transformation that it relies on. Processing an operation description that identifies a "new" leaf or composite logical extent that already exists can avoid creating the new logical extent since that part was already handled in the processing of some earlier operation, and can instead implement only the parts of the operation processing that change the content of leaf or composite logical extents. It is a role of the leader to ensure that transformations are compatible with each other. For example, we can start with two writes come that come in for a pod. A first write replaces a composite logical extent A with a copy of formed as composite logical extent B, replaces a leaf logical extent C with a copy as leaf logical extent D and with modifications to store the content for the second write, and further writes leaf logical extent D into composite logical extent B. Meanwhile, a second write implies the same copy and replacement of composite logical extent A with composite logical extent B but copies and replaces a different leaf logical extent E with a logical extent F which is modified to store the content of the second write, and further writes logical extent F into logical extent B. In that case, the description for the first write can include the replacement of A with B and C with D and the writing of D into composite logical extent B and the writing of the content of the first write into leaf extend B; and, the description of the second write can include the replacement of A with B and E with F and the writing of F into composite logical extent B, along with the content of the second write which will be written to leaf extent F. A leader or any follower can then separately process the first write or the second write in any order, and the end result is B copying and replacing A, D copying and replacing C, F copying replacing E, and D and F being written into composite logical extent B. A second copy of A to form B can be avoided by recognizing that B already exists. In this way, a leader can ensure that the pod maintains compatible common metadata for a logical extent graph across in-sync storage systems for a pod.

Given an implementation of storage systems using directed acyclic graphs of logical extents, recovery of pods based on replicated directed acyclic graphs of logical extents may be implemented. Specifically, in this example, recovery in pods may be based on replicated extent graphs then involves recovering consistency of these graphs as well as recovering content of leaf logical extents. In this implementation of recovery, operations may include querying for graph transformations that are not known to have completed on all in-sync storage systems for a pod, as well as all leaf logical extent content modifications that are not known to have completed across all storage systems for the pod. Such querying could be based on operations since some coordinated checkpoint, or could simply be operations not known to have completed where each storage system keeps a list of operations during normal operation that have not yet been signaled as completed. In this example, graph transformations are straightforward: a graph transformation may create new things, copy old things to new things, and copy old things into two or more split new things, or they modify composite extents to modify their references to other extents. Any stored operation description found on any in-sync storage system that creates or replaces any logical extent can be copied and performed on any other storage system that does not yet have that logical extent. Operations that describe modifications to leaf or composite logical extents can apply those modifications to any in-sync storage system that had not yet applied them, as long as the involved leaf or composite logical extents have been recovered properly.

In another example, as an alternative to using a logical extent graph, storage may be implemented based on a replicated content-addressable store. In a content-addressable store, for each block of data (for example, every 512 bytes, 4096 bytes, 8192 bytes or even 16384 bytes) a unique hash value (sometimes also called a fingerprint) is calculated, based on the block content, so that a volume or an extent range of a volume can be described as a list of references to blocks that have a particular hash value. In a synchronously replicated storage system implementation based on references to blocks with the same hash value, replication could involve a first storage system receiving blocks, calculating fingerprints for those blocks, identifying block references for those fingerprints, and delivering changes to one or a plurality of additional storage systems as updates to the mapping of volume blocks to referenced blocks. If a block is found to have already been stored by the first storage system, that storage system can use its reference to name the reference in each of the additional storage systems (either because the reference uses the same hash value or because an identifier for the reference is either identical or can be mapped readily). Alternately, if a block is not found by the first storage system, then content of the first storage system may be delivered to other storage systems as part of the operation description along with the hash value or identity associated with that block content. Further, each in-sync storage system's volume descriptions are then updated with the new block references. Recovery in such a store may then include comparing recently updated block references for a volume. If block references differ between different in-sync storage systems for a pod, then one version of each reference can be copied to other storage systems to make them consistent. If the block reference on one system does not exist, then it be copied from some storage system that does store a block for that reference. Virtual copy operations can be supported in such a block or hash reference store by copying the references as part of implementing the virtual copy operation.

Figure 42A:
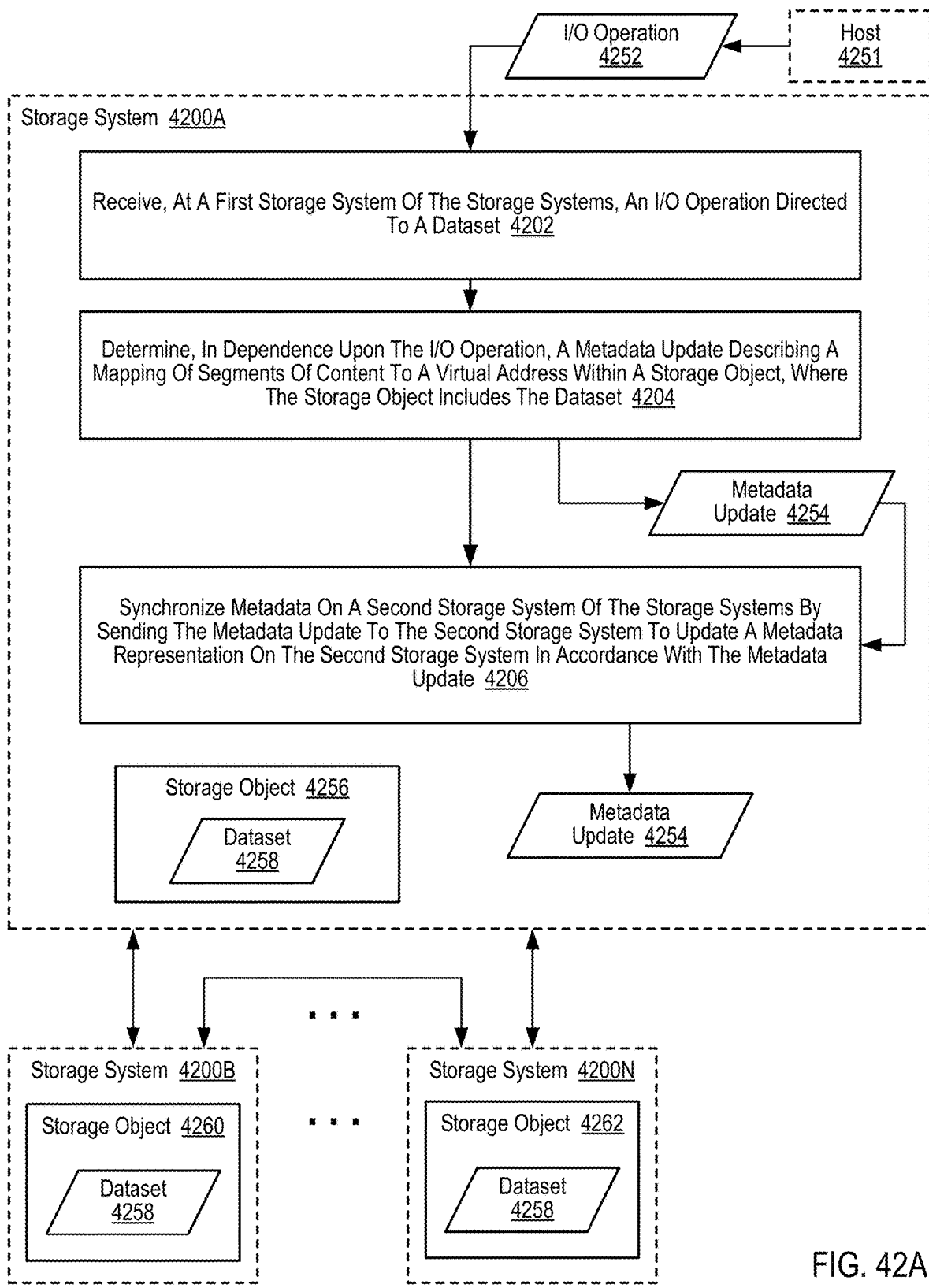
FIG. 42A sets forth a flow chart illustrating an example method for synchronizing metadata among storage systems synchronously replicating a dataset according to some embodiments of the present disclosure.

For further explanation, FIG. 42A sets forth a flow chart illustrating an example method for synchronizing metadata among storage systems synchronously replicating a dataset according to some embodiments of the present disclosure. Although depicted in less detail, the storage system (4200A) depicted in FIG. 42A may be similar to the storage systems described above with reference to FIGS. 1A-1D, FIGS. 2A-2G, FIGS. 3A-3C, or any combination thereof. In fact, the storage system (4200A) depicted in FIG. 42A may include the same, fewer, additional components as the storage systems described above.

As described above, metadata may be synchronized among storage systems that are synchronously replicating a dataset. Such metadata may be referred to as common metadata, or shared metadata, that is stored by a storage system on behalf of a pod related to the mapping of segments of content stored within the pod to virtual address within storage objects within the pod, where information related to those mappings is synchronized between member storage systems for the pod to ensure correct behavior—or better performance—for storage operations related to the pod. In some examples, a storage object may implement a volume or a snapshot. The synchronized metadata may include: (a) information to keep volume content mappings synchronized among the storage systems in the pod; (b) tracking data for recovery checkpoints or for in-progress write operations; (c) information related to the delivery of data and mapping information to a remote storage system for asynchronous or periodic replication.

Information to keep volume content mappings synchronized among the storage systems in the pod may enable efficient creating of snapshots, which in turn enables that subsequent updates, copies of snapshots, or snapshot removals may be performed efficiently and consistently across the pod member storage systems.

Tracking data for recovery checkpoints or for in-progress write operations may enable efficient crash recovery and efficient detection of content or volume mappings that may have been partially or completely applied on individual storage systems for a pod, but that may not have been completely applied on other storage systems for the pod.

Information related to the delivery of data and mapping information to a remote storage system for asynchronous or periodic replication may enable more than one member storage system for a pod to serve as a source for the replicated pod content with minimal concerns for dealing with mismatches in mapping and differencing metadata used to drive asynchronous or periodic replication.

In some examples, shared metadata may include descriptions for, or indications of, a named grouping, or identifiers for, of one or more volumes or one or more storage objects that are a subset of an entire synchronously replicated dataset for a pod—where such a of volumes or storage objects of a dataset may be referred to as a consistency group. A consistency group may be defined to specify a subset of volumes or storage objects of the dataset to be used for consistent snapshots, asynchronous replication, or periodic replication. In some examples, a consistency group may be calculated dynamically, such as by including all volumes connected to a particular set of hosts or host network ports, or that are connected to a particular set of applications or virtual machines or containers, where the applications, virtual machines, or containers may operate on external server systems or may operate on one or more of the storage systems that are members of a pod. In other examples, a consistency group may be defined according to user selections of a type of data or set of data, or specifications of a consistency group similar to the dynamic calculation, where a user may specify, for example through a command or management console, that a particular, or named, consistency group be created to include all volumes connected to a particular set of hosts or host network ports, or be created to include data for a particular set of applications or virtual machines or containers.

In an example using a consistency group, a first consistency group snapshot of a consistency group may include a first set of snapshot for all volumes or other storage objects that are members of the consistency group at the time of the first dataset snapshot, with a second consistency group snapshot of the same consistency group including a second set of snapshots for the volumes or other storage objects that are members of the consistency group at the time of the second dataset snapshot. In other examples, a snapshot of the dataset may be stored on one or more target storage systems in an asynchronous manner. Similarly, asynchronous replication of a consistency group may account for dynamic changes to member volumes and other storage objects of the consistency group, where consistency group snapshots of the consistency group at either the source or the target of the asynchronous replication link include the volumes and other storage objects that are members in relationship to the consistency group at the time that the dataset snapshot relates to. In the case of a target of an asynchronous replication connection, the time that the dataset snapshot relates to depends on the dynamic dataset of the sender as it was received and was in process at the time of the consistency group snapshot on the target. For example, if a target of an asynchronous replication is, say, 2000 operations behind, where some of those operations are consistency group member changes, where a first set of such changes are more than 2000 operations ago for the source, and a second set of changes are within the last 2000, then a consistency group snapshot at that time on the target will account for the first set of member changes and will not account for the second set of changes. Other uses of the target of asynchronous replication may similarly account for the nature of the time of the dataset for the consistency group in determining the volumes or other storage objects (and their content) for those uses. For example, in the same case of asynchronous replication being 2000 operations behind, use of the target for a disaster recovery failover might start from a dataset that includes the volumes and other storage objects (and their content) as they were 2000 operations ago at the source. In this discussion, concurrent operations at the source (e.g., writes, storage object creations or deletions, changes to properties that affect inclusion or exclusion of volumes or other storage objects or other data from a consistency group, or other operations that were in progress and not signaled as completed at a same point in time) might not have a single well-defined ordering, so the count of operations only needs to represent some plausible ordering based on any allowed ordering of concurrent operations on the source.

As another example using consistency groups, in the case of periodic replication based on replication of consistency group snapshots, each replicated consistency group snapshot would include the volumes and other storage objects at the time each consistency group snapshot was formed on the source. Ensuring that membership in a consistency group is kept consistent by using common, or shared, metadata, ensures that a fault—or other change which may cause the source of replication, or the system that forms a dataset snapshot, to switch from one storage system in a pod to another—does not lose information needed for properly handling those consistency group snapshots or the consistency group replication. Further, this type of handling may allow for multiple storage systems that are members of a pod to concurrently serve as source systems for asynchronous or periodic replication.

Further, synchronized metadata describing mapping of segments to storage objects is not limited to mappings themselves, and may include additional information such as sequence numbers (or some other value for identifying stored data), timestamps, volume/snapshot relationships, checkpoint identities, trees or graphs defining hierarchies, or directed graphs of mapping relationships, among other storage system information.

As depicted in FIG. 42A, multiple storage systems (4200A-4200N) that are synchronously replicating a dataset (4258) may be in communication with each other storage system (4200B-4200N) in an in-sync list for a pod—where storage systems may exchange metadata describing I/O operations to perform and metadata describing updates to be made to respective, local metadata representations of the dataset (4258) stored on individual storage systems. Further, each storage system (4200A, 4200B . . . 4200N) may store a respective version of a storage object (4256, 4260 . . . 4262).

The example method depicted in FIG. 42A includes receiving (4202), at a first storage system (4200A) of the storage systems (4200A-4200N), an I/O operation (4252) directed to a dataset (4258). Receiving (4202), at the first storage system (4200A) of the storage systems (4200A-4200N), the I/O operation (4252) directed to the dataset (4258) may be implemented by using one or more communication protocols for transporting packets or data across a network, such as a storage area network (158), the Internet, or any computer network across which a host computer (4251) may communicate with the storage system (4200A). In this example, the storage system (4200A) may receive an I/O operation (4252) received at a network port, such as a SCSI port, where the I/O operation (4252) is a write command that is directed to a memory location that is part of the dataset (4258) being synchronously replicated across the storage systems (4200A-4200N) in the pod.

The example method depicted in FIG. 42A also includes determining (4204), in dependence upon the I/O operation (4252), a metadata update (4254) describing a mapping of segments of content to a virtual address within a storage object (4256), where the storage object (4256) includes the dataset (4258). Determining (4204), in dependence upon the I/O operation (4252), the metadata update (4254) describing the mapping of segments of content to the virtual address within a storage object (4256), where the storage object (4256) includes the dataset (4258) may be implemented by determining, or identifying, information as described above with regard to contents of metadata to be synchronized across the storage systems (4200A-4200N) of a pod, where information from the I/O operation (4252) may also be included in the metadata update (4254), such a logical, or virtual, address, a payload size, and other information, such as deduplication information that describes a manner in which the I/O operation (4252) payload is to be included or incorporated in relation to previously stored data within the dataset (4258).

The example method depicted in FIG. 42A also includes synchronizing (4206) metadata on a second storage system (4200B) of the storage systems (4200A-4200N) by sending the metadata update (4254) to the second storage system (4200B) to update a metadata representation on the second storage system in accordance with the metadata update (4254). Synchronizing (4206) metadata on the second storage system (4200B) of the storage systems (4200A-4200N) by sending the metadata update (4254) to the second storage system (4200B) to update the metadata representation on the second storage system in accordance with the metadata update (4254) may be implemented by transmitting, using one or more network ports and across one or more communication networks (not shown), the metadata update (4254) to each other storage system (4200B-4200N) in the pod—where each other storage system (4200B-4200N) may receive the metadata update (4254) to update a respective, local metadata representation of the synchronized dataset (4258). After each storage system (4200B-4200N) receives and processes the metadata update (4254), the metadata corresponding to the synchronized dataset (4258) on all systems will be synchronized.

For further explanation, FIG. 42B sets forth a flow chart illustrating an example method of synchronizing metadata among storage systems synchronously replicating a dataset according to some embodiments of the present disclosure. The example method depicted in FIG. 42B is similar to the example method depicted in FIG. 42A, as the example method depicted in FIG. 42B also includes: receiving (4202), at a first storage system (4200A) of the storage systems (4200A-4200N), an I/O operation (4252) directed to a dataset (4258); determining (4204), in dependence upon the I/O operation (4252), a metadata update (4254) describing a mapping of segments of content to a virtual address within a storage object (4256), where the storage object (4256) includes the dataset (4258); and synchronizing (4206) metadata on a second storage system (4200B) of the storage systems (4200A-4200N) by sending the metadata update (4254) to the second storage system (4200B) to update a metadata representation on the second storage system in accordance with the metadata update (4254).

However, the example method depicted in FIG. 42B further includes: applying (4288) the I/O operation (4252) to the dataset (4258) on the first storage system (4200A); responsive to successfully applying the I/O operation (4252) on the first storage system (4200A), updating (4290), on the first storage system (4200A) and in accordance with the metadata update (4254), a version of metadata corresponding to the dataset (4258) prior to applying the I/O operation (4252); and determining (4292) predicate metadata describing an ordering of the I/O operation (4252) relative to one or more other I/O operations.

Applying (4288) the I/O operation (4252) to the dataset (4258) on the first storage system (4200A) may be implemented by a controller of the storage system (4200A) as described above with reference to FIG. 1, and the description of the controller carrying out a write operation using one or more of the memory components of the storage system (4200A), such as use of NVRAM and persistent storage, such as flash memory, or any type of solid-state non-volatile memory.

Updating (4290), on the first storage system (4200A) and in accordance with the metadata update (4254), a version of metadata corresponding to the dataset (4258) prior to applying the I/O operation (4252) may be implemented by identifying a portion of a metadata representation for a corresponding storage object (4258), or source volume, storing the dataset (4258), where the portion may, in some cases, be the entire source volume. Further the portion of the metadata representation for the storage object (4256) may be identified by using memory address data for the I/O operation (4252) to traverse the structured collection of metadata objects, described above, to find the nodes that correspond to the data objects for the memory address data for the I/O operation (4252). Further, a metadata object root node for a metadata representation may be created that refers to one or more nodes within the metadata representation for the entire storage object (4256), where the metadata object root node may specify portions of one or more nodes within the metadata representation for the entire storage object (4256), or may specify other indications for referencing only the portions of the metadata representation for the entire storage object (4256) that correspond to the I/O operation (4252). In this way, the metadata representation of the dataset reflects the successful application of the I/O operation (4252).

Determining (4292) predicate metadata describing an ordering of the I/O operation (4252) relative to one or more other I/O operations may be implemented by tracking each received I/O operation and determining whether any dependencies exist between the I/O operations, where after such I/O operations have been identified, any ordering consistency issues should be resolved, just as they should be during normal run-time using techniques such as leader-defined ordering or predicates or through interlock exceptions. An interlock exception is described within application Ser. No. 15/696,418, which is incorporated herein in its entirety. With regard to predicates, descriptions of relationships between operations and common metadata updates may be described as a set of interdependencies between separate, modifying operations—where these interdependencies may be described as a set of precursors that one operation depends on in some way, where the set of precursors may be considered predicates that must be true for an operation to complete. Further, predicates, if they are used to disseminate restrictions on concurrency between leaders and followers, might not need to be preserved, if those predicates drive the order in which storage systems persist information, since the persisted information implies the various plausible outcomes.

Figure 43:
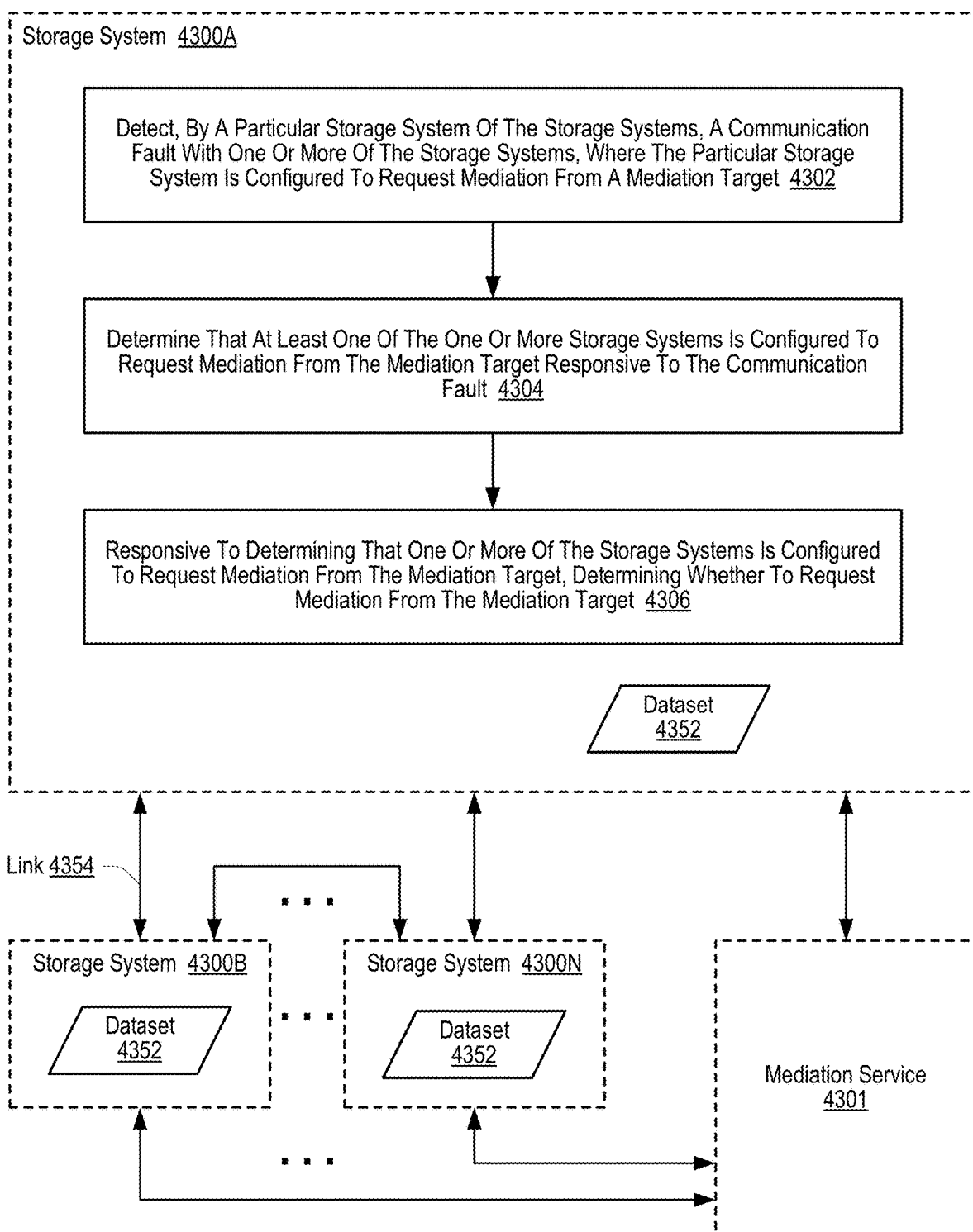
FIG. 43 sets forth a flow chart illustrating an example method for determining active membership among storage systems synchronously replicating a dataset according to some embodiments of the present disclosure.

For further explanation, FIG. 43 sets forth a flow chart illustrating an example method for determining active membership among storage systems synchronously replicating a dataset according to some embodiments of the present disclosure. Although depicted in less detail, the storage systems (4300A-4300N) depicted in FIG. 43 may be similar to the storage systems described above with reference to FIGS. 1A-1D, FIGS. 2A-2G, FIGS. 3A-3B, or any combination thereof. In fact, the storage systems (4300A-4300N) depicted in FIG. 43 may include the same, fewer, or additional components as the storage systems described above.

In the following examples, determining the manner in which to recover from an error among storage systems that synchronously replicate a dataset may include determining whether to engage a mediation service or whether to engage a quorum protocol. As described below, determining active membership in a storage system cluster or pod may overcome errors such as communication faults or storage device failures by determining a subset of the storage systems that continue to service I/O operations directed to the dataset, where another subset of the storage systems do not continue to service I/O operations directed to the dataset. In this way, either through mediation or a quorum policy, one or more storage systems is determined to control the history of I/O operations that modify the synchronously replicated dataset as storage systems are added or removed from an in-sync list of storage systems.

The process of engaging a mediation service in response to an error, such as a communication fault between storage systems—where a storage system may be configured to store a handle that indicates as a contact address over a wide area network and a cryptographically secure token that can be used to manage a pool of keys for mediation—is described in greater detail within application Ser. No. 15/703,559, which is incorporated herein in its entirety. Also discussed within application Ser. No. 15/703,559 is the use of various quorum protocols to determine which storage systems among a set of storage systems replicating a dataset are to continue servicing I/O requests directed to the dataset.

However, while application Ser. No. 15/703,559 describes implementations for mediation and quorum protocols, the focus of this disclosure is an analysis for determining which technique to execute for determining active membership in a storage system cluster. For example, in some scenarios, it is possible for one or more storage systems to engage in and win mediation over another one or more storage systems—where if the other one or more storage systems had won mediation, storage system performance for servicing I/O operations would have been better according to one or more data storage metrics or performance criteria. In other words, it is not always advantageous for the one or more systems that win mediation to win mediation. Discussed below are techniques for avoiding a scenario where one or more storage systems that should not win mediation winning mediation, including assigning a greater quantity of votes to storage systems that are higher performing, or are more closely connected to particular host systems or that have other comparatively better metrics, relative to a quantity of votes assigned to storage systems whose metrics are worse.

In some examples, to determine active membership in a storage system cluster, a default technique for resolving a set of one or more storage systems to continue servicing I/O requests directed to a dataset may be implemented by using a quorum protocol—unless the storage system (4300A) is able to determine, or prove, that use of a quorum protocol would be unable to establish a quorum for determining the set of one or more storage systems to continue servicing I/O requests. In other words, in response to an error such as a communication fault between storage devices within a storage system (4300A), a controller of the storage system (4300A) may determine whether or not a quorum can be established—where if a quorum is able to be established under a particular quorum protocol, then the quorum protocol is used for determining active or in-sync membership in a storage system cluster; otherwise, if a quorum is not able to be established under a particular quorum protocol, then the storage system (4300A) may engage in mediation for determining active or in-sync membership in a storage system cluster. In a simple case, if there are two storage systems that are members of an in-sync list, then no quorum analysis is performed in response to a communication fault because the other, single, storage system would be unable to form a quorum. In some examples, unless a given storage system, or set of storage systems in communication with each other, are able to eliminate the possibility that another set of storage systems may form a quorum based on a comparison of votes for each set of storage systems, then the storage system, or set of storage systems in communication with each other, may rely on a quorum policy to detach the non-communicatively coupled one or more storage systems. In other words, if one or more storage systems that are in communication with each other are able to form a quorum, then one or more storage systems that are not in communication may be detached using a quorum policy without resorting to mediation.

In some examples, a controller for a storage system (4300A) may determine whether or not a quorum may be established, by determining a set of storage systems that are in communication with each other—which also serves to determine a set of storage systems that they are not in communication with based on the storage system (4300A) referencing an in-sync list of the storage systems (4300B-4300N) that are included in the full set of storage systems (4300A-4300N) that are synchronously replicating a dataset. Further, the storage system (4300A) may reference stored indications of a number of votes each storage system among the set of all storage systems or the set of last-known in-sync storage systems (4300A-4300N) has with respect to a given quorum protocol. In this way, given a determined first set of storage systems that are in communication with each other, along with respective votes corresponding to each of the first set of storage systems, and a determined second set of storage systems that are not in communication with the storage system (4300A) performing the analysis, along with respective votes corresponding to each of the second set of storage systems, the storage system (4300A) may determine whether or not the storage systems in the first set of storage systems have sufficient votes to establish a quorum and whether or not the storage systems in the second set of storage systems might have sufficient votes to establish a quorum.

In other words, a storage system (4300A) that detects and responds to a communication fault may determine (1) whether or not the storage systems not in communication may possibly form a quorum, (2) whether or not the storage systems that remain in communication may possibly form a quorum, and/or (3) whether or not any storage system that is not in communication may possibly determine that the storage systems that are in communication may form a quorum—depending on, at least, which set of storage systems remain in communication, which set of storage systems are not in communication, and respective votes that correspond to each storage system within each set of storage systems.

Further, by storage system (4300A) ensuring that another storage system, or another set of storage systems, would be unable to form a quorum, the storage system (4300A) ensures that if it wins mediation, along with one or more other storage systems in communication with storage system (4300A), then no other storage system, or other set of storage systems, would be able to create a version of the synchronously replicated dataset such that if one or more of the storage systems becomes resynchronized with the storage systems that won mediation there would be any inconsistencies in the datasets.

As one example, there may be an even number of votes associated with storage systems that belong to an in-sync list as members of a pod prior to some system fault. In this example, if a first set of storage systems of in-sync pod members are in communication with each other, and the first set of storage systems corresponds to exactly half of the votes for establishing a quorum, then no other set of storage systems that might be in communication with each other—but not with the first set of storage systems—could make up more than half of the votes needed to establish a quorum. In this example, a storage system included in the first set of storage systems may determine that neither the first set of storage systems, nor any other set of storage systems, may possibly form a quorum, and in response, the storage system may initiate mediation.

As another example, a determination for whether or not a quorum may be established by systems in communication or not in communication may be determined repeatedly in response to multiple, respective fault events—where different responses, such as responding by engaging in mediation or quorum voting, may be performed in response to each fault event. For example, prior to a fault such as a communication fault, a set of storage systems may be in-sync members of a pod. In this example, a particular storage system with one vote for establishing a quorum may lose communication with the other members of the pod, and in response, the other members of the pod, by having sufficient votes to establish a quorum, remove the particular storage system through voting. After the completion of this quorum voting phase to remove the particular storage system, the in-sync members of the pod are in-sync members of the pod excluding the particular storage system—resulting in an in-sync member list of storage systems that total four votes for establishing a quorum. To continue with this example, as discussed above, if a fault results in a storage system belonging to a set of storage systems that have a total of two votes, then the storage system may determine that no quorum is possible, and may initiate mediation.

In some examples, storage systems that are in-sync members of a pod may be assigned different, respective numbers of votes, including zero votes. For example, for a set of storage systems that are in-sync members of a pod, different vote distributions include: (a) all storage systems having a single vote, (b) some storage systems having multiple votes and some storage systems having single votes, (c) some storage systems having multiple votes, some storage systems having multiple votes, and some storage systems having zero votes, or (d) each storage system having a different number of votes. In other words, in general, any given storage system that is an in-sync member of a pod may be assigned an arbitrary number of votes, including zero votes. One example of a storage system having zero votes may occur during a migration of a dataset from a source storage system that is a member of the pod to a target storage system that is not yet in the pod—where prior to completion of the migration, the source storage system controls its vote or votes, and the target storage system does not control any votes, and where after migration is complete, the target storage system may be granted control of the vote or votes and the source storage may be updated to not control or have any votes.

In some examples, an in-sync list may be established among a set of storage systems as additional storage systems are added to a pod or detached from a pod, where each storage systems may maintain metadata indicating members of the pod, where the in-sync list may further indicate a status of each member of the pod. As storage systems are added to a pod, the storage system to be added may be provided, by an existing storage system in the pod, a mediation handle for contacting a mediation service. Further, as changes to the pod are made, the in-sync list is updated to reflect a current membership of storage systems within the current pod. Additional description regarding pod definition and management is found within Application Nos. 62/470,172 and 62/518,071, which are herein incorporated by reference in their entirety. Further, as a pod is stretched, or extended, to include more than a single storage system, the storage systems in the pod may be configured to request mediation from a particular mediation service—in this way, each storage system within the pod, in the event that mediation is determined to be the response to a given error, request mediation from the same mediation service. Configuration of storage systems to access a mediation service is further described herein.

As depicted in FIG. 43, multiple storage systems (4300A-4300N) that are synchronously replicating a dataset (4352) may be in communication with each other storage system and with a mediation service (4301) over one or more networks (not depicted)—where the mediation service (4301) may resolve which storage system continues to service the dataset in the event of a communication fault between storage systems, in the event of a storage system going offline, or due to some other triggering event. In general, any number of storage systems may be part of an in-sync list that is synchronously replicating a dataset (4352).

The example method depicted in FIG. 43 includes detecting (4302), by a particular storage system (4300A) of the storage systems (4300A-4300N), a communication fault involving loss of communication with one or more of the storage systems (4300B-4300N), where the particular storage system (4300A) is configured to request mediation from a mediation target, such as mediation service (4301). Detecting (4302) the communications fault may be implemented using several techniques, including a controller of the particular storage system (4300A) not receiving communications (4300B-4300N) over a communication link (4354) or channel from another storage system within some period of time. In another example, detecting (4302) the communication fault may be implemented by a controller of the particular storage system (4300A) in dependence upon a clock exchange protocol to determine that communications channels are not operating correctly, where clock exchanges are described in greater detail at other sections contained herein. Other standard techniques for detecting (4302) a communication fault may also be implemented.

The example method of FIG. 43 also includes determining (4304) that at least one of the one or more storage systems (4300B-4300N) is configured to request mediation from the mediation target, such as mediation service (4301), responsive to the communication fault. Determining (4304) that at least one of the one or more storage systems (4300B-4300N) is configured to request mediation from the mediation service (4301) responsive to the communication fault may be implemented by the storage system (4300A) undergoing the analysis described above—where based on a comparison of votes corresponding to one or more systems in communication with the storage system (4300A) and on votes corresponding to one or more storage systems not in communication with the storage system (4300A), the storage system (4300A) is able to determine whether or not the one or more storage systems not in communication with the storage system (4300A) are able to form a quorum, and whether or not those one or more storage systems not in communication with the storage system (4300A) might possibly be engaging in mediation with the mediation target.

The example method of FIG. 43 also includes, responsive to determining (4304) that the one or more of the storage systems (4300B-4300N) are configured to request mediation from the mediation target, determining (4306) whether to request mediation from the mediation target. Determining (4306) whether to request mediation from the mediation target may be implemented based on the analysis and determination (4304) that at least one of the one or more storage systems with which communication has been lost may be requesting mediation from the mediation target—where if the storage system (4300A) determines that the at least one of the one or more storage systems may be requesting mediation from the mediation target, then the storage system (4300A) may also request mediation from the mediation target. Otherwise, the storage system (4300A), and any storage systems in communication with storage system (4300A) may engage in a quorum policy to detach the at least one of the one or more storage systems, or the storage system (4300A), and any storage systems in communication with storage system (4300A) may determine that another set of storage systems might have quorum and will stop operating with its copies of the synchronously replicated dataset (those storage systems will effectively go offline until communications can be established with more storage systems that can help it determine the state of the in-sync and out-of-sync lists of storage system).

For further explanation, FIG. 44 sets forth a flow chart illustrating an example method for determining active membership among storage systems synchronously replicating a dataset according to some embodiments of the present disclosure. The example method depicted in FIG. 44 is similar to the example method depicted in FIG. 4, as the example method depicted in FIG. 44 also includes: detecting (4302), by a particular storage system (4300A) of the storage systems (4300A-4300N), a communication fault with one or more of the storage systems (4300B-4300N), where the particular storage system (4300A) is configured to request mediation from a mediation target; determining (4304) that at least one of the one or more storage systems (4300B-4300N) is configured to request mediation from the mediation target, such as mediation service (4301), responsive to the communication fault; and responsive to determining (4304) that the one or more of the storage systems (4300B-4300N) are configured to request mediation from the mediation target, determining (4306) whether to request mediation from the mediation target.

However, the example method depicted in FIG. 44 further includes: determining (4402), by a first set of one or more storage systems, that there is consistent communication among storage systems of the first set of one or more storage systems, where each storage system of the storage systems corresponds to zero or more votes within a quorum protocol that determines whether the first set of one or more storage systems may detach a second set of one or more storage systems; determining (4404), by the first set of one or more storage systems, lack of communication with storage systems among the second set of one or more storage systems, where the first set of one or more storage systems is unable to form a quorum; and determining (4406), by the first set of one or more storage systems, that the second set of one or more storage systems is also unable to form a quorum.

Determining (4402), by a first set of one or more storage systems, that there is consistent communication among storage systems of the first set of one or more storage systems may be implemented by each storage system in the first set of one or more storage systems exchanging a status message with every other storage system in the first set of one or more storage systems. In another example, a given storage system may determine that the storage systems in consistent communication with each other are all those storage systems in the in-sync list with the exception of one or more storage systems for which there was a communication fault detected.

Determining (4404), by the first set of one or more storage systems, lack of communication with storage systems among the second set of one or more storage systems may be implemented by similarly detecting (4302) a communication fault, as described above with reference to FIG. 43.

Determining (4406), by the first set of one or more storage systems, that the second set of one or more storage systems is unable to form a quorum may be implemented as described above with reference to whether or not one set of storage systems may establish that another set of storage systems is able to form a quorum.

Figure 45:
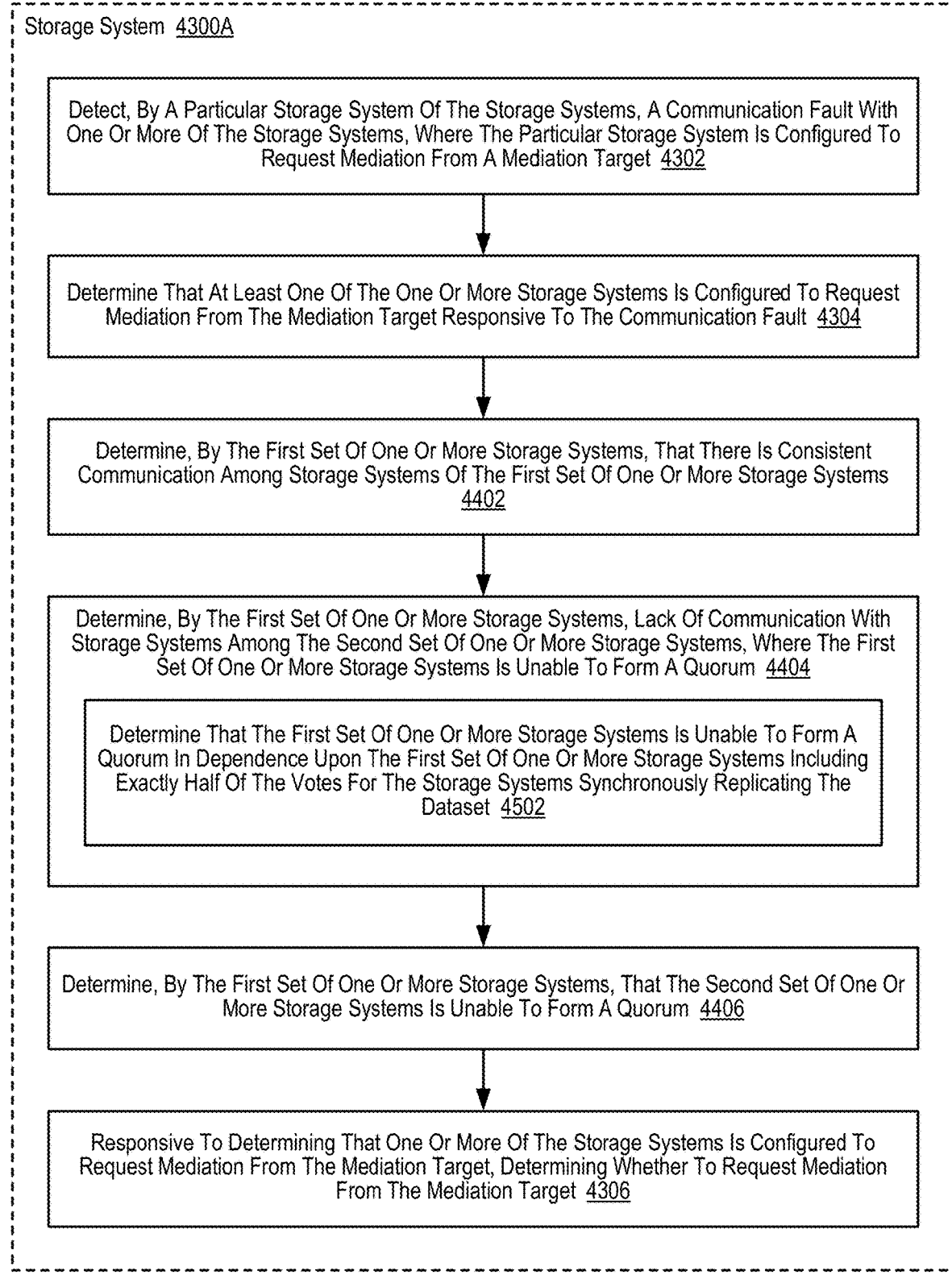
FIG. 45 sets forth a flow chart illustrating an example method for determining active membership among storage systems synchronously replicating a dataset according to some embodiments of the present disclosure.

For further explanation, FIG. 45 sets forth a flow chart illustrating an example method for determining active membership among storage systems synchronously replicating a dataset according to some embodiments of the present disclosure. The example method depicted in FIG. 45 is similar to the example method depicted in FIG. 44, as the example method depicted in FIG. 45 also includes: detecting (4302), by a particular storage system (4300A) of the storage systems (4300A-4300N), a communication fault with one or more of the storage systems (4300B-4300N), where the particular storage system (4300A) is configured to request mediation from a mediation target; determining (4304) that at least one of the one or more storage systems (4300B-4300N) is configured to request mediation from the mediation target, such as mediation service (4301), responsive to the communication fault; determining (4402), by a first set of one or more storage systems, that there is consistent communication among storage systems of the first set of one or more storage systems; determining (4404), by the first set of one or more storage systems, lack of communication with storage systems a the second set of one or more storage systems; determining (4406), by the first set of one or more storage systems, that the second set of one or more storage systems could not have sufficient members or votes to form a quorum; and responsive to determining (4304) that the one or more of the storage systems (4300B-4300N) are configured to request mediation from the mediation target, determining (4306) whether to request mediation from the mediation target.

However, the example method depicted in FIG. 45 further specifies that determining (4404), by the first set of one or more storage systems, lack of communication with storage systems with the second set of one or more storage systems further includes determining (4502) that the first set of one or more storage systems is unable to form the quorum in dependence upon the first set of one or more storage systems including exactly half of the votes for the storage systems synchronously replicating the dataset.

Determining (4502) that the first set of one or more storage systems is unable to form the quorum in dependence upon the first set of one or more storage systems including exactly half of the votes for the storage systems synchronously replicating the dataset may be implemented as described above with reference to whether or not one set of storage systems may establish that another set of storage systems is able to form a quorum—where in the case that the first set of one or more storage systems control exactly half, or more than half, of the total quorum votes, then it would not be possible for the remaining storage systems to establish a quorum for lack of votes.

For further explanation, FIG. 46 sets forth a flow chart illustrating an example method for determining active membership among storage systems synchronously replicating a dataset according to some embodiments of the present disclosure. The example method depicted in FIG. 46 is similar to the example method depicted in FIG. 44, as the example method depicted in FIG. 46 also includes: detecting (4302), by a particular storage system (4300A) of the storage systems (4300A-4300N), a communication fault with one or more of the storage systems (4300B-4300N), where the particular storage system (4300A) is configured to request mediation from a mediation target; determining (4304) that at least one of the one or more storage systems (4300B-4300N) is configured to request mediation from the mediation target, such as mediation service (4301), responsive to the communication fault; determining (4402), by a first set of one or more storage systems, that there is consistent communication among storage systems of the first set of one or more storage systems; determining (4404), by the first set of one or more storage systems, lack of communication with storage systems among the second set of one or more storage systems; determining (4406), by the first set of one or more storage systems, that the second set of one or more storage systems would be unable to form a quorum; and responsive to determining (4304) that the one or more of the storage systems (4300B-4300N) are configured to request mediation from the mediation target, determining (4306) whether to request mediation from the mediation target.

However, the example method depicted in FIG. 46 further specifies that determining (4406), by the first set of one or more storage systems, that the second set of one or more storage systems is unable to form a quorum further includes determining (4602) that the second set of one or more storage systems would be unable to forum a quorum in dependence upon the second set of one or more storage systems including half of the votes for the storage systems synchronously replicating the dataset.

Determining (4602) that the second set of one or more storage systems would be unable to forum a quorum in dependence upon the second set of one or more storage systems including no more than half of the votes for the storage systems synchronously replicating the dataset may be implemented as described above with reference to whether or not one set of storage systems may establish that another set of storage systems is able to form a quorum.

Figure 47:
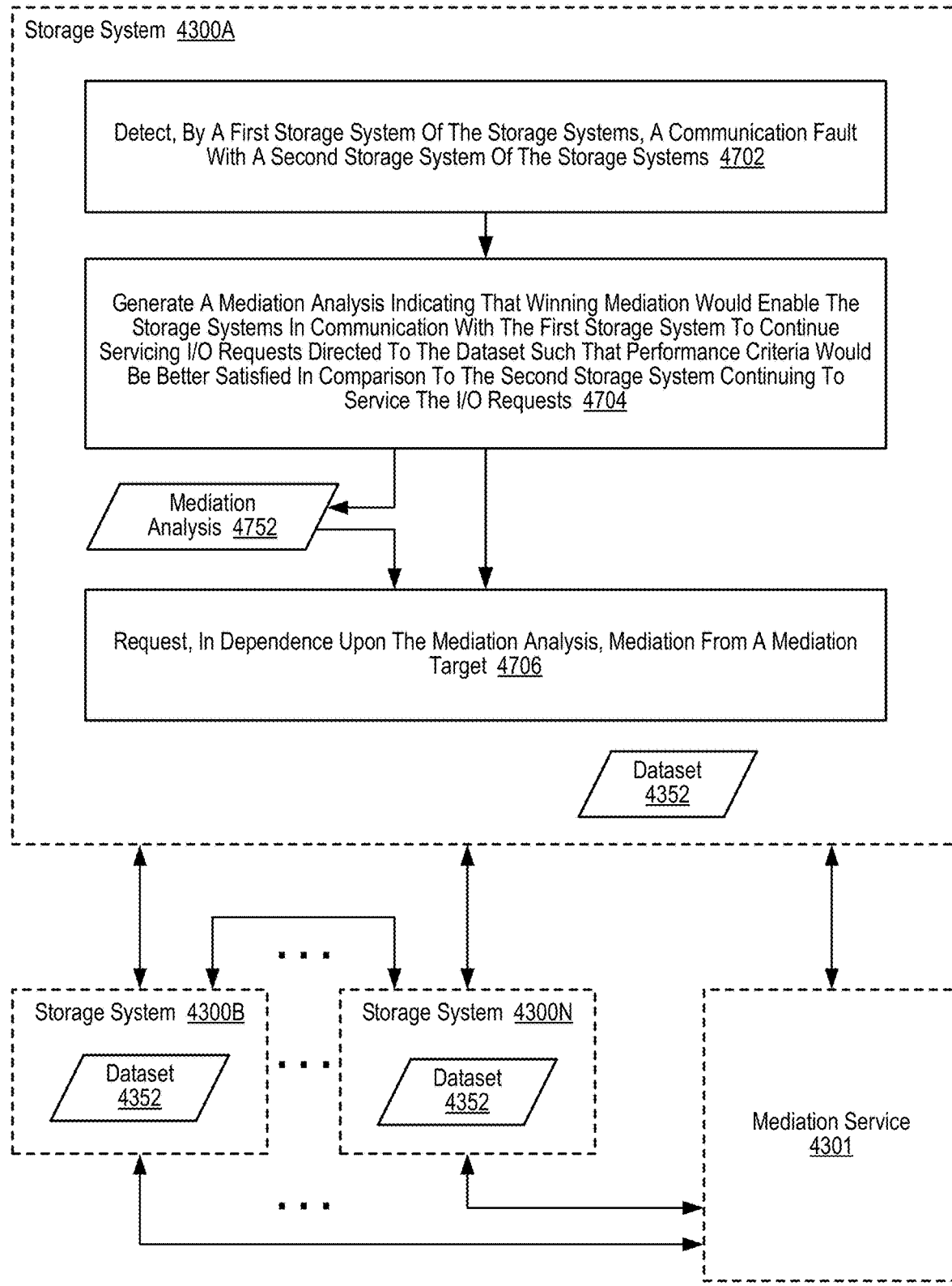
FIG. 47 sets forth a flow chart illustrating an example method for determining active membership among storage systems synchronously replicating a dataset according to some embodiments of the present disclosure.

For further explanation, FIG. 47 sets forth a flow chart illustrating an example method for determining active membership among storage systems synchronously replicating a dataset according to some embodiments of the present disclosure. Although depicted in less detail, the storage systems (4300A-4300N) depicted in FIG. 47 may be similar to the storage systems described above with reference to FIGS. 1A-1D, FIGS. 2A-2G, FIGS. 3A-3B, or any combination thereof. In fact, the storage systems (4300A-4300N) depicted in FIG. 47 may include the same, fewer, additional components as the storage systems described above.

The example method depicted in FIG. 47 includes detecting (4702), by a first storage system of the storage systems, a communication fault with a second storage system of the storage systems. Detecting (4702), by the first storage system of the storage systems, the communication fault with the second storage system of the storage systems may be implemented similarly to detecting (4302), by a particular storage system (4300A) of the storage systems (4300A-4300N), a communication fault with one or more of the storage systems (4300B-4300N), as described above with reference to FIG. 43.

The example method depicted in FIG. 47 also includes generating (4704), a mediation analysis (4752) indicating that winning mediation would enable the storage systems in communication with the first storage system to continue servicing I/O requests directed to the dataset (4352) such that performance criteria would be better satisfied in comparison to the second storage system continuing to service the I/O requests. Generating (4704), the mediation analysis (4752) may be implemented by the storage system (4300A) comparing one or more performance characteristics of the first storage system, and one or more storage systems in communication with the first storage system against one or more corresponding performance characteristics of one or more storage systems not in communication with the first storage system to determine which set of storage systems would more effectively, efficiently, or reliably, handle I/O requests. For example, a storage system may track multiple metrics indicating performance with regard to handling I/O requests, where the metrics may be influenced or based on processor speeds, network latencies, read latencies, write latencies, among other factors.

In other examples, the mediation analysis may reflect the determination of whether or not a quorum may be established with storage systems not in communication, where the mediation analysis indicates that the storage system (4300A) is to engage in mediation or a quorum protocol, as described above with reference to FIG. 43.

The example method depicted in FIG. 47 also includes requesting (4706), in dependence upon the mediation analysis, mediation from a mediation target (4301). Requesting (4706), in dependence upon the mediation analysis, mediation from a mediation target (4301) may be implemented as described above with reference to requesting mediation, and as further described with reference to application Ser. No. 15/703,559.

Figure 48:
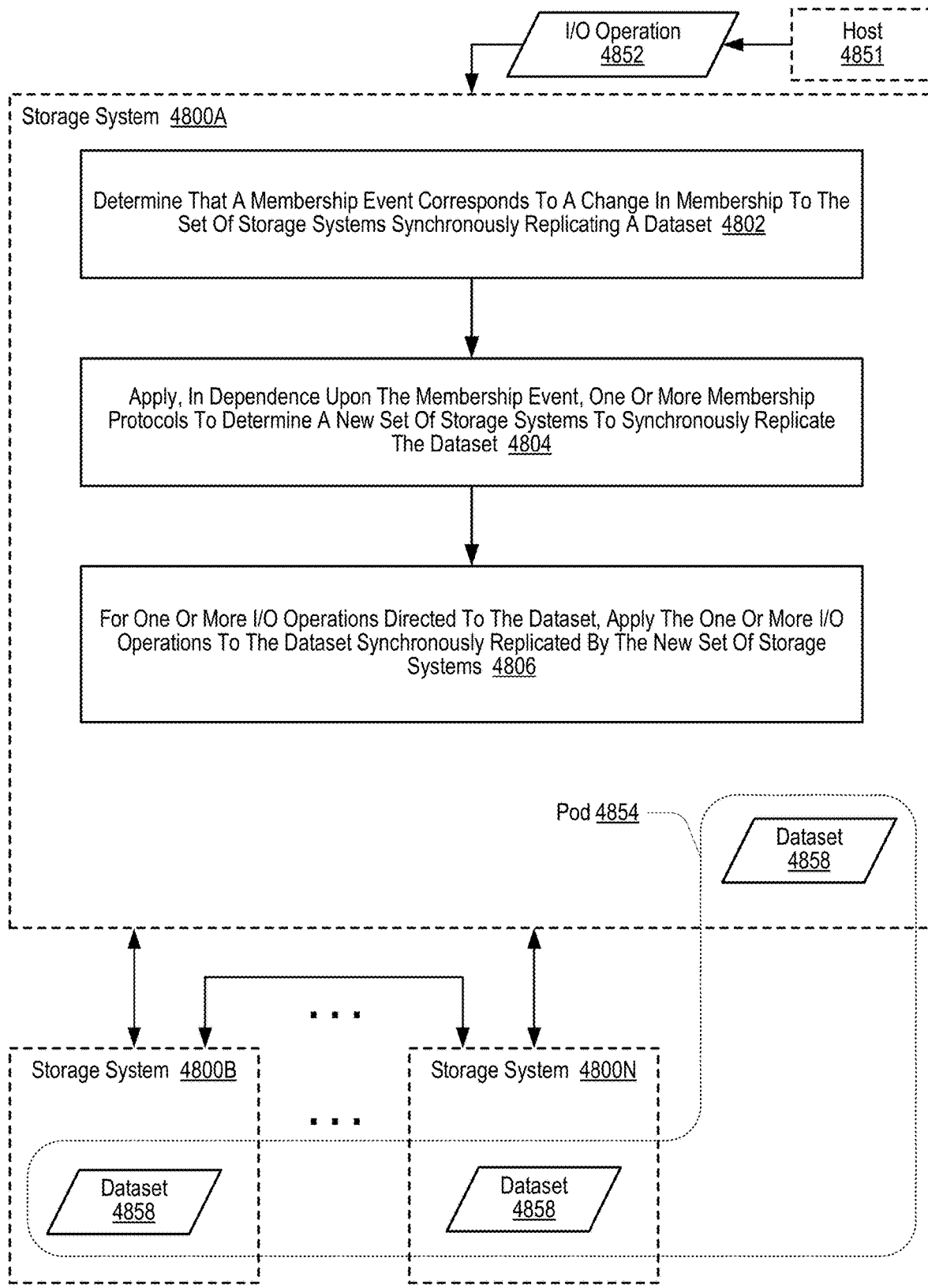
FIG. 48 sets forth a flow chart illustrating an example method for synchronizing metadata among storage systems synchronously replicating a dataset according to some embodiments of the present disclosure.

For further explanation, FIG. 48 sets forth a flow chart illustrating an example method for synchronizing metadata among storage systems synchronously replicating a dataset according to some embodiments of the present disclosure. Although depicted in less detail, the storage system (4800A) depicted in FIG. 48 may be similar to the storage systems described above with reference to FIGS. 1A-1D, FIGS. 2A-2G, FIGS. 3A-3C, or any combination thereof. In fact, the storage system (4800A) depicted in FIG. 48 may include the same, fewer, additional components as the storage systems described above.

In these examples, pod membership may be defined using a list of storage systems, where a subset of that list may be presumed to be synchronized, or in-sync, for the pod. In some cases, the subset of the list may include every one of the storage systems for the pod, and the list may be considered metadata that is common to all storage systems and that is maintained consistently across the pod through the use of one or more consistency protocols applied in response to changes in pod membership. A 'pod', as the term is used here and throughout the remainder of the present application, may be embodied as a management entity that represents a dataset, a set of managed objects and management operations, a set of access operations to modify or read the dataset, and a plurality of storage systems. Such management operations may modify or query managed objects equivalently through any of the storage systems, where access operations to read or modify the dataset operate equivalently through any of the storage systems. Each storage system may store a separate copy of the dataset as a proper subset of the datasets stored and advertised for use by the storage system, where operations to modify managed objects or the dataset performed and completed through any one storage system are reflected in subsequent management objects to query the pod or subsequent access operations to read the dataset. Additional details regarding a 'pod' may be found in previously filed provisional patent application No. 62/518,071, which is incorporated herein by reference.

A storage system may be considered in-sync for a pod if it is at least within a recovery of having identical idle content for the last written copy of the dataset associated with the pod. Idle content is the content after any in-progress modifications have completed with no processing of new modifications. In some cases, this may be referred to as "crash recoverable" consistency. Recovery of a pod may be considered the process of reconciling differences in applying concurrent updates to in-sync storage systems in the pod. Recovery may resolve any inconsistencies between storage systems in the completion of concurrent modifications that had been requested to various members of the pod, but that were never signaled to any requestor as having completed successfully.

Given the use of a list of storage systems for a pod, a storage system that is listed as a pod member, but that is not listed as in-sync for the pod, may be considered to be detached from the pod. Conversely, using the list of storage systems for a pod, a storage system that is listed as a pod member, and that is also listed as in-sync and currently available for actively serving data for the pod, may be considered to be online for the pod. Further, each storage system of a pod may have its own copy of the membership list, including which storage systems it last knew were in-sync, and which storage systems it last knew comprised the entire set of pod members.

In this example, to be online for a pod, a membership list for a given storage system indicates that the given storage system is in-sync for the pod—and the given storage system is able to communicate with all other storage systems in the membership list that are indicated to be in-sync. If a storage system is unable to establish that it is both in-sync and in communication with all other storage systems in the membership list indicated as in-sync, then the storage system stops processing new incoming I/O commands or requests that are directed to the pod until the storage system is able to establish that it is both in-sync and in communication with all other storage systems in the membership list indicated as in-sync. In some examples, if a storage system is unable to establish that it is both in-sync an in communication with all other storage systems in the membership list indicated as in-sync, then instead of stopping processing of new incoming I/O commands or requests, the storage system completes the I/O command or request with an error or exception. An I/O command or request may be a SCSI request, among other types of requests using different network protocols. As an example, a first storage system may determine that a second storage system within the membership list should be detached based on one or more criteria, where a result of the first storage system detaching the second storage system is that the first storage system continues to receive and process I/O commands at least because the first storage system is currently in-sync with all of the storage systems that remain in the membership list after removing the second storage system from the membership list. However, to avoid a "split brain" scenario that leads to irreconcilable datasets, dataset corruption, or application corruption, among other dangers, the second storage system must be prevented from detaching the first storage system such that the second storage system—in addition to the first storage system—continues to receive and process I/O commands directed to the dataset for the pod. In other words, if two different storage systems in a pod believe they have successfully detached each other, then a split brain scenario may ensue.

The situation of determining how to proceed when not communicating with another storage system in a membership list indicated as being in-sync may arise while a storage system is operating normally and then notices one or more lost communications, may arise while the storage system is recovering from a previous fault, may arise while the storage system is switching operations from one set of storage system controller to another set of storage system controller for whatever reason, may arise during startup of a storage system or when network interfaces are connected or enabled, or may arise during or after any combination of these or other kinds of events. In other words, any time that a storage system that is associated with a pod is unable to communicate with all known non-detached members of the membership list, the storage system may either wait, for example, for some predetermined amount of time, until communications may be established, or go offline and possibly continue waiting, or the storage system may determine that it is safe to detach the non-communicating storage system without risk of incurring a split brain scenario, and then continue. Further, if a safe detach happens quickly enough, a storage system may remain continuously online for the pod with little more than a short delay and with few or no faulted requests, or some requests may result in a "busy" or "try again" fault which can be recovered through lower-level requestor-side operation handling with no adverse effects on applications or other higher-level operations.

In some situations, a given storage system in a pod may determine that it is out-of-date or differently configured with respect to other storage systems in the pod. For example, the given storage system may determine that it is out-of-date, or differently configured, after first being added to a pod that is in-sync, where the given storage system may receive, or query for, metadata indicating that existing storage systems in the pod may be configured with software, firmware, hardware, or a combination of software, firmware, or hardware that is newer, or different, than the given storage system. As another example, the given storage system may determine that it is out-of-date, or differently configured, in response to the given storage system reconnecting to another storage system and determines that the other storage system had marked the given storage system as detached—in this case, the given storage system may wait until it connects to some other set of storage systems that are in-sync for the pod.

In these examples, the manner in which a storage system is added or removed from a pod or from an in-sync membership list may determine whether or not transient inconsistencies may be avoided. For example, transient inconsistencies may arise because each storage system may have a respective copy of a membership list and because two or more independent storage systems within a pod may update their respective membership lists at different times—or at least update their respective membership lists at a time other than the exact same time—and because a local copy of a membership list, that is possibly inconsistent with other membership lists, may be all the membership information that a give storage system may have available. As one example, if a first storage system is in-sync for a pod and a second storage system is added, then if the second storage system is updated to list both the first and second storage systems as in-sync in its respective membership list—before the first storage system lists both the first and second storage systems as in-sync in its respective membership list—then if a fault occurs and causes a restart of both the first and second storage systems, the second storage system may start up and wait to connect to the first storage system while the first storage systems may be unaware that it should or could wait for the second storage system. Continuing this example, if the second storage system then responds to an inability to connect with the first storage system by going through a process to detach the first storage system, then the second storage system may succeed in completing a process that the first storage system is unaware of, resulting in a split brain situation.

As an example technique to prevent the scenario described in the above example, storage systems in a pod may abide by a policy that individual storage systems do not disagree on whether they might opt to go through a detach process if they are not communicating. An example technique to ensure that the individual storage systems do not disagree is to ensure that when adding a new storage system to the in-sync membership list for a pod, the new storage system first stores that the new storage system is a detached member. At this point, the existing in-sync storage systems may locally store an indication that the new storage system is an in-sync pod member before the new storage system locally stores that the new storage system is an in-sync pod member. As a result, if there is a set of reboots or network faults or outages prior to the new storage system storing an in-sync status for itself, then the original storage systems—the storage systems that are in-sync members of the pod prior to the attempt of adding the new storage system—may detach the new storage system due to non-communication, but the new storage system will wait.

Continuing with this example, a reverse version of such a change in membership might be needed for removing a communicating storage system from a pod—where, initially, a storage system being removed, or detached, locally stores an indication of not being in-sync, and where the storage systems that are to remain in the pod subsequently store an indication that the system being removed is no longer in-sync. At this point, both the storage systems that are to remain in the pod and the storage systems being removed delete the storage system being removed from their respective membership lists. In this example, depending on the implementation, an intermediate, persisted detached state may not be necessary.

Further, whether or not care is required in local copies of membership lists may depend on the model storage systems use for monitoring each other or for validating their membership. For example, if a consensus model is used for both, or if an external system—or an external distributed or clustered system—is used to store and validate pod membership, then inconsistencies in locally stored membership lists may become inconsequential.

Some example models for resolving spontaneous membership changes include use of quorums, an external pod membership manager, or racing for a known resource. These example models may be used in response to communications failures, one or more storage systems in a pod failing, or a storage system starting up (or failing over to a secondary controller) that is unable to communicate with paired storage systems in a pod. Given these events that may trigger a change in pod membership, the different membership models may use different mechanisms to define how storage systems in a pod decide to detach one or more paired storage systems in a manner that is safe, and how to follow through on detaching one or more storage systems.

In some examples, there may be multiple membership lists used in reaching consensus on membership changes. For example, for a given group of storage systems, each storage system may be on an in-sync list or on an out-of-sync list, where each storage system stores a local, respective copy of an in-sync list and out-of-sync list. In this example, the group of storage systems may be storage systems {A, B}, and initially, a pod may include storage system A, where the pod is to be stretched, or expanded, from storage system A to storage system B. This stretching of the pod, which is equivalent to expanding the membership of storage systems for the pod, may begin by ensuring that storage systems A and B are connected. Ensuring that storage systems A and B are connected may be a configuration step that precedes the stretch operation—however, mere connectivity between storage systems A and B does not stretch the pod, but rather, connectivity between storage systems A and B allows for the pod to be stretched. In this example, storage system A may receive a command—for example from a management console for managing volumes, pods, and storage systems—indicating that the pod, or a particular volume of the pod on storage system A be stretched to storage system B. Given connectivity between storage systems A and B, the initial state may be described as storage system A storing an in-sync list indicating {A} and an out-of-sync list indicating {B}, and an epoch identifier equal to n, and a membership sequence equal to m, where storage system B stores an empty list for both an in-sync and out-of-sync list. In response to storage system A receiving a stretch command, storage system A may send to storage system B a message indicating a session identified by a pod identifier, an epoch identifier n, where in response, storage system B communicates back to storage system A. Further, a configuration level heartbeat among the storage systems A and B may distribute the in-sync and out-of-sync lists for storage system A to storage system B, where in response, storage system B determines that it is not an in-sync member, and may initiate a resynchronization operation with storage system A, which synchronizes the pod across both storage systems A and B. Further, in response to the resynchronization, storage system A may write an updated in-sync list {A, B} to storage system B, and then wait for storage system B to respond. At this point, storage system A is ready to begin communication with storage system B with regard to in-sync operations—however, storage system B does not participate in such communications until storage system B receives an updated in-sync list listing {A, B} as in-sync members of the pod. For example, storage system A may begin communication by initiating a clock exchange operation with storage system B, however storage system B may not begin the clock exchange operation until storage system B receives pending in-sync list {A, B}. Clock exchanges are described in greater detail within Application Nos. 62/470,172 and 62/518,071, which are included herein in their entirety.

Continuing with this example, to unstretch, or remove a storage system from membership in a pod, a member storage system may take the following steps. For example, if a pod membership is currently {A, B}, where both storage systems A and B have the same in-sync list of {A, B}, and out-of-sync list of { }, a current epoch of n, and a current membership sequence of m—in this scenario, storage system A may receive a request to unstretch the pod to exclude storage system B. In response to the unstretch request, storage system A may send to storage system B a message indicating committed membership lists indicating an in-sync list of {A, B}, and an out-of-sync list of { }, and indicating a pending membership list indicating an in-sync list of {A}, and an out-of-sync list of { }, and a current epoch of n, and a membership sequence of (m+1). Storage system B, in response to receiving the message from storage system A, applies the state information indicated within the message, and responds to storage system A that the state change has been applied. Storage system A, in response to receiving the acknowledgement from storage system B of the state change, updates its local state information to indicate committed membership lists for an in-sync list of {A}, and an out-of-sync list of { }, a pending membership list for an in-sync list of {A}, and an out-of-sync list of { }, and an epoch of (n+1), and storage system B then stops communicating with storage system B. Storage system B may detect the lost session, but has an in-sync list of {A}, so it requests to re-establish a session from storage system A, and receives a response indicating that storage system B is no longer a member of the pod.

In an example using quorum as a membership model, one technique for resolving detach operations is to use a majority—or quorum—model for membership. For example, given three storage systems, as long as two are communicating, the two in communication are able to agree to detach a third storage system that is not communicating; however, the third storage system is not able to, by itself, choose to detach either of the two storage systems in communication. In some cases, confusion may arise when storage system communication within the pod is inconsistent. In this example, with storage systems {A, B, C}, storage system A may be communicating with storage system B, but storage system A may not be communicating with storage system C, whereas storage system B may be communicating with both storage systems A and C. In this scenario, both storage systems A and B may detach storage system C—or both storage systems B and C may detach storage system A—but more communication between pod members may be needed to figure out the membership.

Continuing with this example, a quorum policy, or quorum protocol, may solve this scenario for adding or removing storage systems from a pod. For example, if a fourth storage system is added to the pod, then a majority of storage systems becomes three storage systems. The transition from three storage systems, with two required for majority, to a pod with four storage systems, with three required for majority, may require something similar to the model described previously for carefully adding a storage system to the in-sync list. For example, the fourth storage system, say storage system D, may start in an attaching state, but not yet an attached state, where it would never instigate a vote over quorum. Given that storage system D is in an attaching state, storage systems A, B, and C may each be updated to be aware of storage system D, and updated about a new requirement for three storage systems to reach a majority decision to detach any particular storage system from the pod. Further, removing a given storage system from the pod may similarly transition the given storage system to a detaching state before updating the other storage systems in the pod. In some examples, an issue with the quorum model may be that a common configuration is a pod with exactly two storage systems, and in such cases, one solution is to add storage systems into a network that only participate in quorum voting for a pod, but do not otherwise storage a dataset for a pod. In this case, such voting-only members would, in general, not instigate a round of quorum voting, but would only participate in voting instigated by storage systems in the pod that were configured as in-sync storage systems.

In an example using an external pod membership manager as a membership model, one technique includes managing membership transitions using an external system that is outside of the storage systems themselves to handle pod membership. For example, in order to become a member of a pod, a prospective storage system is configured to contact a pod membership system to request membership to the pod, and to verify that the prospective storage system is in-sync for the pod. In this model, any storage system that is online, or in-sync, for a pod, should remain in communication with the pod membership system and should wait, or go offline, if communication is lost with the pod membership system. In this example, a pod membership system may be implemented as a highly available cluster using various cluster tools, for example, Oracle™ RAC, Linux HA, VERITAS™ Cluster Server, IBM™ HACMP, or others. In other examples, a pod membership system may be implemented using distributed configuration tools such as Etcd™ or Zookeeper™, or a reliable distributed database such as DynamoDB™ by Amazon. Further, in other examples, pod membership may be determined using distributed consensus algorithms such as RAFT or PAXOS, where an implementation based on concepts from RAFT may include RAFT-based internal algorithms for membership, or may include RAFT-inspired algorithms for log-style update consistency, that may be used as part of an overall solution for determining valid, up-to-date membership and for determining the current value of the up-to-date membership information.

In an example using racing for a known resource as a membership model, or a racing protocol, a technique may be implemented by a cluster manager for a pod to resolve membership changes by requiring access to some resource that may be locked in some way to the exclusion of others, or by requiring access to a majority of several such resources. For example, one technique is to use a resource reservation, such as SCSI Reservations or SCSI Persistent Reservations, to get locks on one or more networked SCSI devices. In this example, if a majority of a configured set of these networked devices can be locked by a storage system, then that storage system may detach other storage systems; otherwise, the storage system would be unable to detach other storage systems. Further, in order to remain online, or in-sync, a storage system may need to reassert or test these locks on resources frequently, or be in communication with some other storage system that is asserting, reasserting, or testing these locks on resources. Further still, networked compute resources that may be asserted and tested against in a variety of ways may be used similarly.

Continuing with this example, to ensure that an extended outage by all storage system members of a pod can be handled properly while allowing one storage system to resume as a member and detach other storage system members, a network resource as described above must have persistent properties that may be used to test that some other storage system had not previously detached the resuming storage system pod member. However, in the case where a service may only provide for resource reservations, without the ability to persistently store status information or other metadata, then the resource reservation service may be used to gain access to some externally stored data, such as a third party database or cloud storage, which may then be queried and written to after a particular storage systems gains access—where data written may record information that a detached storage system may query to determine that it had been detached.

In some examples, a racing protocol may be implemented using a mediation service, which is a service that resolves whether one storage system has authority to detach another storage system from a pod. Example implementations of a mediation service are further described within application Ser. No. 15/703,559, which is incorporated herein in its entirety.

In another example, a combination of mechanisms may be used, which may be useful when a pod is stretched across more than two storage systems. In one example, preference rules may be combined with mediation. In the top-of-rack example, the larger central storage system in a data center or campus might itself be synchronously replicated to a large storage system in a second location. In that case, the top-of-rack storage systems may never resume alone, and may prefer any of the larger central storage systems in the two locations. The two larger storage systems in that case might be configured to mediate between each other, and any smaller storage systems that can connect to whichever of the two larger storage systems that remain online may continue servicing their pod, and any smaller storage systems that cannot connect to either of the two large storage systems (or that can only connect to one which is offline for the pod) may stop servicing the pod. Further, a preference model may also be combined with a quorum-based model. For example, three large storage systems in three locations might use a quorum model between each other, with smaller satellite or top-of-rack storage systems lacking any votes and working only if they can connect to one of the larger in-sync storage systems that are online.

In another example of combining mechanisms, mediation may be combined with a quorum model. For example, there may be three storage systems that normally vote between each other to ensure that two storage systems can safely detach a third that is not communicating, while one storage system can never detach the two other storage systems by itself. However, after two storage systems have successfully detached a third storage system, the configuration is now down to two storage systems that agree they are in-sync and that agree on the fact that the third storage system is detached. In that case, the two remaining storage systems may agree to use mediation (such as with a cloud service) to handle an additional storage system or network fault. This mediation and quorum combination may be extended further. For example, in a pod stretched between four storage systems, any three can detach a fourth, but if two in-sync storage systems are communicating with each other but not to two other storage systems they both currently consider to be in-sync, then they could use mediation to safely detach the other two. Even in a five storage system pod configuration, if four storage systems vote to detach a fifth, then the remaining four can use mediation if they are split into two equal halves, and once the pod is down to two storage systems, they can use mediation to resolve a successive fault. Five to three might then use quorum between the three allowing a drop to two, with the two remaining storage systems again using mediation if there is a further failure. This general multi-mode quorum and mediation mechanism can handle an additional number of situations that neither quorum between symmetric storage systems nor mediation by itself can handle. This combination may increase the number of cases where faulty or occasionally unreachable mediators can be used reliably (or in the case of cloud mediators, where customers may not entirely trust them). Further, this combination better handles the case of three storage system pods, where mediation alone might result in a first storage system successfully detaching a second and third storage systems on a network fault affecting just the first storage system. This combination may also better handle a sequence of faults affecting one storage system at a time, as described in the three to two, and then to one example. These combinations work because being in-sync and a detach operation result in specific states—in other words, the system is stateful because it is a process to go from detached to in-sync, and each stage in a sequence of quorum/mediator relationships ensures that at every point all online/in-sync storage systems agree on the current persistent state for the pod. This is unlike in some other clustering models where simply having a majority of cluster nodes communicating again is expected to be enough to resume operation. However, the preference model can still be added in, with satellite or top-of-rack storage systems never participating in either mediation or quorum, and serving the pod only if they can connect to an online storage system that does participate in mediation or quorum.

The example method depicted in FIG. 48 includes determining (4802) that a membership event corresponds to a change in membership to a set of storage systems (4800A-4800B) synchronously replicating a dataset (4858). Determining (4802) that the membership event corresponds to a change in membership to the set of storage systems (4800A-4800B) synchronously replicating the dataset (4858) may be implemented using different techniques. As one example, a storage system (4800A) may receive an I/O command indicating that a pod (4854) is to be stretched to include a new storage system (4800N) or indicating that a pod (4854) is to be unstretched to exclude an existing storage system (4800N). As another example, a storage system (4800A) may detect and determine that communication has been lost, or communication has become unreliable or inefficient beyond a specified threshold, with a particular storage system (4800N) of the set of storage systems.

Receiving, at the storage system (4800A) of the set of storage systems (4800A-4800N), an I/O command for the pod (4854), or an I/O operation (4852) directed to the dataset (4858), may be implemented by using one or more communication protocols for transporting packets or data across a network, such as a storage area network (158), the Internet, or any computer network across which a host computer (4851) may communicate with the storage system (4800A). In some cases, receiving an I/O command for the pod (4854), or an I/O operation (4852) directed to the dataset (4858), may be implemented by using a communications interconnect (173) in between storage systems (4800A-4800N) of the pod (4800A)—or some other communication channel that is internal to the storage system (4800A)—where the I/O commands or operations are received from applications or processes that are resident, or executing, on storage system computing resources. Further, applications that are resident, or remote, may use the storage systems (4800A-4800N) in implementing file systems, data objects, databases, which may provide functionality that is dependent upon the storage systems (4800A-4800N) being in-sync and online—and where any of these protocols or applications may be distributed implementations that operate on a synchronously replicated, and symmetrically accessible, underlying storage implementation. In this example, the storage system (4800A) may receive an I/O command or an I/O operation (4852) received at a network port, such as a SCSI port, where the I/O operation (4852) is a write command that is directed to a memory location that is part of the dataset (4858) being synchronously replicated across the storage systems (4800A-4800N) in the pod.

The example method depicted in FIG. 48 also includes applying (4804), in dependence upon the membership event, one or more membership protocols to determine a new set of storage systems to synchronously replicate the dataset (4858). Applying (4804), in dependence upon the membership event, the one or more membership protocols to determine the new set of storage systems to synchronously replicate the dataset (4858) may be implemented as described above using any one or more of the quorum protocols, external pod membership manager protocols, or racing protocols.

The example method depicted in FIG. 48 also includes, for one or more I/O operations (4852) directed to the dataset (4858), applying (4806) the one or more I/O operations (4852) to the dataset (4858) synchronously replicated by the new set of one or more storage systems. Applying (4806) the one or more I/O operations (4852) to the dataset (4858) synchronously replicated by the new set of storage systems may be implemented as described within Application Nos. 62/470,172 and 62/518,071, which are included herein in their entirety, and which describe receiving and handling I/O operations such that any changes to a dataset are synchronously replicated across all in-sync storage systems members of a pod.

Readers will appreciate that the methods described above may be carried out by any combination of storage systems described above. Furthermore, any of the storage systems described above may also pair with storage that is offered by a cloud services provider such as, for example, Amazon™ Web Services ('AWS'), Google™ Cloud Platform, Microsoft™ Azure, or others. In such an example, members of a particular pod may therefore include one of the storage systems described above as well as a logical representation of a storage system that consists of storage that is offered by a cloud services provider. Likewise, the members of a particular pod may consist exclusively of logical representations of storage systems that consist of storage that is offered by a cloud services provider. For example, a first member of a pod may be a logical representation of a storage system that consists of storage in a first AWS availability zone while a second member of the pod may be a logical representation of a storage system that consists of storage in a second AWS availability zone.

To facilitate the ability to synchronously replicate a dataset (or other managed objects such as virtual machines) to storage systems that consist of storage that is offered by a cloud services provider, and perform all other functions described in the present application, software modules that carry out various storage system functions may be executed on processing resources that are provided by a cloud services provider. Such software modules may execute, for example, on one or more virtual machines that are supported by the cloud services provider such as a block device Amazon™ Machine Image ('AMI') instance. Alternatively, such software modules may alternatively execute in a bare metal environment that is provided by a cloud services provider such as an Amazon™ EC2 bare metal instance that has direct access to hardware. In such an embodiment, the Amazon™ EC2 bare metal instance may be paired with dense flash drives to effectively form a storage system. In either implementation, the software modules would ideally be collocated on cloud resources with other traditional datacenter services such as, for example, virtualization software and services offered by VMware™ such as vSAN™. Readers will appreciate that many other implementations are possible and are within the scope of the present disclosure.

Readers will appreciate that in situations where a dataset or other managed object in a pod is retained in an on-promises storage system and the pod is stretched to include a storage system whose resources are offered by a cloud services provider, the dataset or other managed object may be transferred to the storage system whose resources are offered by a cloud services provider as encrypted data. Such data may be encrypted by the on-promises storage system, such that the data that is stored on resources offered by a cloud services provider is encrypted, but without the cloud services provider having the encryption key. In such a way, data stored in the cloud may be more secure as the cloud has no access to the encryption key. Similarly, network encryption could be used when data is originally written to the on-premises storage system, and encrypted data could be transferred to the cloud such that the cloud continues to have no access to the encryption key.

Through the use of storage systems that consist of storage that is offered by a cloud services provider, disaster recovery may be offered as a service. In such an example, datasets, workloads, other managed objects, and so on may reside on an on-premises storage system and may be synchronously replicated to a storage system whose resources are offered by a cloud services provider. If a disaster does occur to the on-premises storage system, the storage system whose resources are offered by a cloud services provider may take over processing of requests directed to the dataset, assist in migrating the dataset to another storage system, and so on. Likewise, the storage system whose resources are offered by a cloud services provider may serve as an on-demand, secondary storage system that may be used during periods of heavy utilization or as otherwise needed. Readers will appreciate that user interfaces or similar mechanisms may be designed that initiate many of the functions described herein, such that enabling disaster recovery as a service may be as simple as performing a single mouse click.

Through the use of storage systems that consist of storage that is offered by a cloud services provider, high availability may also be offered as a service. In such an example, datasets, workloads, other managed objects, that may reside on an on-premises storage system may be synchronously replicated to a storage system whose resources are offered by a cloud services provider. In such an example, because of dedicated network connectivity to a cloud such as AWS Direct Connect, sub-millisecond latency to AWS from variety of locations can be achieved. Applications can therefore run in a stretched cluster mode without massive expenditures upfront and high availability may be achieved without the need for multiple, distinctly located on-premises storage systems to be purchased, maintained, and so on. Readers will appreciate that user interfaces or similar mechanisms may be designed that initiate many of the functions described herein, such that enabling applications may be scaled into the cloud by performing a single mouse click.

Through the use of storage systems that consist of storage that is offered by a cloud services provider, system restores may also be offered as a service. In such an example, point-in-time copies of datasets, managed objects, and other entities that may reside on an on-premises storage system may be synchronously replicated to a storage system whose resources are offered by a cloud services provider. In such an example, if the need arises to restore a storage system back to a particular point-in-time, the point-in-time copies of datasets and other managed objects that are contained on the storage system whose resources are offered by a cloud services provider may be used to restore a storage system.

Through the use of storage systems that consist of resources that are offered by a cloud services provider, data that is stored on an on-premises storage system may be natively piped into the cloud for use by various cloud services. In such an example, the data that is in its native format as it was stored in the on-premises storage system, may be cloned and converted into a format that is usable for various cloud services. For example, data that is in its native format as it was stored in the on-premises storage system may be cloned and converted into a format that is used by Amazon™ Redshift such that data analysis queries may be performed against the data. Likewise, data that is in its native format as it was stored in the on-premises storage system may be cloned and converted into a format that is used by Amazon™ DynamoDB, Amazon™ Aurora, or some other cloud database service. Because such conversions occurs outside of the on-premises storage system, resources within the on-premises storage system may be preserved and retained for use in servicing I/O operations while cloud resources that can be spun-up as needed will be used to perform the data conversion, which may be particularly valuable in embodiments where the on-premises storage system operates as the primary servicer of I/O operations and the storage systems that consist of resources that are offered by a cloud services provider operates as more of a backup storage system. In fact, because managed objects may be synchronized across storage systems, in embodiments where an on-premises storage system was initially responsible for carrying out the steps required in an extract, transform, load ('ETL') pipeline, the components of such a pipeline may be exported to a cloud and run in a cloud environment. Through the use of such techniques, analytics as a service may also be offered, including using point-in-time copies of the dataset (i.e., snapshots) as inputs to analytics services.

Readers will appreciate that applications can run on any of the storage systems described above, and in some embodiments, such applications can run on a primary controller, a secondary controller, or even on both controllers at the same time. Examples of such applications can include applications doing background batched database scans, applications that are doing statistical analysis of run-time data, and so on.

Example embodiments are described largely in the context of a fully functional computer system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Embodiments can include be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A plurality of storage systems comprising:
   a dataset synchronously replicated across the storage systems, where each storage system includes a computer memory and a computer processor, the computer memory of each of the storage systems including computer program instructions that, when executed by the computer processor of a particular storage system, cause the particular storage system to carry out:
   attaching to a pod, the pod including the dataset and a plurality of storage systems, wherein:
      access operations to read or modify the dataset operate equivalently through any of the storage systems, each storage system stores a separate copy of the dataset as a proper subset of the datasets stored and advertised for use by the storage system, and
      operations that modify the dataset, performed and completed through any one member storage system, are reflected in subsequent access operations to read the dataset.

2. The plurality of storage systems of claim 1, wherein one or more of the storage systems include computer program instructions that, when executed by the computer processor of a particular storage system, cause the particular storage system to carry out processing a request to read a portion of the dataset locally.

3. The plurality of storage systems of claim 1, wherein one or more of the storage systems include computer program instructions that, when executed by the computer processor of a particular storage system, cause the particular storage system to carry out:
   keeping the dataset on the particular storage system accessible for dataset operations responsive to determining that the particular storage system should remain in the pod at after detecting a disruption in data communications with one or more of the other storage systems.

4. The plurality of storage systems of claim 3, wherein one or more of the storage systems include computer program instructions that, when executed by the computer processor of a particular storage system, cause the particular storage system to carry out:
   making the dataset on the particular storage system accessible for dataset operations responsive to a detection that the disruption in data communications with one or more of the other storage systems has been repaired.

5. The plurality of storage systems of claim 3, wherein at least one of the storage systems include computer program instructions that, when executed by the computer processor of each storage system, cause the storage system to carry making the dataset on the particular storage system inaccessible for dataset operations responsive to determining that the particular storage system should not remain in the pod.

6. The plurality of storage systems of claim 1, wherein two or more of the storage systems include computer program instructions that, when executed by the computer processor of each storage system, cause each storage system to carry out:
   asynchronously replicating, to a target storage system that is not one of the plurality of storage systems across which the dataset is synchronously replicated, a portion of the dataset that is not being asynchronously replicated to the target storage system by any of the other storages systems, wherein the two or more storage systems collectively replicate the dataset in full to the target storage system.

7. The plurality of storage systems of claim 1, wherein at least one of the storage systems is embodied as cloud storage that is provided by a cloud services provider.

8. A method comprising:
   attaching, by a plurality of storage systems across which a dataset is synchronously replicated, to a pod, the pod including the dataset and a plurality of storage systems, wherein:
      access operations to read or modify the dataset operate equivalently through any of the storage systems, each storage system stores a separate copy of the dataset as a proper subset of a plurality of datasets stored and advertised for use by the storage system, and operations to modify the dataset, performed and completed through any one member storage system, are reflected in subsequent access operations to read the dataset.

9. The method of claim 8 further comprising:

processing, by a particular storage system that is one of the plurality of storage systems, a request to read a portion of the dataset locally.

10. The method of claim 8 further comprising:

keeping the dataset on a particular storage system accessible for dataset operations responsive to determining that the particular storage system should remain in the pod at after detecting a disruption in data communications with one or more of the other storage systems.

11. The method of claim 10 further comprising:

making the dataset on the particular storage system accessible for dataset operations responsive to a detection that the disruption in data communications with one or more of the other storage systems has been repaired.

12. The method of claim 10, further comprising making the dataset on the particular storage system inaccessible for dataset operations responsive to determining that the particular storage system should not remain in the pod.

13. The method of claim 8 further comprising:

asynchronously replicating, to a target storage system that is not one of the plurality of storage systems across which the dataset is synchronously replicated, a portion of the dataset that is not being asynchronously replicated to the target storage system by any of the other storages systems, wherein the plurality of storage systems collectively replicate the dataset in full to the target storage system.

14. The method of claim 8 wherein at least one of the storage systems is embodied as cloud storage that is provided by a cloud services provider.

15. An apparatus for synchronously replicating a dataset across a plurality of storage systems, the apparatus comprising a computer processor, a computer memory operatively coupled to the computer processor, the computer memory having disposed within it computer program instructions that, when executed by the computer processor, cause the apparatus to carry out:

attaching, by the plurality of storage systems, to a pod, the pod including the dataset and a plurality of storage systems, wherein:

access operations to read or modify the dataset operate equivalently through any of the storage systems, each storage system stores a separate copy of the dataset as a proper subset of a plurality of datasets stored and advertised for use by the storage system, and operations to modify the dataset, performed and completed through any one member storage system, are reflected in subsequent access operations to read the dataset.

16. The apparatus of claim 15 further comprising computer program instructions that, when executed by the computer processor, cause the apparatus to carry out:

processing a request to read a portion of the dataset locally.

17. The apparatus of claim 15 further comprising computer program instructions that, when executed by the computer processor, cause the apparatus to carry out:

keeping the dataset on a particular storage system accessible for dataset operations responsive to determining that the particular storage system should remain in the pod at after detecting a disruption in data communications with one or more of the other storage systems.

18. The apparatus of claim 17 further comprising computer program instructions that, when executed by the computer processor, cause the apparatus to carry out:

making the dataset on the particular storage system accessible for dataset operations responsive to a detection that the disruption in data communications with one or more of the other storage systems has been repaired.

19. The apparatus of claim 17, further comprising computer program instructions that, when executed by the computer processor, cause the apparatus to carry out: making the dataset on the particular storage system inaccessible for dataset operations responsive to determining that the particular storage system should not remain in the pod.

20. The apparatus of claim 15 further comprising computer program instructions that, when executed by the computer processor, cause the apparatus to carry out:

asynchronously replicating, to a target storage system that is not one of the plurality of storage systems across which the dataset is synchronously replicated, a portion of the dataset that is not being asynchronously replicated to the target storage system by any of the other storages systems, wherein the plurality of storage systems collectively replicate the dataset in full to the target storage system.

\* \* \* \* \*